United States Patent [19]
Tezuka et al.

[11] Patent Number: 5,845,078
[45] Date of Patent: Dec. 1, 1998

[54] NETWORK INTEGRATED CONSTRUCTION SYSTEM, METHOD OF INSTALLING NETWORK CONNECTION MACHINES, AND METHOD OF SETTING NETWORK PARAMETERS

[75] Inventors: Satoru Tezuka; Satoru Matsumura, both of Yokohama; Kenichi Kihara, Fujisawa; Hiroshi Furukawa, Yokohama; Shigeru Miyake, Yokohama; Reiko Iwasaki, Yokohama; Koichi Kimura, Yokohama; Toru Horimoto, Atsugi; Hiromichi Itoh, Yokohama; Hideaki Ishida, Kawasaki; Naomichi Nonaka, Kawasaki; Keiichi Nakane, Yokohama, all of Japan

[73] Assignee: Hitachi, Ltd., Tokyo, Japan

[21] Appl. No.: 46,942

[22] Filed: Apr. 16, 1993

[30]    Foreign Application Priority Data

| Apr. 16, 1992 | [JP] | Japan | 4-096279 |
| Jul. 21, 1992 | [JP] | Japan | 4-194195 |
| Aug. 12, 1992 | [JP] | Japan | 4-235165 |
| Oct. 22, 1992 | [JP] | Japan | 4-284175 |

[51] Int. Cl.⁶ .......................... H04L 12/12; G06F 15/177
[52] U.S. Cl. ................... 395/200.52; 395/200.58; 395/712; 395/651; 395/652
[58] Field of Search ................... 395/800, 700, 395/200, 200.01, 712, 651, 652, 200.52, 200.58

[56]    References Cited

U.S. PATENT DOCUMENTS

| 5,021,949 | 6/1991 | Morten et al. | 395/200 |
| 5,142,680 | 8/1992 | Ottman et al. | 395/700 |
| 5,155,847 | 10/1992 | Kirouac et al. | 395/600 |
| 5,208,912 | 5/1993 | Nakayama et al. | 395/200 |
| 5,247,683 | 9/1993 | Holmes et al. | 395/700 |
| 5,280,627 | 1/1994 | Flaherty et al. | 395/700 |
| 5,353,432 | 10/1994 | Richek et al. | 395/500 |
| 5,367,686 | 11/1994 | Fisher et al. | 395/700 |
| 5,381,534 | 1/1995 | Shi | 395/200 |

FOREIGN PATENT DOCUMENTS

| 03-235125 | 10/1991 | Japan | G06F 9/445 |

OTHER PUBLICATIONS

Mamvam, "Maintenance of System Software on a Wide Area Network of Mainframes," IEEE, 1991, pp. 113–119.

Pau et al., "SOFTM: A Software Maintanence Expert System in Biology," IEEE 1988, pp. 306–311.

Flauih et al., "Management of Distibuted Applications in Large Networks" IEEE, 1988, pp. 232–241.

"Challenge? Personal Computer LAN", Nikkei Byte, Oct. 1991 no translation.

*Primary Examiner*—Alyssa H. Bowler
*Assistant Examiner*—John Follansbee
*Attorney, Agent, or Firm*—Antonelli, Terry, Stout & Kraus, LLP

[57]    ABSTRACT

Parameters representing types of machines to be connected to a network, connection types thereof to the network, and operation modes thereof in the network system are set from an information processing apparatus. The obtained parameters are written as parameter files on a recording medium. In each network machine, a network system is automatically constructed by referencing the files. Consequently, the parameter setting operations for the installation of the machine are simplified and there is achieved automation of operations in each network machine.

38 Claims, 124 Drawing Sheets

MULTIVENDER ENVIRONMENT

FILE SERVER INSTALL
SCREEN (PORTION)

BIT MAP　　LIST OF STATE CHANGE NAMES

| STATE | STATE OF BUTTON | SELECTION WAITING STATE | NAME | REFERENCE |
|---|---|---|---|---|
| 1 | NOT DEPRESSED | ABSENT | O F | FIG.130<br>416001 OF FIG.135 |
| 2 | | PRESENT | O F F | FIG.131<br>416002 OF FIG.135 |
| 3 | DEPRESSED | ABSENT | O N | FIG.132<br>416003 OF FIG.135 |
| 4 | | PRESENT | O N F | FIG.133<br>416004 OF FIG.135 |
| 5 | INVALID | ABSENT | D I S | FIG.134<br>416005 OF FIG.135 |

BUTTON STATE 2

BUTTON STATE 3

BUTTON STATE 4

BUTTON STATE 5

FIG.105
LIST OF CHANGES IN BUTTON STATE
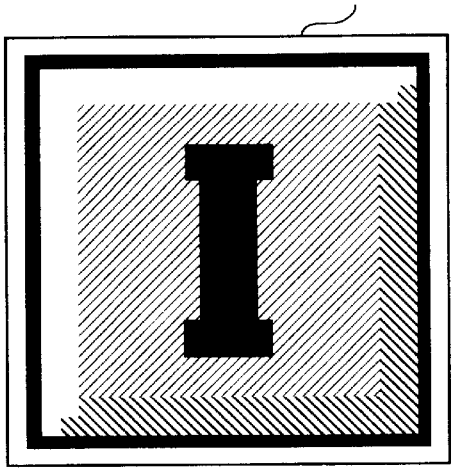
416001
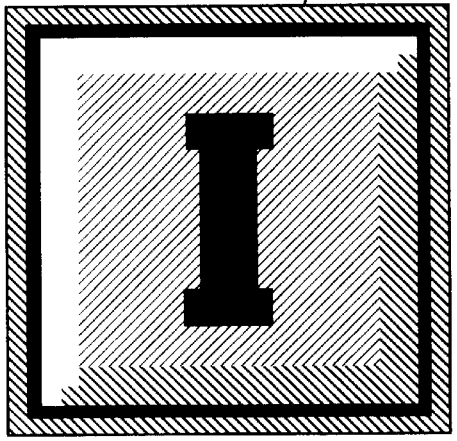
416002
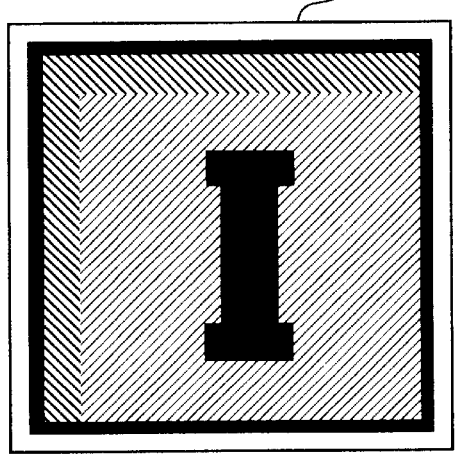
416003
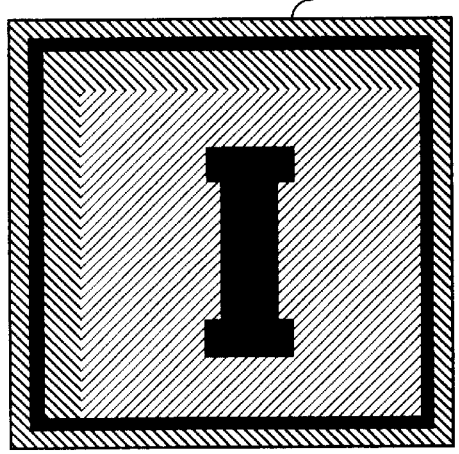
416004
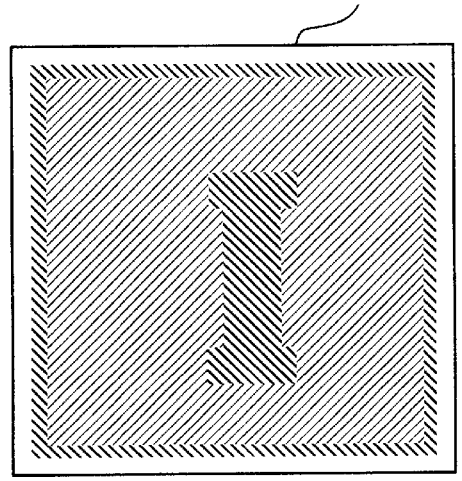
416005

STATE CHANGE 1

STATE CHANGE 2

STATE CHANGE 3

STATE CHANGE 4

FIG.110
BIT MAP CLASSIFICATION BY FUNCTION (NO1)

| W×L | BUTTON NAME | PICTURE | POSITION OF USE | REFERENCE EXAMPLE | FUNCTION |
|---|---|---|---|---|---|
| 16×12 | DOWN | O | FWP | 120005 OF FIG.120 | INCREMENT / DECREMENT OF NUMERIC VALUE |
| | UP | O | FWP | 120004 OF FIG.120 | |
| 24×24 | #1 | | FWP | 122001 OF FIG.122 | (F) CARD NO. SELECTION |
| | #2 | | FWP | 122002 OF FIG.122 | (F) DISK NO. SELECTION |
| | #3 | | FWP | 122003 OF FIG.122 | (W) CARD NO. SELECTION |
| | #4 | | FWP | 122004 OF FIG.122 | (W) DEFAULT NO. SELECTION |
| | #5 | | FWP | 122005 OF FIG.122 | (P) SLOT NO. SELECTION |
| | #6 | | F  P | 122006 OF FIG.122 | (P) DATA BIT NO. SELECTION |
| | #7 | | F  P | 122007 OF FIG.122 | |
| | #8 | | F  P | 122008 OF FIG.122 | |
| 32×32 | SORT | O | P | 313004 OF FIG.313 | SORTING ORDER SELECTION |
| 44×24 | LONG NO | | P | 316008 OF FIG.316 | SELECTION OF PRESENCE / ABSENCE OF X-ON / X-OFF |
| | LONG YES | | P | 316008 OF FIG.316 | |
| | STOP BIT 1 | | P | 316006 OF FIG.316 | STOP BIT SELECTION |
| | STOP BIT 1.5 | | P | 316006 OF FIG.316 | |
| | STOP BIT 2 | | P | 316006 OF FIG.316 | |
| | EVEN PARITY | | P | 316007 OF FIG.316 | PARITY SELECTION |
| | WITHOUT PARITY | | P | 316007 OF FIG.316 | |
| | ODD PARITY | | P | 316007 OF FIG.316 | |
| 40×40 | AUTO | | W | 233008 OF FIG.223 | (W) LAN CARD HARDWARE SELECTION |
| | MANUAL | | W | 233009 OF FIG.223 | |
| | BNC | ◉ | FW | 124009 OF FIG.124 | CABLE SHAPE SELECTION FOR LAN CARDS |
| | DIX | ◉ | FW | 124010 OF FIG.124 | |
| | TWIST PAIR (TP) | ◉ | FW | | |
| | DEFAULT | O | FWP | 122021 OF FIG.122 | DEFAULT SETTING |

FIG.111

BIT MAP CLASSIFICATION BY FUNCTION (NO2)

| W×L | BUTTON NAME | PICTURE | POSITION OF USE | REFERENCE EXAMPLE | REMARKS |
|---|---|---|---|---|---|
| 40×40 | DOS | | F | 122017 OF FIG.122 | OS(S') SELECTION FOR HARD DISK |
| | ETC | | | | |
| | NW | | F | 122016 OF FIG.122 | |
| | ENS | | W | 222004 OF FIG.222 | EXTENDED MEMORY SELECTION FOR SYSTEM SETTING |
| | XNS | | W | 222005 OF FIG.222 | |
| | NO | | W | 222003 OF FIG.222 | |
| | FD | ◎ | W | 222007 OF FIG.222 | INSTALL DESTINATION SELECTION FOR SYSTEM INSTALLATION |
| | FD/HD | | W | 222009 OF FIG.222 | |
| | HD | ◎ | W | 222008 OF FIG.222 | |
| | HARD DISK | ○ | FW | 122011 OF FIG.122 | HARDWARE SETTING |
| | COMMUNICATION | ○ | FWP | 124012 OF FIG.124 | (F)COMMUNICATION METHOD SETTING (P)COMMUNICATION TYPE SETTING |
| | YES | | W | | |
| 48×40 | LOCAL | ◎ | P | 315003 OF FIG.315 | SELECTION OF PRINTER CONNECTING DESTINATION |
| | REMOTE | ◎ | P | 315005 OF FIG.315 | |
| | PARALLEL | ◎ | P | 315006 OF FIG.315 | PORT TYPE SELECTION FOR PRINTER SETTING |
| | SERIAL | ◎ | P | 315006 OF FIG.315 | |
| 48×48 | LAN CARD | ○ | FW | 121002 OF FIG.121 | INSTALLER MENU SELECTION |
| | DISK | ○ | F | 121001 OF FIG.121 | |
| | OPTION | ○ | FWP | 121004 OF FIG.121 | |
| | PRINTER | ○ | P | 310004 OF FIG.310 | |
| | SYSTEM | ○ | FWP | 121003 OF FIG.121 | |
| 80×48 | DESCRIPTION | ○ | FWP | 121005 OF FIG.121 | DESCRIPTION BUTTON |

BUTTON SIZE COMPARISON

FIG.113
DISPLAY OF CURVED LINE
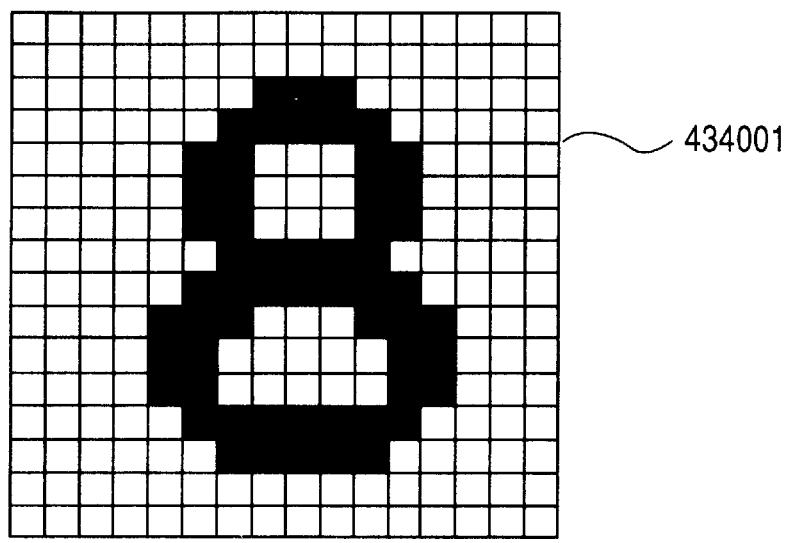
434001
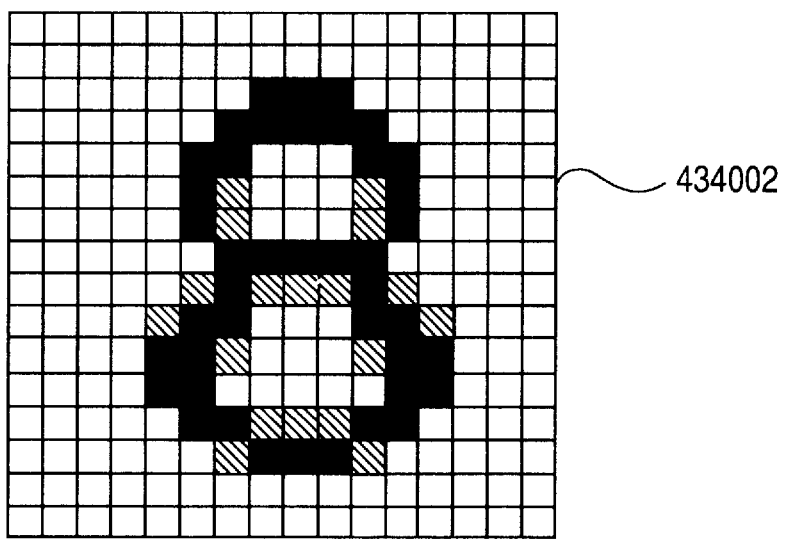
434002
 434003
 434004

DISPLAY IN HALFTONE

BUTTON WITHOUT SHADE ('ON' CHARACTER IN CLEAR COLOR)

441001

BUTTON WITHOUT SHADE ('ONF' CHARACTER IN CLEAR COLOR)

442001

BUTTON WITH SHADE : ON CHARACTER IN CLEAR COLOR

BUTTON WITH SHADE : ONF CHARACTER IN CLEAR COLOR

FIG.133

```
*************************************************
*              THIS IS PARAMETER FILE OF         *
*                   SYSTEM MANAGER                *
*                FOR EASY INSTALLATIONS           *
*                  (C)COPYRIGHT 1992,             *
*   MICROELECTRONICS PRODUCTS DEVELOPMENT LAB. (MPDL),   *
*                     HITACHI, LTD.               *
*                  ALL RIGHTS RESERVED.           *
*                                                 *
*                JAPANESE (TRANSLATION            *
*                 OF DESCRIPTION ABOVE)           *
*                                                 *
*************************************************
```
⎫
⎬ 801005
⎭

| | | | |
|---|---|---|---|
| 801010 | | | |
| 801011 | A00 | COUNTER FOR MANAGEMENT USES | : 01 |
| 801012 | A10 | OBJECTIVE MACHINE TYPE NAME | : 3010 |
| 801013 | A20 | OBJECTIVE NETWARE VERSION | : v3.1J |
| 801020 | A30 | SYSTEM MANAGER VERSION | : v1.00 |
| 801021 | S00 | FILE SERVER NAME | : NETWAREFILESERVER01 |
| 801022 | S20 | IPX INTERNAL NUMBER | : 00000001 |
| 801030 | S30 | NETWORK NUMBER | : 80000001 |
| 801031 | D00 | NO. OF DISK DRIVES | : 01 |
| 801032 | D10 | HARD DISK DRIVER NAME | : ISADISK |
| 801033 | D20 | DISK INTERRUPTION VECTOR | : 0E |
| 801034 | D40 | DISK PORT ADDRESS | : 01F0 |
| 801035 | D70 | TOTAL PHYSICAL DISK CAPACITY | : 0080 |
| 801036 | D80 | NO. OF DISK PARTITIONS | : 02 |
| 801037 | D81 | PARTITION OS | : MSDOS |
| 801038 | D82 | PARTITION CAPACITY | : 0004 |
| 801039 | D81 | PARTITION OS | : NET WARE |
| 801050 | D82 | PARTITION CAPACITY | : 0066 |
| 801051 | L00 | NO. OF LAN CARDS | : 01 |
| 801052 | L10 | LAN CARD DRIVER NAME | : MICRONET |
| 801053 | L20 | LAN CARD INTERRUPTION VECTOR | : 05 |
| 801054 | L40 | LAN PORT ADDRESS | : 0260 |
| 801055 | L50 | LAN CARD INSERTION SLOT NO. | : 08 |
| 801056 | L60 | LAN CARD FRAME MEMORY | : 000C8000 |
| 801057 | L80 | LAN CARD CABLE TYPE | : DIX |
| 801058 | L90 | LAN CARD FRAME TYPE | : ETHERNET_802.3 |
| 801059 | LA0 | RETRY COUNT FOR LAN CARD TRANSMISSION | : EC |
| | LB0 | LAN CARD NODE NO. | : 000000000000 |

```
***************************************************
*            THIS IS PARAMETER FILE OF             *
*                  SYSTEM MANAGER                  *
*               FOR EASY INSTALLATIONS             *
*                  (C) COPYRIGHT 1992,             *
*   MICROELECTRONICS PRODUCTS DEVELOPMENT LAB. (MPDL), *
*                     HITACHI, LTD.                *
*                  ALL RIGHTS RESERVED.            *
*                 JAPANESE (TRANSLATION            *
*                  OF DESCRIPTION ABOVE)           *
***************************************************
```

| | | | |
|---|---|---|---|
| 802010 | A00 | COUNTER FOR MANAGEMENT USES | : 00 |
| 802011 | A10 | OBJECTIVE MACHINE TYPE NAME | : AX |
| 802012 | A20 | OBJECTIVE NETWARE VERSION | : v3.1J |
| 802013 | A30 | SYSTEM MANAGER VERSION | : v1.00 |
| 802020 | S10 | WORKSTATION NAME | : FLORA3010LSTWORKSTATION |
| 802021 | S40 | WORK DRIVE SETTING UNIT | : HD |
| 802022 | S50 | EXTENDED MEMORY DRIVER | : NONE |
| 802023 | S70 | WORKSTATION OS | : MSDOS |
| 802030 | L00 | NO. OF LAN CARDS | : 01 |
| 802031 | L10 | LAN CARD DRIVE NAME | : MICRONET |
| 802032 | L80 | LAN CARD CABLE TYPE | : BNC |
| 802033 | LD0 | LAN CARD SETTING NO. | : 00 |

FIG.135

```
**************************************************************
*               THIS IS PARAMETER FILE OF                     *
*                   SYSTEM MANAGER                            *
*                 FOR EASY INSTALLATIONS                      *
*                    (C) COPYRIGHT 1992,                      *
*   MICROELECTRONICS PRODUCTS DEVELOPMENT LAB. (MPDL),        *
*                     HITACHI, LTD.                           *
*                  ALL RIGHTS RESERVED.                       *
*                                                             *
*                  JAPANESE (TRANSLATION                      *
*                   OF DESCRIPTION ABOVE)                     *
*                                                             *
**************************************************************
```

| | | | |
|---|---|---|---|
| 803010 | A00 | COUNTER FOR MANAGEMENT USES | : 03 |
| 803011 | A20 | OBJECTIVE NETWARE VERSION | : v3.1J |
| 803012 | A30 | SYSTEM MANAGER VERSION | : v1.00 |
| 803020 | S00 | FILE SERVER NAME | : |
| 803021 | S90 | PRINT SERVER NAME | : PSV01 |
| 803022 | SA0 | PRINT SERVER PASSWORD H | : |
| 803023 | SA1 | PRINT SERVER PASSWORD M | : |
| 803024 | SA2 | PRINT SERVER PASSWORD L | : |
| 803025 | SB0 | PRINT SERVER OPERATOR | : SUPERVISOR |
| 803026 | SC0 | PRINT SERVER USER | : EVERYONE |
| 803030 | P00 | NO. OF PRINTERS | : 01 |
| 803031 | P10 | PRINTER MACHINE TYPE NAME | : AX |
| 803032 | P11 | IDENTIFIER | : ESCP |
| 803033 | P20 | PRINTER NAME | : PRINTER01 |
| 803034 | P30 | CONNECTING DESTINATION | : 00 LOCAL |
| 803035 | P31 | PORT TYPE | : 00 PARALLEL |
| 803036 | P32 | PORT NO. | : 00 |
| 803037 | P33 | TYPE NO. | : 00 |
| 803038 | P40 | WITH/WITHOUT INTERRUPTION VECTOR | : 01 WITH INTERRUPTION VECTOR |
| 803039 | P41 | INTERRUPTION VECTOR NO. | : 07 |
| 803040 | P50 | BUFFER SIZE | : 03 |
| 803041 | P70 | QUEUE SERVICE MODE | : 00 FORM TO BE CHANGED IF NECESSARY |
| 803042 | P71 | FORM NO. OF USER SPECIFICATION | : 00 |
| 803043 | P80 | PRINT JOB ENVIRONMENT NAME | : PRINTER01 |
| 803044 | P81 | WITH/WITHOUT CODE CONVERSION | : 00 WITH CODE CONVERSION |
| 803045 | P90 | PRINT FORM NAME | : A4 (JIS, HORIZONTAL) |
| 803046 | P91 | PRINT FORM LENGTH | : 66 |
| 803047 | P92 | PRINT FORM WIDTH | : 80 |
| 803050 | Q00 | PRINT QUEUE NAME | : PRINTER01 |
| 803051 | Q10 | PRINT QUEUE PRIORITY | : 01 |
| 803052 | Q20 | PRINT QUEUE OPERATOR | : SUPERVISOR |
| 803053 | Q30 | PRINT QUEUE USER | : EVERYONE |

PARAMETER FILE SYSTEM

DELIVERY OF PARAMETERS

INITIAL SCREEN OF FS_AUTO

WINDOW 1 OF FS_AUTO

WINDOW 2 OF FS_AUTO

WINDOW 3 OF FS_AUTO

WINDOW 4 OF FS_AUTO

WINDOW 5 OF FS_AUTO

WINDOW 6 OF FS_AUTO

WINDOW 7 OF FS_AUTO

WINDOW 8 OF FS_AUTO

FIG.149

WINDOW 9 OF FS_AUTO

〈 PARAMETERS BEING UPDATED 〉

FIG.150

WINDOW 10 OF FS_AUTO

〈 END OF PARAMETER UPDATE 〉

FIG.151

WINDOW 11 OF FS_AUTO

HARD DISK WILL BE FORMATTED.
SAVE DOS DIRECTORY FOR BACKUP ?

YES
NO  — 912001

WINDOW 12 OF FS_AUTO

WINDOW 13 OF FS_AUTO

WINDOW 14 OF FS_AUTO

WINDOW 15 OF FS_AUTO

WINDOW 16 OF FS_AUTO

FIG.157

WINDOW 17 OF FS_AUTO

⟨ SYSMAN_AUTO BEING UPDATED ⟩

FIG.158

WINDOW 18 OF FS_AUTO

⟨ END OF SYSMAN_AUTO UPDATE ⟩

FIG.159

WINDOW 19 OF FS_AUTO

⟨ PARTITION BEING INITIALIZED ⟩
SCREEN IS TURNED OFF.
WAIT, PLEASE.

FIG.160

WINDOW 20 OF FS_AUTO

```
( PARTITION BEING INITIALIZED )
WAIT PLEASE
```

FIG.161

WINDOW 21 OF FS_AUTO

```
( END OF PARTITION INITIALIZATION )
```

FIG.162

WINDOW 22 OF FS_AUTO

SET DOS SYSTEM DISK IN DRIVE A.

CONTINUE
CANCEL — 923001

WINDOW 23 OF FS_AUTO

WINDOW 24 OF FS_AUTO

WINDOW 25 OF FS_AUTO

WINDOW 26 OF FS_AUTO

WINDOW 27 OF FS_AUTO

FIG.168

WINDOW 28 OF FS_AUTO ( SYSMAN-1 BEING COPIED )

FIG.169

WINDOW 29 OF FS_AUTO ( END OF SYSMAN-1 COPY )

FIG.170

WINDOW 30 OF FS_AUTO

SET SYSTEM-2 DISK IN DRIVE A.

CONTINUE
CANCEL — 931001

WINDOW 31 OF FS_AUTO

WINDOW 32 OF FS_AUTO

WINDOW 33 OF FS_AUTO

WINDOW 34 OF FS_AUTO

WINDOW 35 OF FS_AUTO

FIG.176

WINDOW 36 OF FS_AUTO

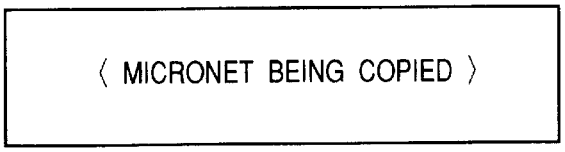

⟨ MICRONET BEING COPIED ⟩

FIG.177

WINDOW 37 OF FS_AUTO

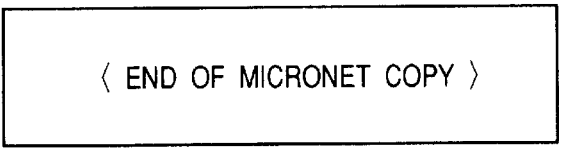

⟨ END OF MICRONET COPY ⟩

FIG.178

WINDOW 38 OF FS_AUTO

NETWARE INSTALLATION ENVIRONMENT IS DISPLAYED.
OPERATE ACCORDING TO INSTRUCTION OF THIS WINDOW.

• VOLUME CREATION
    SELECT "VOLUME OPTION", CREATE VOLUME "SYS", AND
    SET STATUS TO "MOUNTED".

• SYSTEM COPY
    SELECT "COPY OF SYSTEM AND PUBLIC FILES" OF
    "SYSTEM OPTION" TO COPY ALL DISK CONTENTS OF
    NETWARE ON TO HARD DISK.

• WHEN ENDED WITH ESC KEY, NETWARE OPERATION
  ENVIRONMENT IS SET.

THANK YOU.    [ END ] ~ 939001

FIG.179

```
┌─────────────────────────────────────────────┐
│            SELECT WORKSTATION.              │
│  NWWS0001                                   │
│  NWWS0002                                   │
│  NWWS0003                                   │
│  NWWS0004                                   │
│  NWWS0005                                   │
│  NWWS0006                                   │
│  NWWS0007                                   │
│  NWWS0008                                   │
│  [ MORE ]                                   │
│  [ CANCEL ]                                 │
└─────────────────────────────────────────────┘
```

940001 — NWWS0001 … NWWS0008
940002 — [ MORE ]
940003 — [ CANCEL ]

FIG.180

```
┌─────────────────────────────────────────────┐
│        CONFIRM CONTENTS OF PARAMETERS       │
│  WORKSTATION : NWWS0001                     │
│  MACHINE TYPE FOR INSTALLATION : AX         │
│  BOOT DRIVE : HD       LAN CARD  1 : MICRONET│
│                                  2 : NONE.  │
│                                  3 : NONE.  │
│                                  4 : NONE.  │
│                                             │
│                   O.K. ?           YES      │
│                                     N O     │
└─────────────────────────────────────────────┘
```

941001 — WORKSTATION : NWWS0001
941002 — MACHINE TYPE FOR INSTALLATION : AX
941003 — BOOT DRIVE : HD
941004 — LAN CARD 1 : MICRONET / 2 : NONE. / 3 : NONE. / 4 : NONE.
941005 — YES / NO

FIG.184

( SHGEN BEING COPIED )

FIG.185

( END OF SHGEN COPY )

FIG.186

INSTALLATION IS COMPLETED.
PROGRAM IS TERMINATED.
THANK YOU.

CONFIRM —— 947001

FIG.187

```
┌─────────────────────────────────────────────┐
│           SELECT PRINT SERVER                │
│   NWPS0001                                   │
│   NWPS0002                                   │
│   NWPS0003                                   │
│   NWPS0004                                   │
│   NWPS0005                                   │
│   NWPS0006                                   │
│   NWPS0007                                   │
│   NWPS0008                                   │
│   [ MORE ]                                   │
│   [ CANCEL ]                                 │
└─────────────────────────────────────────────┘
```

950001 — NWPS0001–NWPS0008
950002 — [ MORE ]
950003 — [ CANCEL ]

FIG.188

```
┌──────────────────────────────────────────────────┐
│         CONFIRM CONTENTS OF PARAMETERS            │
│  PRINT SERVER : NWPS0001       — 951001          │
│                                                   │
│  PRINTER 01 : CANNON / LASER SHOT   09 : NONE.   │
│          02 : NONE.                 10 : NONE.   │
│          03 : NONE.                 11 : NONE.   │
│          04 : NONE.                 12 : NONE.   │
│          05 : NONE.                 13 : NONE.   │
│          06 : NONE.                 14 : NONE.   │
│          07 : NONE.                 15 : NONE.   │
│          08 : NONE.                 16 : NONE.   │
│                                     ┌────────┐   │
│                                     │  YES   │   │
│              O.K. ?                 │  N O   │   │
│                                     └────────┘   │
└──────────────────────────────────────────────────┘
```

951002 — printer list
941003 — YES / NO

KOCHIKU1. BAT

- 701 — MD C:¥KOUCHIKU
- 702 — CD C:¥KOUCHIKU
- 703 — COPY A:¥*.* C:
- 704 — KOCHIKU2. BAT

700

KOCHIKU2. BAT

- 801 — PARAIN. EXE
- 802 — DRIVERIN. EXE
- 803 — SERVFD. EXE
- 804 — GUIDE. EXE
- 805 — MAKSHELL. EXE
- 806 — SHELL. EXE
- 807 — LOGIN. EXE
- 808 — MAKLINF. EXE
- 809 — MAKPRNF. EXE
- 810 — GUIINST. EXE
- 811 — UNYOINST. EXE
- 812 — USERREG. EXE
- 813 — MAKFILE. EXE
- 814 — APINST. EXE
- 815 — MAKCFD. EXE

```
[SERVER1]
TYPE: F3020
FD: 3.5
HD: 100
HDIF: SCSI
EXHD: 100
EXHDIF: SCSI
LAN: CCC
LANP: ETHERNET

[CLIANT1]
TYPE: F3010
FD: 3.5
HD: 40
HDIF: IDE
EXHD:
EXHDIF:
LAN: AAA
LANP: ETHERNET

[CLIANT2]
TYPE: F3010
FD: 3.5
HD: 80
HDIF: IDE
EXHD:
EXHDIF:
LAN: BBB
LANP: ETHERNET
```

~1300

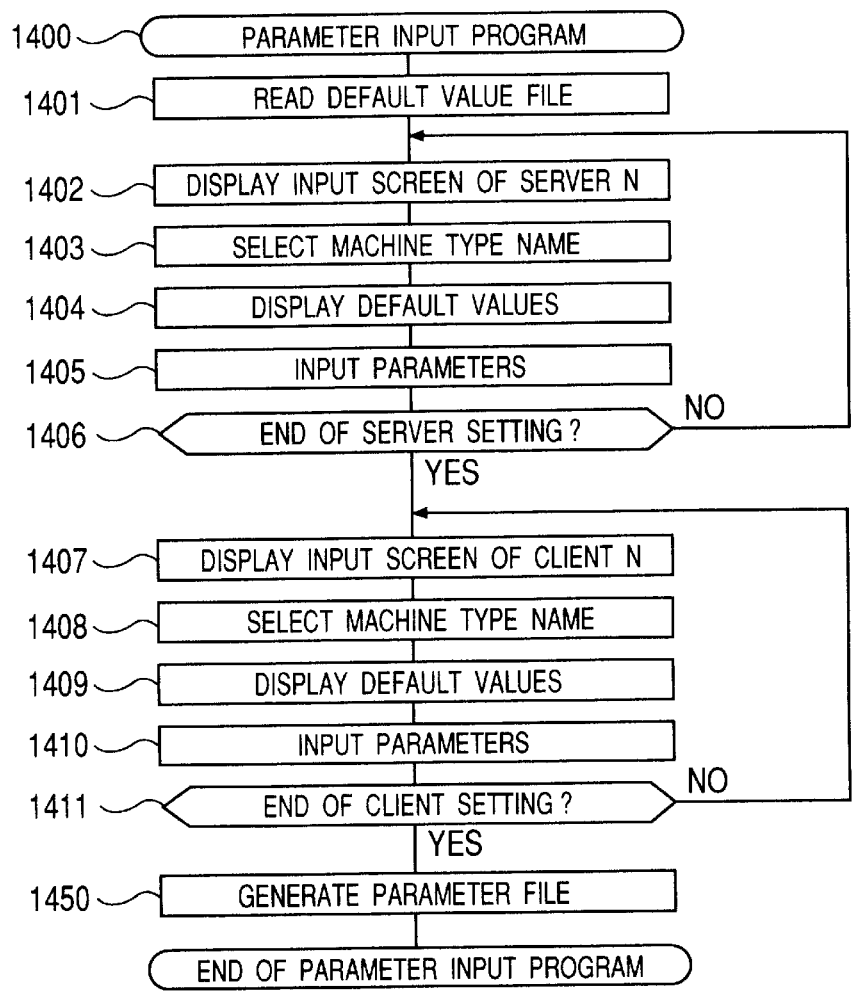
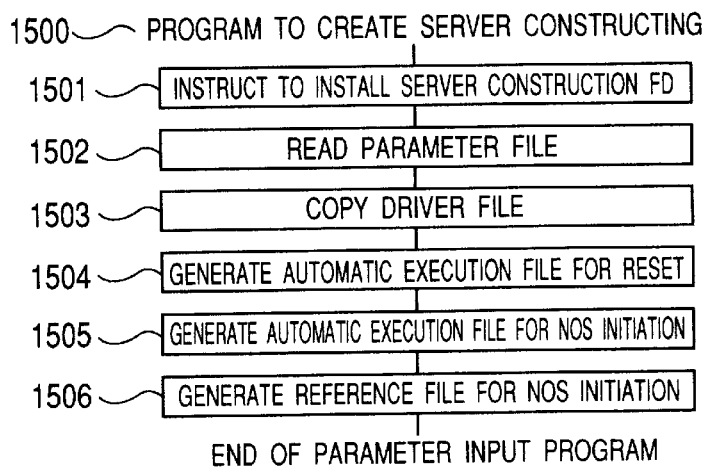

```
[PATTERN A]
    [SERVER1]
    TYPE: F3020
    [CLIANT1]
    TYPE: F3010
    [CLIANT2]
    TYPE: F3010
    [CLIANT3]
    TYPE: F3010
[PATTERN B]
    [SERVER1]
    TYPE: F3020
    [SERVER2]
    TYPE: F3010
    [CLIANT1]
    TYPE: F3010
    [CLIANT2]
    TYPE: F3010

[F3020]
FD: 3.5, 5 :3.5
HD: 40,80,100 :100
HDIF: IDE,SCSI :SCSI
EXHD: 40,80,100 :100
EXHDIF: IDE,SCSI :SCSI
LAN: AAA BBB CCC :CCC
LANP: ETHERNET,TOKENRING :ETHERNET

[F3010]
FD: 3.5, 5 :3.5
HD: 40,80,100 :40
HDIF: IDE,SCSI :IDE
EXHD: 40,80,100 :
EXHDIF: IDE,SCSI :
LAN: AAA BBB CCC :AAA
LANP: ETHERNET,TOKENRING :ETHERNET
```
~3200

NETWORK INTEGRATED CONSTRUCTION SYSTEM, METHOD OF INSTALLING NETWORK CONNECTION MACHINES, AND METHOD OF SETTING NETWORK PARAMETERS

BACKGROUND OF THE INVENTION

The present invention relates to a system for supporting an integrated or comprehensive construction of a network so as to facilitate the network construction, and in particular, to a system in which installations achieved in the network construction are automatically conducted.

In construction of a network system in which there are set connection types of a plurality of network apparatuses or machines mutually connected to each other via a network and operation modes of the machines, it has been necessary for the operator to visit each of the locations of the network machines to set parameters and to register the system, thereby achieving the installation of the machine. The present stage of the technology has been described, for example, in "Challenge! Personal Computer LAN", Nikkei Byte, October 1991. In consequence, for an installation of a network system, there are required a large number of human operators and a great amount of working time. For example, to install a network system constituted of a file server, a print server, and ten clients, three days are required for an average operator and one and half days for an experienced operator in the current stage of the technology.

SUMMARY OF THE INVENTION

It is therefore a first object of the present invention to facilitate parameter setting operations in the installation so as to automatically conduct the operations.

A second object of the present invention is to possibly simplify parameter setting operations in the installation of a plurality of network machines.

A third object of the present invention is to minimize the working period of time required for the operator at the site of the pertinent machine for the installation.

A fourth object of the present invention is to provide means for setting parameters so as to install a network machine at a location different from that of the machine.

A fifth object of the present invention is to provide a network integrated construction system for achieving the first to fourth objects above in an integrated manner.

A sixth object of the present invention is to provide operation screens which mitigate loads imposed on the operator in the parameter setting operations and which facilitates the operations.

To achieve the first object according to the present invention, there is disposed an independent working machine separated from network machines for the installation so that the operator sets parameters for a plurality of network machines in a centralized fashion. Accordingly, the parameter setting operation can be conducted at a location in a centralized manner. Moreover, regardless of installation states of network machines, the parameters can be set in advance.

To achieve the second object according to the present invention, parameters for the installation of network machines are written on a recording medium to conduct the installation thereof by use of the recording medium. Consequently, the parameter setting job can be accomplished at a location far from the network machines. Furthermore, the parameters thus prepared may be employed to install network machines in another network having the similar configuration.

To achieve the third object according to the present invention, the parameter setting operation for the installation of network machines and the installation of each network machine are conducted at different points of time and at different spatial positions. In consequence, the parameters can be set in advance and hence the period of time necessary for the operator at the site of the network machine can be reduced.

To achieve the fourth object according to the present invention, there is disposed a parameter file which contains the parameters for the installation of network machines and which is recorded on a portable recording medium. With this provision, modifications and changes of the parameters are facilitated and the management of information about the network configuration is simplified.

To achieve the fifth object according to the present invention, there is provided a network integrated construction system. In the system, there is created a parameter file containing types of machines to be connected to the network, types of connections of the machines to the network, and operation modes thereof in the network system. The file is referenced by each of the machines to automatically achieving the network construction related thereto. Accordingly, the network can be integrally controlled and operated. Moreover, in the network construction, installation parameters can be easily set such that the installation job in each network machine is automatically accomplished. In addition, for the operation control, the respective setting elements such as items of user registration and directory setting operations can be related to each other so as to achieve an integral control thereof in the user environments. Furthermore, for the maintenance control, there can be achieved an automatic maintenance operation. In this operation, when a failure is detected, the condition is notified to the user, and a countermeasurement is effected in an automatic manner.

To achieve the sixth object according to the present invention, there are provided, by use of a graphical user interface (GUI), operation screens most suitable for the parameter setting operations in the installation of network machines.

BRIEF DESCRIPTION OF THE DRAWINGS

These and other objects and advantages of the present invention will become apparent by reference to the following description and accompanying drawings wherein:

FIG. 105 is a diagram showing a button in an all state;

FIG. 110 is a diagram 1 showing functional classification of bit maps;

FIG. 111 is a diagram 2 showing functional classification of bit maps;

FIG. 113 is a diagram showing a method of presenting a curved line;

FIGS. 119 to 123 are flowcharts showing the operation flows of FSAUTO;

FIG. 124 is a diagram showing a procedure to initialize a hard disk;

FIGS. 125 to 127 are diagrams showing the operation flows of WSAUTO;

FIGS. 128 to 131 are diagrams showing the operation flows of PSAUTO;

FIG. 132 is a diagram showing a procedure to register print queues by an API function;

FIG. 133 is a diagram showing a parameter file to install a file server;

FIG. 134 is a diagram showing a parameter file to install a client;

FIG. 135 is a diagram showing a parameter file to install a print server;

FIG. 136 is a diagram showing the structure of directory of a parameter disk;

FIG. 137 is a diagram showing an index information file for file server installation;

FIG. 138 is a diagram showing a method of generating a parameter file;

FIG. 139 is a diagram useful to explain means to transfer parameters;

Figure 140:
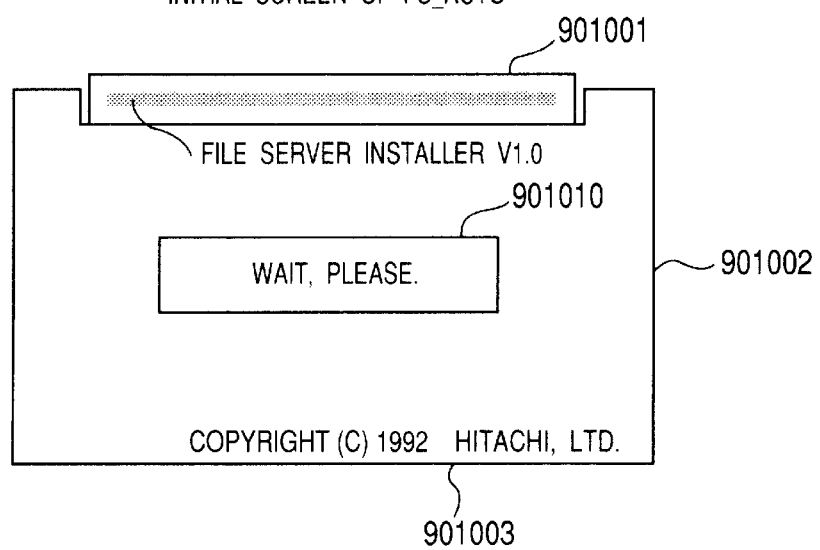
Figure 192:
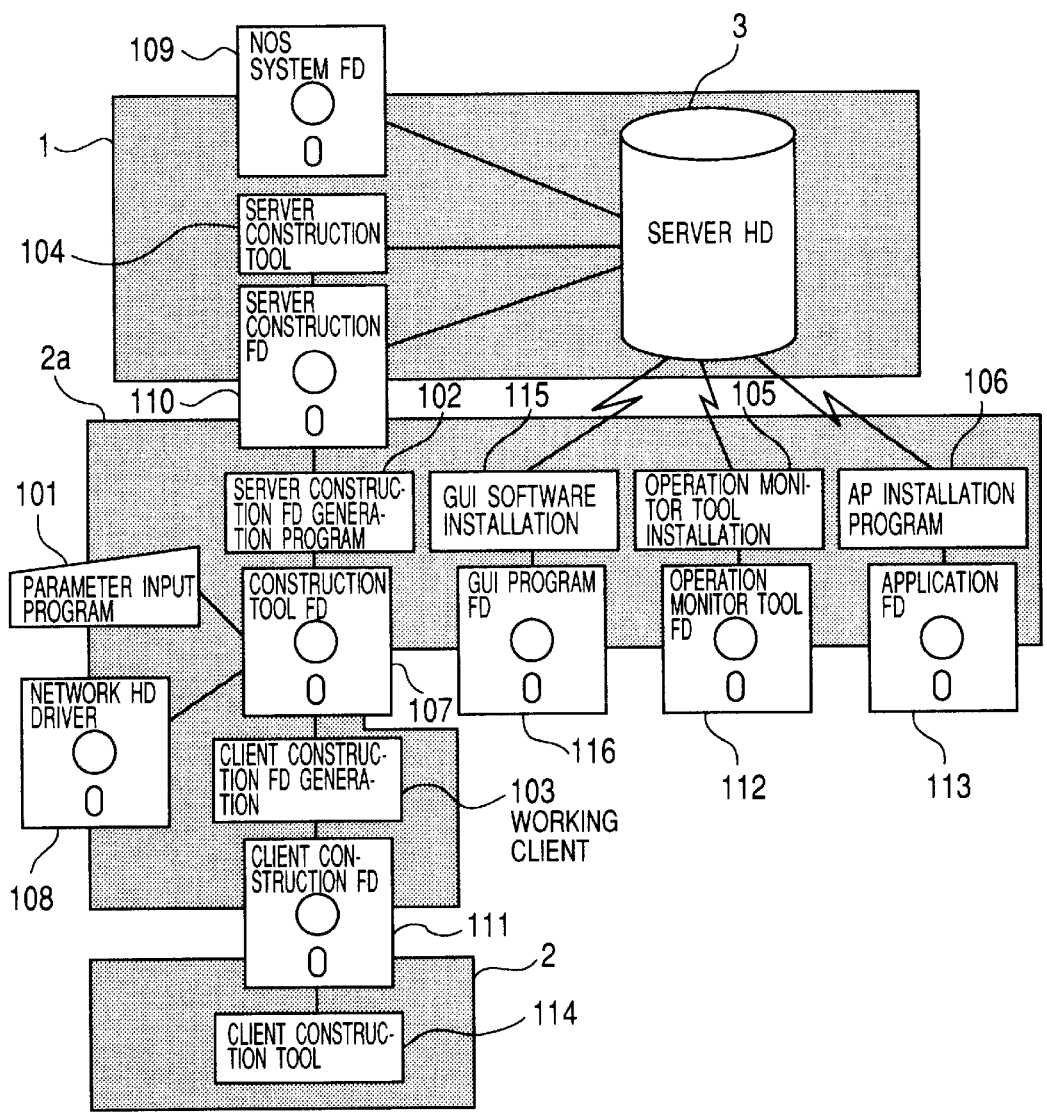
Figure 193:
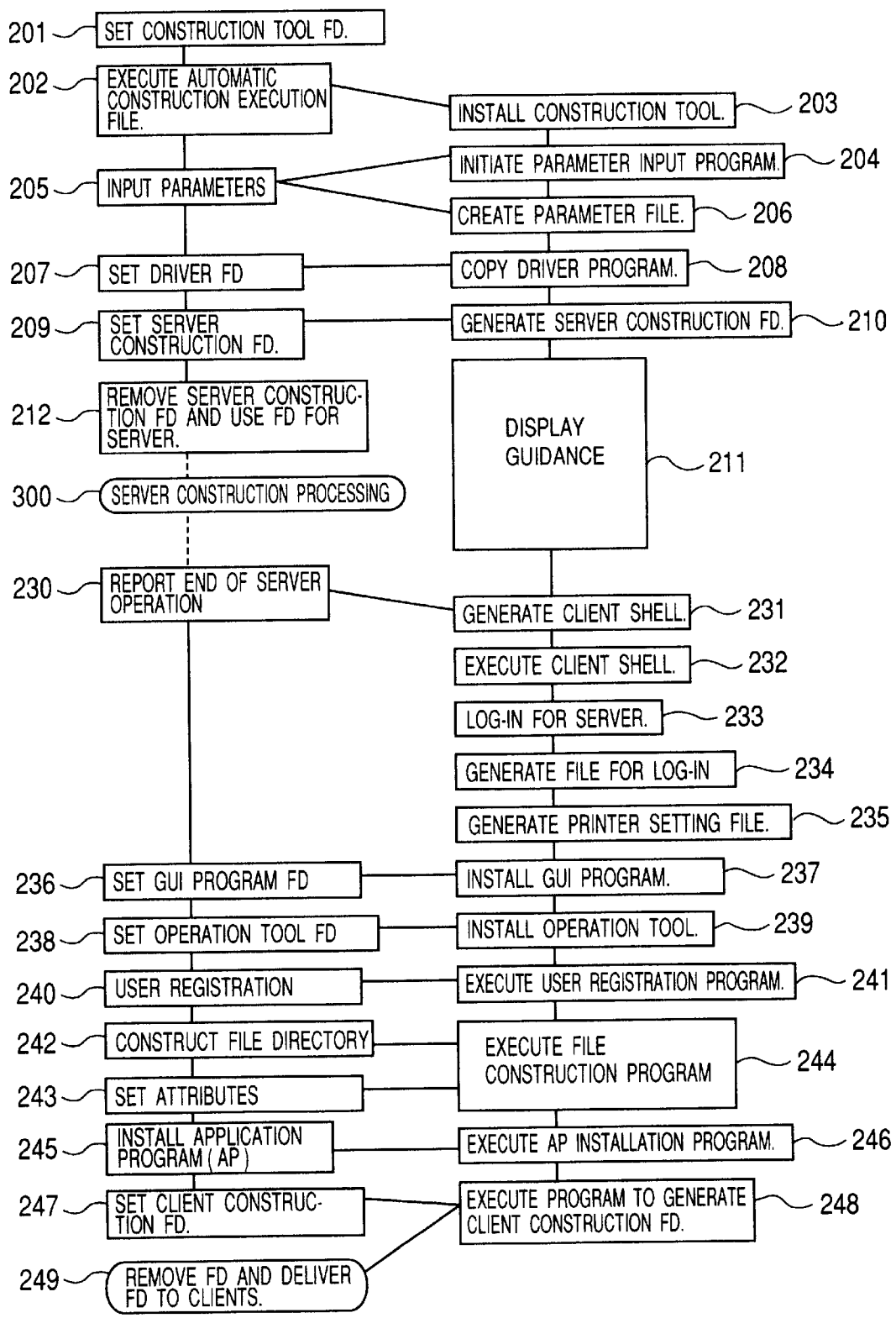
Figure 194:
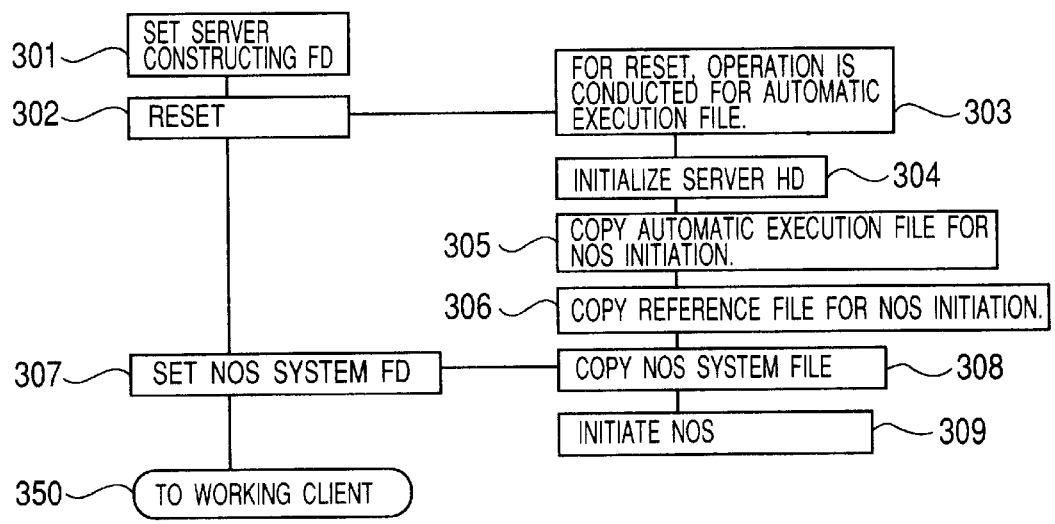
Figure 195:
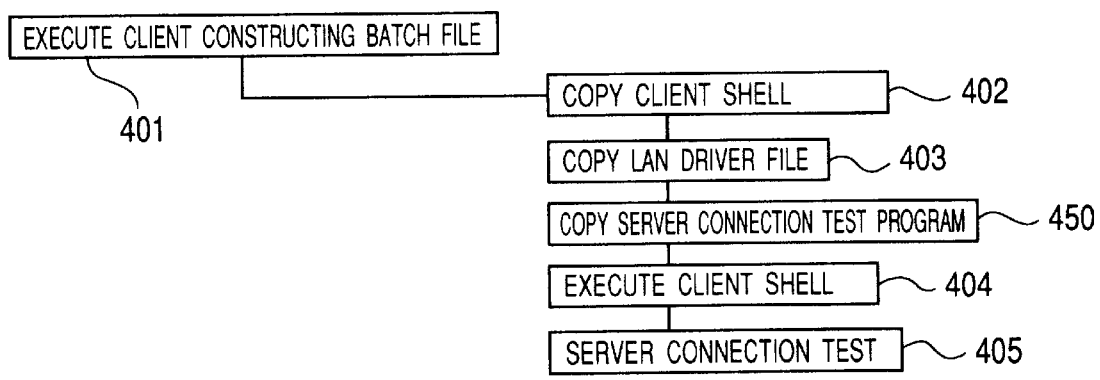
Figure 196:
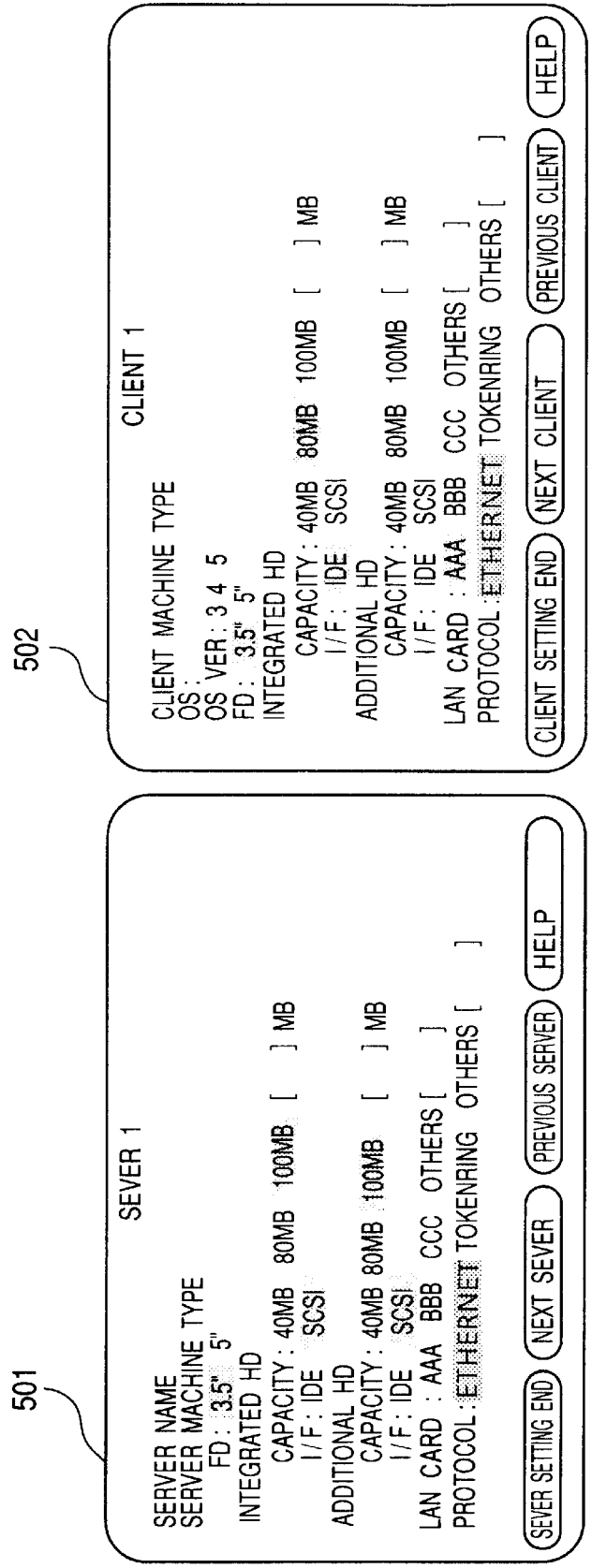
Figures 197, 198, 199:
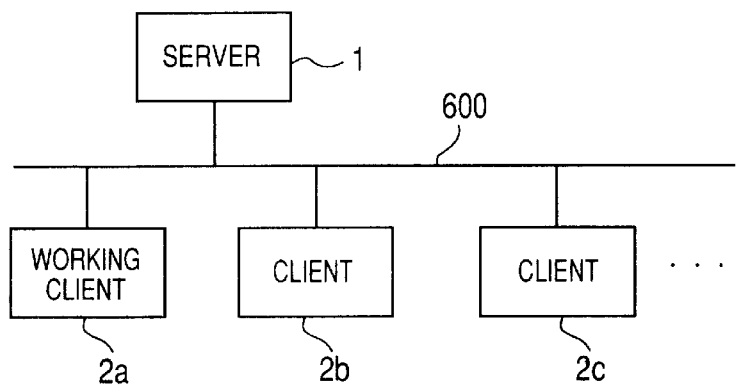
Figure 200:
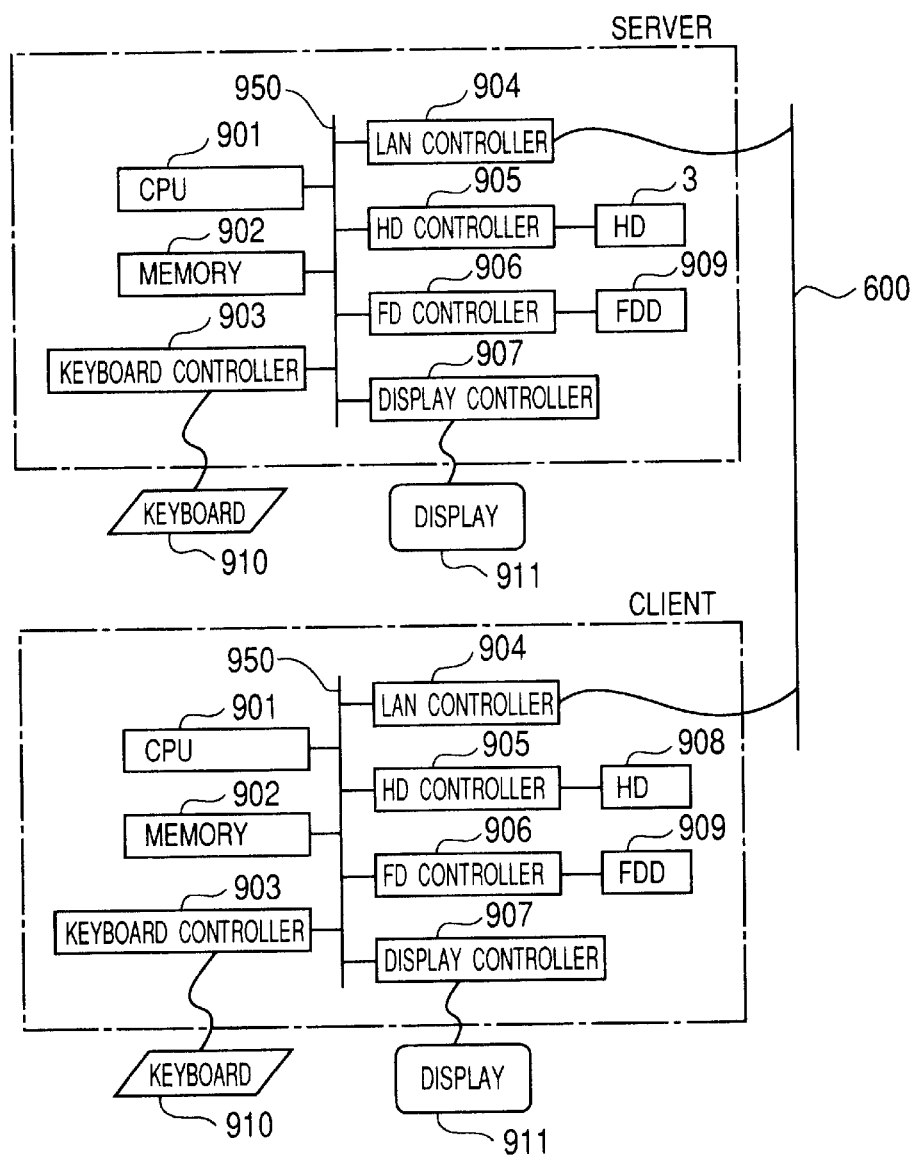
Figure 201:
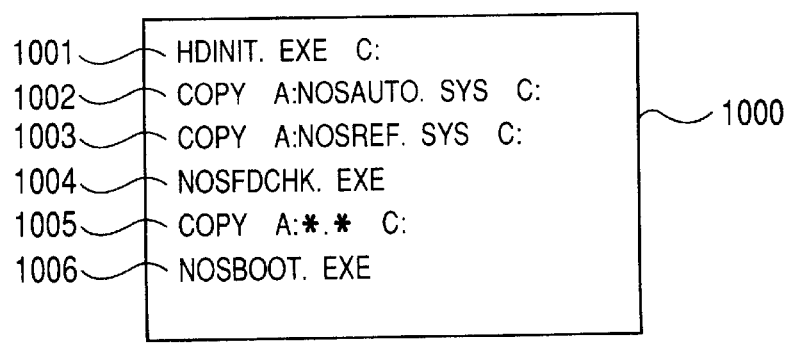
Figure 202:
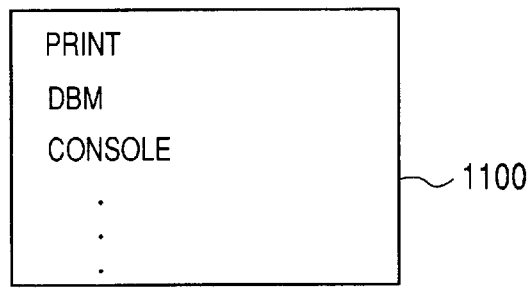
Figure 203:
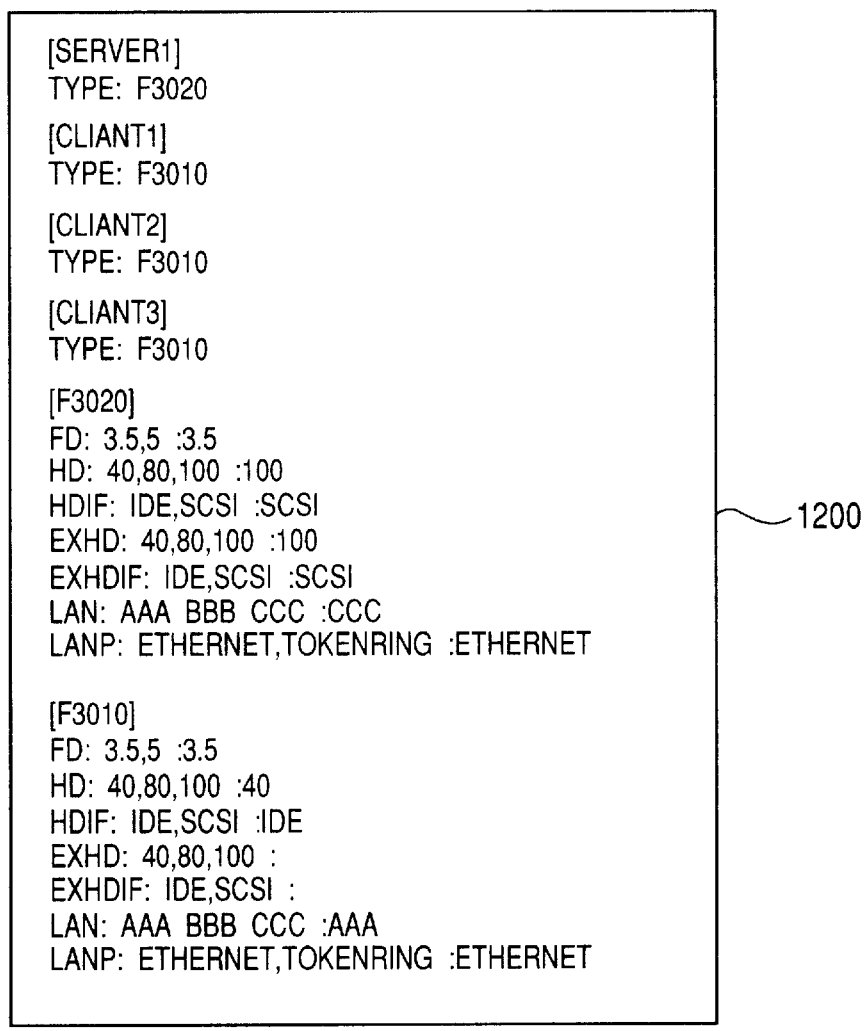
Figure 207:
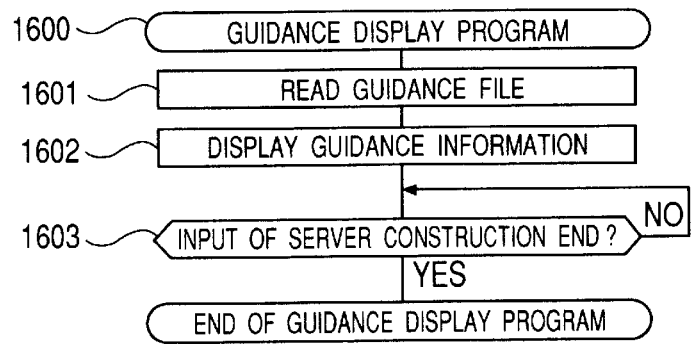
Figure 208:
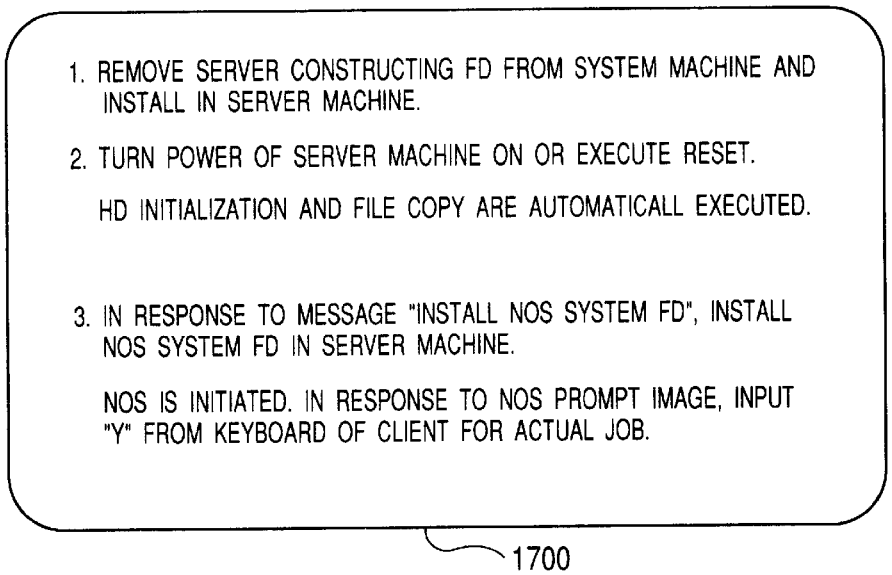
Figure 209:
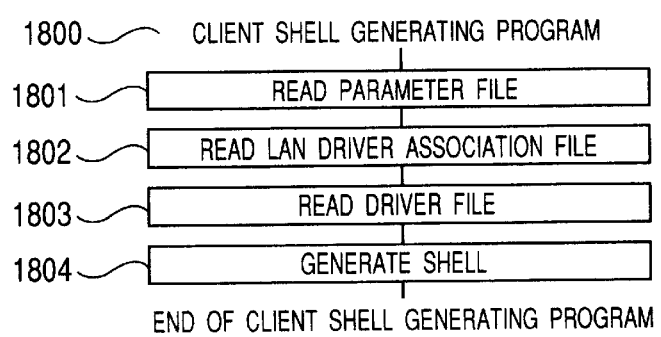
Figure 210:
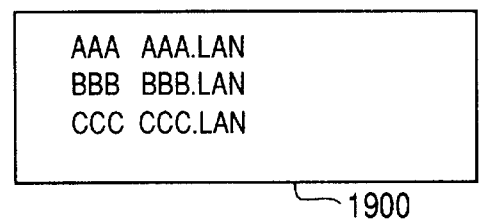
Figure 211:
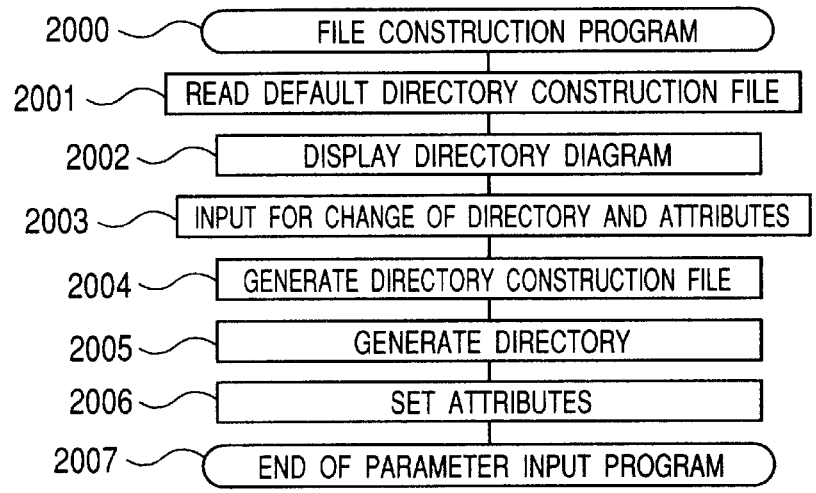
Figure 212:
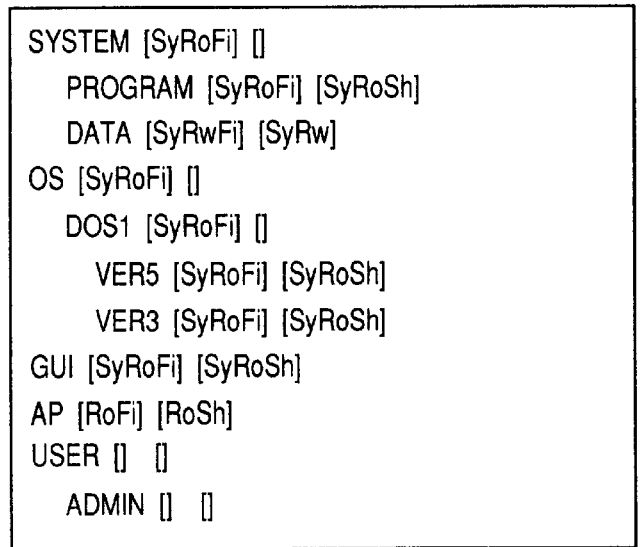
Figure 213:
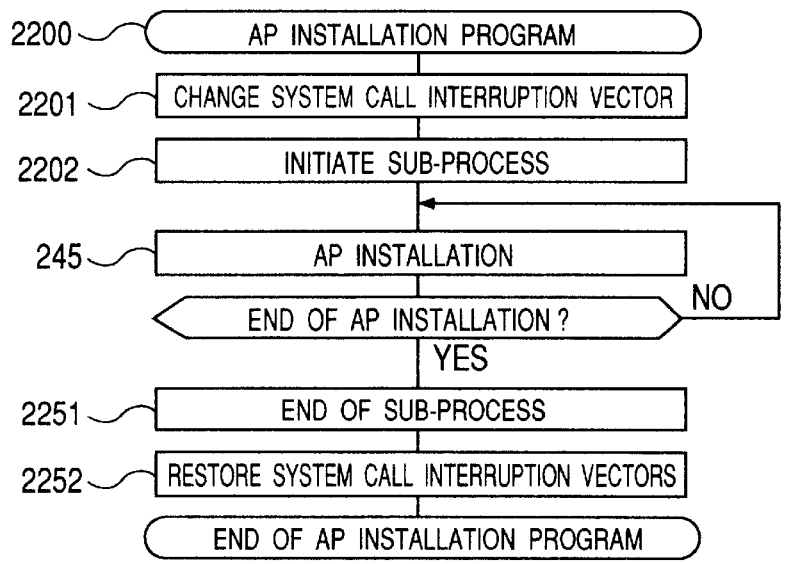
Figure 214:
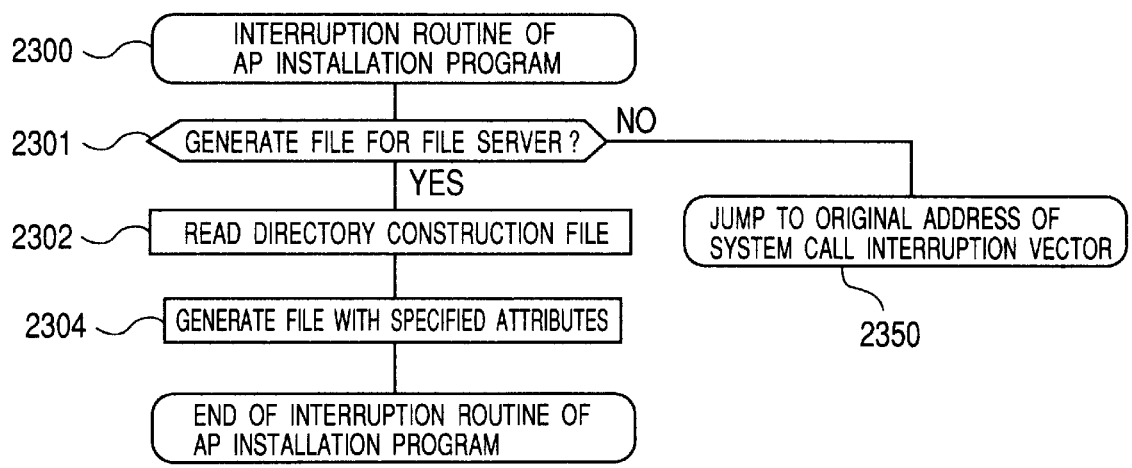
Figures 215, 216:
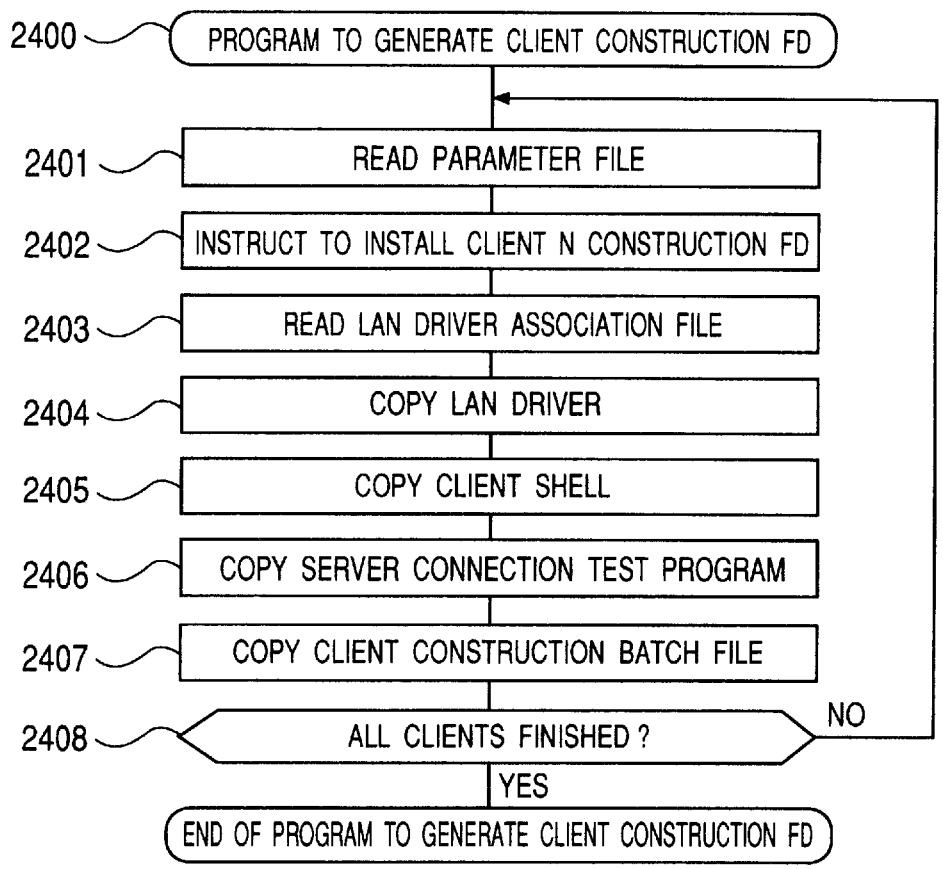
Figure 217:
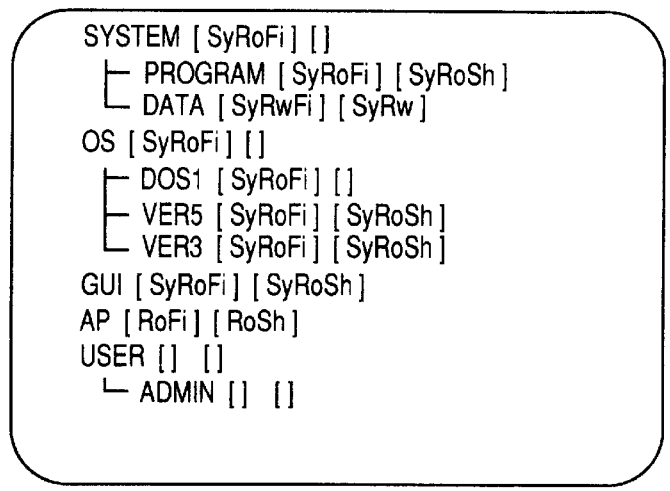
Figure 218:
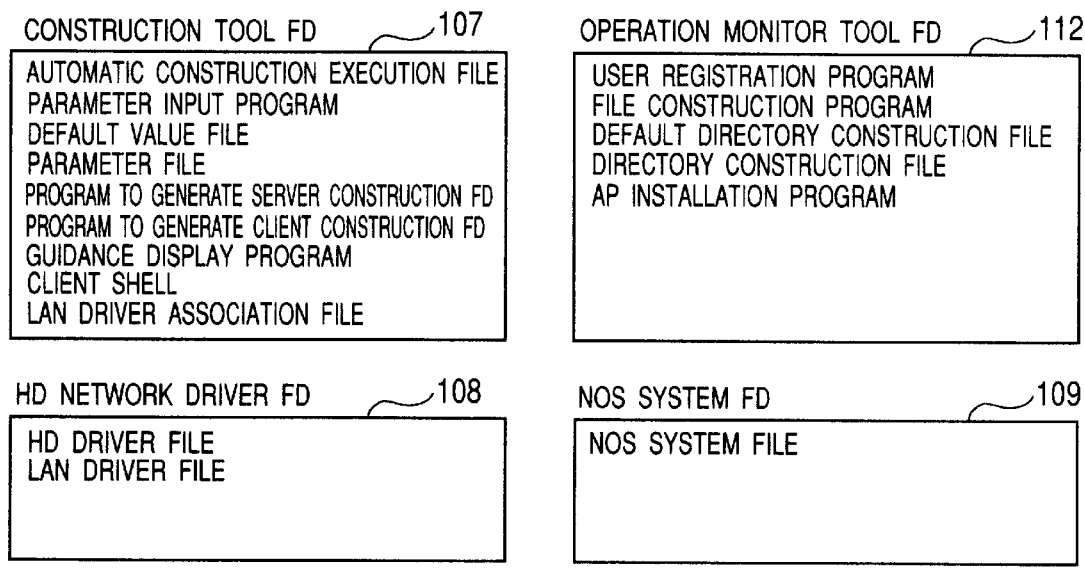
Figure 219:
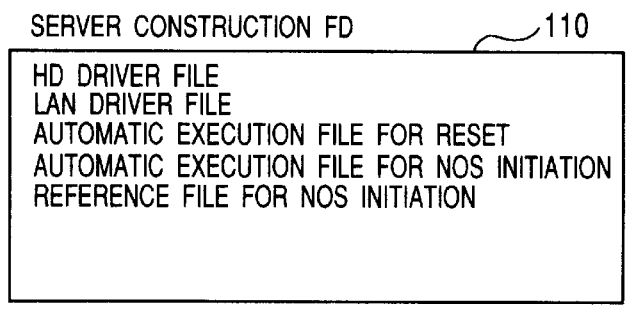
Figure 220:
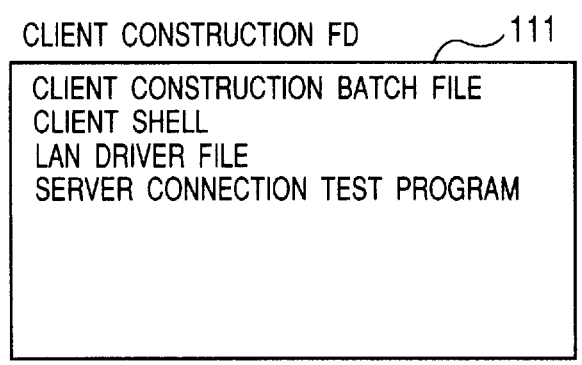
Figure 221:
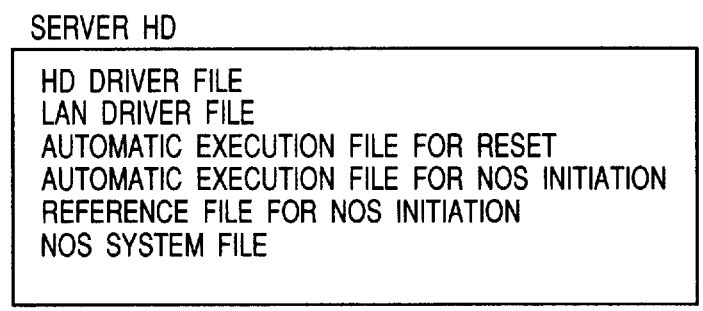
Figure 222:
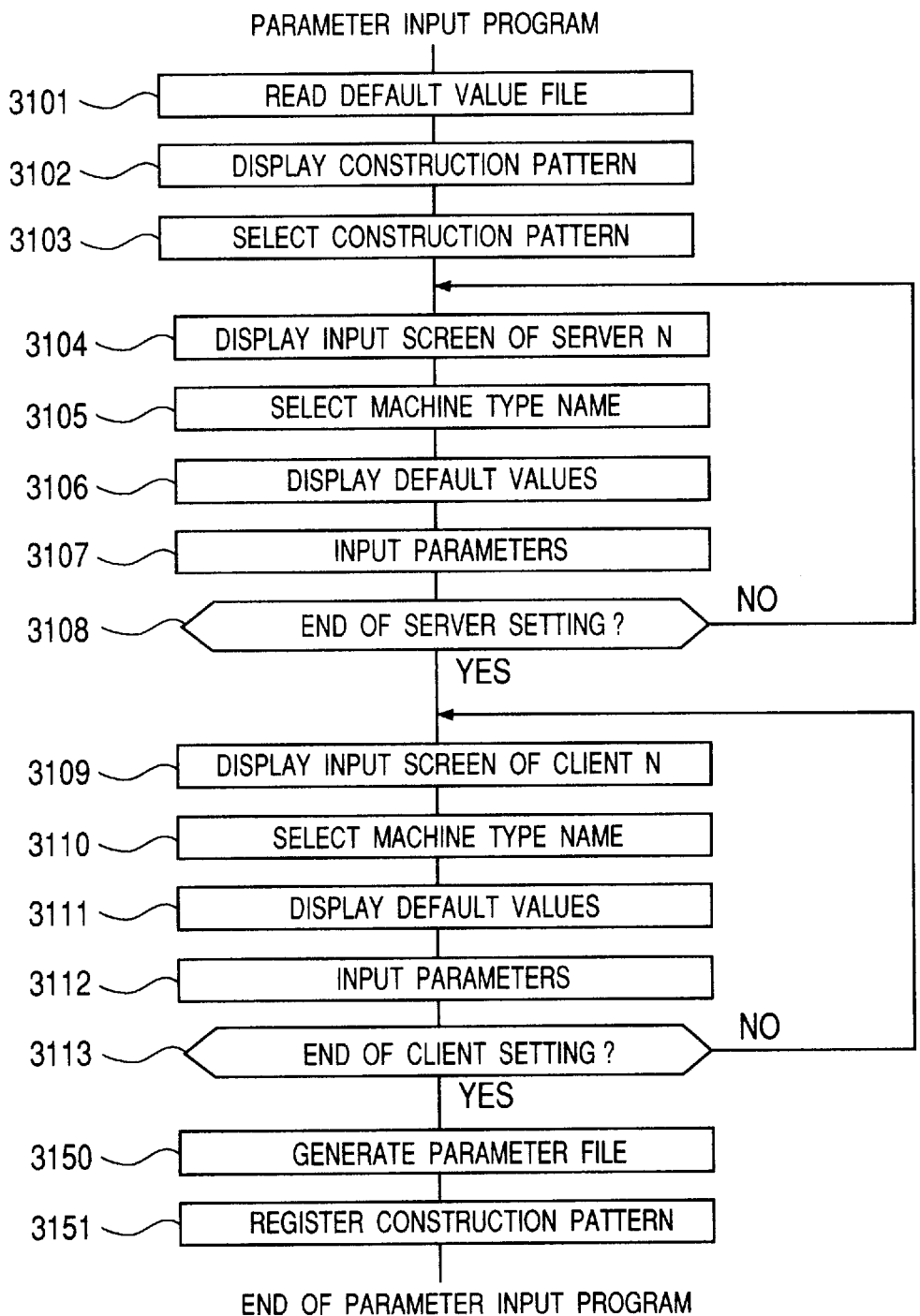
Figures 223, 224:
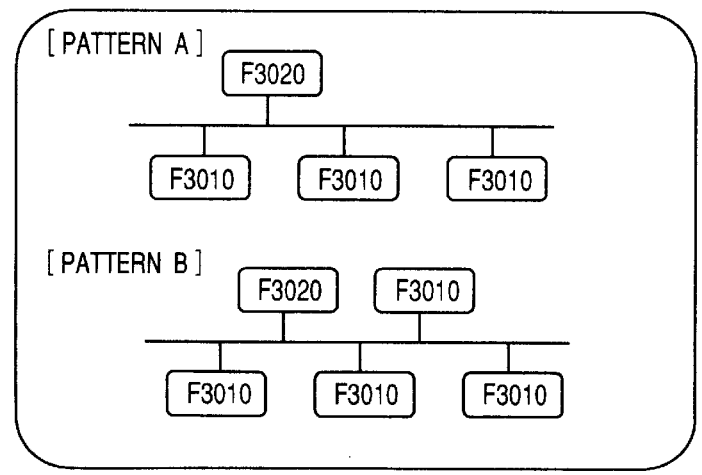

FIG. 140 is a diagram of an initial screen of FSAUTO;

FIGS. 141 to 178 are diagrams respectively showing windows 1 to 38 of FSAUTO;

FIGS. 179 to 186 are diagrams respectively showing windows 1 to 8 of WSAUTO;

FIGS. 187 to 191 are diagrams respectively showing windows 1 to 5 of PSAUTO;

FIG. 192 is a diagram showing an outline of a system construction method;

FIG. 193 is a flowchart showing the operation procedure to construct a working client;

FIG. 194 is a flowchart showing the operation procedure to construct a server;

FIG. 195 is a flowchart showing the operation procedure to construct a client;

FIG. 196 is a diagram showing an example of a parameter input screen;

FIG. 197 is a diagram showing an example of an overall system configuration;

FIG. 198 is a diagram showing an example of a first construction automatic execution file adopted in a construction start phase by a working client;

FIG. 199 is a diagram showing an example of a second construction automatic execution file initiated by the first construction automatic execution file adopted in a construction start phase by a working client;

FIG. 200 is a diagram showing an example of the internal hardware configuration of an information processing apparatus;

FIG. 201 is a diagram showing an example of an automatic execution file for reset which is prepared on a server construction FD to automatically achieve a server construction by a reset operation;

FIG. 202 is a diagram showing an example of an automatic execution file for NOS initiation;

FIG. 203 is a diagram showing an example of a default value file in which default values to be employed by the parameter input program are stored;

FIG. 204 is a diagram showing an example of a parameter file containing therein various parameter values of the network system which are determined by the parameter input program according to user inputs for default values;

FIG. 205 is a diagram showing an example of a flowchart of the parameter input program;

FIG. 206 is a diagram showing an example of a flowchart of the program to generate server construction FD;

FIG. 207 is a diagram showing an example of a flowchart of the guidance display program;

FIG. 208 is a diagram showing an example of the guidance display screen;

FIG. 209 is a diagram showing an example of a flowchart of a client shell generating program;

FIG. 210 is a diagram showing an example of an LAN driver association file indicating a correspondence between LAN card names and LAN driver file names to be used;

FIG. 211 is a diagram showing an example of a file construction program to generate a directory of a server HD;

FIG. 212 is a diagram showing an example of a default directory construction file in which default values to be used by the file construction program are written;

FIG. 213 is a diagram showing an example of an AP installation program;

FIG. 214 is a diagram showing an example of an interruption processing routine of the AP installation program;

FIG. 215 is a diagram showing an example of a program to create a client construction FD;

FIG. 216 is a diagram showing an example of a reference file for NOS initiation in which parameters necessary for the NOS initiation are stored;

FIG. 217 is a diagram showing an example of a directory display screen presented by the file construction program;

FIG. 218 is a diagram showing an example of the contents respectively of a construction tool FD, an operation monitor tool FD, an HD network driver FD, and an NOS system FD on which programs and data to be used in the present embodiment are stored;

FIG. 219 is a diagram showing an example of the contents of the server construction FD created by the construction tool;

FIG. 220 is a diagram showing an example of the contents of the client construction FD created by the construction tool;

FIG. 221 is a diagram showing an example of a file produced on the server HD by the server construction FD;

FIG. 222 is a diagram showing an example of a flowchart of a parameter input program associated with a plurality of default patterns;

FIG. 223 is a diagram showing an example of a default value file containing default values of a plurality of patterns to be used by the parameter input program associated with the plural default patterns; and FIG. 224 is a diagram showing an example of a screen displayed for pattern selection by the parameter input program corresponding to the plural default patterns.

DESCRIPTION OF THE PREFERRED EMBODIMENTS

Thanks to development of the PC-LAN, there increasingly appear chances of configuring a network. In association therewith, the amount of work to be achieved by each system engineer (SE) has been increased; moreover, there has been recognized the difficulty of installation of a network operating system (NOS) for the network.

In this situation, to avoid the increase in the amount of SE job and to solve the hindrance in the installation of the operating system of the network, the inventors have developed a network integrated construction system (to be called a system manager herebelow). Referring now to the drawings, description will be given of embodiments according to the present invention.

Figure 1:
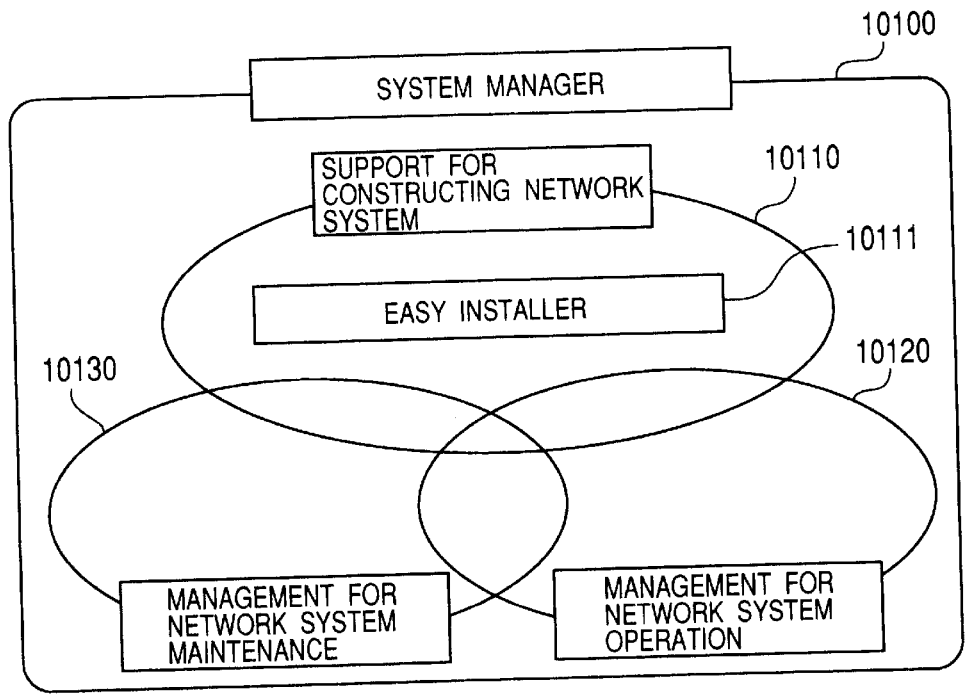
FIG. 1 is a diagram showing a concept of a system manager and a position of an easy installer.

FIG. 1 shows a concept of the system manager and positional relationships between the manager and easy installers.

A reference numeral 10100 denotes the system manager including portions respectively of a managing section for network system operation 10120 and a managing section for network system maintenance 10130, which overlap with a support section for network system construction 10110. Furthermore, an easy installer 10111 as an embodiment according to the present invention is located in a range of the support section 10110.

Figure 2:
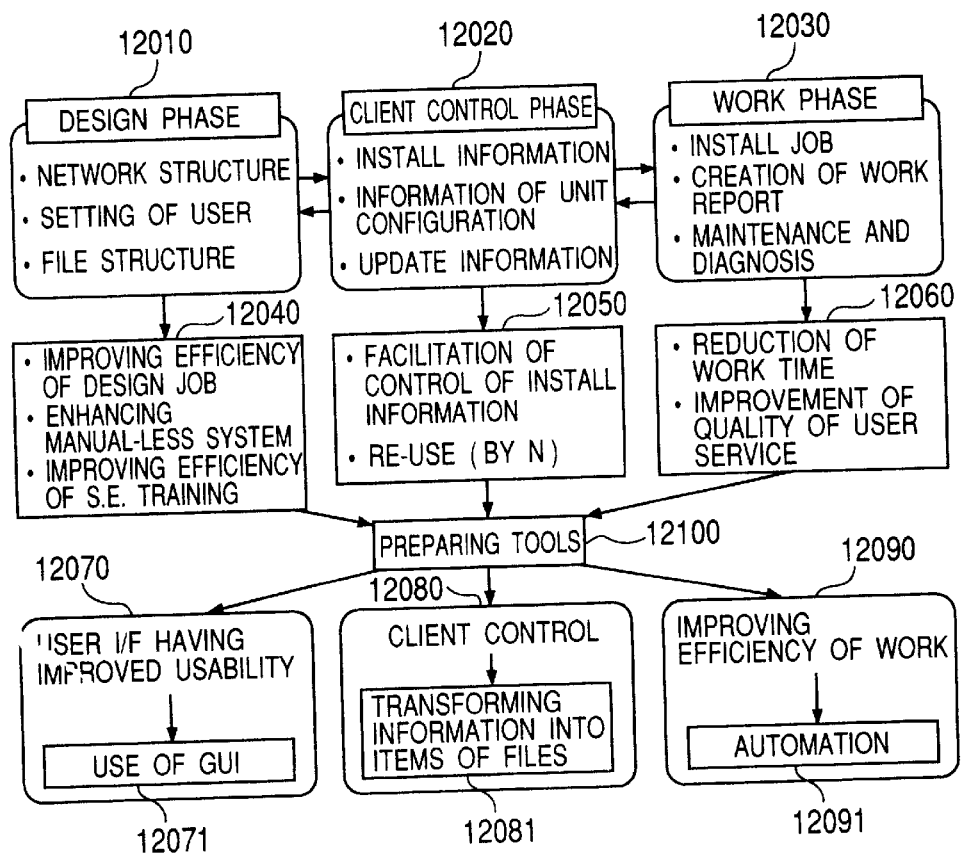
FIG. 2 is a diagram schematically showing a network system construction support according to the present invention.

FIG. 2 shows an outline of the support section 10110.

Analyzing the support, there are obtained three phases as shown in FIG. 2, namely, a design phase 12010 related to a design job on desk, a client control phase 12020, and a work phase 12030 associated with work on site.

In the phase 12010, a network configuration, a user setting operation, a file structure, and the like are discussed for the design of the network. Requirements for these items include a job step 12040 to achieve operations of improving the design work, forming a manual-less system, and improving efficiency of SE training.

In the phase 12020, there are controlled install information, information of device or unit configuration, update information, and the like. Required for this phase are a step 12050 including operations to facilitate the control of installation information and multiplying control information by N through re-use thereof.

In the phase 12030, there are conducted jobs such as an installation, creation of work reports, and maintenance and diagnoses. For this phase, there is necessitated a step 12060 including reduction of work time and improvement of quality of user service.

These needs are entirely transformed into tools in a step 12100.

The creation of tools 12010 in the design phase 12010 is disposed to provide a user interface having a satisfactory usability 12070. For this purpose, a graphical user interface GUI 12071 is adopted. The GUI is executed in an information processing apparatus operating in an online or offline manner through a network system. The tool creation 12100 in the client control phase 12020 aims at controlling clients 12080. To implement the tool, information is transformed into items of files 12081. The tool creation 12100 in the work phase 12030 is employed to improve efficiency of work 12090. To achieve the object, there is implemented automation of processing.

Figure 3:
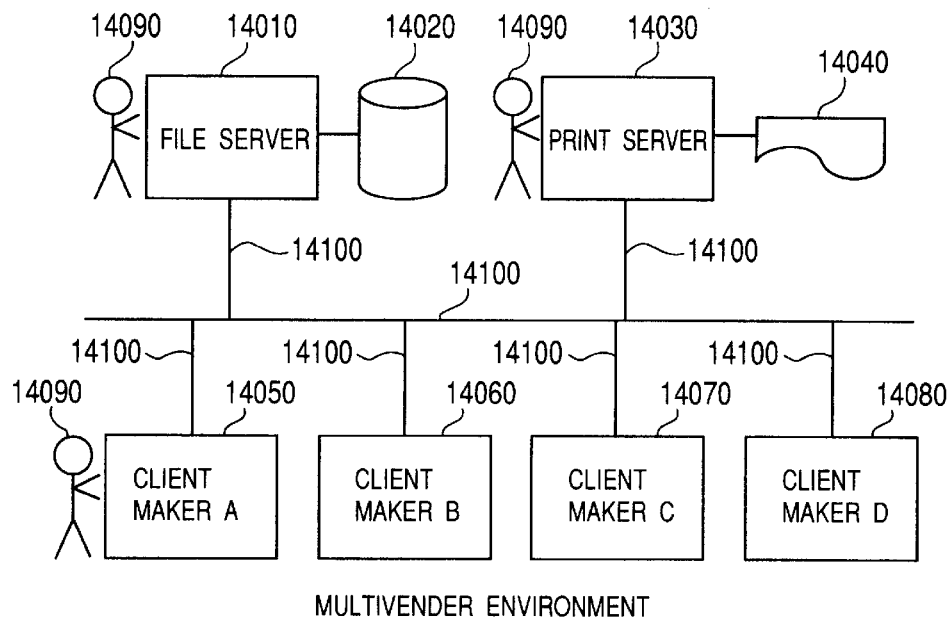
FIG. 3 is a diagram showing concept installation of NetWare.

Referring now to the network configuration of FIG. 3, numerals 14010 and 14020 denote a machine as a file server and a disk 14020, respectively. Numerals 14030 and 14040 indicate a print server and a printer, respectively. Reference numerals 14050 to 14080 respectively designate machines respectively of makers A to D. These machines are connected as clients to a network 14100, thereby forming a multi-vendor environment of FIG. 3.

In the network environment, to install the file server, the print server, and the clients, it has been heretofore necessary for the worker or operator 14090 to actually visit the installation site of the related machine so as to conduct the jobs above on the site.

Figure 4:
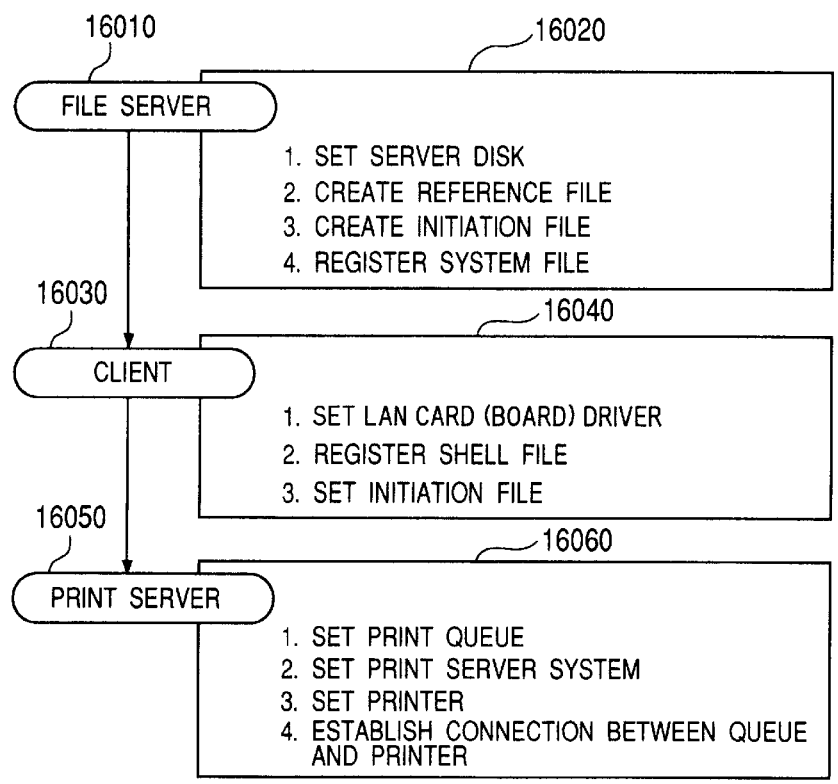
FIG. 4 is a diagram showing procedure of a conventional installation.

FIG. 4 shows a NetWare installation procedure to constructing the network environment of FIG. 3.

According to the procedure, the operator installs a file server 16010, a client 16030, and a print server 16050 in this sequence.

In the file server 16010, there is accomplished a file server processing 16020. First, a server disk is installed, a reference file and an initiation file are created, and then NetWare system files are registered, thereby finishing the installation.

In the client 16030, the client processing 16040 is executed. An LAN card driver is first set, a shell file is next registered, and an initiation file is finally installed, thereby completing the installation.

In the final step, i.e., the print server 16050, there is conducted a print server processing 16060. First, a print queue is established, a print server system and a printer are set, and a connection is established between the queue and the printer, thereby terminating the installation phase.

Figure 5:
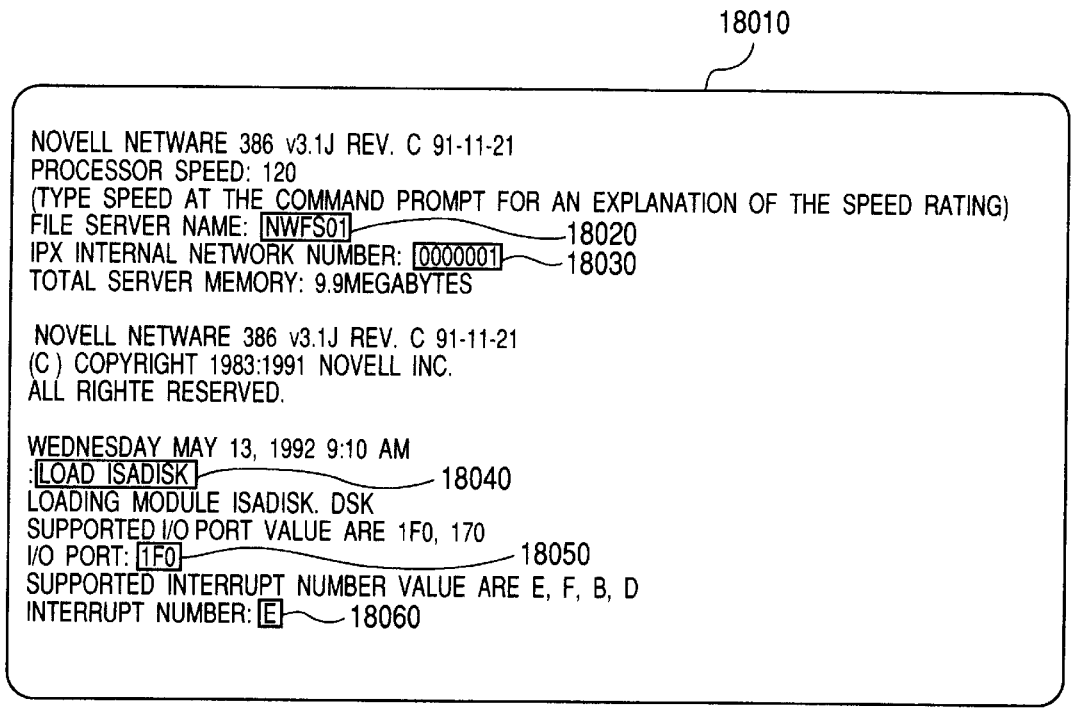
FIG. 5 is a diagram showing a part of conventional installation screen in a file server.

FIG. 5 shows a portion of an installation screen of the file server. A reference numeral 18010 indicates a portion of a file server installation screen of the NetWare.

Numerals 18020 to 18060 denote operations conducted by an installation operator to input from a keyboard or the like such items as setting parameters according to indications on screens while checking instructions in an operators' guide or manual and the like.

In this regard, description will be given of problems related to the NetWare installation.

The NetWare installation method supports only a keyboard input interface to input necessary items in the format of command statement, which makes it impossible to implement a manual-less system. Consequently, the operability is considered to be quite unsatisfactory for the user.

In addition, default values cannot be used to skip setting operations, namely, all parameters are required to be inputted. Moreover, it is necessary for the installer to have knowledge of relationships between the setting parameters. This also makes it impossible to implement a manual-less system. In consequence, there exist a large number of parameters to be set.

As a result, the installation time is elongated and the installation operation becomes to be difficult.

Figure 6:
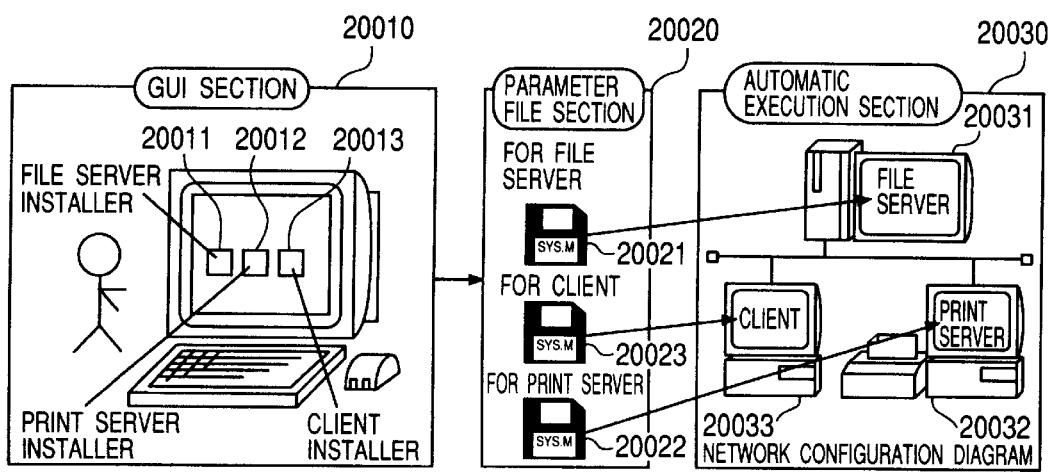
FIG. 6 is a diagram showing the structure of an easy installer according to the present invention.

FIG. 6 shows the system configuration in an embodiment according to the present invention.

The overall structure is constituted of a GUI section 20010, a parameter file section 20020, and an automatic execution section 20030.

The GUI section 20010 includes a GUI for file server installer 20011, a GUI for print server installer 20012, and a GUI for client installer 20013. The parameter file section 20020 includes a parameter file for file server installer 20021, a parameter file for print server installer 20022, and a parameter file for client installer 20023. The automatic execution section 2030 is constituted, for the network structure of FIG. 3, of an automatic execution program for file server 20031, an automatic execution program for print server 20032, and an automatic execution program for client 20033.

Next, description will be given of an installation method of a file server installer according to the present invention.

The operator first initiates the GUI 20011 operating in a machine connected to the network in an online or offline manner and then sets the parameters necessary for the installation of the file server according to GUI's suitable for operations. The parameters thus set by the operator are stored in the file 20021. The file 20021 is set for the file server 20031 for the actual installation such that the program 20031 achieves an actual installation based on the setting parameters stored in the file 20021 in accordance with the present invention.

Subsequently, the print server and client installers are similarly operated.

Thanks to provision of the system construction above, there are attained the following advantages.

Since the parameter file 20020 establishes interface between the GUI section 20020 and the execution section 20030, the job to set parameters of the GUI section 20010 need not be accomplished on the site. Namely, information related to the apparatuses and units constituting the network can be set from apparatuses in an office in a concentrated manner, which minimizes the work time on the installation site. In other words, the parameters depending on the network can be set from a remote place separated from the network. Moreover, the parameter setting operation can be conducted for a hardware system not actually existing in the network.

In addition, the parameter file may be controlled, for example, for each system thus constructed or for each client to develop a data base or the like, thereby flexibly coping with the system re-use, maintenance, operation management, etc.

Figure 7:
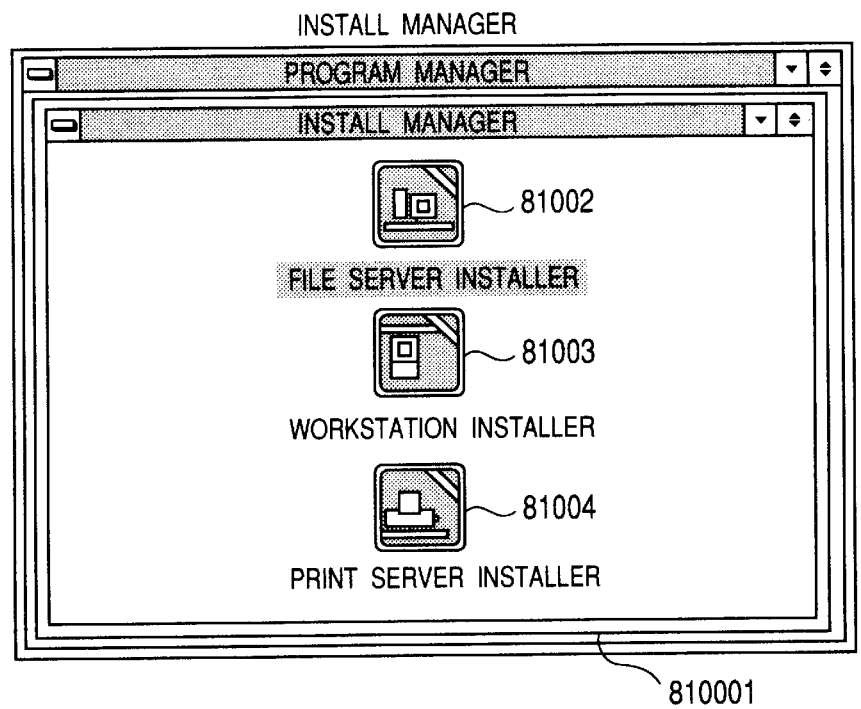
FIG. 7 is a diagram showing an example of an installation manager.

Referring now to FIG. 7, the following items will be described in detail.

1. Contents of installation manager integrating three installers, which will be described later, to supply the results to the user
2. Outline of user interface provided by installation manager and installers
3. Concept of easy setting employed to construct user interface FIG. 7 shows an example of the installation manager developed by the grouping function of program manager of the MS-Windows (registered trade mark of the Microsoft Inc.)

A reference numeral 81001 denotes a window of the installation manager grouped by the function. Although functions of program manager are used in this example, it is naturally possible to regard the installation manager as a single program to supply information in a menu format. Moreover, the selection and initiation may be conducted by a program having a higher-level concept so as to improve the operability for the user.

Numerals 81002 to 81004 are icons having switching functions to initiate the related installers, which will be described later.

The icons 81002 to 81004 are associated with the file server installer, the client installer, and the print server installer, respectively.

The installation manager and the respective installers are used to provide a friendly operation environment for the user in which a graphical user interface is employed. For this purpose, the following types of control are provided.
1. Box for inputting therein a character string from a keyboard
2. A combo box for outputting therefrom, when a button is depressed, a list of selectable or selection items 3. A box to which a numeric value is set, a button to increase the value, and a button to decrease the value
4. A push button for selecting, when depressed, a function assigned thereto
5. Selection buttons in which one of the buttons is depressed to indicate a selection state
6. A list box for presenting a list of setting states
7. A list box related to a plurality of items associated with the list boxes above
8. Scroll bar for scrolling the display contents of the list box when the contents overflow the screen
9. Switch button to set a function, when clicked, in a toggle-switch manner These setting control items are supported according to the contents of the setting parameters, thereby providing an environment in which the parameter setting operations can be efficiently conducted. Moreover, to implement an environment familiar to the user, the respective windows used to the actual setting operations are designed according to the image setting concept as follows.

The concept for the image setting includes seven items.
1. Providing a visual setting environment by use of GUI
2. Providing an input operation environment adopting pointing devices such as a mouse
3. Assigning such items to buttons as parameters to be selected
4. Assigning graphic images to buttons for visualization of buttons
5. Common relative position of controls in windows, the controls being shared among the windows
6. Online help call button and default parameter setting button arranged in each window for satisfactory operation environment
7. Layout of items in windows in which controls are arranged such that the operation is achieved from the upper-left corner to the lower-right corner of windows according to an operation flow assumed for a standard parameter setting operation For these items, description will be given of object of each concept thus set and effect thereof.

Concept 1:
Using the GUI, when the sequential setting operation of the conventional system is combined with the grouping of the devices to be set, there can be progressively developed an operation environment which is similar to that of a random-access and in which setting values can be mutually referenced and changed in the setting group. Particularly, in a situation where parameters are mutually related to each other, the concept is very efficient for the operation.

Concept 2:
This is necessary to effectively utilize the GUI. For example, if the display operation is achieved such that in relation to an operation of depressing a button of a mouse, there is presented an image in which a button is also depressed in the screen, there is implemented a GUI which can be intuitively understood by the operator at once.

Concept 3:
This is also used to enhance efficiency of the GUI. In a case where the items to be selected is small in number, for example, where there are several items to be selected, if such parameters are assigned to buttons having a visual operability, there is developed a user interface in which relationships between numeric values and selection states are more intuitively recognized as compared with the case where the parameters are represented with numeric values or character strings.

Concept 4:
This concept is implemented by developing the concept 3. Namely, image patterns presenting visual characteristics of setting parameters are indicated on buttons to possibly minimize descriptive explanations so that the user intuitively appreciates functions of buttons, thereby decreasing loads imposed on the user to set parameters.

Concept 5:
This concept is provided to possibly integrate operability in a plurality of windows. Relative positions of buttons are integrally arranged in the windows so that the user operating with a pointing device such as a mouse is relieved from the load of troublesome operations, which reduces the number of errors in the operations and the operation time.

Concept 6:
This is disposed to lower the loads imposed on the user. In the conventional examples, the online help function has been positively incorporated into GUI screens only in a few cases, namely, the function is positioned as an additional function in the prior art. In this example, the function is positively disposed as a portion of the screen function in all windows. Moreover, a default setting button is arranged to provided a model of standard setting values, which minimizes a portion of the setting operation to be conducted by the user.

Concept 7:
Assuming a flow of processing to be executed by the user, there is arranged the operation flow to guide the user to naturally set parameters. In addition, parameters having a higher-level significance are disposed on the upper-left corner of the screen to enhance visibility thereof.

Figure 21:
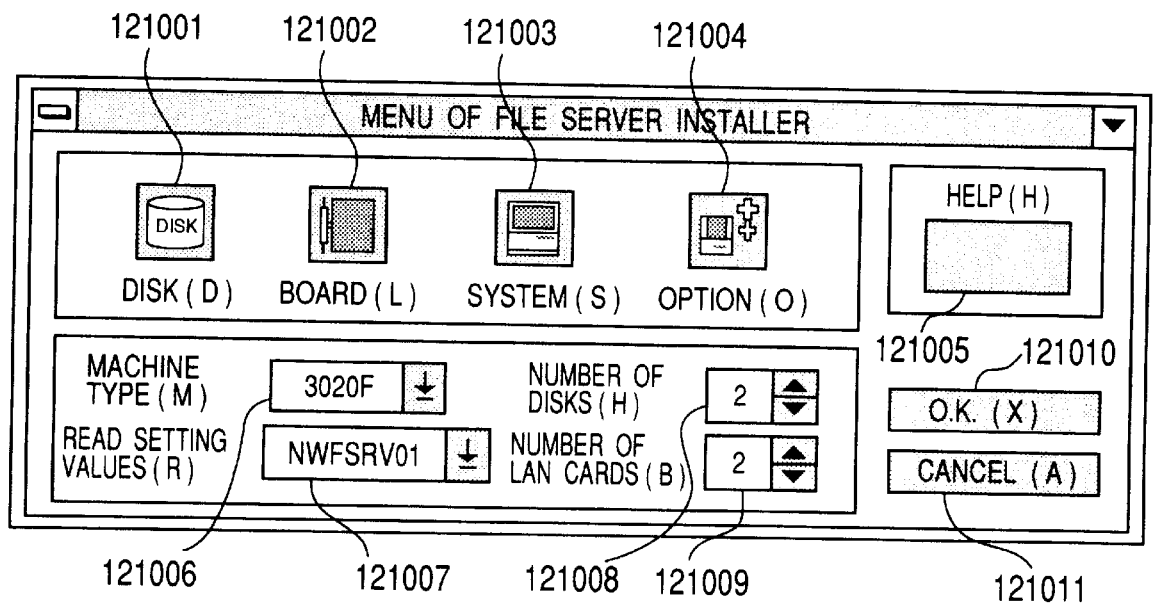
FIG. 21 is a diagram showing a menu window.
Figure 22:
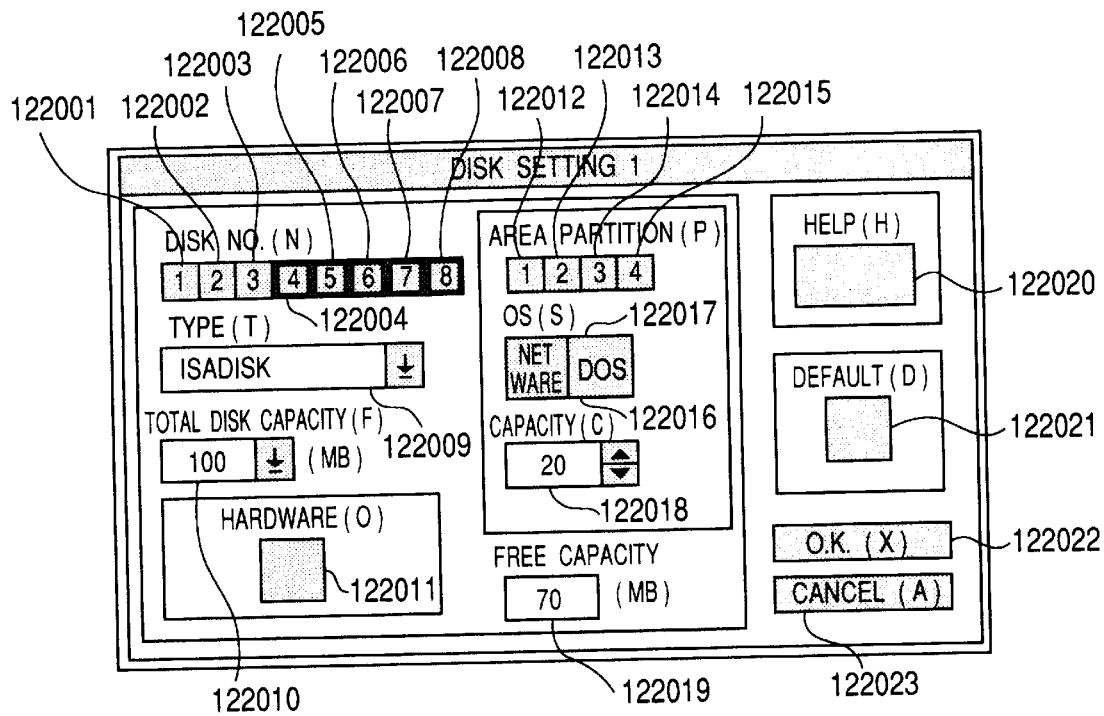
FIG. 22 is a diagram showing a hard disk setting window.

An example of implementation of the concepts above will next be described by reference to FIGS. 21, 22, and 24. In this connection, details of these diagrams will be described later, namely, only relationships thereof with the concepts above will now be described. In FIG. 21, a button 1220016 is different in shape from a button 1220017 and is designed to be visible when depressed. Such presentation of buttons is developed according to the concepts 1 and 2. Moreover, the buttons above are respectively associated with character strings NetWare and DOS as parameters, which is namely implemented according to the concept 3. Similarly, based on the concepts 1 to 3, eight buttons 122001 to 122008 and four buttons 122012 to 122015 are disposed. The concept 4 is representatively implemented as four buttons 121001 to 121004 of FIG. 21. Due to presentation of external characteristics on buttons, the operability thereof is improved. The concepts 5 and 6 are applied to the right portions of FIGS. 21, 22, and 24. In each pair of buttons 12020 and 123013, 122021 and 123014, 122022 and 123015, and 122023 and 123016, the constituent elements are associated with each other and are assigned with substantially the same function. Particularly, the buttons 122020 and 123013 are assigned with an online help call function and the buttons 122021 and 123014 are assigned with a default setting function. The concept 7 can be understood by establishing a correspondence between the flowcharts of FIGS. 11 and 12.

As described above, it can be appreciated that the seven concepts of the easy setting are effective to improve the operability for the user.

Figure 8:
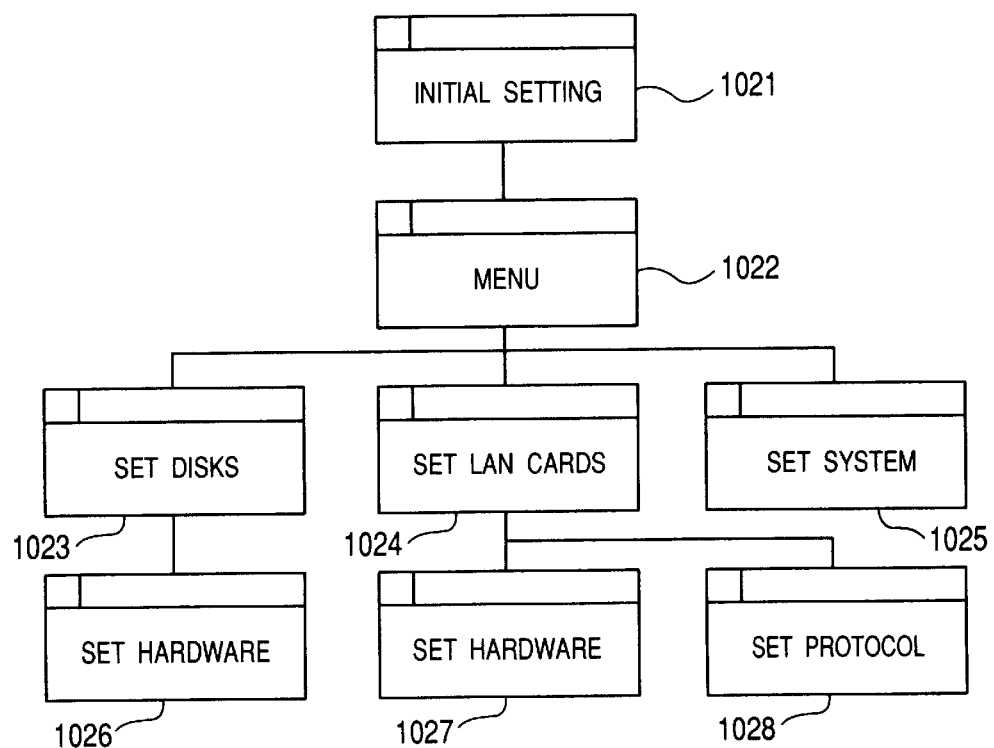
FIG. 8 is a diagram showing relationships between the screens of a file server installer (GUI section)

Subsequently, details of the following items will be described by reference to FIG. 8.
1. Relationships between screens of file server installer (GUI section)
2. Event-driven-like processing method to be initiated from menu
3. Concepts of upper-order and lower-order parameters according to classification thereof based on degree of significance thereof in install processing 4. Method of hierarchically assigning setting parameters based on classification of parameters FIG. 8 shows relationships between the primary parameter setting windows supported by the file server installer (GUI section). As can be seen from this diagram, the installer has eight parameter setting windows 1021 to 1028, which are configured in a tree structure.

The window 1021 is used to set conditions for initiation, namely, there can be set three parameters including a machine type to be installed, the number of disks, and the number of LAN cards. These parameters designating the basic machine configuration are essential for the installation processing.

The window 1022 presents a menu from which three different windows can be called, namely, a window to set three parameters including a machine type to be installed, the number of disks, and the number of LAN cards, a window to read the contents of parameters beforehand set so as to send the contents to the file server installer, and a window to set the contents of the respective parameters.

The window 1023 can call a hardware window 1026 in which there can be set such higher-order parameters related to disks as a type of disk, the total capacity of all disks, a type of an operating system employed according to a softwarewise subdivision of disks, and a capacity of the operating system occupying in the disk. Moreover, a capacity not used in the area of the disks is displayed and lower-order parameters related to disks can be set. The higher-order parameters are indispensable to designate a name of product and a basic specification of an element machine connected to the machine to be installed. In contrast thereto, for the lower-order parameters, the setting values thereof need not be altered in an ordinary machine configuration; however, in a particular machine configuration, the setting values are required to be partially varied in conformity with the respective usages of the associated constituent units.

The window 1024 can call two windows. In one of the windows, there can be set the higher-order parameters associated with LAN cards such as a name for identifying a LAN card, a type thereof, and a contour of a cable used for the LAN connection. In the other one thereof, there can be set the other parameters related to LAN cards.

In the window 1025, there can be set three parameters indispensable to construct a NetWare network system, namely, a file server name, a network number in IPX, and a network number.

The window 1026 is disposed to set four lower-order parameters which are related to disks and which are necessary for a particular machine configuration, namely, an I/O port number, an interruption number, a memory address, and an insertion slot number.

In the window 1027, there are set five lower-order parameters which are associated with LAN cards and which are necessary for a particular machine configuration such as an I/O port number, an interruption number, a memory address, a DMA channel number, and an insertion slot number.

The window 1028 is used to set seven lower-order parameters which are related to disks and which are necessary for a particular machine configuration, namely, a frame time, an error retry count, a node number, and token ring parameters including a link station number, an SAP station number, a buffer count, and a buffer size.

Thanks to the screen layout of FIG. 8 and provision of the menu windows, the operator can set parameters, which have been set in a unique order in the conventional system, while referencing relationships therebetween. This remarkably facilitates the setting operation.

Moreover, establishing the correspondence between the classification of parameters such as higher-order and lower-order parameters and the tree structure of screens, there can be provided an installation parameter setting environment in which parameters are set in a hierarchic fashion, thereby reducing the number of operation steps of the user and the period of time necessary to set the parameters.

Figure 9:
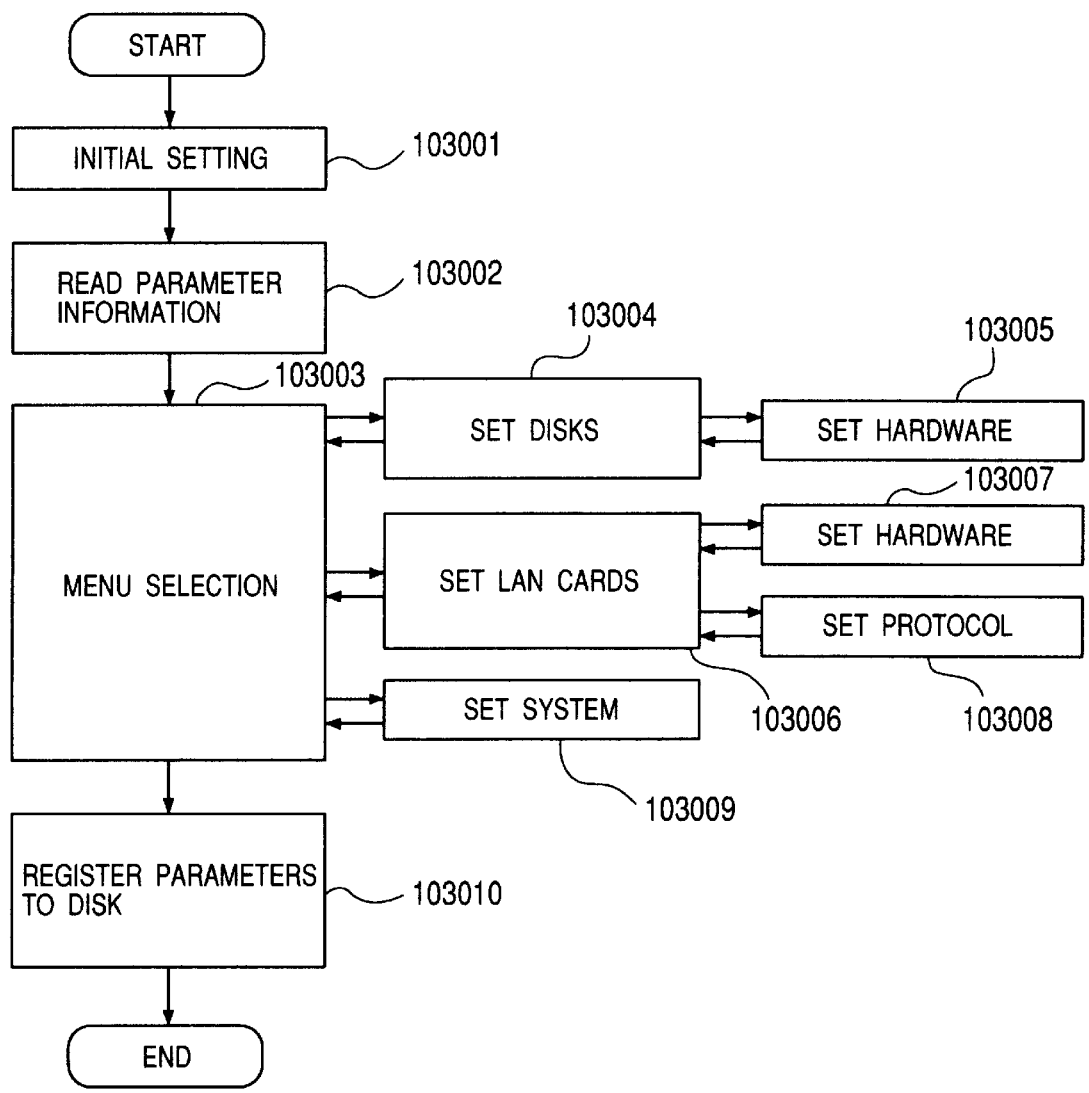
FIG. 9 is a flowchart illustratively showing the processing of the file server installer (GUI)

Referring now to FIG. 9, the following items will be described in detail.
1. Example of overall operation flow of file server installer (GUI section)
2. Example of order of setting parameters FIG. 9 shows an example of the flow of operations achieved by the user according to the file server installer (GUI section).

In FIG. 9, frames or boxes 103001 to 103009 respectively correspond to windows appearing in programs of the file server installer (GUI section). Of these windows, nine windows excepting the window 103010 have already been explained as the windows configuring the tree structure of FIG. 8. Details thereof such as a constitution and a function will be described later.

The file sever installer automatically executes programs through four frames 103001, 103002, 103003, and 103010 in this order. In the most simplified flow, the processing is achieved along these frames.

In the frame 103001 of this flowchart, there is executed an initial setting operation to specify parameters designating fundamental constituent units of the machine to be installed.

In the frame 103002, a set of parameters beforehand registered are read from a parameter disk, which will be described later.

The frame 103003 is a menu frame for calling three processing frames 103004, 103006, and 103009.

In the frame 103010, parameters are saved onto the parameter disk, which will be described later.

In three frames 103004, 103006, and 103009, the user conducts selections to set parameters in the menu processing 103003 while paying attention to parameters to be set in each window. When the parameters are set only through a reading operation thereof in the frame 103001, the three frames above need not be called in some cases. The parameters set in the three processing sections are related to the higher-order parameters defined in the description of FIG. 8.

In the frame 103004, there are set parameters associated with disk devices, for example, a name of device.

The frame 103006 is disposed to set parameters associated with LAN cards, for example, a name of device.

In the frame 103009, there are set parameters associated with a network system, for example, a name of file server.

Processing 103005 is called from the frame 103004, whereas processing 103007 and 103008 is invoked from the frame 103006. These processing frames are used to set more detailed parameters, which are associated with the lower-order parameters defined in the description of FIG. 8.

In the frame 103005, lower-order parameters related to disks are set, for example, an I/O port number of disk device is specified.

The frame 103007 is disposed to set lower-order parameters associated with hardware of LAN cards, for example, an I/O port of LAN card device.

In the frame 103008, there are set lower-order parameters related to software of LAN card devices, for example, a frame type used in a program driving LAN cards.

Subsequently, the following items will be described in detail by reference to FIG. 10.
1. Example of an operation flow from a program initiation to a menu window presentation in the operations of the file server installer (GUI section)

2. Behavior of transition from the window 1021 to the window 1022 shown in FIG. 8
3. Parameter setting method without limitations related to operation procedure and number of operations in which parameters can be set according to mutual references therebetween The frames 104001 and 104002 respectively correspond to the frames 1021 and 1022 of FIG. 8. FIG. 10 shows an example of a detailed operation flow associated with the transition from the frame 103001 to the frame 103002 of FIG. 9.

When the program is initiated, there immediately appears an initial setting window 104001. In this window, the user conducts a machine type setting 104003, a setting of the number of disks 104004, and a setting of the number of LAN cards 104005. When a setting termination 104006 is activated, the window 104001 disappears and then a menu window 104002 is displayed. Details of the operation method will be described later by reference to FIG. 20.

In the frame 104003, a type of machine is set for the machine to be installed. This is the fundamental parameter for the other parameters.

The frame 104004 is used to set the number of disks connected to the machine. This is the fundamental parameter for the other parameters related to disks.

In the frame 104005, the number of LAN cards connected to the machine is set. This is the fundamental parameter for the other parameters related to LAN cards.

When the frame 104006 is operated to terminate the setting operation, there occurs transition to the menu window 104002 in which the user can select a desired window for the subsequent setting operation.

Figure 10:
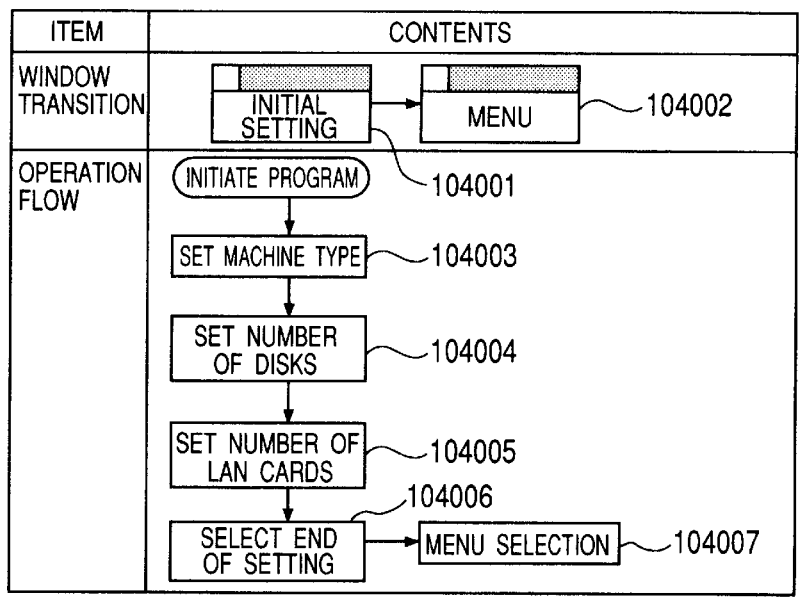
FIG. 10 is a flowchart showing the initial setting processing.

In the example of operation flow shown in FIG. 10, three operations of the frames 104003 to 104005 can be achieved in any operation sequences. Namely, the same results are obtained even when the operation sequence is changed. Moreover, these operations may be repeatedly accomplished to alter the contents to be set. In other words, neither the operation sequence nor the number of operations is limited. These operations can be arbitrarily conducted until the setting end frame 104006 is initiated. The contents specified in the setting operations at initiation of the frame 104006 are assumed as the contents of parameters thereafter.

Figure 11:
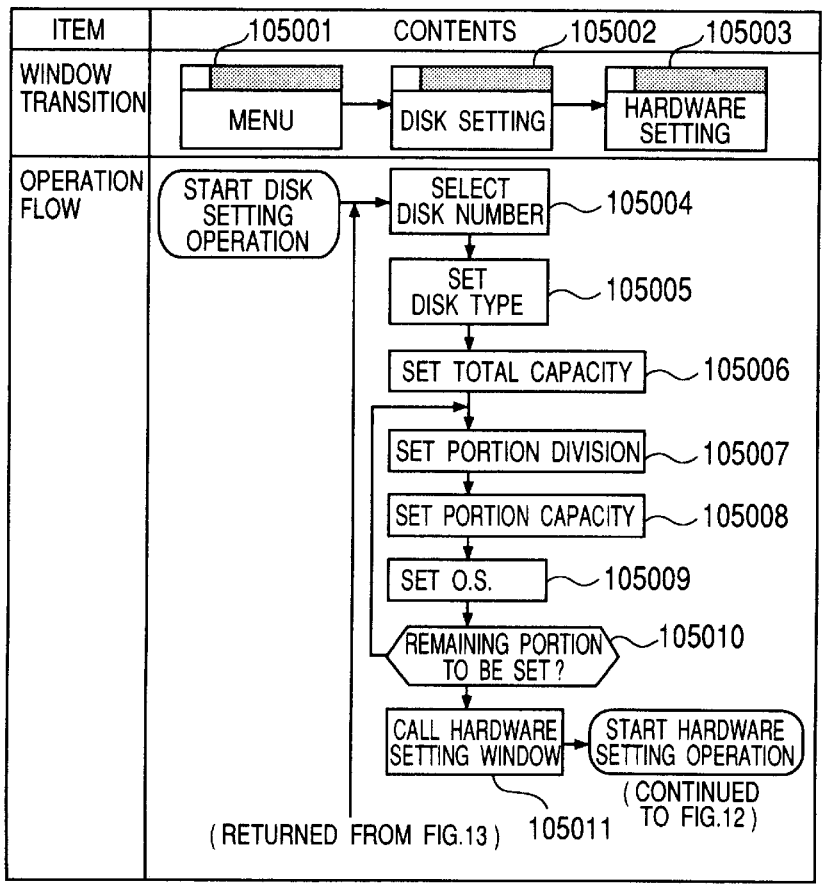
FIG. 11 is a flowchart showing the hard disk setting processing.
Figure 12:
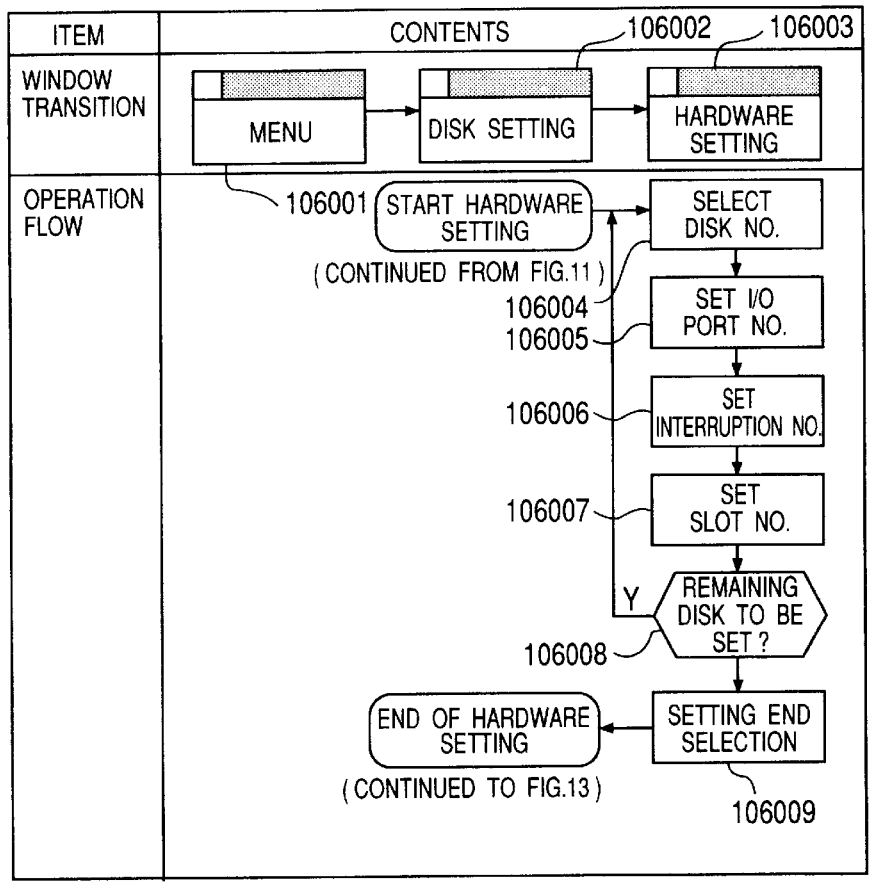
FIG. 12 is a flowchart showing the processing of setting hardware for hard disks.
Figure 13:
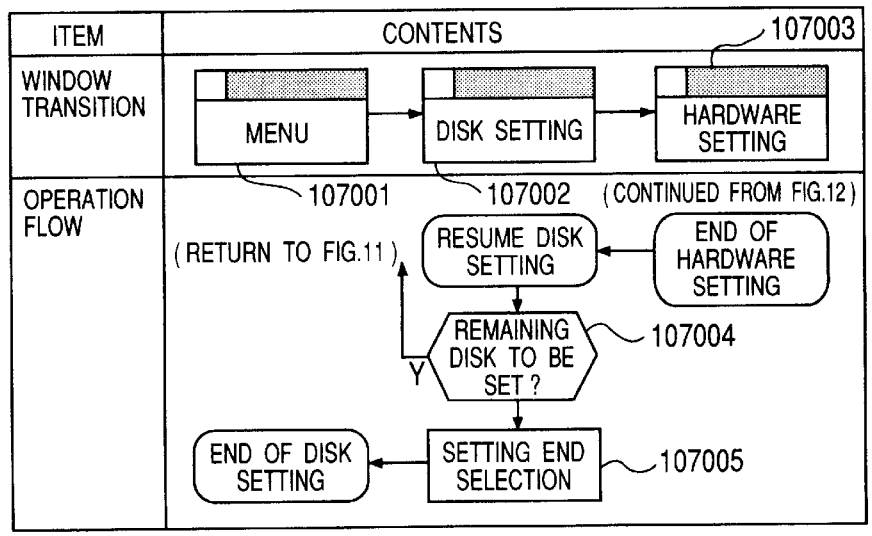
FIG. 13 is a flowchart showing the hard disk setting processing.

Referring next to FIGS. 11 to 13, description will be given of the following items in detail.
1. Example of operation flow from a menu window to a disk setting window in the operations of the file server installer (GUI section)
2. Behavior of transition from frame 1023 to frame 1026 in relation to the operation flow above and the windows of FIG. 8.
3. Parameter setting method without limitations related to operation procedure and number of operations in which parameters can be set according to mutual references therebetween Frames 105001, 106001, and 107001; frames 105002, 106002, and 107002; and frames 105003, 106003, and 107003 respectively correspond to the frames 1022, 1023, and 1026 of FIG. 8. By reference to three screen images of FIGS. 11 to 13, description will be given in details of an example of operation flow associated with the change from the step 103003 to the step 103005 of FIG. 9. Namely, examples of processing procedures conducted by the user for transition from the window 1022 to the window 1023, for transition from the window 1023 to the window 1026, and for transition from the window 1026 to the window 1022 will be described by reference to FIGS. 11, 12, and 13, respectively.

Referring now to FIG. 11, a detailed description will be given of an operation to set higher-order parameters related to disk devices for the installation.

FIG. 11 shows a first-half portion of the detailed operation flow of the operation ranging from the step 103003 to the step 103004 of FIG. 9.

In a menu window 105001, when an operation is conducted to call a disk setting window 105002, there appears the window 105002.

In a case where a value equal to or more than two is set as the number of disks in the setting frame 104003, there is first selected a number assigned to the pertinent disk for the parameter setting operation (105004). The user assigns a number to each disk device in an arbitrary order. Thereafter, a type is set for the disk (105005) and the total capacity is set therefor (105006). In the frame 105005, the user specifies a name denoting a specification of the disk. According to the value of parameter set in this frame, items of parameters to be set in the window 105003 and initial values thereof are altered. In the frame 105006, the total capacity of the disk is set.

In a sequence of operations of frames 105007 to 105010, there are set a plurality of storage areas to be softwarewise controlled in the respective disks. First, a number of areas to be subdivided is set (105007). The number is specified by the user for the setting operation and is associated with a control number of the operating system controlling the hard disks. After the subdivision area number is set (1050079), a capacity is specified in the area (105008) and an operating system controlling the area is set (105009). To set a plurality of division areas, the operations of frames 105007 to 105009 are repeatedly accomplished as many as there are division areas.

In a window 105011 to call hardware setting window, lower-order parameters are set depending on the specification of disk designated in the frame 105005.

Referring next to FIG. 12, the operation to set lower-order parameters will be described in detail.

FIG. 12 shows in detail the operation flow of the steps 103004 to 103005 of FIG. 9.

When an initiation of hardware setting processing is selected in a disk setting window 106002, there appears a hardware setting window 106003.

In the window 106003, a disk number selection 106004 is effected, like in the case described by reference to FIG. 11, so as to identify a disk device to be set.

For the disk device, there are next set an I/O port number (106005), an interruption number (106006), and a slot number in which a card associated with the disk device is inserted (106007). Moreover, depending on the type of disk device specified in the frame 104005 of FIG. 10, the parameter setting operation may be skipped for some of the three parameters.

In a frame 106008, if the parameters have been set for all disk devices, the user selects a setting termination in a frame 106009 to finish the processing of frame 106003 and then control is returned to the frame 106002.

Next, referring to FIG. 13, description will be given of the other operations in the disk setting window.

FIG. 13 shows a last-half portion of the detailed operation flow related to the steps 103003 and 103004 of FIG. 9.

In the window 106009, when a selection is made to finish the setting operation, there is achieved according to the flow of FIG. 13 an operation subsequent to that described by reference to FIG. 11. In a frame 107004, if the setting operation has been completed for all disk devices, a setting finish frame 107005 is selected to terminate the processing of the window 107002, thereby passing control to the menu window 107001.

The processing related to the screen images shown in FIGS. 11 to 13 is collectively called a disk setting processing.

Figure 14:
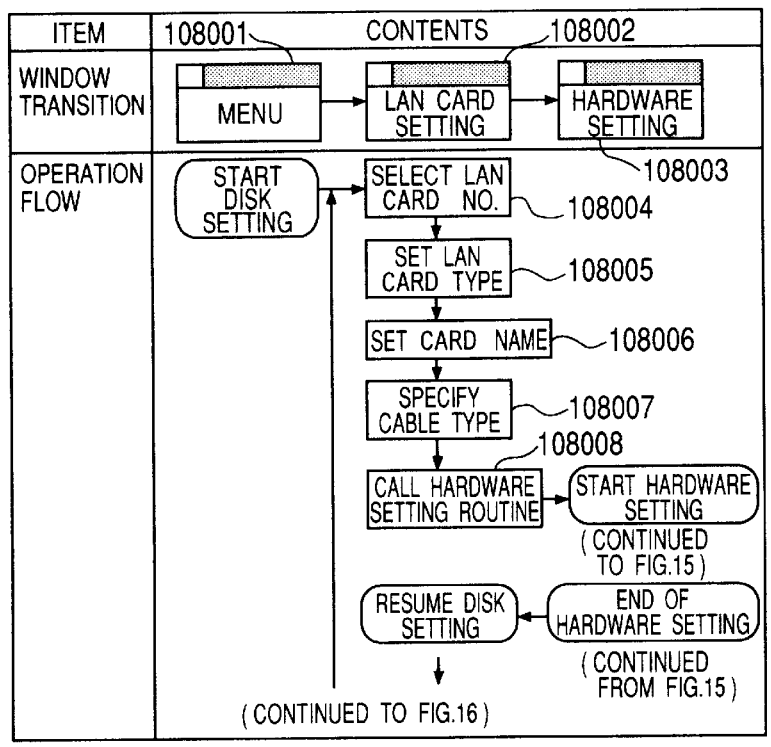
FIG. 14 is a flowchart showing the LAN card setting processing.
Figure 15:
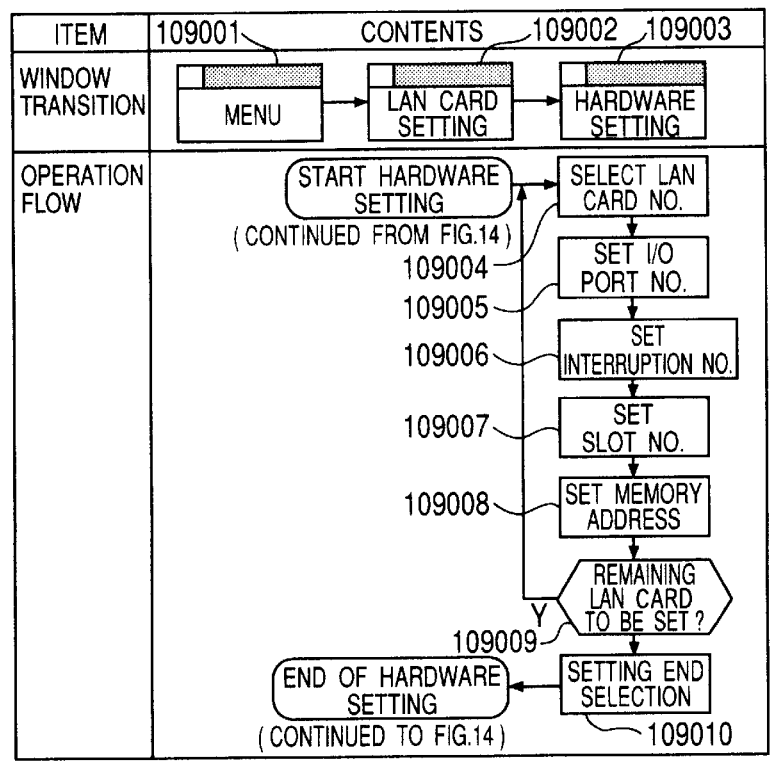
FIG. 15 is a flowchart showing the processing of setting hardware for LAN cards.

Details of the following items will next be described by reference to FIGS. 14 to 18.
1. Example of LAN card setting flow initiated from menu window in the operations of file server installer (GUI section)
2. Behavior of transition from window 1024 to windows 1027 and 1029 in association with the flow above and FIG. 8
3. Method of setting parameters without limiting operation procedure and number of operations according to mutual references therebetween Frames 108001, 109001, 110001, 111001, and 112001; frames 108002, 109002, 110002, 111002, and 112002; and frames 108003 and 109003; and frames 110003, 111003, and 112003 respectively correspond to the steps 1022, 1024, 1027, and 1028 of FIG. 8. By reference to two screen images of FIGS. 14 and 15 and three images of FIGS. 16 to 18, examples of detailed operation flows will be described respectively corresponding to a flow related to the frames 103003, 103006, and 103007 and a flow associated with the frames 103003, 103006, and 103008. Referring to FIGS. 14 and 15, there will be respectively described a transition from the window 1022 to the window 1024 and a transition from the window 1024 to 1027. By reference to FIGS. 16 and 17 and FIG. 18, description will be respectively given of a transition from the window 1024 to the window 1027 and an example of processing procedure conducted by the user in a transition from the window 1024 to the window 1022.

Referring now to FIG. 14, a detailed description will be given of the operation to set higher-order parameters related to LAN cards (boards) for the installation.

FIG. 14 shows a first-half portion of the detailed operation flow from the step 103003 to the step 103005 of FIG. 9.

When the user calls the LAN card setting window 108002 in the menu window 108001, there appears the window 108002.

In a case where a value equal to or more than two is set as the number of LAN cards in the window 104005 of FIG. 10, the user first selects a number assigned to an LAN card to which parameters are set (108004). The number is assigned to each LAN card device by the user in an arbitrary order for convenience.

Thereafter, a type of LAN card is set (108005), a name thereof is specified for identification when there exist a plurality of LAN cards (108006), and a shape of cable is set for connection the LAN card (108007). In the frame 108005, there is specified a name representing a specification of the LAN card unit. According to a value set as the type of LAN card, items for the parameter setting operation and initial values thereof vary in the window 108003. In the window 108006, a name including a maximum of 47 arbitrary alphanumeric characters excepting special symbols may be set as the name of LAN card device. In the frame 108007, the user select one of the cable shapes registered to the system in advance.

In the window 108008, according to the specification of LAN card specified in the window 108005, lower-order parameters associated with hardware are specified.

Next, the operation to set the lower-order parameters for hardware will be described in detail by reference to FIG. 15.

FIG. 15 shows details of the operation flow related to the steps 103006 to 103007 of FIG. 9.

When an initiation of hardware setting operation is selected in the window 109002, there appears a hardware setting window 109003.

In this window, the user selects a number assigned to an LAN card, like in the case of FIG. 14, thereby identifying the card unit for the subsequent parameter setting.

Thereafter, there are specified for the LAN card device an I/O port number (109005), an interruption number (109006), a slot number used to insert the card in the disk device (109007), and a memory address (109008). These four items may be specified in an arbitrary sequence. Moreover, depending on the type of LAN card device designated in the window 108005 of FIG. 14, all of the three parameters need not be necessarily set.

In a window 109009, if the operation has been completed for all card units, a setting end is selected in a window 109010 to terminate the processing of the window 109003, thereby passing control to the window 109002. Namely, control returns to the flow of FIG. 14 and then transfers to the flow shown in FIG. 16 to continue the processing.

Figure 16:
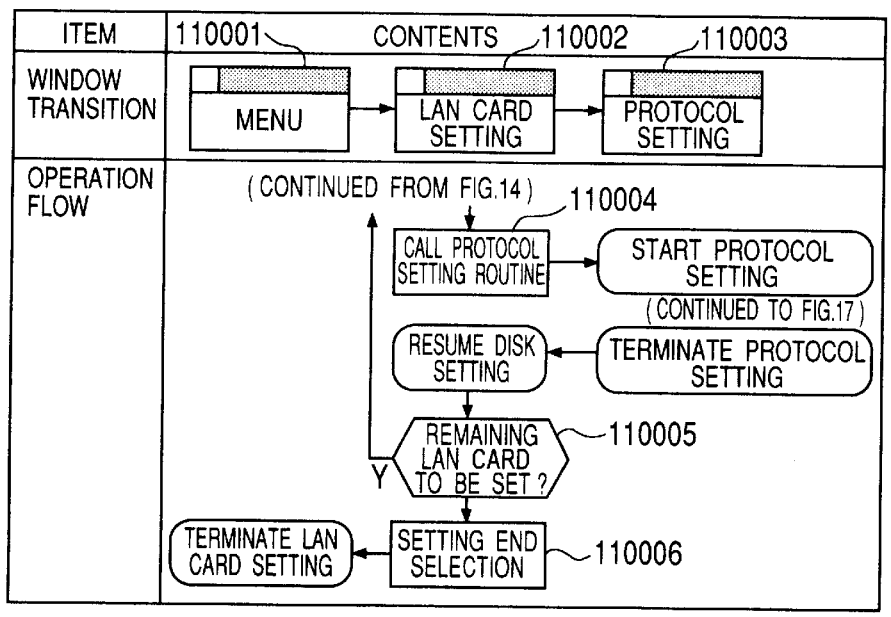
FIG. 16 is a flowchart showing the LAN card setting processing.

Subsequently, a flow from the call of the protocol setting to the end of LAN card setting will be described by referring to FIG. 16.

In a window 110004, the user calls a window in which lower-order LAN card parameters related to the protocol are specified. The operation flow of this window will be described later.

After returning from the window 110003, if it is detected that there does not exists any LAN card for which parameters are to be set (110005), a setting end is selected in a window 110006 to terminate the processing so as to pass control to a menu window 110001.

Figure 17:
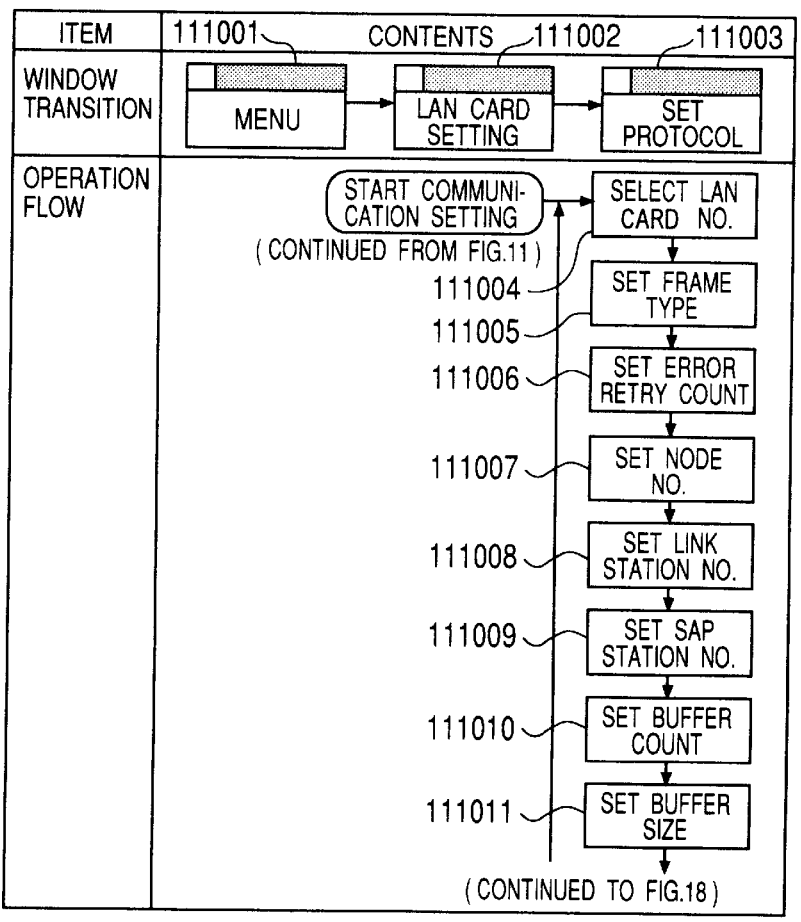
FIG. 17 is a flowchart showing the processing of setting protocol for LAN cards.
Figure 18:
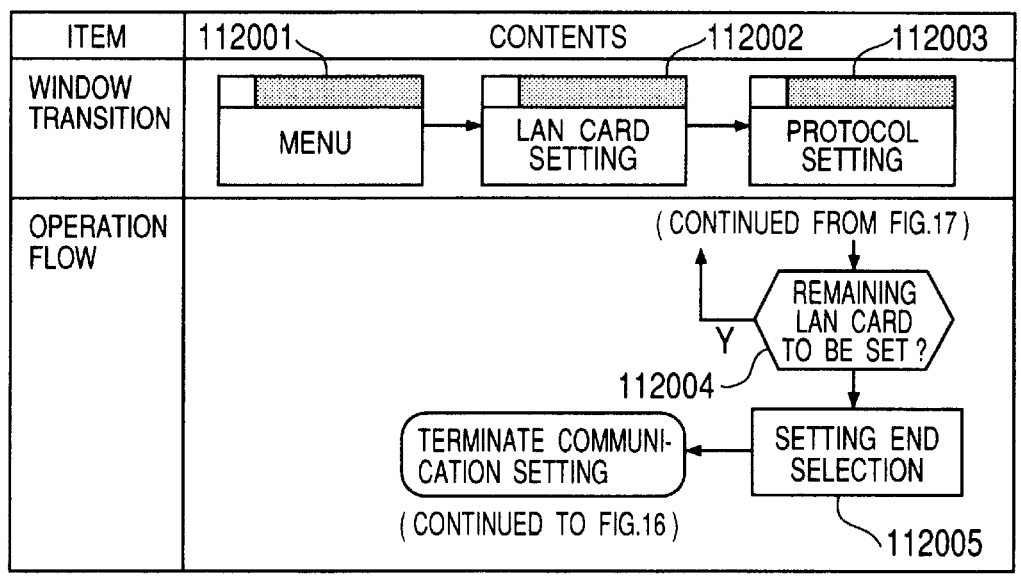
FIG. 18 is a flowchart showing the processing of setting protocol for LAN cards.

Referring next to FIGS. 17 and 18, description will be given in detail of the operation to set the lower-order parameters associated with the protocol.

FIGS. 17 and 18 show details of the operation flow from the step 103006 to the step 103008.

When an initiation of the protocol setting operation is selected in an LAN card setting window 111002, there is displayed a protocol setting window 111003.

In this window, like in the case of FIG. 14, there is selected an LAN card number to identify an LAN card device for the subsequent operation.

Thereafter, the user sets a frame type used by software driving LAN cards (111005), a number of retries at an occurrence of a packet communication error (111006), an address employed when a plurality of file servers are disposed in an identical network (111007), an address of link station adopted in the token-ring network (111008), an address of station of service access point (SAP, 111009), a number of buffers utilized for packet communications (111010), and a size thereof (111011). These seven parameters may be specified in an arbitrary order. In addition, depending on the type of LAN card device set in the window 108005 of FIG. 14, all of these parameters need not be necessarily specified.

In the window 112004, if the setting operation has been finished for all card devices, a setting termination is selected in a window 112005 to complete the processing of the window 109003, thereby passing control to the window 109002. Returning to the flow of 16, the processing of LAN card setting is ended as describe above.

The processing described in conjunction with the screen images respectively of FIGS. 14 to 18 will be collectively called an LAN card setting operation.

Figure 19:
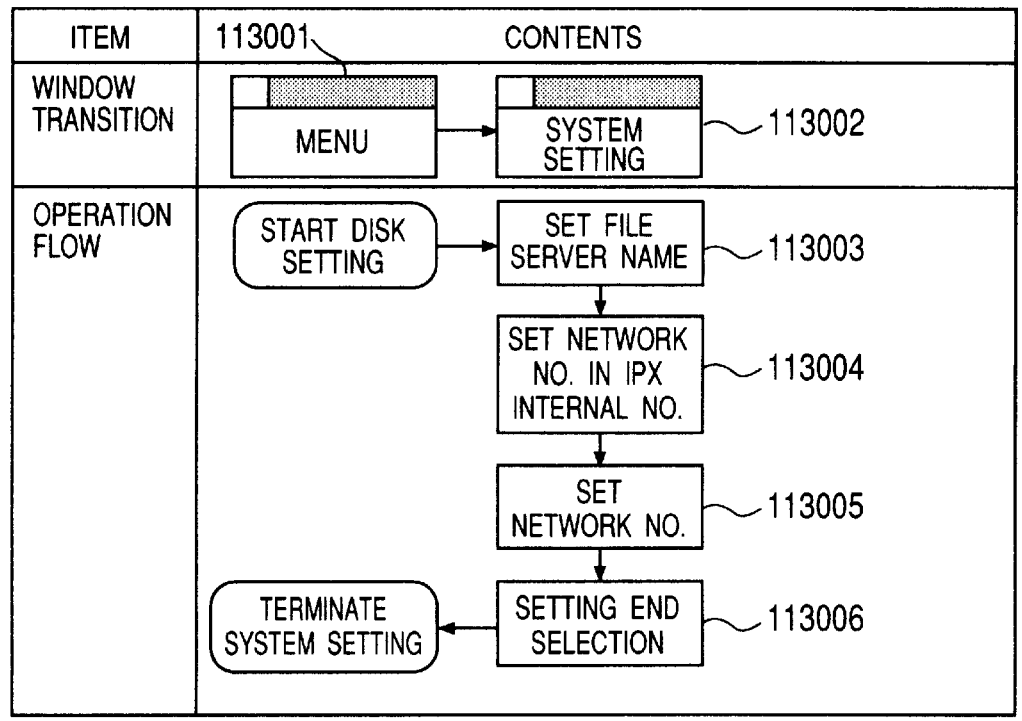
FIG. 19 is a flowchart showing the system setting processing.

Referring now to FIG. 19, the following items will be described in detail.

1. Example of operation flow from the menu window to the system setting window in operations of file server installer (GUI section)
2. Behavior of transition from window 1022 to window 1025 of FIG. 8 in relation to the flow above
3. Method of setting parameters without limitation of operation procedure and number of operations with mutual reference between parameters Windows 113001 and 113002 respectively correspond to the windows 1022 and 1025 of FIG. 8. Referring to FIG. 19, description will be given of an example of detailed operation flow related to a flow from the window 103003 to 103009 of FIG. 9.

In the menu of the window 113001, when the user selects a system setting operation, there is presented a system initiation screen 113002. In this window, there are set a file server name (113003), a network number in IPX (113004), and a network number (113005). When a setting termination 113006 is activated, the window 113002 is finished and the menu window 113001 is restored.

In the window 113003, the user sets a name identifying the file server for the operation after the installation.

In the window 113004, there is denoted a network number allocated to the file server for the IPX protocol.

In the window 113005, a network number is set for a connection of the file server.

When an end of setting is specified in the window 113006, control is passed to the menu window 113002.

The operation flow of FIG. 19 has been described only as an example, namely, the operations in the windows 113003 to 113005 may be conducted in an arbitrary sequence. Moreover, these operations may be executed as many times as necessary to alter the contents of the setting parameters. That is, the sequence of the operations above and the number thereof are not limited. These operations can be freely effected until the operation of the window 113006 is executed. The contents of setting values obtained when the window 113006 is initiated are assumed as the contents of parameters in the subsequent processing.

Figure 20:
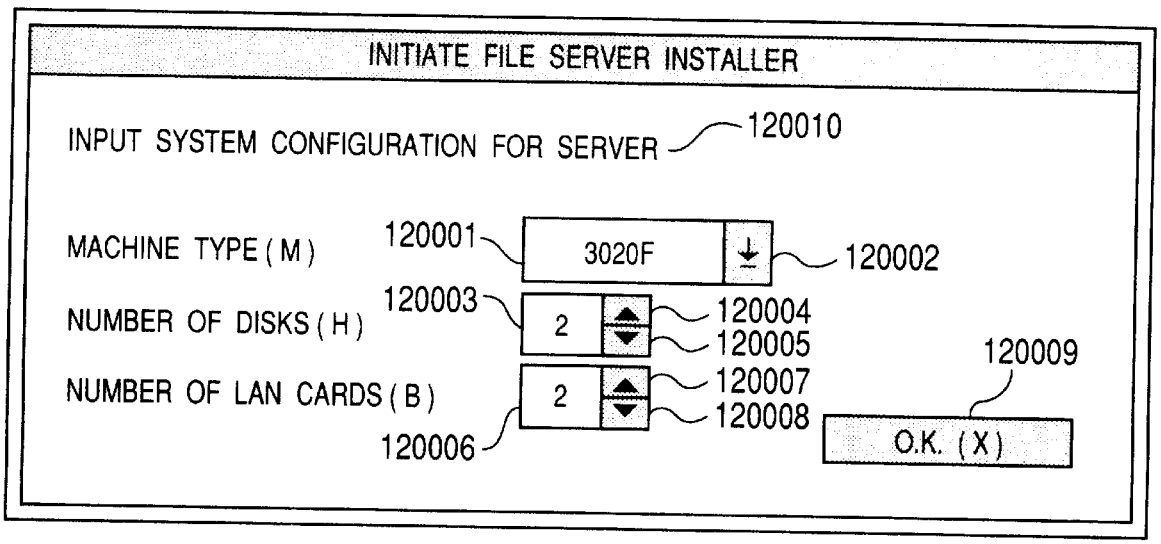
FIG. 20 is a diagram showing an initial setting window.

Referring next to FIG. 20, the following items will be described in detail.
1. Items to be set in program initiation from screens of file server installer (GUI section)
2. Modes of input interface supported to set the items
3. Reasons for determining interface modes for the interface FIG. 20 shows a screen of initial setting of the file server installer (GUI section). The operation flow associated with the screen has already been described in conjunction with FIG. 10.

As already described by reference to FIG. 10, the user sets three parameters in the screen of FIG. 20, namely a machine type for the installation, the number of disk units connected, the number of LAN cards disposed.

A set including a frame 120001 and a button 120002 is called a combination or combo box. The frame 120001 is disposed to set a type of machine to be installed so as to present therein the value of the specified machine in the form of a character string. When the button 120002 is depressed, there appears in the frame 120001 a list of parameters to be selected. The configuration of combo box has been adopted in the machine type setting operation for the following reasons. Since several character strings are possible as parameters in the frame 120001, the selecting form of the list thereof is quite efficient for the operation.

A frame 120003 and buttons 12004 and 12005 form a set for an input operation. The frame 12003 is used to specify a numeric value representing the number of disks such that the designated numeric value is displayed therein. The allowable value is an integer ranging from one to eight, namely, other values are to be rejected. To alter the values in the frame 120003, the user inputs another value directly from the keyboard or by use of the add button 120004 or the subtract button 120005. When the button 12004 is clicked once, the value set to the frame 120003 is incremented by one. Moreover, the button 120004 has a repeat function and hence when this button is kept clicked for several seconds, the repeat function is automatically effected to continuously increase the numeric value. In either case, since the value to be set to the frame 120003 is restricted by a limit value, the value is prevented from exceeding the limitation. Namely, when the value in the frame 120003 is identical to the limit value, the function of the button 120004 is nullified to be ineffective for the operation. When the subtract button 120005 is clicked one, the value set to the frame 120003 is decremented by one. Furthermore, the button 120005 has a repeat function and hence when this button is kept clicked for several seconds, the repeat function is automatically effected to continuously decrease the numeric value. In either case, when the value in the frame 120003 is equal to a lower limit value, the function of the button 120004 becomes to be ineffective for the operation. The frame with add and subtract buttons is disposed for the following reasons. When setting a numeric value, the user can conduct a consecutive alteration of the numeric value in addition to an input operation from the keyboard, thereby improving operability for the user.

A group including a frame 120006 and buttons 12007 and 12008 develops a similar function. The frame 120006 is used to set therein the number of LAN cards with an integer ranging from one to six. The buttons 120007 and 12008 are respectively associated with the buttons 120004 and 120005 to respectively increment and decrement the value in the frame 120006.

Figure 121:
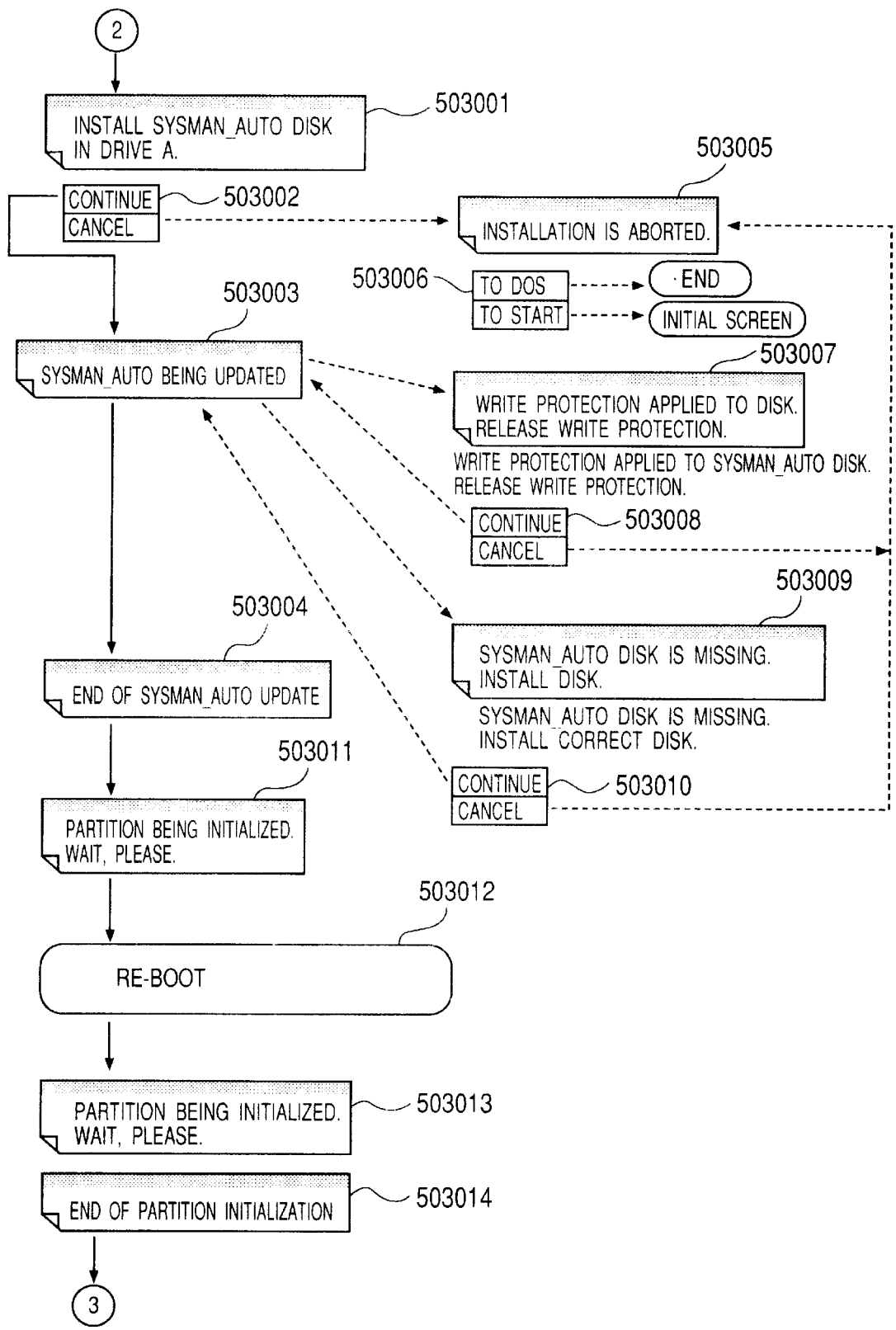
Figure 122:
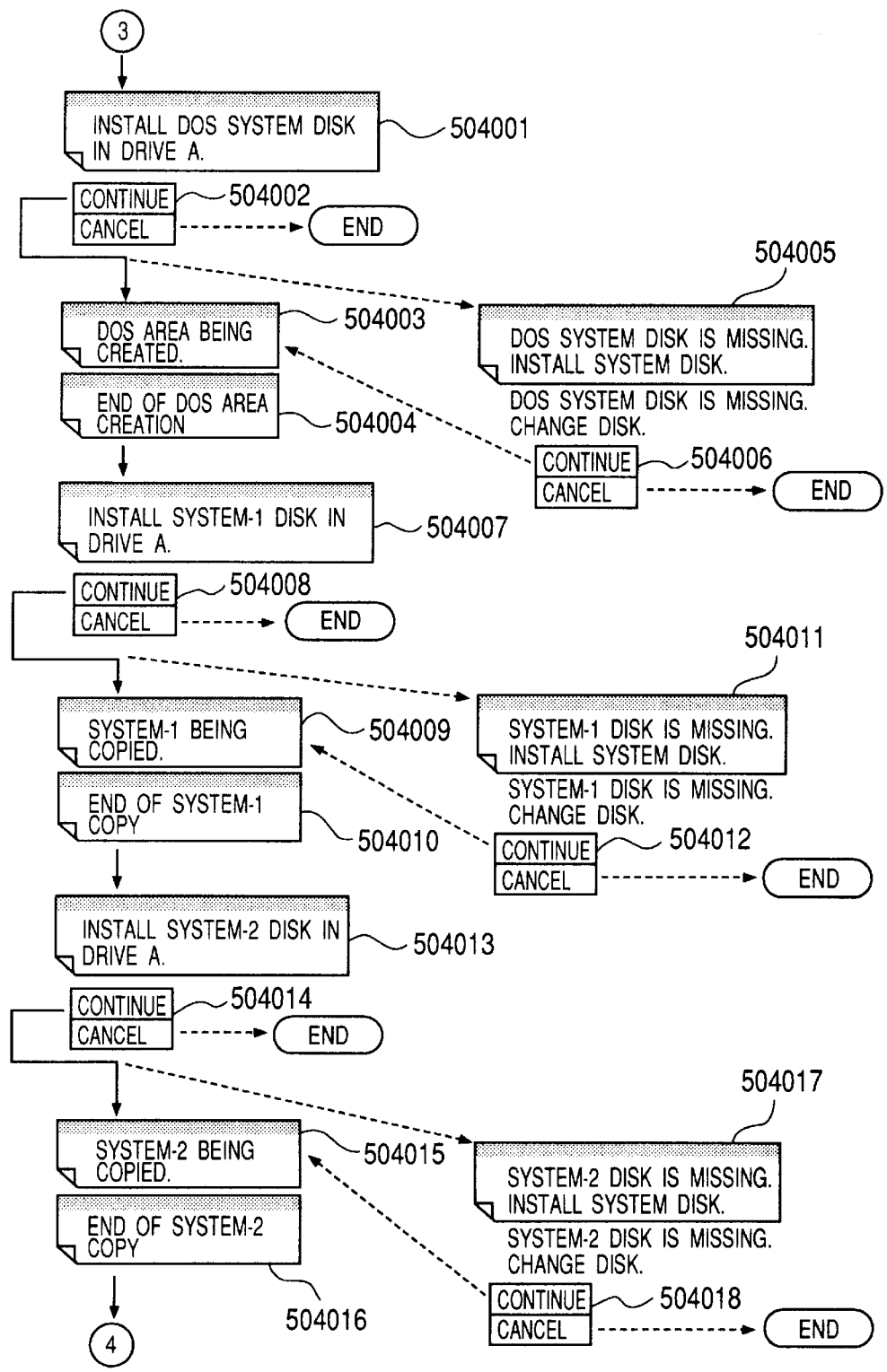
Figure 123:
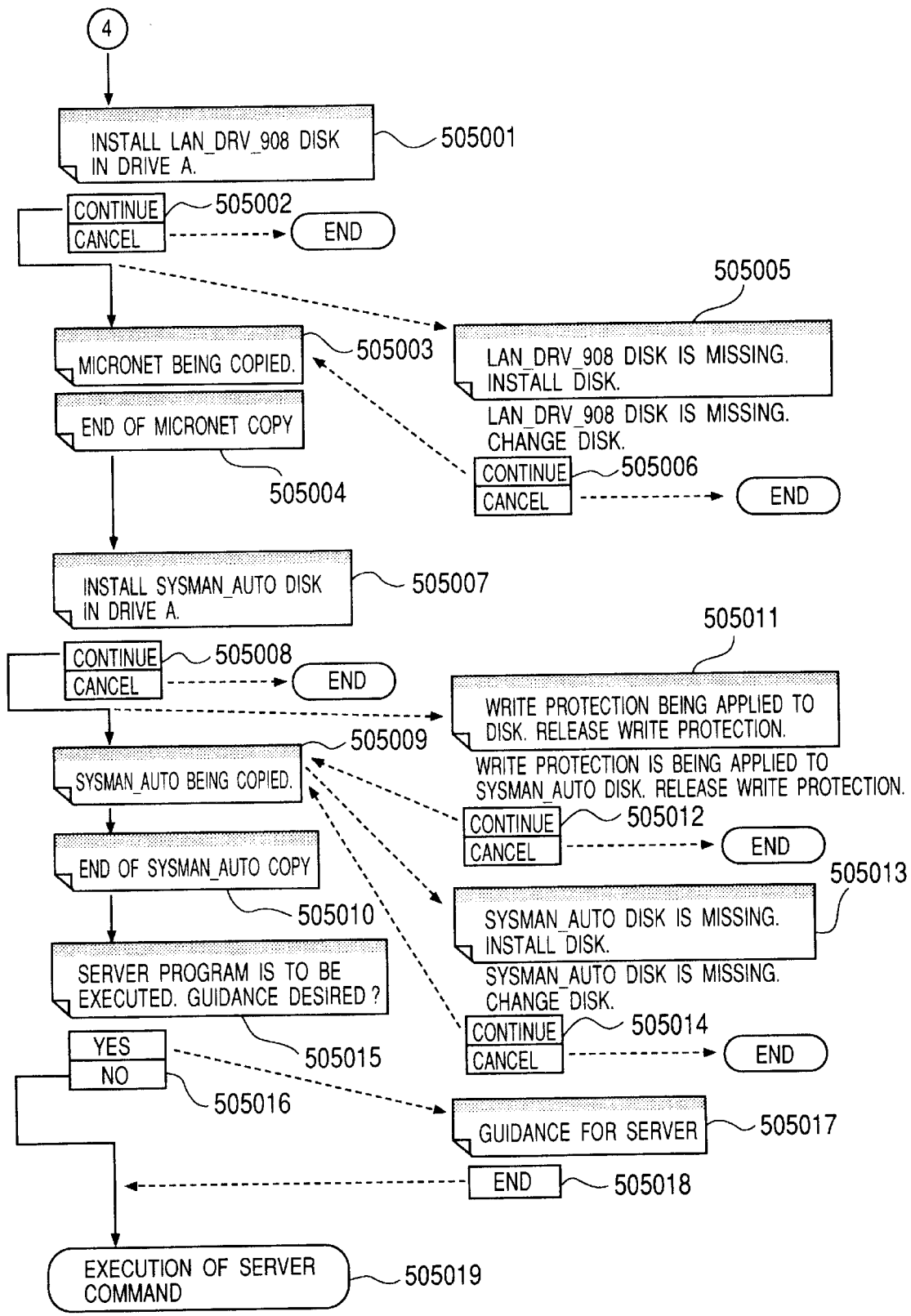

A button 120009 is disposed to select an end of setting operation. When this button is activated, the window of FIG. 20 is cleared to present a window of FIG. 121, which will be described later.

Referring now to FIG. 21, the following items will be described in detail.
1. Items to be set or selected in menu window of file server installer (GUI section)
2. Functions of parameter file supported only in menu window
3. Modes of input interface supported to set items 1 and 2
4. Reasons for determining interface modes to support interface above FIG. 21 shows a window of the file server installer (GUI section) presenting menu functions as a central portion of the programs and input and output functions of the parameter file. According to functions of the menu window, other windows are called to set various parameters in detail, parameters set in the initial setting window of FIG. 20 are altered, registered parameters are read from the parameter file, and parameters completely set are registered thereto.

A button 121001 is disposed to call a window to set items related to disks, which will be described by reference to FIG. 22. When this button is clicked, a disk setting window of FIG. 22 is displayed in a pop-up form in the menu window of FIG. 21.

A button 121002 is used to call a window to set items associated with LAN cards, which will be described in conjunction with FIG. 24. When this button is effected, an LAN card setting window of FIG. 24 is displayed in a pop-up form in the menu window of FIG. 21.

Figure 27:
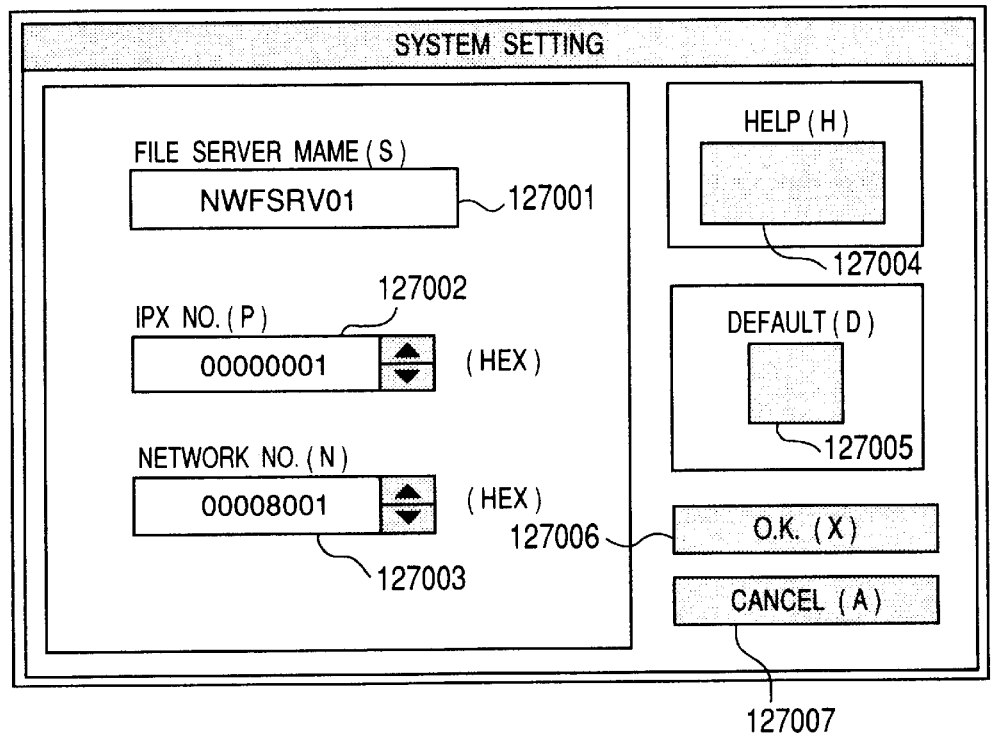
FIG. 27 is a diagram showing a system setting window.

A button 121003 is disposed to call a window to set items associated with a network system, which will be described in conjunction with FIG. 27. When this button is activated, a system setting window of FIG. 27 is presented in a pop-up form in the menu window of FIG. 21.

A button 121004 is reserved for a future use. However, in a future expansion of the system in which optional functions are to be supported, this button will be assigned with a function to call a window for the options in the menu window in a pop-up form like in the case of the button 121001 or the like.

A button 121005 is used to call an online help function. In the present stage, since neither the online help system nor the document for the help system have been completely prepared, this button is ineffective. According to a plan of development in the future, the online help system and the document will be prepared. Since there does not exist any technological problem at the present point of time, the development will be easily implemented.

A frame 121007 is related to the same parameters as those of the combo box constituted with the frame 12001 and the button 120002, namely, there is specified a machine type for the installation. Since control cannot return to the initial setting window of FIG. 20 directly from FIG. 21, this function is disposed to correct the contents set in the initial setting window.

A combo box 121008 is utilized to read existing parameters or parameters beforehand created. In this frame, when the user selects one of the file server names presented in a list, a set of parameters associated with the file server name are read from the parameter file. Moreover, when the user selects also an items of fundamental values in the frame, there is set a group of default parameters beforehand incorporated in the program. The control mode of the combo box 12008 is disposed for the following reasons. The number of groups of registered parameters is unknown to the user. The control mode enables the user to select an desired one of the plural groups presented in a list. Details of the parameter read operation will be described later by reference to FIG. 30.

A reference numeral 121009 indicates a combo box similar to that denoted by numerals 12003 to 12005 of FIG. 20 in which the same parameters can be used to set the number of disks connected to the machine to be installed. Since control cannot be directly returned to the initial setting window of FIG. 20, this function is provided to correct the contents set therein.

A frame 121011 is similar to the combo box including constituent elements 120006 to 120008 of FIG. 20 in which the same parameters can be specified to set the number of LAN cards of the machine for the installation. Since control cannot be directly returned to the initial setting window of FIG. 20, this function is provided so that the contents set therein are corrected.

A button 121011 is used to select an end for the setting operation of parameters in the file server installation. When this button is selected, in order to register the parameters thus set in the memory to the parameter file, a window for confirming the setting end (FIG. 32) is displayed in the window of FIG. 21 in a pop-up fashion. Details of the parameter registration will be described later. In the setting end window, when the parameter registration is instructed and the parameters are accordingly registered to the file, the operation of the menu window is finished and then the file server installer is terminated.

A button 121012 is disposed to interrupt the parameter setting of the file server installation to select termination of the file server installer (GUI section). When the button is activated, a window for confirming the interruption of setting (FIG. 29) is presented in the window of FIG. 21 in a pop-up manner. When an end of setting is instructed in the setting interruption window, control is returned to the menu window. Thereafter, the operation of the menu window and then the file server installer are finished.

Frames 121005, 121011, and 121012 are arranged at the same relative positions in the respective windows according to the easy setting concepts 5 and 6. Moreover, based on the easy setting concept 7, the buttons 121001 to 121003 are disposed in a direction from the left to the right in the window according to the standard operation flow assumed in the development stage. Four controls 121006 to 121010 are regarded as auxiliary setting frames and hence are not included in the arrangement according to the standards above.

Next, the following items will be described in detail by reference to FIG. 22.
1. Items to be set and/or to be selected in disk setting window of file server installer (GUI section)
2. Input interface modes provided to set items above
3. Reasons for determining interface modes to support the interface FIG. 22 shows a window of the file server installer (GUI section) to set higher-level parameters for hard disks. The hard disk setting window provides functions to set higher-level parameters and to call setting windows to specify associated lower-level parameters in detail. This window corresponds to the portions described in conjunction with FIGS. 11 and 13.

Eight buttons 122001 to 122008 are disposed to specify the number assigned to the disk device for the setting operation, which has been described in conjunction with the frame 105004 of FIG. 11. These buttons relate to the parameter expressing the number of disks set in the frame 120003. Each button represents a numeric character corresponding to the disk device number. When either one thereof is clicked, the following parameters can be set for the disk device thus indicated. In any situation, only one of the eight buttons is in the selected state. In the example of FIG. 22, a value of three is set by the button 12003 and hence only the buttons 122001 to 122003 are effected. Of these buttons, only the button 122001 representing one is in the selected state. Consequently, it is considered that the parameters set by the controls are associated with the disk device 1. As above, since only the buttons of parameters which can be selected by the user are effective, there is obtained a setting environment having a high visibility, i.e., the operator can easily understand the setting parameters based on the visual images.

A combo box 122009 is used to set a type of hardware specification of the disk device associated with the number set to the selected state by the buttons 122001 to 122008. From the items which can be set for parameters specified by the button, the user selects a type of the pertinent disk devices. Furthermore, assuming a case of addition of disk types to be supported by the system, there may be selected a type "See Vendor" equivalent to "others". When the disk type is changed in the frame 122009, the other setting values are set to default parameters of the type.

A combo box 122010 is disposed to set the total physical capacity of the disk device in megabytes (MB). The reason for provision of this box is that the physical capacity of disk device is discrete in general and a continuous change in the capacity is considered to be unsuitable for the operation.

Figure 23:
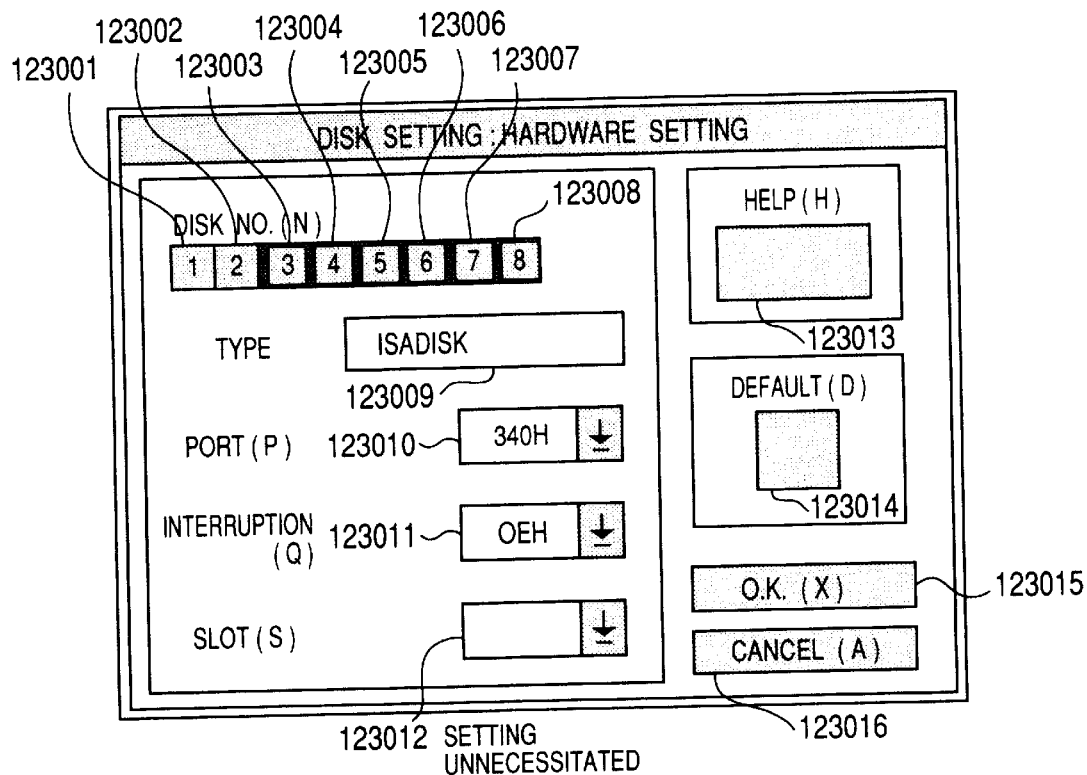
FIG. 23 is a diagram showing a window to set hardware for hard disks.

A button 122011 is used to call a window of FIG. 23 in which lower-order hardware parameters are set for the disk device.

Buttons 122012 to 122015 are disposed to set a software-wise subdivision of the total physical capacity of the disk device set in the frame 122010. The respective buttons are effective and either one thereof is in the selected state in any case. In the file server installation, the disk can be subdivided into up to four areas. For each area, an operating system controlling the area and a capacity of the area are required to be set. For this purpose, a numeral assigned to the control area is specified by the four buttons.

Buttons 122016 to 122017 are arranged to set an operating system to control the subdivided area of the disk. There are supported two operating systems, namely, NetWare and MS-DOS (registered trade mark of the Microsoft Inc.). These buttons become to be effected depending on the capacity of the divided area denoted by a frame 122018. The button 122016 is effective when the value of the frame 122018 is 30 or more; whereas, the button 122017 is valid when the setting value is four or more.

The frame 122018 is associated with add and subtract buttons to set a capacity of the subdivided area. A numeric value is directly set in the box or by use of the buttons in megabytes (MB). The specifiable value ranges from 0 to an upper-limit of capacity determined as the difference between the total capacity and that already set for other divided areas.

In a frame 122019, there is displayed a disk capacity reserved for the remaining subdivision area. The user cannot set any numeric value therein. The value in this frame is computed as the discrepancy between the total disk capacity and that already set for other divided areas.

A reference numeral 122020 designates a button for calling a help system disposed according to the image setting concepts.

A numeral 122021 denotes a button for setting default values arranged in accordance with the easy setting concepts. When the button is activated, setting values respectively of the frames 122009, 122010, 122016, 122017, and 12018 are set as parameters according to the standard system configuration assumed. In addition, the values of lower-order parameters to be set in the windows called from the window 122011 are set as default parameters.

A button 122022 is used to select an end of setting operation in the disk setting window. When the button is selected, while the parameters thus set are kept remained in the memory, the operation of the window is terminated, thereby passing control to the menu window.

A button 122023 is disposed to interrupt the parameter setting operation for the disk so as to return control to the menu window. When the button is effected, a window to confirm the interruption of the setting operation (FIG. 29) is displayed in the window of FIG. 22 in a pop-up manner. When an assertion is inputted in the window, control is transferred to the menu window. When a cancellation is instructed, control is passed to the disk setting window.

The controls 122020 to 122023 are arranged at the same relative positions in the respective windows according to the easy setting concepts 5 and 6. Moreover, based on the easy setting concept 7, the control frames and buttons are disposed in a direction from the left to the right in each window according to the standard operation flow assumed in the development stage.

Referring next to FIG. 23, the following items will be described in detail.
1. Items to be set and selected in disk hardware setting windows in screens of file server installer (GUI section)
2. Modes of input interface supported to set items above
3. Reasons for deciding interface modes to provide the interface FIG. 23 is a window to set lower-order parameters for disks in screens of the file server installer (GUI section). In the setting window, there are provided functions to set lower-order parameters. This window is associated with the portion of the operation flow described by reference to FIG. 12.

Eight buttons 123001 to 123008 are disposed to set a number assigned to the disk device for the setting operation, which has been described by reference to the frame 106004 of FIG. 12. These buttons are related to the parameter denoting the number of disks set in the frame 120003. Each button is provided with a numeric character corresponding to the number assigned to the disk device. When either one thereof is clicked, there is set a parameter for the disk device associated with the numeric character as follows. In any situation, only one of the eight buttons is in the selected state. FIG. 23 shows an example in which the value set in the window 12003 is two and hence only three buttons 123001 to 123003 are valid. Since the button 123001 indicating a value "1" is selected, the parameters represented by the setting controls are assumed to be related to the disk device 1. As above, since only the buttons corresponding to available parameters are set to be effective, there is obtained a visually facilitated operating environment.

A reference numeral 123009 denotes a box for displaying therein a type of hardware specification of the disk device associated with the number in the selected state. In this case, neither the setting nor the alteration of the type parameter can be achieved.

A numeral 123010 indicates a combo box to set a port number allocated to the disk device. Only the values which can be set according to the disk type presented in the frame 123009 are displayed as selection items in a list. The parameter setting may be dispensed with depending on the disk type. In such a case, an indication "Setting Unnecessitated" is presented and the control is invalidated.

A numeral 123011 indicates a combo box to set a hardware interruption number allocated to the disk device. There are displayed as selection items in a list only the values which can be set according to the disk type presented in the frame 123009. The parameter setting may be dispensed with depending on the disk type. In such a case, an indication "Setting Unnecessitated" is presented and the control is invalidated.

A numeral 123012 designates a combo box to set a slot number for installation of an extended card of the disk device. Only the values which can be set according to the disk type presented in the frame 123009 are displayed as selection items in a list. The parameter setting may be skipped depending on the disk type. In such a case, an indication "Setting Unnecessitated" is displayed and the control is nullified. The example of FIG. 23 is of this case.

A numeral 123013 stands for a button to call a help system disposed according to the easy setting concepts.

A numeral 123014 denotes a button to set default values arranged in accordance with the easy setting concepts. When this button is clicked, the setting values respectively of the frames 123010 to 123012 are set as default parameters corresponding to the disk type of the window 123009.

A numeral 123015 indicates a button to select termination of the setting operation in the hardware setting window for disk devices. When the button is selected, while keeping the specified parameters remained in the memory, the system terminates the operation of the hardware setting window and passes control to the disk setting window.

A numeral 123016 designates a button to interrupt the setting operation of hardware parameters for disks so as to return control to the disk setting window. When this button is activated, a window to confirm the interruption of setting (FIG. 29) is displayed in the window of FIG. 23 in a pop-up fashion. When an O.K. button is depressed in the window, control is transferred to the disk setting window. When a cancel button is effected, control is returned to the hardware setting window.

The controls 123013 to 123016 are disposed at the same relative positions in the respective windows according to the easy setting concepts 5 and 6. Moreover, in accordance with the concept 7, the controls are arranged along a direction from the left to the right in the windows based on the standard operation flow assumed in the system developing stage.

Next, the following items will be described in detail by reference to FIG. 24.

1. Items to be set and selected in LAN card setting windows of the screens for file server installer (GUI section)
2. Mode of input interface supported to set the items
3. Reasons for deciding interface modes for interface supported FIG. 24 shows a window for setting therein higher-order parameters for LAN cards in screens of the file server installer (GUI section). In this window, there are provided functions to set higher-order parameters and to call windows to set detailed lower-order parameters. The window is associated with a portion of the operation flow described by reference to FIGS. 14 and 16.

Six buttons 124001 to 124006 are disposed to specify a number of LAN card unit for the setting operation, which has been described in conjunction with the window 108004 of FIG. 14. The buttons are associated with parameters of the number of LAN cards set in the frame 120006. Each button is provided with a numeric character corresponding to the number of the LAN card device. When either one thereof is clicked, there is set a parameter for the LAN card unit associated with the numeric character as follows. In any situation, only one of the six buttons is in the selected state. FIG. 24 shows an example in which the value set in the window 120003 is three and hence only three buttons 124001 to 124003 are valid. Since the button 124001 indicating a value "1" is selected, the setting parameters represented by the setting controls are assumed to be related to the LAN card unit 1. As above, only the buttons corresponding to available parameters are set to be effective; consequently, there is implemented a visually facilitated operating environment.

A numeral 124007 denotes, when a plurality of LAN card units are employed, a card name including up to 47 alphanumeric characters arbitrarily selected to identify each LAN card.

A numeral 124008 indicates a combo box to set a type of hardware specification for the LAN card unit corresponding to the number selected. In this case, the user can select one of the items available for the parameter of machine type set by the button 12001. Moreover, assuming a case of addition of LAN card types to be supported, the user may select a type "See Vendor" equivalent to "Others". When the type setting is changed for the LAN card by the button 124008, the other setting values are altered to default values of the type thus set.

Numerals 124009 and 124010 designate selection buttons to select a specification of cable for the connection between the LAN card unit and a network. Either one thereof can be depressed at a time. In addition, depending on the type parameter of the frame 124008, the cable contour is uniquely decided. In such a case, these buttons are invalidated.

Figure 24:
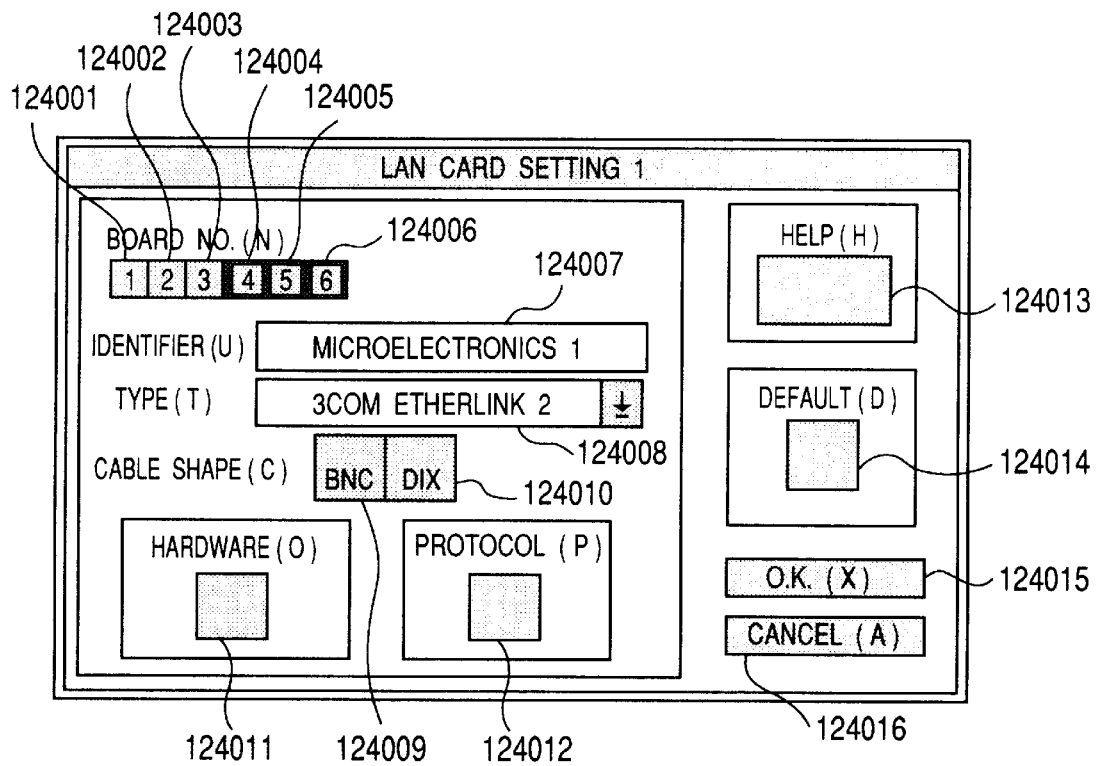
FIG. 24 is a diagram showing an LAN card setting window.

A numeral 124011 stands for a button to call a window of FIG. 24 for hardware setting in which lower-order parameters are set for the LAN card.

Figure 25:
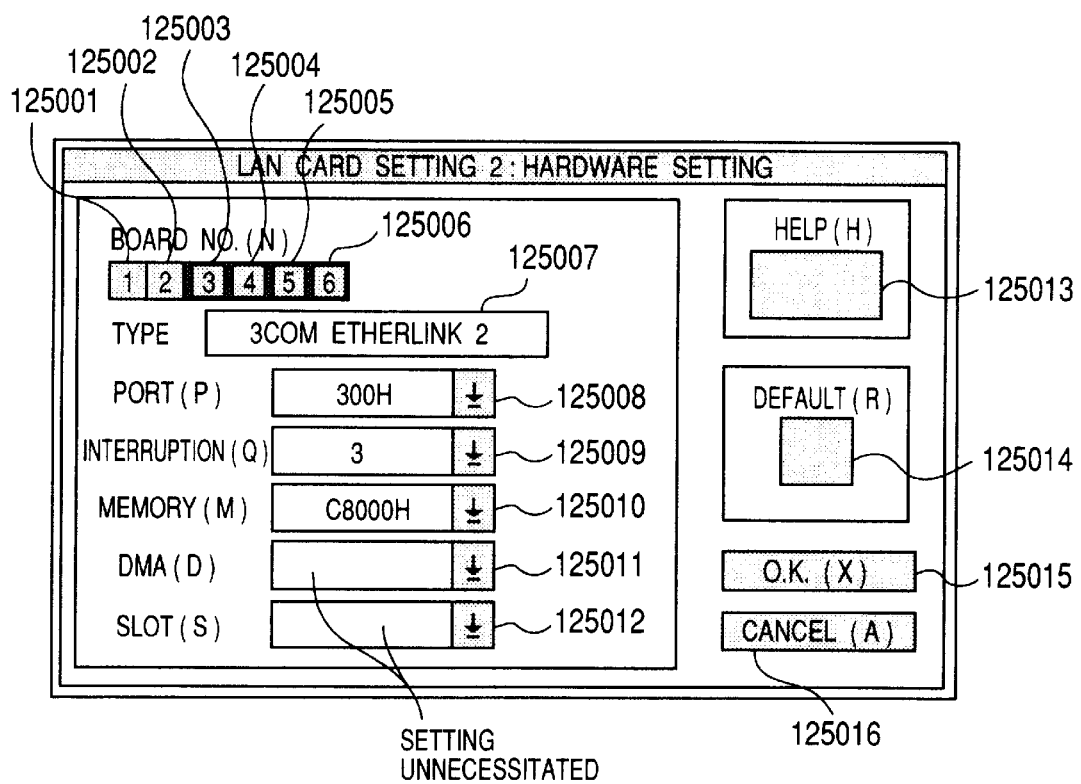
FIG. 25 is a diagram showing a window to set hardware for LAN cards.

A numeral 124012 indicates a button to call a window of FIG. 25 for protocol setting so as to set a communication protocol for the LAN card.

A numeral 124013 denotes a button to call a help system disposed according to the easy setting concepts.

A numeral 124014 designates a button to set default values prepared in accordance with the easy setting concepts. When the button is activated, the setting values of the frames 124007 to 124010 are set to parameters according to the standard machine configuration assumed. Moreover, values of lower-order parameters to be specified in the window 124011 are also set to default parameters at the same time.

A numeral 124015 stands for a button to select termination of the setting operation in the LAN card setting window. When the button is selected, while retaining the specified parameters in the memory, the system finishes the operation of the window and passes control to the menu window.

A numeral 124016 is a button to interrupt the parameter setting for LAN cards so as to return control to the menu window. When the button is effected, a window to confirm the setting interruption (FIG. 29) is displayed in the window of FIG. 24 in a pop-up manner. When an O.K. button is depressed in this window, control is returned to the menu window. When a cancel button is activated, control is transferred to the LAN card setting window.

The controls 124013 to 124016 are arranged in the same relative locations of the respective windows according to the easy setting concepts 5 and 6. Furthermore, in accordance with the easy setting concept 7, the controls are disposed along a direction from the left to the right in the windows based on the standard operation flow assumed in the development stage.

Subsequently, the following items will be described in detail by referring to FIG. 25.

1. Items to be set and selected in hardware setting windows for LAN cards in the screens of file server installer (GUI section)
2. Mode of input interface supported to set the items
3. Reasons for deciding interface modes for interface supported FIG. 25 shows a window for setting therein lower-order parameters for hardware of LAN cards in screens of the file server installer (GUI section). In this window, there is provided a function to set lower-order parameters. The window is associated with a portion of the operation flow described by reference to FIG. 15.

Six buttons 125001 to 125006 are disposed to specify a number of LAN card unit for the setting operation, which has been described in conjunction with the window 109004 of FIG. 15. The buttons are associated with parameters of the number of LAN cards set in the frame 120006. Each button is provided with a numeric character corresponding to the number of the LAN card device. When either one thereof is clicked, there is set a parameter for the LAN card unit associated with the numeric character as follows. In any situation, only one of the six buttons is in the selected state. FIG. 25 shows an example in which the value set in the window 120003 is two and hence only two buttons 125001 to 125002 are valid. Since the button 125001 indicating a value "1" is selected, the setting parameters represented by the setting controls are assumed to be related to the LAN card unit 1. As above, only the buttons corresponding to available parameters are set to be effective; consequently, there is implemented a visually facilitated operating environment.

A numeral 125007 denote a frame to present therein a type of hardware specification for the LAN card unit corresponding to the selected number in the frames 124001 to 125006. In this case, it is impossible to set or to alter the type parameter.

A numeral 125008 indicates a combo box to set a port number allocated to the LAN card unit. Only the values available for the type of LAN card presented in the frame 125007 are displayed as selection items in a list. In a case where the parameter need not be set depending on the LAN card type, a designation "Setting Unnecessitated" is presented and the box is set as an ineffective control.

A numeral 125009 indicates a combo box to set a hardware interruption number for the LAN card unit. Only the values available for the type of LAN cards presented in the frame 125007 are displayed as selection items in a list. In a case where the parameter can be dispensed with depending on the LAN card type, a designation "Setting Unnecessitated" is presented and the function of this box is nullified.

A numeral 125010 indicates a combo box to set a memory address range allocated to the LAN card unit. Only the values available for the type of LAN card presented in the frame 125007 are displayed as selection items in a list. In a case where the parameter setting can be skipped depending on the LAN card type, a designation "Setting Unnecessitated" is presented and the function of this box is nullified.

A numeral 125011 denotes a combo box to set a DMA channel number allocated to the LAN card unit. Only the values available for the type of LAN card presented in the frame 125007 are presented as selection items in a list. In a case where the parameter can be dispensed with depending on the LAN card type, a designation "Setting Unnecessitated" is presented and the function of this box is nullified. In the example of FIG. 25, the setting operation need not be conducted.

A numeral 125012 indicates a combo box to set a slot number for insertion of an LAN card of the LAN card unit. Only the values available for the type of LAN card presented in the frame 125007 are presented as selection items in a list. In a case where the parameter need not be specified depending on the LAN card type, a designation "Setting Unnecessitated" is presented and the function of this box is nullified. This is the case of the example of FIG. 25.

A numeral 125013 stands for a button to call a help system disposed according to the easy setting concepts.

A numeral 125014 denotes a button to set default values according to the easy setting concepts. When the button is clicked, the setting values in the windows 125010 to 125012 are set to default parameters associated with the LAN card type presented in the window 125009.

A numeral 125015 is a button to select termination of the operation setting in the hardware setting window for LAN cards. When the button is selected, while retaining the specified parameters in the memory, the system finishes the operation of the hardware setting window for LAN cards and then passes control to the LAN card setting window.

A numeral 125016 designates a button to interrupt the setting operation of hardware parameters for LAN card so as to return control to the LAN card setting window. When this button is activated, the window to confirm the interruption of setting (FIG. 29) is displayed in the window of FIG. 25 in a pop-up fashion. When an O.K. button is depressed in the window, control is transferred to the LAN card setting window. When a cancel button is effected, control is returned to the window for setting hardware of LAN cards.

The controls 125013 to 125016 are disposed at the same relative positions in the respective windows according to the easy setting concepts 5 and 6. Moreover, in accordance with the concept 7, the controls are arranged along a direction from the left to the right in the windows based on the standard operation flow assumed in the system developing stage.

Figure 26:
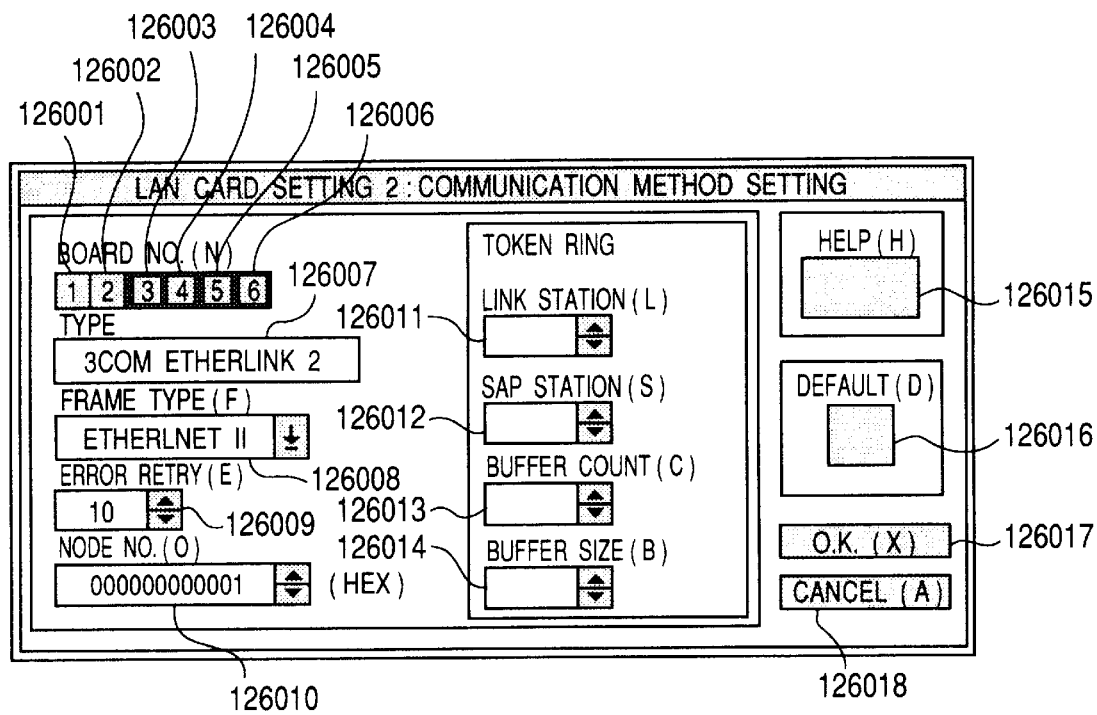
FIG. 26 is a diagram showing a window to set protocol for LAN cards.

Next, the following items will be described in detail by reference to FIG. 26.
1. Items to be set and selected in windows to set protocol for LAN cards in screens of file server installer (GUI section)
2. Mode of input interface supported to set the items
3. Reasons for deciding interface modes for interface supported FIG. 26 shows a window for setting therein lower-order parameters of protocol for LAN cards in screens of the file server installer (GUI section). In this window, there are provided functions to set lower-order parameters. The window is associated with a portion of the operation flow described by reference to FIGS. 17 and 18.

Six buttons 126001 to 126006 are disposed to specify a number assigned to the LAN card unit for the setting operation, which has been described in conjunction with the window 111004 of FIG. 17. The buttons are associated with parameters of the number of LAN cards set in the frame 120006. Each button is provided with a numeric character corresponding to the number assigned to the LAN card device. When either one thereof is clicked, there is set a parameter for the LAN card unit associated with the numeric character as follows. In any situation, only one of the six buttons is in the selected state. FIG. 26 shows an example in which the value set in the window 120003 is two and hence only two buttons 126001 to 126002 are valid. Since the button 126001 indicating a value "1" is selected, the setting parameters represented by the setting controls are assumed to be related to the LAN card unit 1. As above, only the buttons corresponding to available parameters are set to be effective; consequently, there is implemented a visually facilitated operating environment.

A numeral 126007 denotes a box to present therein a type of hardware specification for the LAN card unit corresponding to the number indicated by one of the buttons 126001 to 126006. In this case, it is impossible to set or to alter the type parameter.

A numeral 126008 indicates a combo box to set a form of packet header employed by the LAN card unit for packet communications. Only the values available for the type of LAN card presented in the frame 126007 are displayed as selection items in a list.

A numeral 126009 designates a combo box with add and subtract buttons to specify the number of re-transmission processes to be achieved by the LAN card unit when a packet communication error occurs. The user may set a hexadecimal value ranging from 00 to FF. In a case where the parameter can be dispensed with depending on the LAN card type, a designation "Setting Unnecessitated" is presented and the function of this box is nullified.

A numeral 126010 indicates a combo box with add and subtract buttons to specify, when the LAN card is connected to a network and has an identical network number, a network node address for specifying a network node to which the LAN card unit is connected. The user may set a value represented by 12 hexadecimal characters. In a case where the parameter setting need not be specified depending on the LAN card type, a designation "Setting Unnecessitated" is presented and the function of this box is nullified.

A numeral 126011 denotes a combo box with add and subtract buttons to set a link station address when the LAN card unit is connected to a token ring. The user may set a hexadecimal value ranging from 00 to FF. In a case where the parameter can be dispensed with depending on the LAN card type, a designation "Setting Unnecessitated" is presented and the function of this box is nullified. In the example of FIG. 26, the setting operation need not be conducted.

A numeral 126012 indicates a combo box with add and subtract buttons to set an address of a service access point (SAP) station when the LAN card unit is connected to a token ring. The user may set a hexadecimal value ranging from 00 to FF. In a case where the parameter need not be specified depending on the LAN card type, a designation "Setting Unnecessitated" is presented and the function of this box is nullified. This is the case of the example of FIG. 26.

A numeral 126013 designates a combo box with add and subtract buttons to set a buffer count for packet communications when the LAN card unit is connected to a token ring. The user may set a value ranging from 00 to 02. In a case where the parameter need not be specified depending on the LAN card type, a designation "Setting Unnecessitated" is presented and the function of this box is invalidated. FIG. 26 shows an example of this case.

A numeral 126014 indicates a combo box with add and subtract buttons to set a buffer size for packet communications when the LAN card unit is connected to a token ring. The user may set a hexadecimal value ranging from 0060 to FFFF. In a case where the parameter need not be specified depending on the LAN card type, a designation "Setting Unnecessitated" is presented and the function of this box is invalidated. FIG. 26 shows an example of this case.

A numeral 126015 stands for a button to call a help system disposed according to the easy setting concepts.

A numeral 126016 denotes a button to set default values according to the easy setting concepts. When the button is clicked, the setting values of the windows 126008 to 126014 are set to default parameters associated with the LAN card type presented in the window 125009.

A numeral 126017 is a button to select termination of the operation setting in the protocol setting window for LAN cards. When the button is selected, while retaining the specified parameters in the memory, the system finishes the operation of the pertinent window for LAN cards and then passes control to the LAN card setting window.

A numeral 126018 designates a button to interrupt the parameter setting operation for the protocol of the LAN card so as to return control to the LAN card setting window. When this button is activated, the window to confirm the interruption of setting (FIG. 29) is displayed in the window of FIG. 26 in a pop-up fashion. When an O.K. button is depressed in the window, control is transferred to the LAN card setting window. When a cancel button is effected, control is returned to the protocol setting window for LAN cards.

The controls 126015 to 126018 are disposed at the same relative positions in the respective windows according to the easy setting concepts 5 and 6. Moreover, in accordance with the concept 7, the controls are arranged along a direction from the left to the right in the windows based on the standard operation flow assumed in the system developing stage.

Next, the following items will be described in detail by reference to FIG. 27.
1. Items to be set and selected in system setting windows of screens of file server installer (GUI section)
2. Mode of input interface supported to set the items
3. Reasons for deciding interface modes for interface supported FIG. 27 shows a window for setting therein parameters related to a network system in screens of the file server installer (GUI section). The window is associated with a portion of the operation flow described by reference to FIG. 19.

A numeral 127001 designates a box to set a file server name for identifying a file server in the network system. The user may set the name with up to 47 alphanumeric characters from the keyboard. When this window is first presented, there is displayed a file server name as a default item. The window is initiated in the waiting state to await a name inputted from the user.

A numeral 127002 indicates a box with add and subtract buttons to set as a network number in IPX a network number allocated to the file server. The user may set this value with eight characters in hexadecimal notation. The initial value is 80000001 not to be conflict with the network number in a frame 127003.

A numeral 127003 indicates a box with add and subtract buttons to set a network number for the connection of the file server. The user may set this value with eight characters in hexadecimal notation. The initial value is 00000001 not to be conflict with the network number in IPX in the frame 127002.

A numeral 127004 stands for a button to call a help system disposed according to the easy setting concepts.

A numeral 127005 denotes a button to set default values according to the easy setting concepts. When the button is clicked, setting values of the windows 127001 to 127003 are set to default parameters.

A numeral 127006 is a button to select termination of the operation setting in the system setting window. When the button is selected, while retaining the specified parameters in the memory, the system finishes the operation of the system setting window to return control to the menu window of FIG. 21.

A numeral 127007 designates a button to interrupt the system parameter setting so as to return control to the menu window. When this button is activated, the window to confirm the interruption of setting (FIG. 29) is displayed in the window of FIG. 27 in a pop-up fashion. When an O.K. button is depressed in the window, control is transferred to the system setting window. When a cancel button is effected, control is returned to the menu window of FIG. 21.

The controls 127004 to 127007 are disposed at the same relative positions in the respective windows according to the easy setting concepts 5 and 6. Moreover, in accordance with the concept 7, the controls are arranged along a direction from the left to the right in the windows based on the standard operation flow assumed in the system developing stage.

Figure 28:
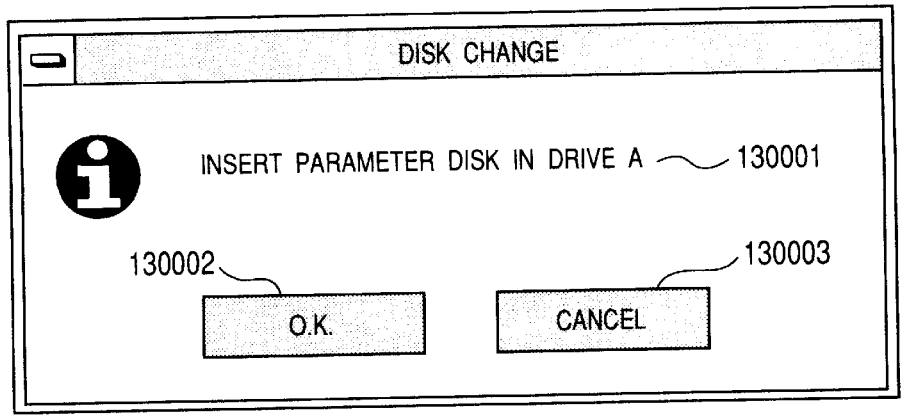
FIG. 28 is a diagram showing a disk change confirmation window.

Referring next to FIG. 28, the following item will be described in detail.
1. Confirmation window to request change of parameter disk FIG. 28 shows a window presented in the following situation. When the file server installer (GUI section) attempts to access a parameter file, a floppy disk (to be called a parameter disk herebelow) dedicatedly used to store parameters therein is missing in a floppy disk driving device (to be called a disk drive herebelow) and hence a request is issued to the user to install a parameter disk in the disk drive.

This window achieves the same operation not only for the file server installer (GUI section) but also for the client installer (GUI section) and the print server installer (GUI section). Moreover, the same messages are displayed in the respective operations. The window is presented in either one of the following cases.

Figure 66:
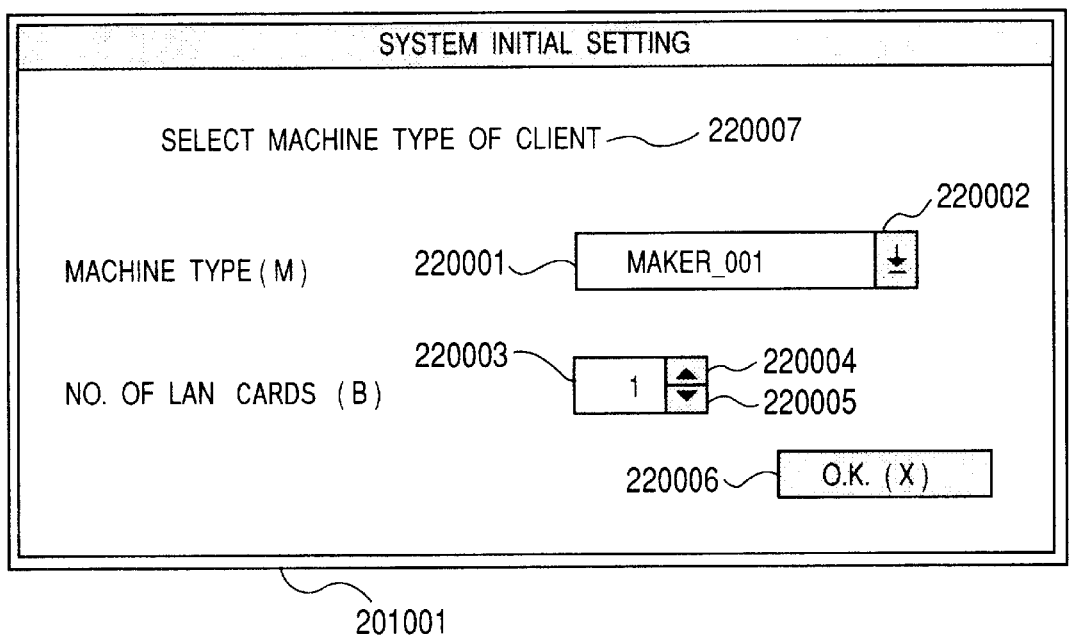
FIG. 66 is a diagram showing an initial setting window.

1. File server installer (GUI section): When the initial setting window of FIG. 20 is desired to be changed to the menu window of FIG. 21, the parameter disk is missing in the disk drive.
2. Client installer (GUI section): When an initial setting window of FIG. 66 is desired to be changed to a menu window of FIG. 67, the parameter disk is missing in the disk drive.
3. Print server installer (GUI section): The parameter disk is missing in the disk drive when a program is desired to be initiated.
4. When a selection is made from a menu window of one of the installers to read setting values, the parameter disk is missing in the disk drive.
5. In a menu window of one of the installers, termination of a setting operation is selected and then a parameter write operation is instructed. In this situation, however, the parameter disk is missing in the disk drive.
6. When there occurs a case where the user is required to install the parameter disk in the disk drive.

Figure 29:
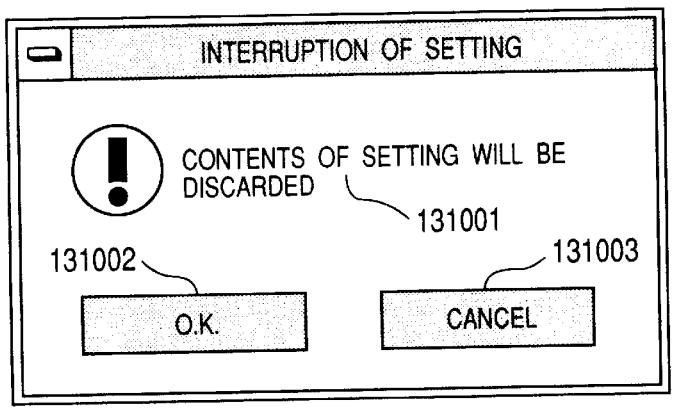
FIG. 29 is a diagram showing a setting interruption window.

Next, the following items will be described in detail by reference to FIG. 29.
1. Layout of window for confirming setting interruption displayed when the setting interruption is selected
2. Improvement of operability for user according to design of display timing of the window FIG. 29 shows a window displayed to confirm a setting interruption in response to depression of a setting interruption button disposed in each window of FIGS. 21 to 27.

A numeral 131001 denotes a message to notify that the contents thus set are entirely invalidated by the setting interruption. A numeral 131002 indicates a button for the user to select continuation of processing, namely, to achieve the setting interruption. A numeral 131003 is a button to cancel the selection of setting interruption to restore the screen to the state before the selection of setting interruption.

When the processing to interrupt the setting operation is selected, the confirmation window is presented so as to prevent the results of parameter setting operation achieved by the user from being cleared by a wrong selection of the setting interruption.

To prevent the wrong operations caused by mistakes of the user, it is effective to dispose two kinds of confirmation window levels. In the first level, there is notified a warning to an operation error of the user, namely, an operation beyond limitation of specifications. This applies, for example, to a case where data is attempted to be saved onto a parameter disk without installing the parameter disk in the disk drive. In the second level, there is presented a warning associated with an operation as follows. For example, even when the operation conforms to the specification, if the result of processing makes it difficult to restore the original state, a second-level warning is issued. This is the case, for example, of the confirmation of the setting interruption processing of FIG. 29. In this case, a plurality of parameters are cleared and information thereof is lost. If the state before the clear operation is desired to be restored, the user is required to conduct again the operation once achieved prior to the clear operation. As above, for an operation causing a result which makes it impossible to automatically restore the original state, there is efficiently disposed a warning window like the window to confirm the setting interruption.

Figure 30:
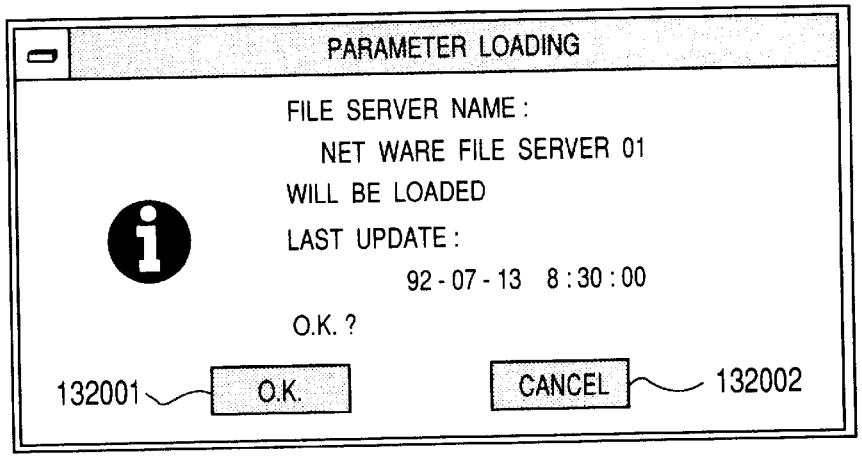
FIG. 30 is a diagram showing a parameter load window.

Subsequently, the following items will be described in detail by reference to FIG. 30.
1. Method of reading file to attain a set of parameters specified in windows shown in FIGS. 20 to 27
2. Details of confirmation window appearing in parameter reading operation
3. Improvement of operability for user according to design of timing of appearance of window FIG. 30 is a window disposed to confirm a parameter reading operation when a set of parameters are specified according to a file server name in the value reading combo box 121008 of FIG. 21.

A reference numeral 132001 denotes a button to instruct a parameter reading operation and a setting operation associated with controls of the respective setting windows.

A numeral 132002 indicates a button to instruct an interruption of the parameter reading and a return to the menu window of FIG. 21.

A numeral 132003 is a message including a file server name specified in the frame 121008 requesting the user to confirm whether or not the user selection is correct.

A numeral 132004 is a message including a date and time of the last update of parameters associated with the file server name specified in the frame 121008 so as to request the user to confirm whether or not the user selection is appropriate.

Description will next be given of an outline of the operation flow of the parameter reading operation.

For a parameter specified by the user, the floppy disk exclusively storing therein parameters is accessed such that a retrieval is achieved through an index information file, which will be described later, according to a file server name to obtain a file name of the pertinent MS-DOS control, thereby opening and loading the file. In this operation, the format of the parameter file is converted into an internal expression of programs of the file server installer (GUI section). Thanks to the conversion, continuity and easy maintenance of the parameter file are guaranteed.

In this connection, also for the client and print server installers, when the operation to read setting values is conducted in the menu window, there appears a window for confirming the parameter reading operation, which is similar to the window of FIG. 30, so that the user confirms specified parameters.

Figure 31:
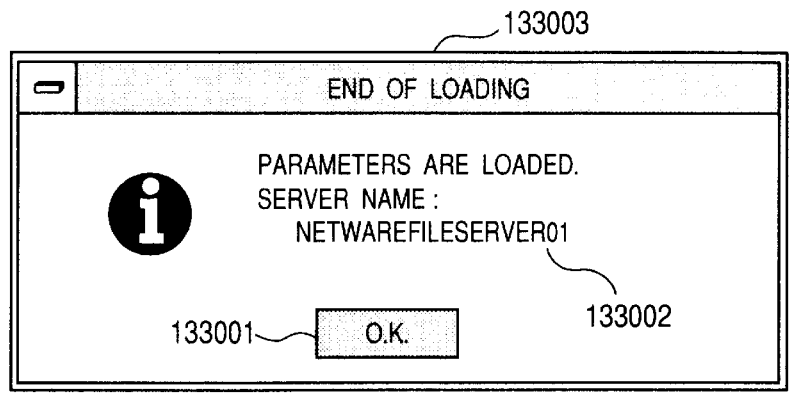
FIG. 31 is a diagram showing a load termination window.

Details of the following items will now be described by reference to FIG. 31.
1. Details of a confirmation window presented in parameter reading operation
2. Improvement of operability for user according to design of timing of appearance of windows FIG. 31 is a window displayed when the parameter reading operation instructed in FIG. 30 is correctly finished.

A numeral 133001 stands for a button to notify the program that the user has confirmed a message denoting the termination of parameter reading.

A numeral 133002 is a message to present a file server name indicating a parameter obtained.

A numeral 133003 designates a window to confirm the end of loading operation.

Figure 32:
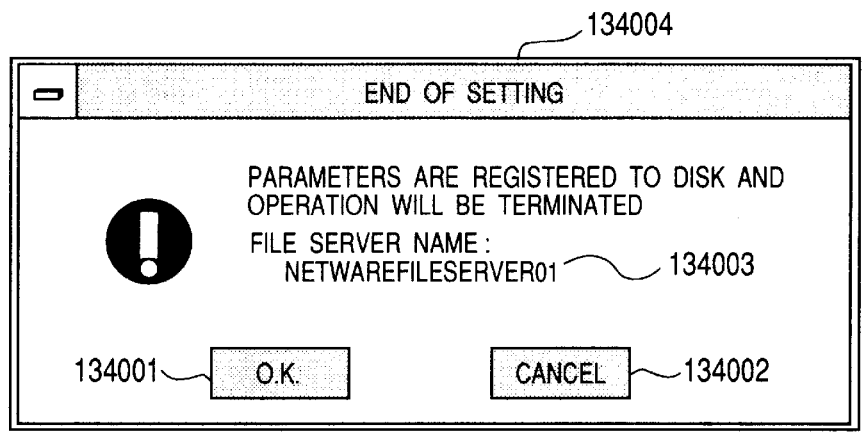
FIG. 32 is a diagram showing a setting termination window.

Next, referring to FIG. 32, description will be given of the following items in detail.
1. Details of confirmation window presented in parameter registering operation when menu window operation is terminated
2. Improvement of operability for user according to design of timing when the window appears FIG. 32 is a window displayed when the parameter registration is specified after the setting end is selected in the menu window of FIG. 21.

A numeral 134001 stands for a button to notify the parameter registration.

A numeral 134002 is a message to cancel the instruction of parameter registration and to pass control to the menu window of FIG. 21.

A numeral 134003 designates a window to display a file server name related to the parameters to be registered so as to confirm that the correct parameters are registered.

A numeral 134004 denotes a window to confirm the setting end operation.

Figure 33:
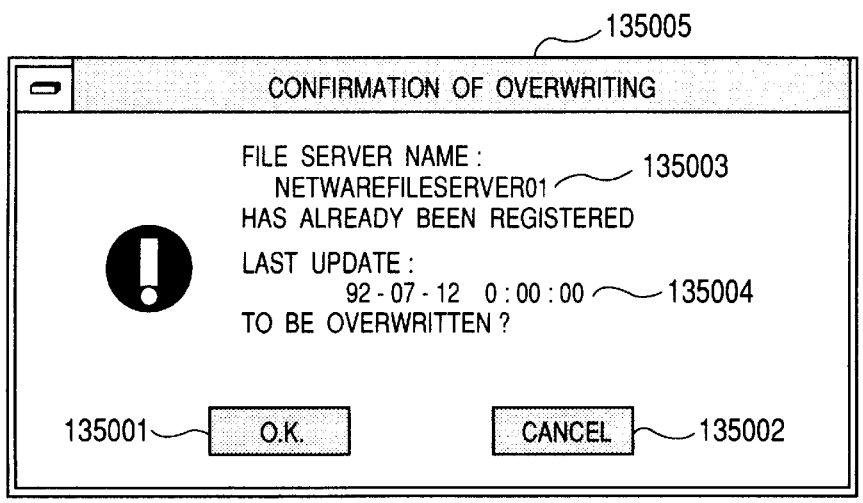
FIG. 33 is a diagram showing an overwrite confirmation window.

Subsequently, the following items will be described in detail by reference to FIG. 33.

1. Method of writing in file a set of parameters specified in windows shown in FIGS. 20 to 27
2. Details of confirmation window appearing in parameter writing operation
3. Improvement of operability for user according to design of timing of window display FIG. 33 is a window disposed for the user to confirm a parameter writing operation. This window is presented when the setting end button is selected in the frame 121011 of FIG. 21. Namely, during a registration and/or a write operation onto a parameter file before the end of operation of the window of FIG. 21, if there exists a parameter having the same file server name, the window is displayed for the user to confirm an overwriting operation in the file.

A reference numeral 135001 denotes a button to replace the contents of parameters set in the controls of the associated setting windows with the contents of existing files.

A numeral 135002 indicates a button to cancel the write operation of the parameter onto the existing file and to return control to the menu window of FIG. 21.

A numeral 135003 is a message presenting a file server name to be registered as a parameter in the file so as to request the user to confirm whether or not the user selection is correct.

A numeral 135004 is a message notifying a date and time of the last update of existing parameters associated with the specified file server name specified in the frame 121008 so as to request the user to confirm whether or not the user selection is correct.

Figure 34:
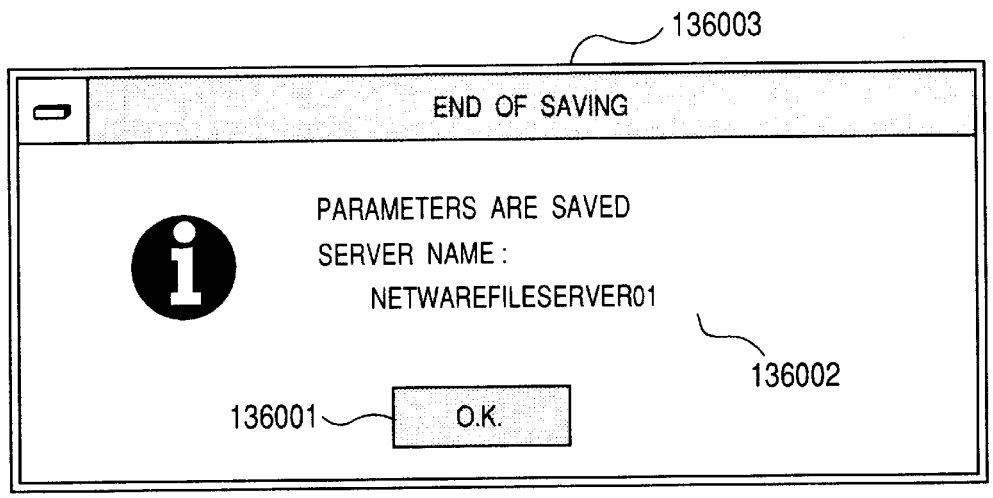
FIG. 34 is a diagram showing a save termination window.

Next, the following items will be described in detail by reference to FIG. 34.

1. Details of confirmation window appearing at end of parameter write operation
2. Improvement of operability for user according to design of timing of window display FIG. 34 is a window appearing when a parameter write operation instructed in the window of FIG. 32 or 33 is normally terminated.

A reference numeral 136001 denotes a button to notify that the user has confirmed the message indicating the termination of parameter write operation. When this button is depressed, control is returned to the menu window of FIG. 21 and then the program execution is finished.

A numeral 136002 indicates a message presenting a file server name designating the parameter thus written.

A numeral 136003 designates a window to confirm the end of saving operation.

Description will now be given of a GUI program file server installer.

Figure 35:
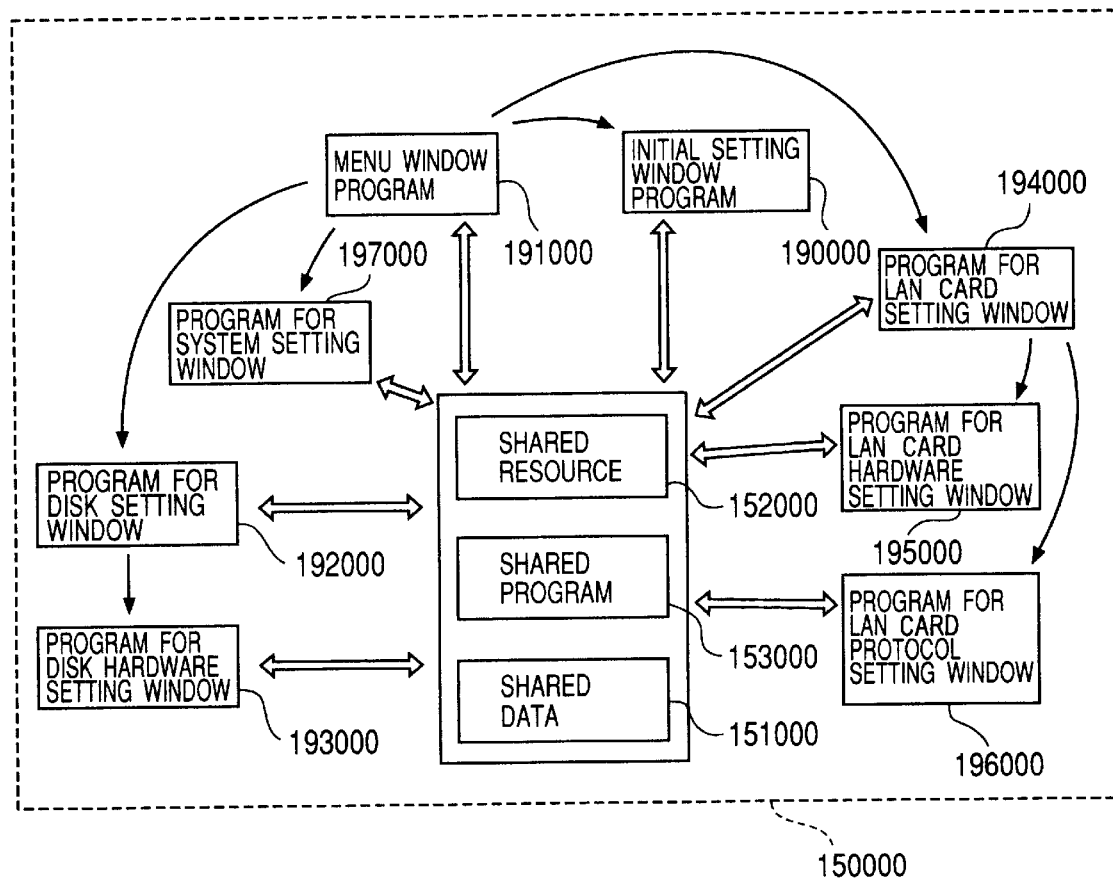
FIG. 35 is a diagram showing in blocks the steps of file server GUI program.

As shown in FIG. 35, this program 15000 includes a menu window program 191000, an initial setting window program 190000, a disk setting window program 192000, a disk hardware setting window program 193000, an LAN card setting window program 194000, and a program for LAN card hardware setting window 195000, a program of window for setting LAN card protocol 196000, a system setting window program 197000, a shared resource 152000, a shared program 153000, and shared data 151000.

In FIG. 35, eight programs shown in an outer area respectively correspond to windows of GUI screens according to a one-to-one correspondence. Namely, the menu window program 191000 corresponds to the menu window (FIG. 21), the initial setting window program 190000 to the initial setting window (FIG. 20), the disk setting window program 192000 to the disk setting window (FIG. 22), the program 193000 to the disk hardware setting window (FIG. 23), the program 194000 to the LAN card setting window (FIG. 24), the program 195000 to the LAN card hardware setting window (FIG. 25), the program 196000 to the protocol setting window (FIG. 26), and the system setting window program 197000 to the system setting window (FIG. 27).

Call operations between the respective blocks will now be described. In FIG. 35, a line with an arrowhead denotes a call operation. From the program 191000, there are called the programs 192000, 190000, 194000, and 197000. Moreover, from the program 192000, there is called the program 193000. The programs 195000 and 196000 are called from the program 194000.

In this connection, the shared resource 152000, the shared program 153000, and the shared data 151000 are commonly used by the other programs related to windows such as the programs 191000, 190000, 192000, 193000, 194000, 195000, 196000, and 197000.

Next, each block above will be described.

Figure 36:
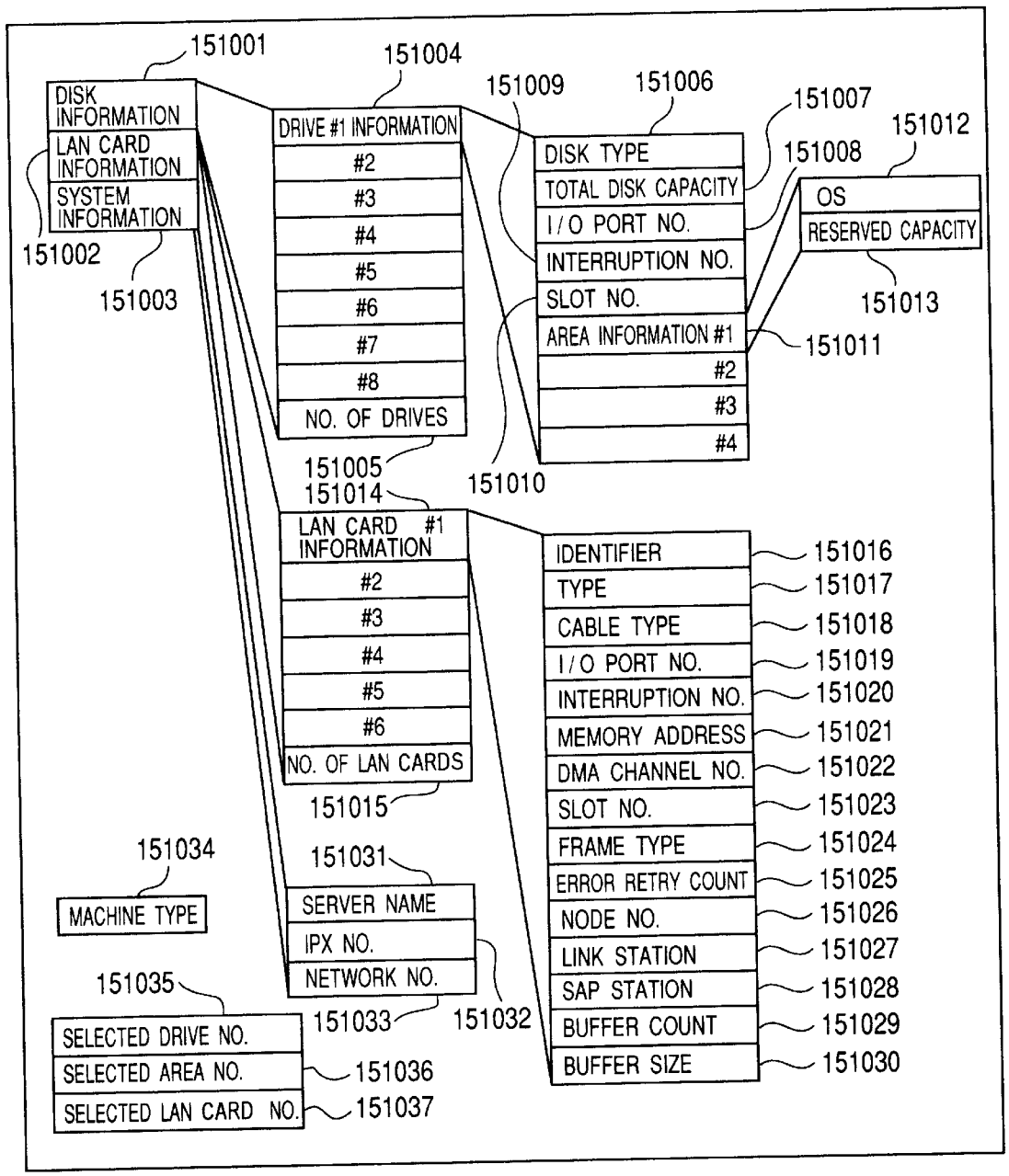
FIG. 36 is a diagram showing common data of the file server GUI program.

FIG. 36 shows the contents of the shared data 151000. The data 151000 is subdivided into seven large data groups, namely, disk information 151001, LAN card information 151002, system information 151003, a machine type 151034, a drive number being selected 151035, an area number being selected 151036, and an LAN card number being selected 151037.

The disk information 151001 is constituted with setting items for disks, namely, drive information 151004 (#1 to #8) and a number of drives 151005. The drive information 151004 includes a disk type 151006, a total disk capacity 151007, an I/O port number 151008, an interruption number 151009, a slot number 151010, and area information 151011 (#1 to #4). The area information 151011 includes an operating system (OS) 151012 and a reserved capacity 151013.

The LAN card information 151002 is formed of setting items for LAN cards, namely, LAN card information 151014 (#1 to #6) and a number of LAN cards 151015. The card information 151014 includes an identifier 151016, a type 151017, a cable type 151018, and I/O port number 151019, an interruption number 151020, a memory address 151021, a DMA channel number 151022, a slot number 151023, a frame type 151024, an error retry count 151025, a node number 151026, a link station 151027, an SAP station 151028, a buffer count 151029, and a buffer size 151030.

The system information includes such system setting items as a server name 151031, an IPX number 151032, and a network number 151033.

Figure 37:
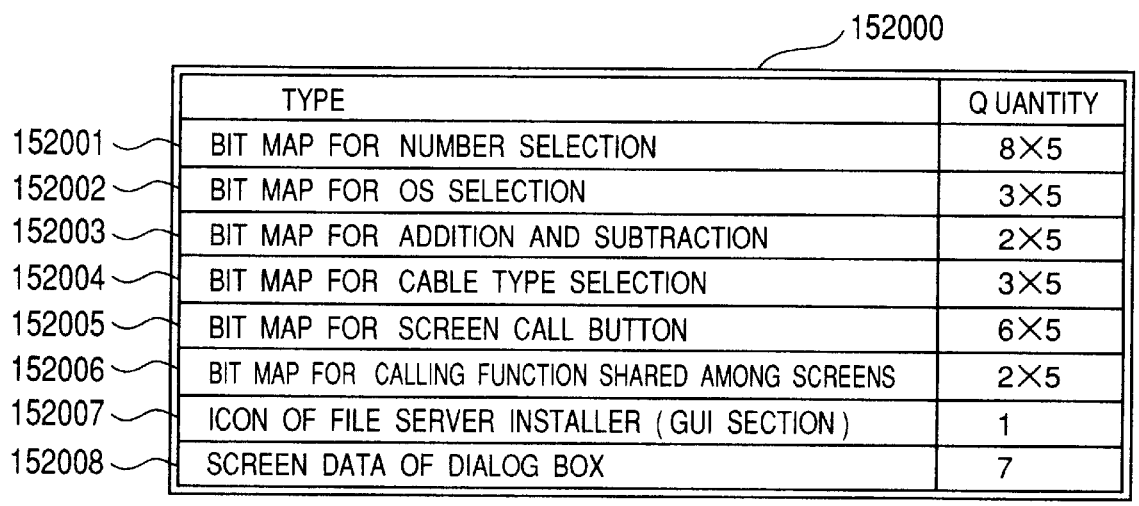
FIG. 37 is a diagram showing common resources of the file server GUI program.

Next, the shared resource 152000 will be described. The resource 152000 is formed with such items to be used by the programs as bit maps, icons, dialog box screen data. FIG. 37 is a list of shared resources necessary to implement the file server GUI. A bit map for number selection button 152001 is a picture fixed onto a button to select one of the numbers associated therewith. For example, the map 152001 is used in the buttons 122001 to 122008 of FIG. 22. For the buttons, there exist five states, for example, the presence or absence of input focus (reference is to be made to the description of the bit maps for buttons). Consequently, five bit maps are created for eight groups (related to numeric characters 1 to 8), namely, there are prepared 40 bit maps. Incidentally, in this description, the respective bit maps will be described as separate resources; however, a plurality of bit maps may be grouped in a set such that a desired portion is separated therefrom when necessary. This minimizes the number of the constituent elements of the resource and hence the number of attribute items inherent to the resource is reduced, thereby improving the memory use efficiency.

The bit map for the OS selection button is configured in the same fashion as for the bit map of the number selection button. According to the bit map, a button is used to select one of a plurality of operating systems. This is implemented as Netware 122016 and DOS 122017 of FIG. 22. Like the example above, ten bit maps are necessary for two sets.

The bit map for the add and subtract buttons 152003 is also constituted in the similar fashion. For example, there is required bit maps for two kinds of upward and downward triangle marks (12004 and 12005) to set the number of disks in FIG. 20. Namely, ten bit maps are required for two sets.

The bit map for the cable type selection button 152004 is implemented in the similar manner and is used for BNC 124009 and DIX 124010 of FIG. 24. This is also the case of the bit maps 152005 and 152006.

The icon 152007 of the GUI section of file server installer is image data to be displayed, for example, when a program is minimized during execution thereof. The dialog box screen data 152008 is a resource defining the screen configurations respectively of the programs 190000, 192000, 193000, 194000, 195000, 196000, and 197000. The data 152008 is used when the associated window is opened.

Figure 38:
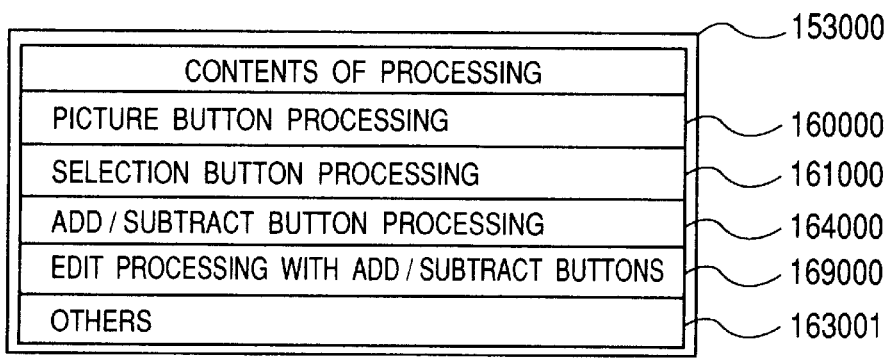
FIG. 38 is a diagram showing common programs of the file server and client GUIs.

Next, the shared or common program will be described. FIG. 38 shows the contents of the shared program for the file server/client GUI. Five kinds of processing programs will be described in this order.

Picture button processing 160000 denotes a program to process a push button on which a bit map (picture) is fixed. The processing is employed, for example, for the disk button 121001 of FIG. 21.

Selection button processing 161000 indicates a program to process a button used to select one of a plurality of selection items. The selection processing is adopted, for example, for disk number buttons 122001 to 122008 of FIG. 22.

Add/subtract button processing 164000 designates a program to add or to subtract a value in an edit field when the add or subtract button is depressed. This button processing is used, for example, for the add button 120004 and the subtract button 120005 for respectively incrementing and decrementing the number of disks in FIG. 20.

Edit processing with add/subtract buttons 169000 denotes a program to process an edit field with the add and subtract buttons disposed on a side thereof. This processing applies to the frame 120003 of FIG. 20.

Others 163001 stands for a program other than the four programs above and is shared among the respective windows. This program includes, for example, a program to convert data and a program to initialize the shared data 151000.

Next, the contents of the programs constituting the common program 153000 will be sequentially described.

Figure 39:
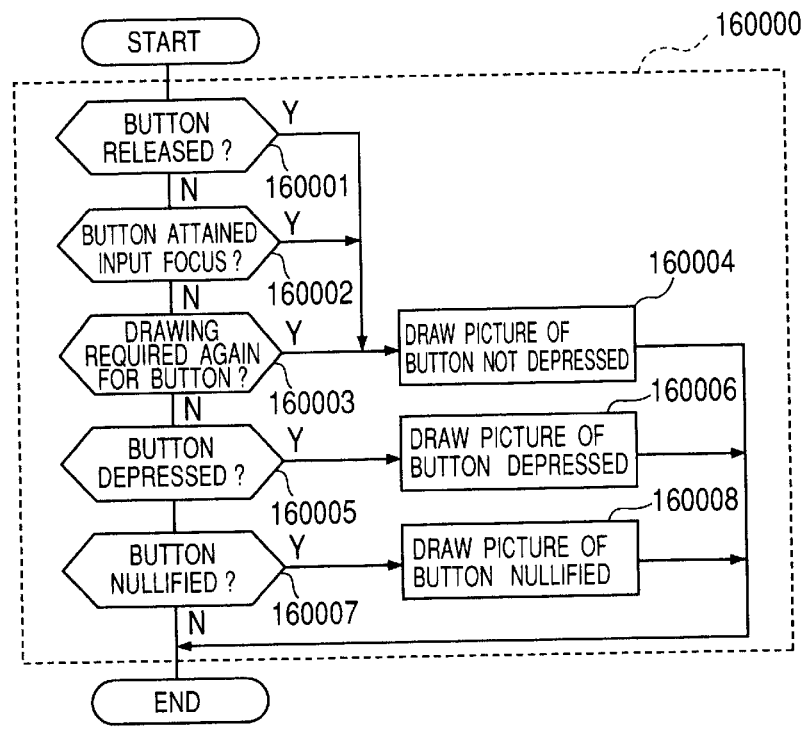
FIG. 39 is a diagram showing the processing of a button with picture.

FIG. 39 shows a flowchart 160000 of the picture button processing.

This processing is executed in response to an occurrence of an event for the picture button. First, a check is made to determine whether or not the contents of the event indicate "the button is released" (step 160001). If this is the case, a picture of a button not depressed is drawn (step 160004), thereby terminating the processing. Otherwise, whether or not the event is "the button obtained an input focus" is determined (step 160004). If this is the case, a picture of a button not depressed is drawn (step 160004), thereby terminating the processing. Otherwise, a check is conducted to decide whether or not the event is "re-drawing is required for the button" is determined (step 160003). If this is the case, a picture of a button not depressed is drawn (step 160004), thereby terminating the processing. Otherwise, whether or not the event is "the button is depressed" is determined (step 160005). If this is the case, a picture of the depressed button is drawn (step 160006) so as to terminate the processing. Otherwise, whether or not the event is "the button is nullified" is determined (step 160007). If this is the case, a picture of the nullified button is drawn (step 160008), thereby terminating the processing. Otherwise, the processing is terminated without achieving any operation.

Figure 40:
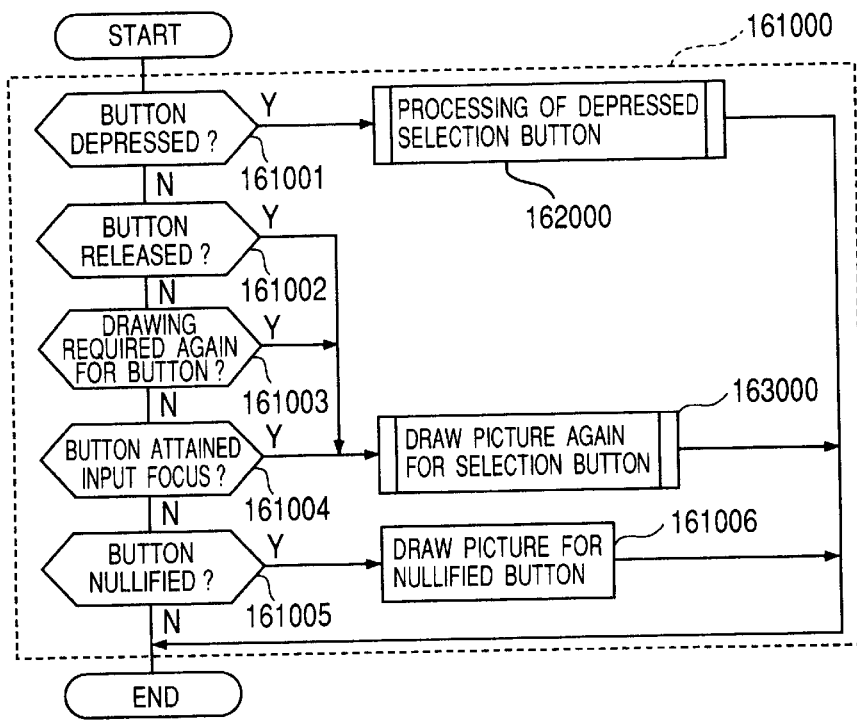
FIG. 40 is a diagram showing the processing of a button with selection button.

FIG. 40 shows the selection button processing 161000, which is executed at an occurrence of an event related to the selection button. First, a check is made to decide whether or not the contents of the event indicate "the button is depressed" (step 161000). If this is the case, processing of selection button depression 162000 is executed and then the processing is terminated. If the event is "the button is released", "re-drawing is necessary for the button", or "the button obtained an input focus", the processing of re-drawing selection button 163000 is executed and then the processing is terminated. If the event is "the button is nullified", a picture of the nullified button is drawn, and then the processing is terminated. Otherwise, the processing is terminated without achieving any operation.

Figure 41:
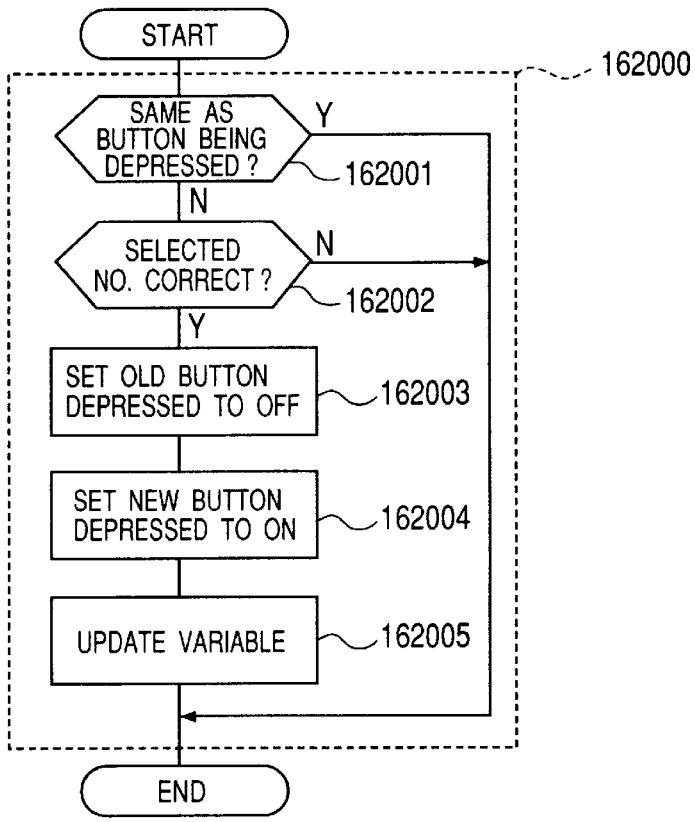
FIG. 41 is a diagram showing the processing of depression of the selection button.

FIG. 41 shows the processing of selection button depression 162000, which is executed at an occurrence of an event for each button constituting the selection button. The contents of processing are as follows. A check is made to decide whether or not a button has already been depressed (step 162001). If this is the case, the processing is terminated without achieving any operation. Otherwise, whether or not the selected number is in an appropriate range is determined (step 162000). If the number is beyond the range, the processing is terminated without achieving any operation. Otherwise, the display of the button kept depressed so far is set to the "released state" and then the display of the new button depressed is set to the "depressed state". A variable associated therewith is then updated, thereby terminating the processing.

Figure 42:
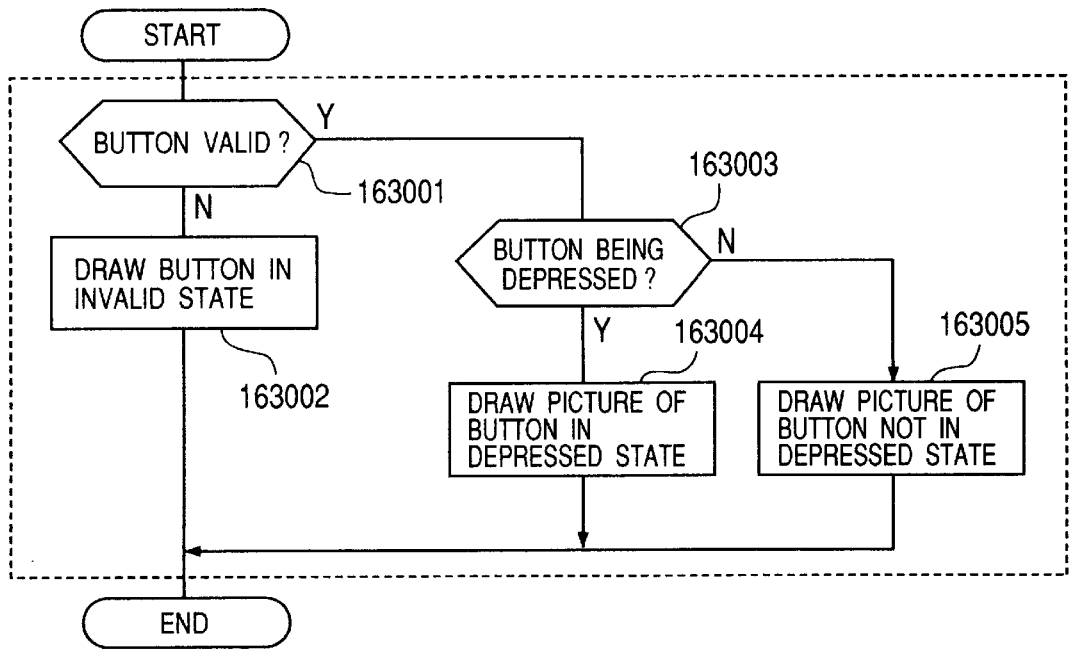
FIG. 42 is a diagram showing the processing of re-drawing of the selection button.

FIG. 42 shows a flowchart of the processing of selection button re-drawing 163000. First, a check is made to decide whether or not the button is valid (step 163001). If the button is invalid, a picture of the invalid button is drawn, thereby terminating the processing. Otherwise, whether or not the button is selected is determined (step 163003). If this is the case, a picture of the depressed button is drawn; otherwise, a picture of the released button is drawn.

Figure 43:
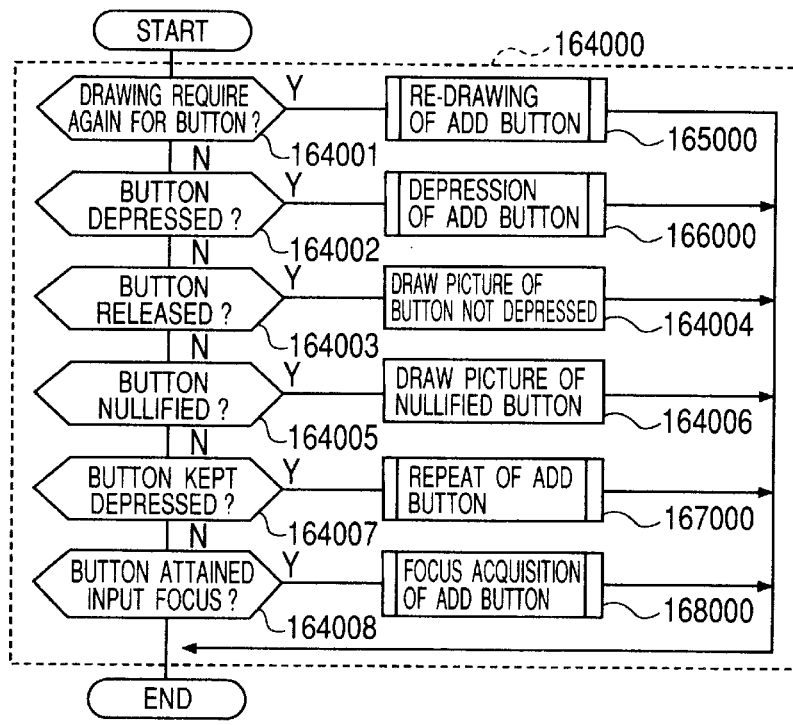
FIG. 43 is a diagram showing the processing of an add button.

FIG. 43 shows a flowchart of the add button processing 164000, which is executed at an occurrence of an event related to the add button. Events of the subtract button are also treated in a similar manner. The contents of processing are as follows. First, a check is made to determine whether or not the event is "re-drawing for the button" (step 1640001). If this is the case, the processing of re-drawing add button 165000 is executed and then the processing is terminated. Otherwise, whether or not the event is "the button is depressed" is decided (step 164002). If this is the case, the processing of add button depression 166000 is executed and then the processing is terminated. Otherwise, whether or not the event is "the button is released" is decided (step 164003). If this is the case, a picture of the released button is drawn, thereby terminating the processing.

Otherwise, whether or not the event is "the button is nullified" is determined (step 164005). If this is the case, a picture of the nullified button is drawn, thereby terminating the processing. Otherwise, whether or not the event is "the button is kept depressed" is determined (step 164007). If this is the case, an add button repeat processing 167000 is executed and then the processing is terminated. Otherwise, whether or not the event is "the button attained an input focus" is determined (step 164008). If this is the case, processing for add button focus acquisition 168000 is executed and then the processing is terminated. Otherwise, the processing is terminated without achieving any operation.

Figure 44:
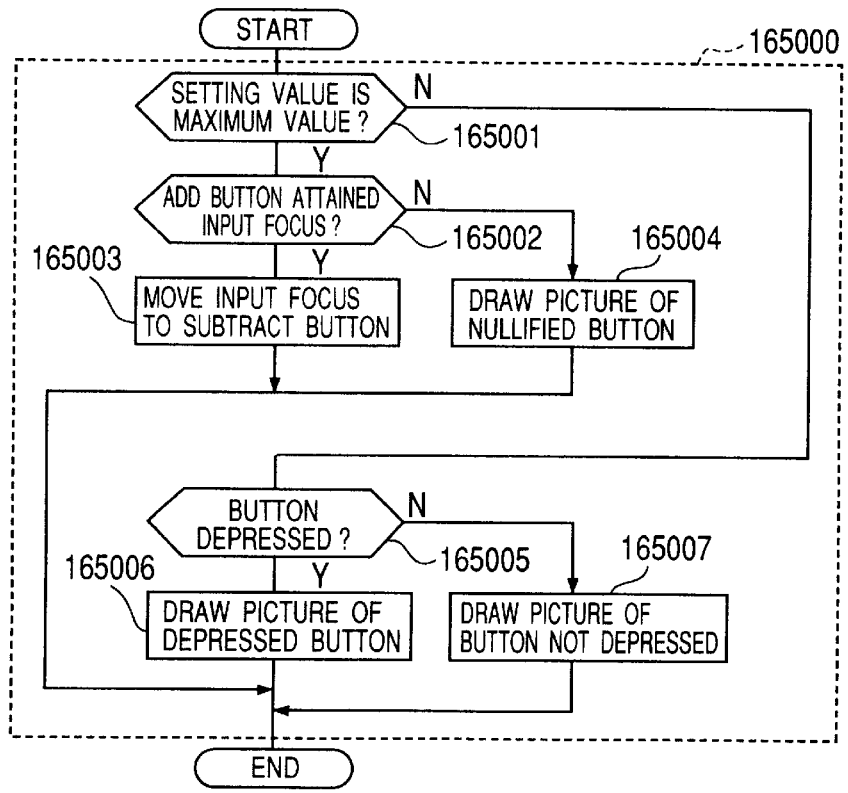
FIG. 44 is a diagram showing the processing of re-drawing of the add button.

FIG. 44 shows the processing for add button re-drawing 165000. First, a check is made to decide whether or not the setting value is the maximum value (step 165001). If this is the case, it is determined whether or not the add button obtained the input focus (step 165002). If this is the case, the input focus is moved to the subtract button (step 165003) and then the processing is terminated. Otherwise, a picture of the nullified button is drawn (step 165004) and then the processing is terminated. If the setting value is other than the maximum value, whether or not the button is depressed is determined (step 165005). If this is the case, a picture of the depressed button is drawn (step 165006) and then the processing is terminated. Otherwise, a picture of the button not depressed is drawn (step 165007) and then the processing is terminated.

Figure 45:
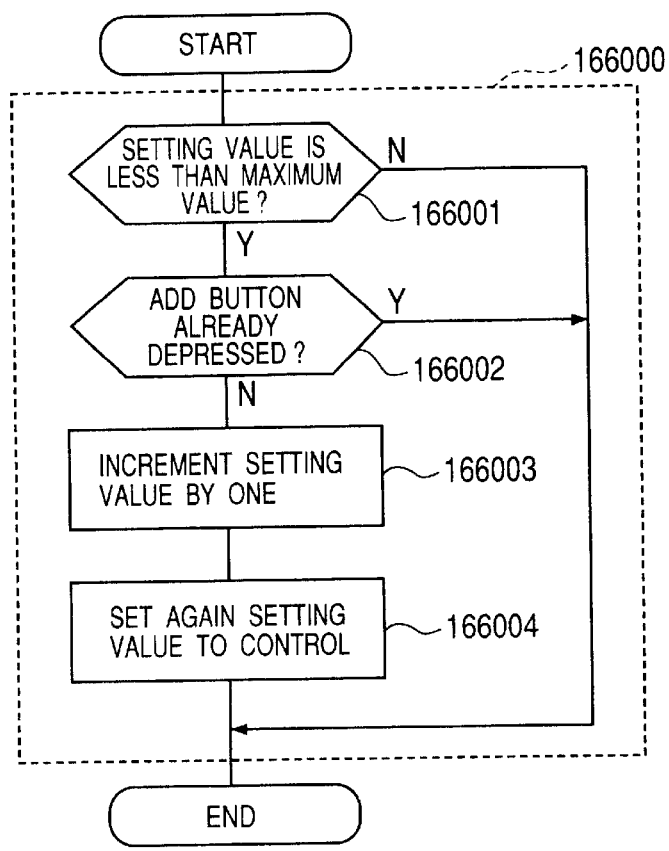
FIG. 45 is a diagram showing the processing of depression of the add button.

FIG. 45 shows the processing of add button depression 166000. First, whether or not the setting value is less than the maximum value is determined (step 166001). If the setting value is equal to or more than the maximum value, the addition is unnecessary and hence the processing is terminated without conducting any operation. Otherwise, whether or not the add button has already been depressed is judged (step 166002). If the button has not been depressed, the setting value is incremented by one to register the resultant value to the edit field, thereby terminating the processing. Otherwise, the processing is terminated without conducting any operation. This processing, namely, the termination of processing without any operation, is disposed to prevent a disadvantageous phenomenon of an abrupt increase in the setting value, which may possibly occur due to many events of button depression issued when the mouse cursor is moved on the buttons with the buttons kept depressed.

Figure 46:
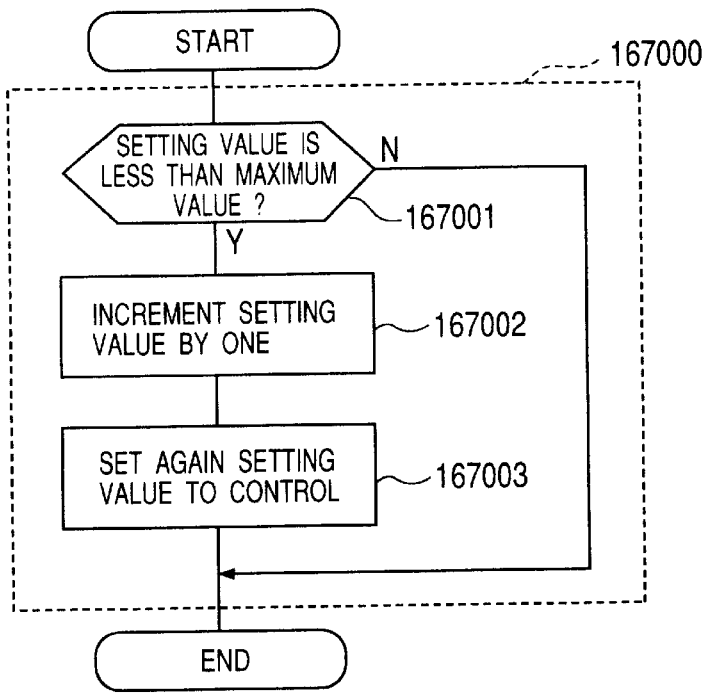
FIG. 46 is a diagram showing the processing of a repeat function of the add button.

FIG. 46 is a flowchart of the add button repeat processing 167000. First, whether or not the setting value is less than the maximum value is checked (step 167001). If the setting value is equal to or more than the maximum value, the addition is unnecessary and hence the processing is terminated without conducting any operation. Otherwise, the setting value is incremented by one (step 167002) to register the resultant value to the edit field (step 167003), thereby terminating the processing.

Figure 47:
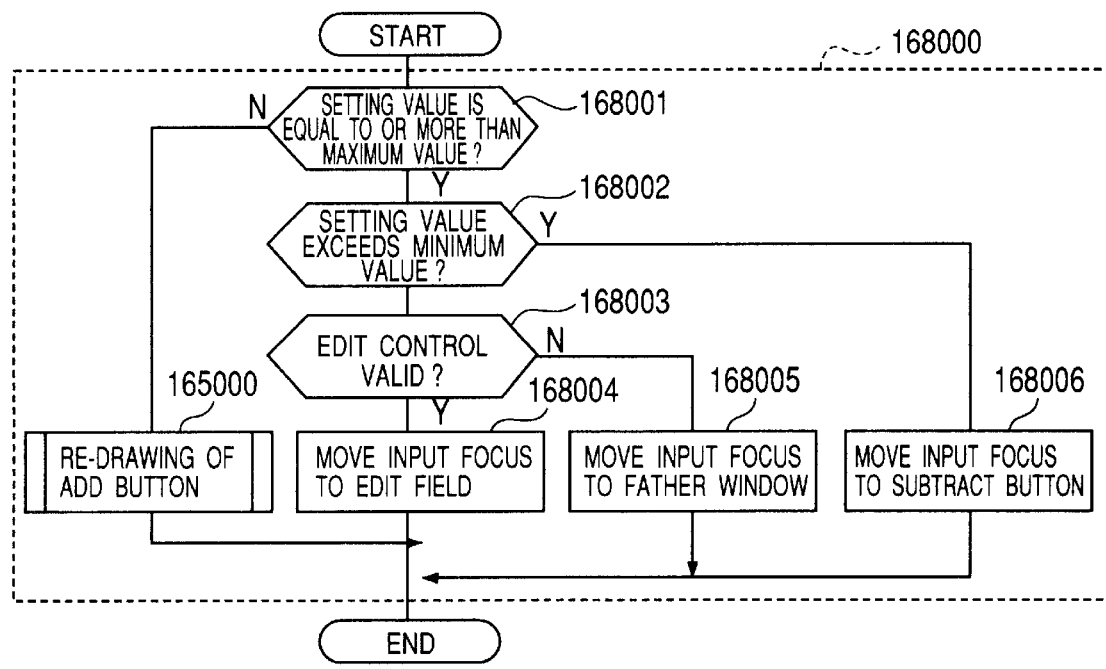
FIG. 47 is a diagram showing the processing of acquisition of focus of the add button.

FIG. 47 is a flowchart of the processing of add button focus acquisition 168000. The processing is centered on an operation not to set the input focus to any controls in the invalid state. First, to determine whether or not the add button for the input focus is valid, a check is made to judge whether or not the setting value is equal to or more than the maximum value (step 168001). If the setting value is less than the maximum value, the add button is valid and hence the redrawing operation 165000 is executed and then the processing is terminated. Otherwise, the add button is invalid and hence cannot obtain the input focus. An attempt is then made to move the input focus from the add button to the subtract button. To determine whether or not the subtract button for the input focus is valid, a check is made to judge whether or not the setting value is more than the minimum value (step 168002). If this is the case, the subtract button is valid and hence the input focus is moved thereto (step 168006) and then the processing is terminated. Otherwise, the subtract button is invalid and then an attempt is made to move the input focus to the edit field. For this purpose, judgement is conducted to decide whether or not the edit field is in the valid state (step 168003). If valid, the edit field obtains the input focus (step 168004) and then the processing is terminated. Otherwise, the input focus is moved to the starting or father window (step 168005) and then the processing is terminated.

Figure 48:
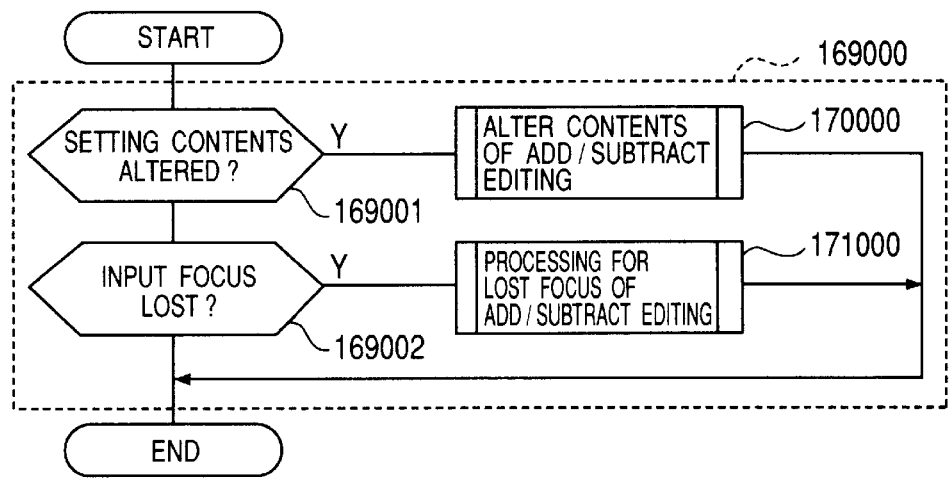
FIG. 48 is a diagram showing the edit processing with add and subtract buttons.

FIG. 48 is a flowchart of the processing of editing with add and subtract buttons 169000, which is executed at an occurrence of an event of editing operation with the add and subtract buttons. First, a check is made to decide whether or not the issued event is "the setting value is changed" (step 169001). If this is the case, the processing to change the contents of editing with add and subtract buttons 170000 is achieved, thereby terminating the processing. Otherwise, whether the event is "the input focus is lost" is judged (step 169002). If this is the case, the processing for lost focus of editing with add and subtract buttons 171000 is executed, thereby terminating the processing. Otherwise, the processing is terminated without achieving any operation.

Figure 49:
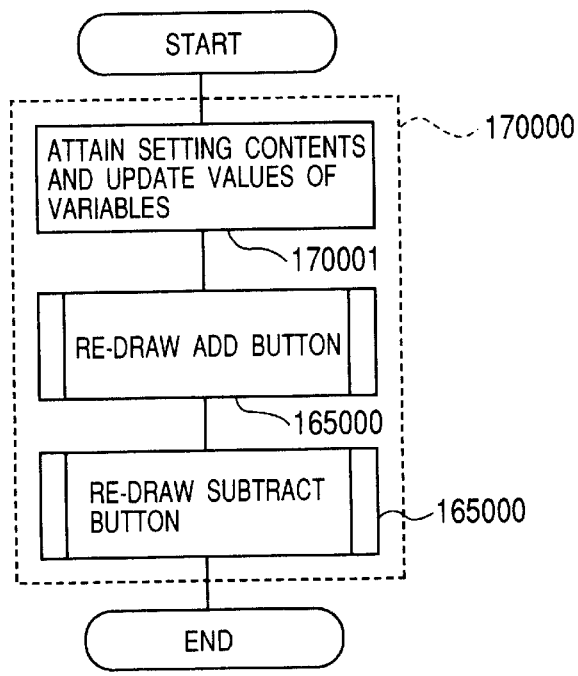
FIG. 49 is a diagram showing the processing of change in the contents of editing with add and subtract buttons.

FIG. 49 is a flowchart of the processing to change the contents of editing with add and subtract buttons 170000. First, the value set in the edit field is acquired to update the value of variable. Subsequently, the processing of add button re-drawing 165000 and the processing of subtract button re-drawing 165000' are effected, thereby terminating the processing.

Figure 50:
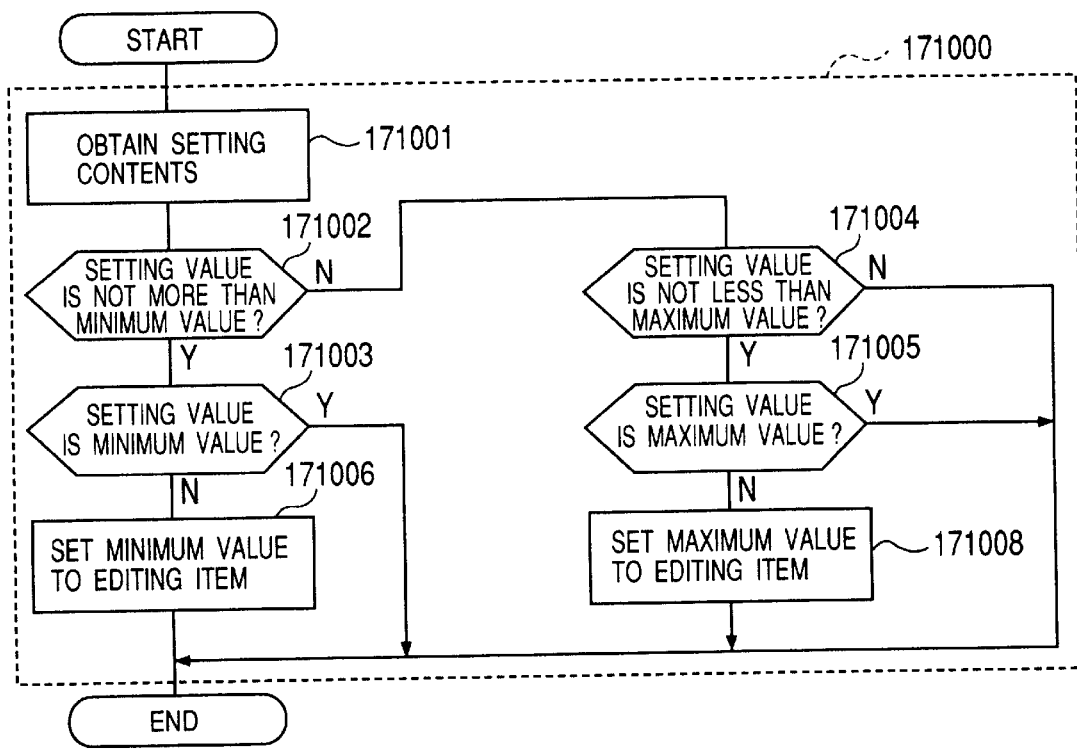
FIG. 50 is a diagram showing the processing of lost focus in edit processing with add and subtract buttons.

FIG. 50 is a flowchart of the processing for lost focus of editing with add and subtract buttons 171000. This processing is conducted to adjust the setting value to be within a range between the minimum and maximum values. First, the value set in the-.edit field is acquired (171001) to determine whether or not the value is equal to or less than the minimum value (step 171002). If this is the case, a comparison is achieved to determine whether the value is equal to the minimum value (step 171003). If this is the case, the setting value need not be corrected; consequently, the processing is terminated without achieving any operation. Otherwise, the minimum value is set again to the edit field (step 171006), thereby terminating the processing. If the setting value is more than the minimum value, whether or not the setting value is equal to or more than the maximum value is judged (step 171004). If the value is less than the maximum value, the setting value need not be corrected and hence the processing is terminated without achieving any operation. Otherwise, whether the setting value is equal to the maximum value is decided (step 171005). If this is the case, the setting value need not be corrected; consequently, the processing is terminated without achieving any operation. Otherwise, the maximum value is set again to the edit field, thereby terminating the processing.

Next, the programs for the respective windows will be sequentially described.

Figure 51:
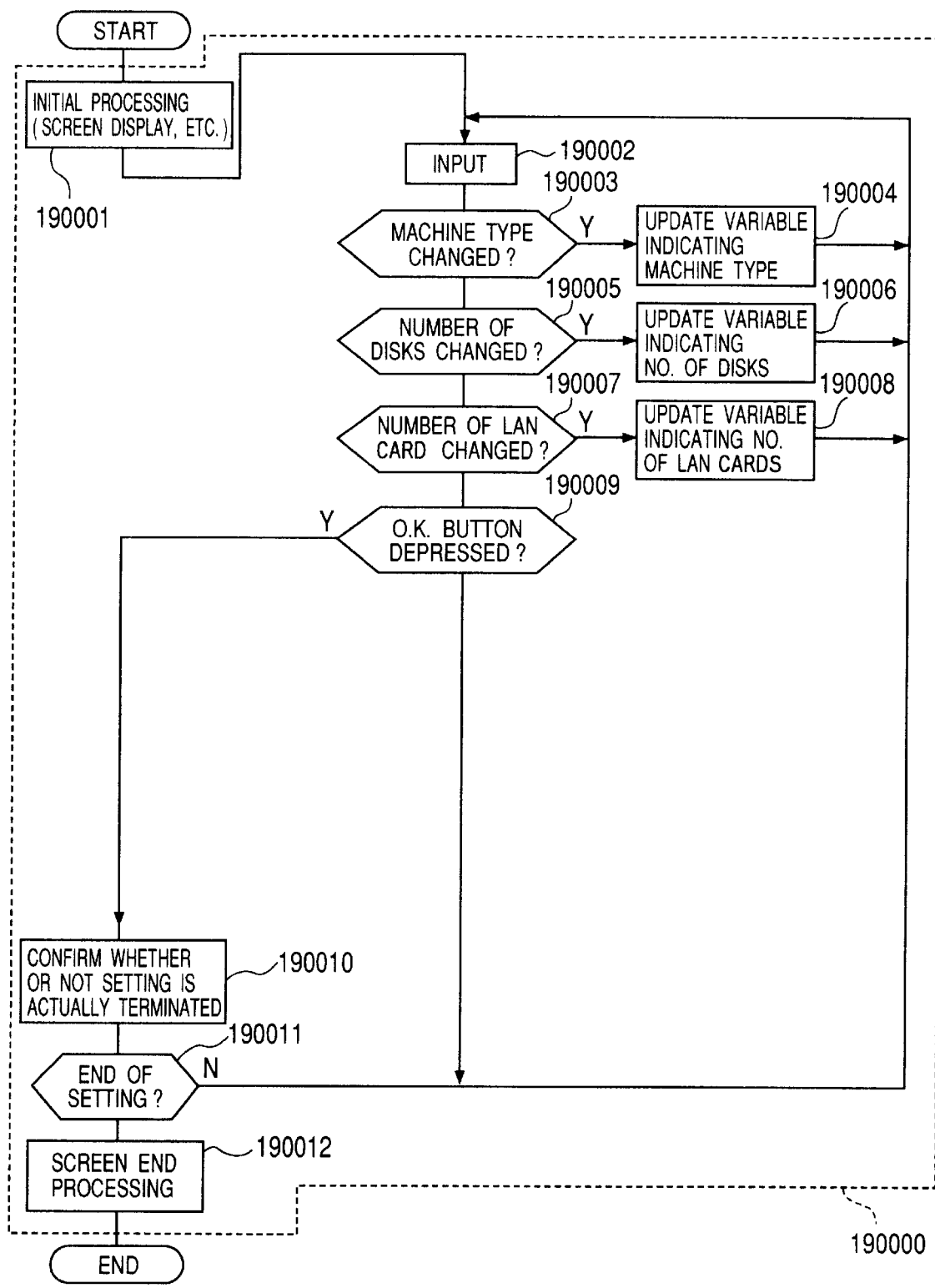
FIG. 51 is a diagram showing the processing of initial setting window of file server GUI program.

FIG. 51 is a flowchart of the processing of program initializing window of the file server GUI. First, an initial processing is conducted (step 190001). Namely, the initial setting window of FIG. 20 is displayed such that a machine name is registered and initial selection items are set in the machine selection frame or combo box 120001, an initial value is set to the number of disks 120003, and an initial value is set to the number of LAN card 120006. When the initial processing is completed, the system enters an input wait state (step 19002) to await an input operation of the user. When a user conducts an input operation, a check is first made to decide whether or not the machine type is altered (step 190004). If this is the case, the value of a variable denoting the machine type (a machine type 151034) of FIG. 36 is updated and then control is returned to the input wait step 190002. Otherwise, whether or not the number of disks is varied is next judged (step 190005). If this is the case, the value of the variable denoting the number of disks (a number of drives 151005) of FIG. 36 is updated (step 19006) and then control is returned to the input wait step 190002. Otherwise, whether or not the number of LAN cards is varied is further judged (step 190007). If this is the case, the value of the variable denoting the number of LAN cards (a number of LAN cards 151015) of FIG. 36 is updated and then control is returned to the input wait step 190002. Otherwise, whether or not the setting end button is depressed is checked (step 190009). If the button is kept released, control is returned to the input wait step 190002 without conducting any operation. Otherwise, a confirmation request is issue to the user to determine whether or not the setting end operation is to be actually conducted (step 190011). When the user acknowledges the operation, a screen end processing (step 190012) is achieved. In this processing, the initial setting window is removed from the screen.

Figure 52:
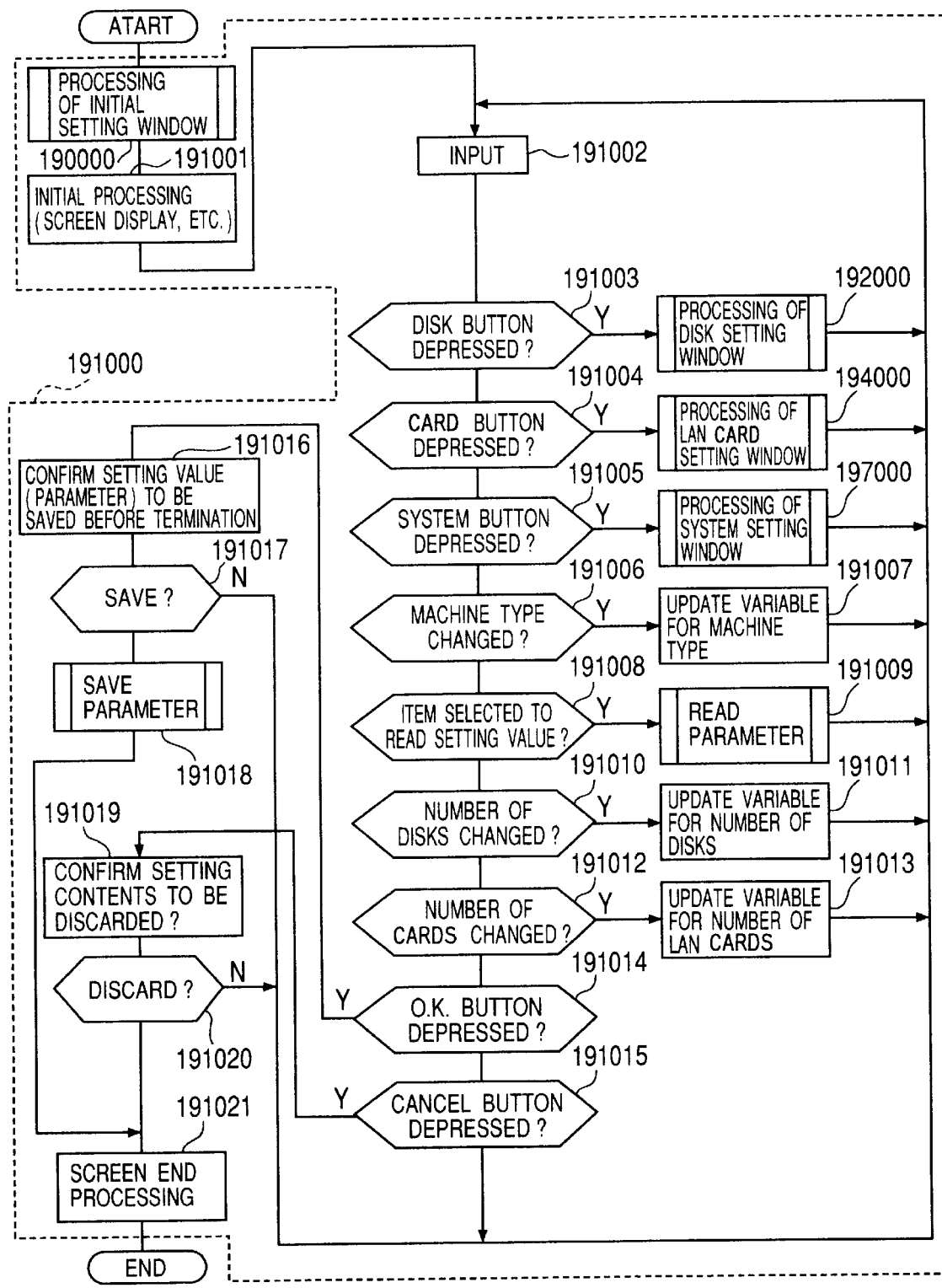
FIG. 52 is a diagram showing the processing of menu window of file server GUI program.

FIG. 52 is a flowchart of the processing of program menu window of the file server GUI 191000. The processing is first executed when the GUI program is initiated. The contents of processing are as follows. First, an initial processing of initial setting window 190000 is executed. The initial setting window (FIG. 20) is resultantly opened for the user to conduct an initial setting operation (191001). In this operation, the menu window (FIG. 21) is displayed, a machine is registered and initial setting items are set in the frame 121006, an initial value is set to the field to edit the number of disks 120008, and an initial value is set to the field to edit the number of cards 121009. When these operations are completed, the system enters an input wait state (step 191002) to await an operation to be conducted by the user. When the disk button is depressed (step 191003), a program for processing disk setting window 192000 is called or invoked. When the window is closed, control is returned to the input step 191002. When the card button is depressed (step 191004), a program for processing LAN card setting window 194000 is called. When the window is closed, control is returned to the input step 191002. When the system button is depressed (step 191005), a program for processing system setting window 197000 is called. When the window is closed, control is returned to the input step 191002. When the machine type is changed (step 191006), the value of the machine type 121006 (FIG. 21) is updated (step 191007) and then control is returned to the input step 191002. When the setting value read item is selected (step 191008), a parameter reading operation is conducted (step 191009). When the number of disks is varied (step 191010), the value of number of disks 121008 (FIG. 21) is updated, thereby returning control to the input step 191002. When the number of cards is varied (step 191012), the value of number of LAN cards 121009 (FIG. 21) is updated and then control is returned to the input step 191002. When the O.K. button is depressed (step 191014), the setting values are saved and then a confirmation request is issued to the user to decide whether or not the processing is to be terminated (step 191016). If the user acknowledges the termination, the parameters are saved (step 191018) and then a screen end processing is executed (step 191021), thereby finishing the processing. When the cancel button is depressed (step 191015), a confirmation request is issued for the user to decide whether or not the contents of setting values are to be discarded (step 191019). If the user acknowledges the operation, the parameters are saved (step 191018) and then a screen end processing is executed (step 191021), thereby finishing the processing.

Figure 53:
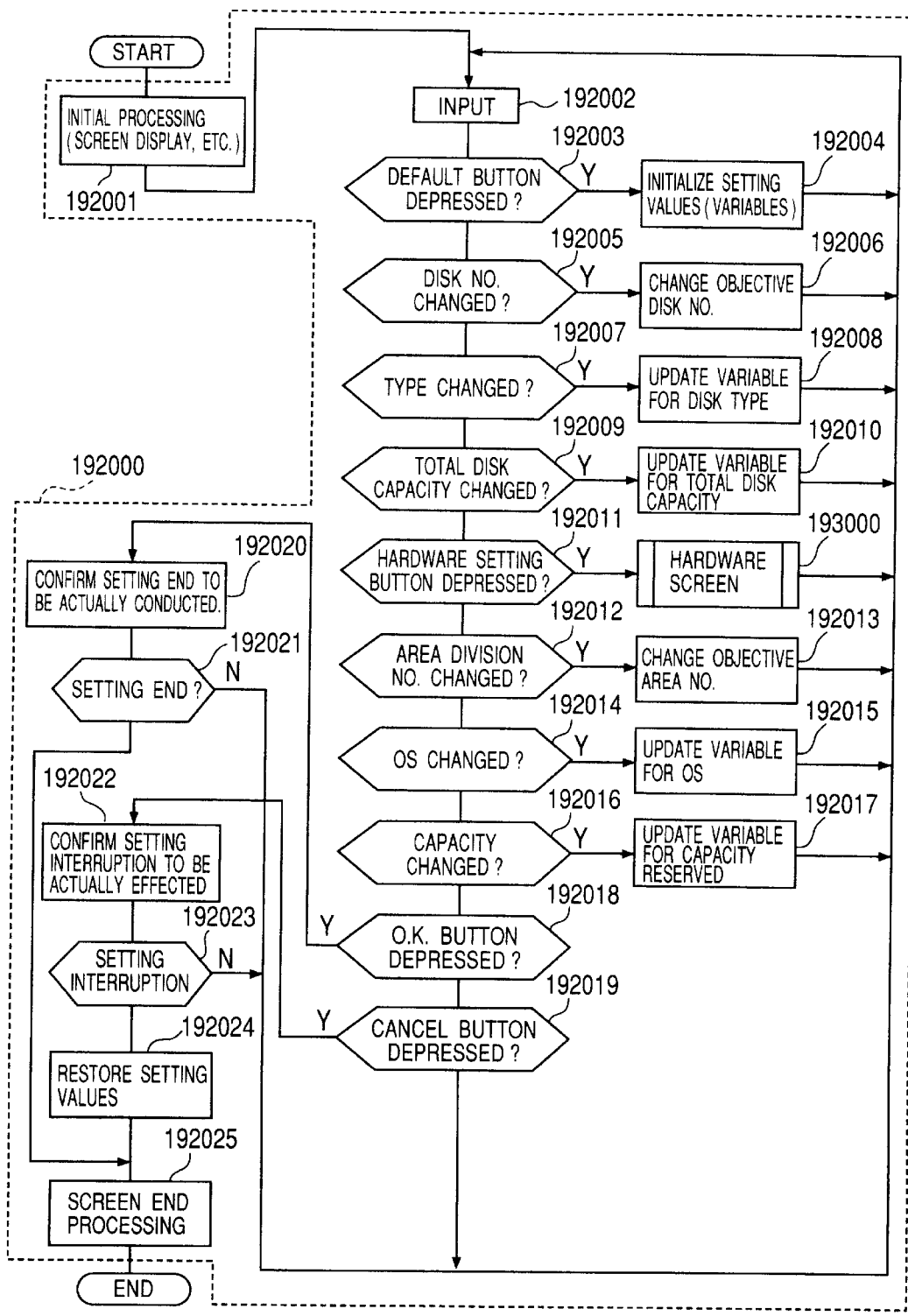
FIG. 53 is a diagram showing the processing of hard disk setting window of file server GUI program.

FIG. 53 shows a flowchart of the processing of disk setting window for the file server GUI. Details of the processing flow will now be described. First, an initial processing is executed (step 192001). Namely, the disk setting window (FIG. 22) is displayed, a disk type name is registered and initial selection items are set in the frame 122009, a disk capacity and initial selection items are set in the frame 122010, the other controls are initially displayed, and the contents of disk information 151001 (FIG. 36) are temporarily saved. The contents of saved variables are utilized at an interruption of setting so as to restore the setting values. After the processing is finished, the system enters an input wait state (step 192002) to wait for an operation to be conducted by the user. When the user depresses the default button (step 192003), the contents of disk information 151001 (FIG. 36) are initialized and the resultant items are displayed in the window, thereby returning control to the input step 192002. When the disk number is varied (step 1920045), the value of the selected drive number 151035 is updated and then the setting items (type, total disk capacity, OS, and available disk capacity) of which display contents are influenced by the change of the drive number are again accordingly displayed, thereby returning control to the input step 192002. When the type is altered (step 192007), the value of the disk type 151006 (FIG. 36) is updated (step 192009) and then control is transferred to the input step 192002. When the total disk capacity is changed (step 192009), the value of the total disk capacity 151007 (FIG. 36) is updated and then the value is corrected, if necessary, to be within the allowable setting range, thereby displaying the resultant value. The value of the free or available disk capacity is calculated again and is then displayed again, thereby returning control to the input step 192002. When the hardware setting button is depressed (step 192011), the processing of disk hardware setting window 193000 is called and then control is passed to the input step 192002. When the area division number is changed (step 192012), the value of the selected area number 151036 (FIG. 36) is updated (step 192013) and then the setting items (OS and capacity) of which the display contents are to be altered according to the change of the area number are displayed again, thereby returning control to the input step 192002. When the operating system (OS) is changed (step 192014), the value of the operating system 151012 (FIG. 36) is updated (step 192015) and then control is passed to the input step 192002. When the capacity is varied (step 192016), the reserved capacity 151013 (FIG. 13) is updated and then a check is made to determine whether or not the value is equal to or more than the minimum reserve capacity determined for NetWare or DOS. If the value is less than the minimum capacity, the OS selection button is nullified; moreover, if the operating system has already been in the selected state, the operating system is released from the selected state, thereby returning control to the input step 192002. On the other hand, when the value is equal to or more than the minimum reservation capacity, the OS selection button is validated and then control is returned to the input step 192002. When the O.K. button is depressed (step 192018), a confirmation request is issued to the user to determine whether or not the setting end is actually achieved (step 192020). If the operation is acknowledged, the screen end processing is executed (step 192025) and then the processing is finished. When the cancel button is depressed (step 192019), a confirmation request is issued to the user to determine whether or not the cancel is actually effected (step 192022). If the cancel is desired, the values temporarily saved are restored to the disk information 151001 (FIG. 36, step 192024) and the screen end processing is executed (step 192025).

Figure 54:
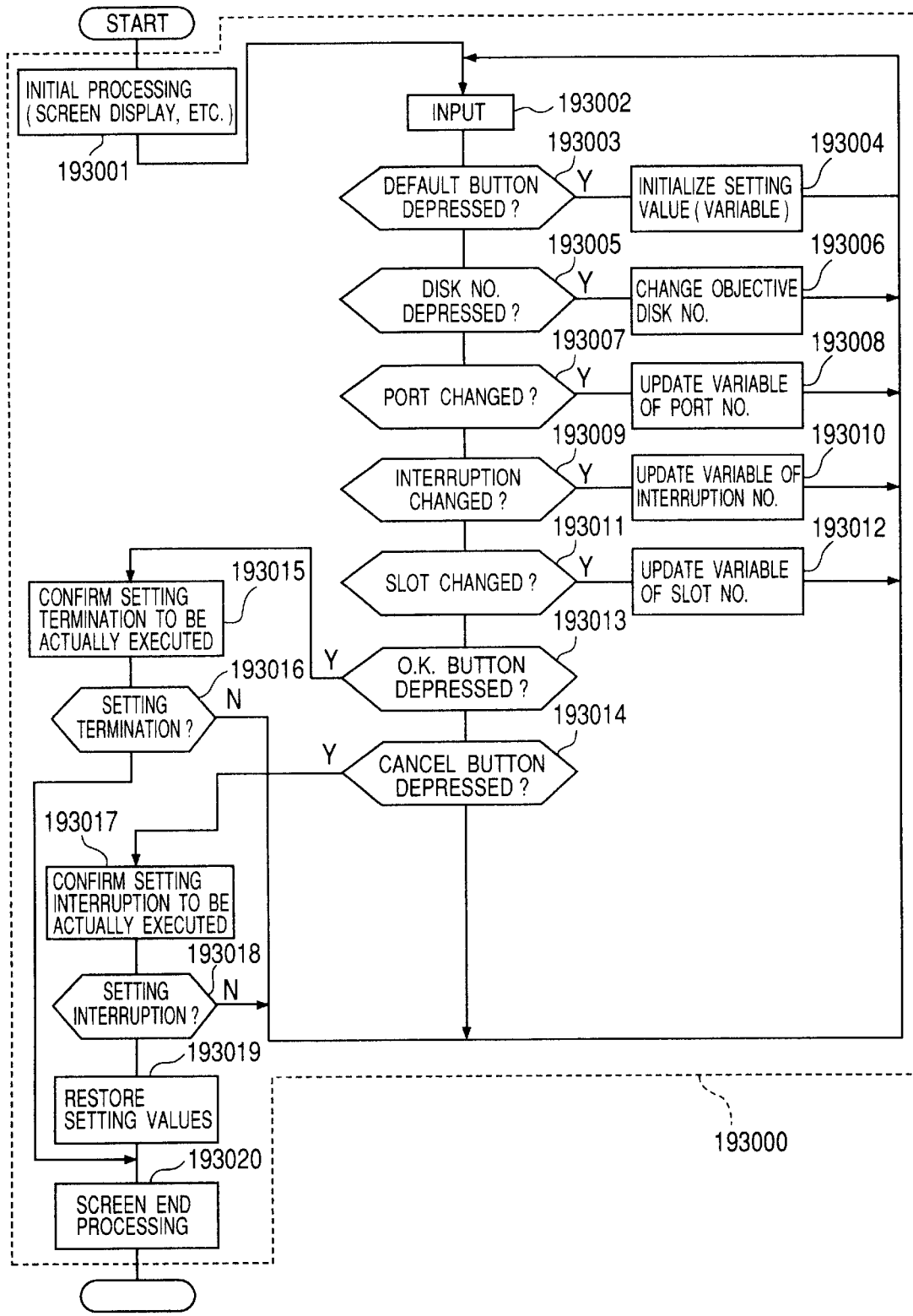
FIG. 54 is a diagram showing the processing of window to set hardware for hard disks in the file server GUI program.

FIG. 54 shows a flowchart of the processing of disk hardware setting window in the file server GUI program. Since the processing is substantially identical to the processing of disk hardware setting window (FIG. 53), description thereof will be avoided.

Figure 55:
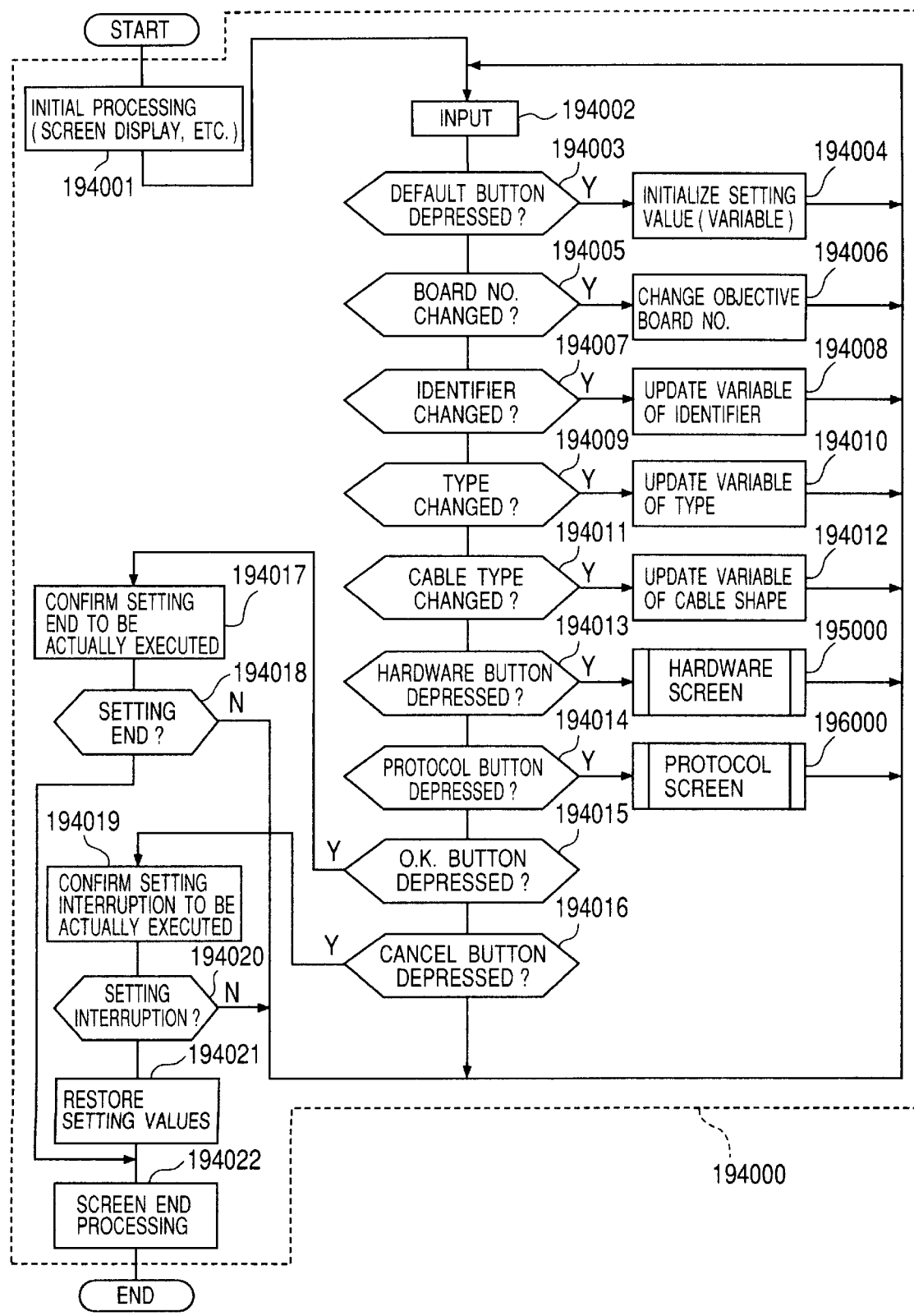
FIG. 55 is a diagram showing the processing of LAN card setting window of the file server GUI program.

FIG. 55 is a flowchart of the processing of LAN card setting window in the file server GUI program. Similarly, this is also similar to the processing of disk hardware setting window (FIG. 53).

Figure 56:
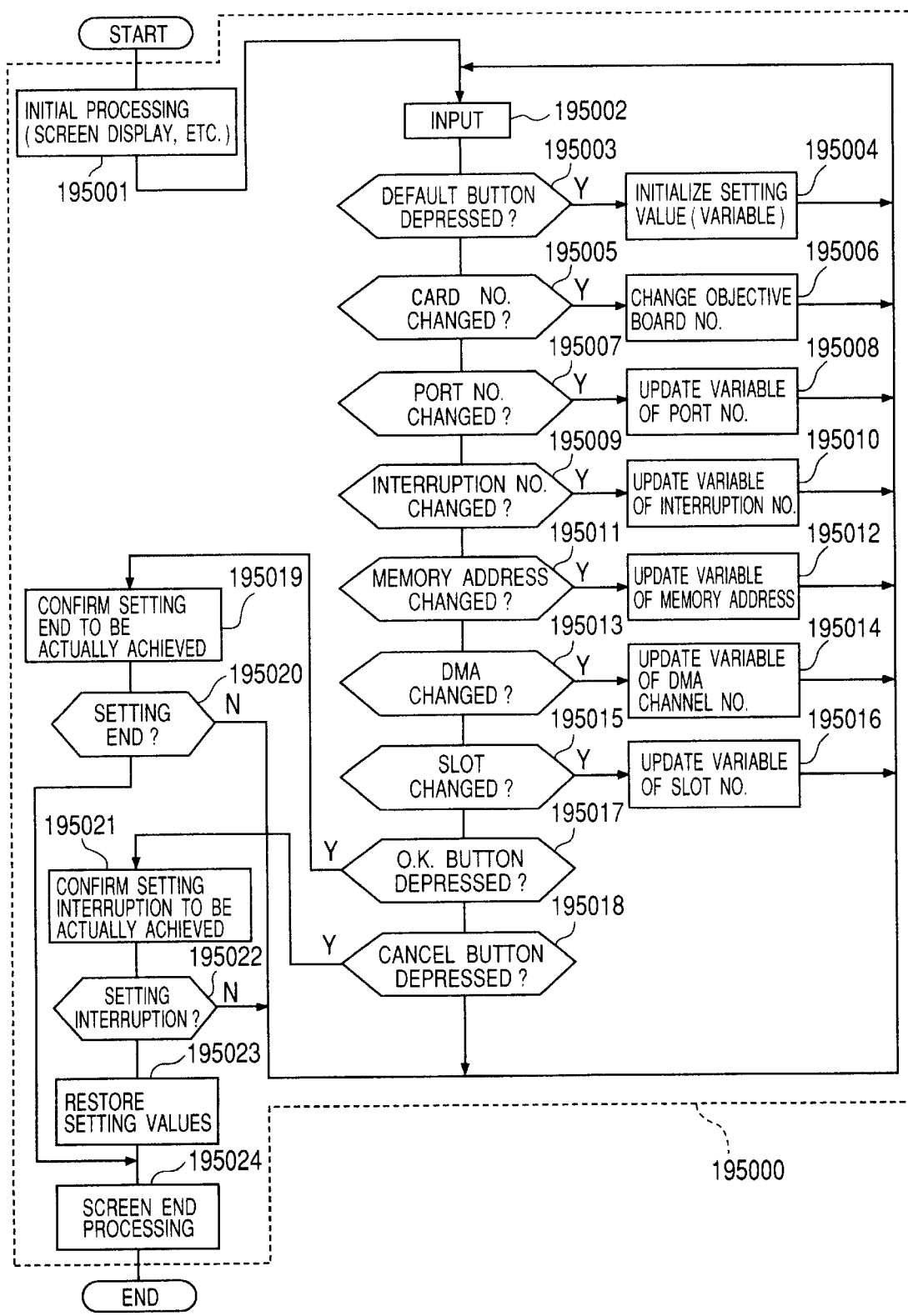
FIG. 56 is a diagram showing the processing of window to set hardware for LAN card in the file server GUI program.

FIG. 56 is a flowchart of the processing of LAN card hardware setting window in the file server GUI program. This is also similar to the processing of disk hardware setting window (FIG. 53).

Figure 57:
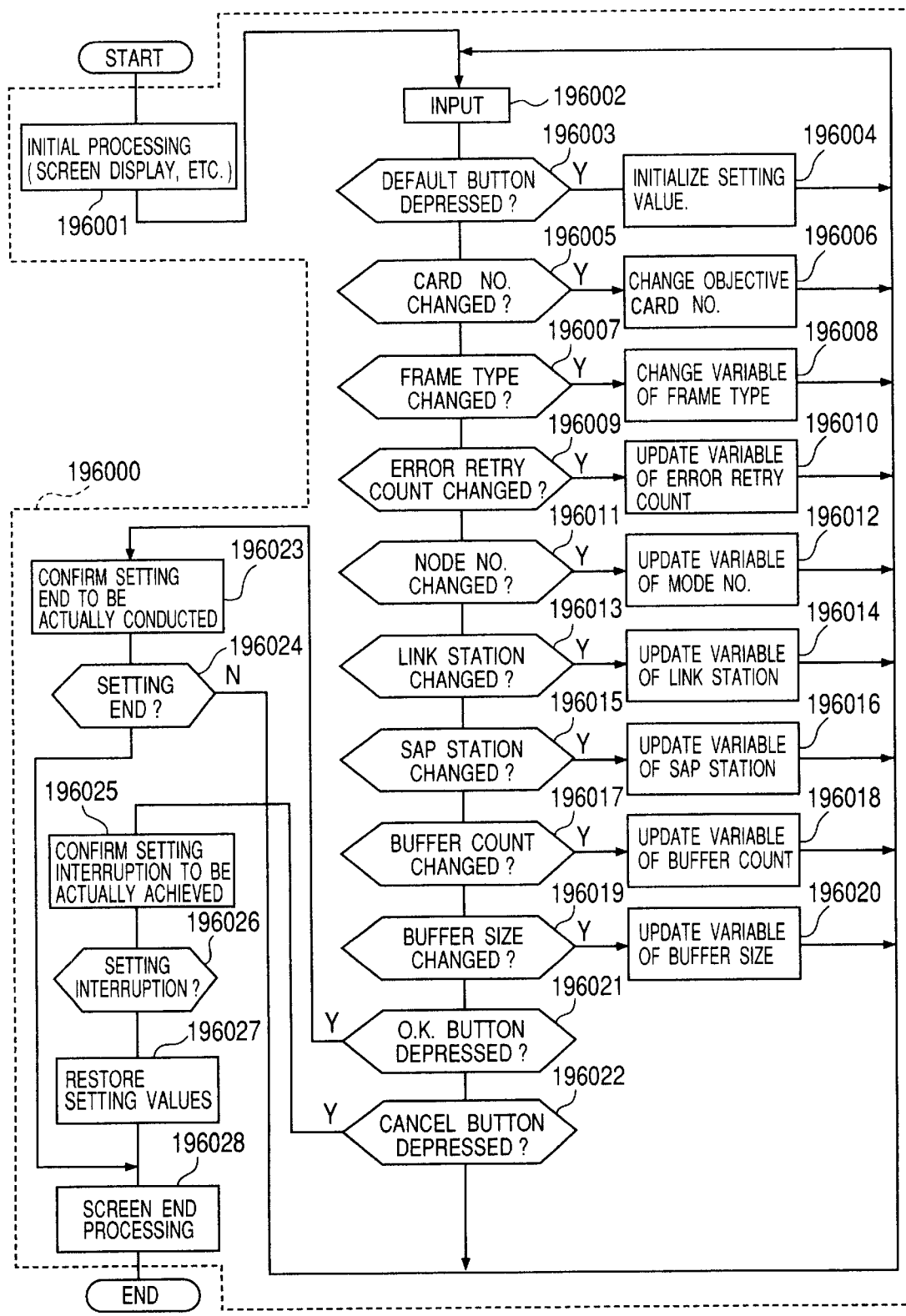
FIG. 57 is a diagram showing the processing of window to set protocol for LAN cards in the file server GUI program.

FIG. 57 is a flowchart of the processing of window to set a protocol for LAN cards in the file server GUI program. This is also similar to the processing of disk hardware setting window (FIG. 53).

Figure 58:
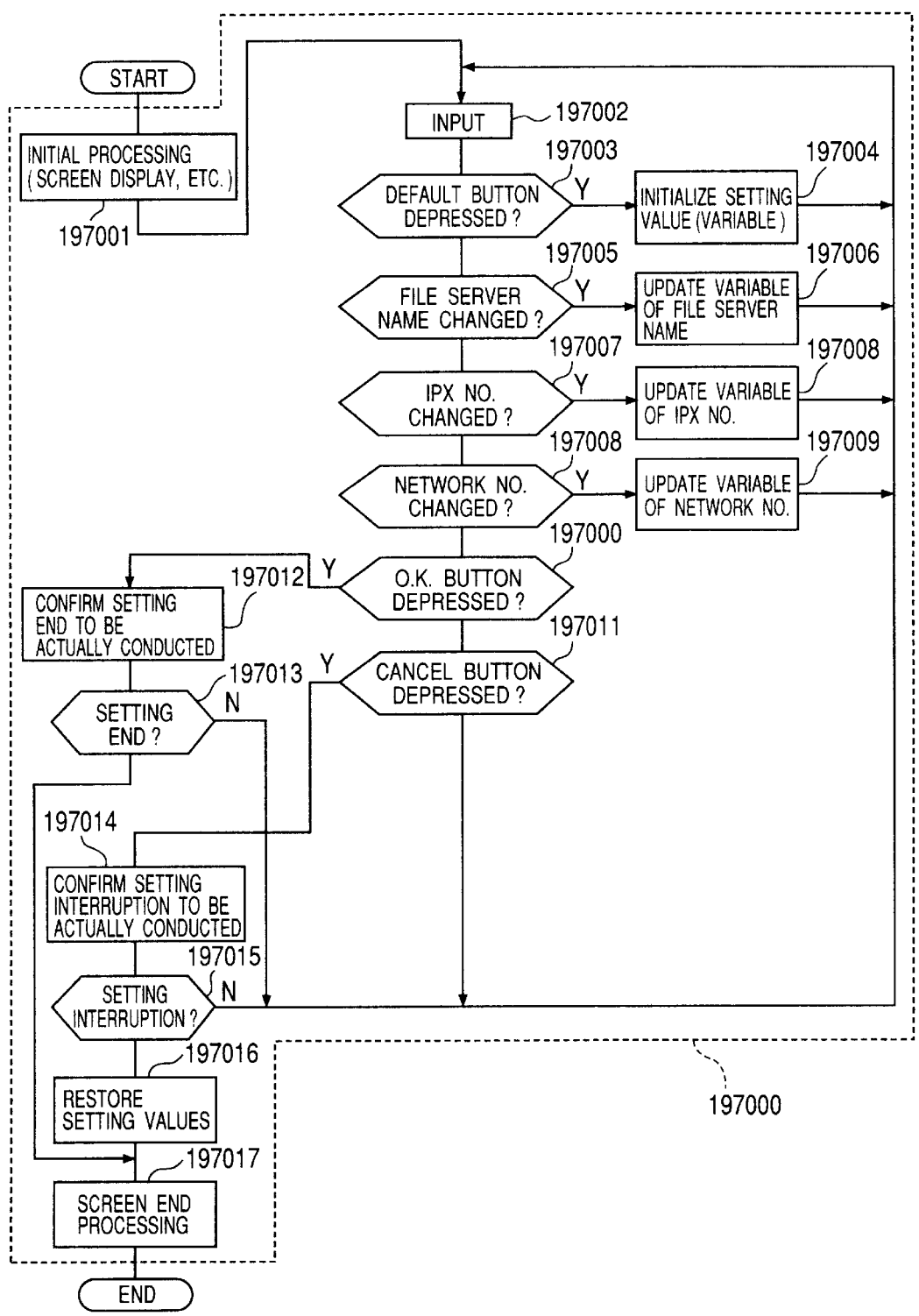
FIG. 58 is a diagram showing the processing of system setting window of the file server GUI program.

FIG. 58 is a flowchart of the processing of system setting window. This is also similar to the processing of disk hardware setting window (FIG. 53).

The GUI section of the client installer will now be described.

Figure 59:
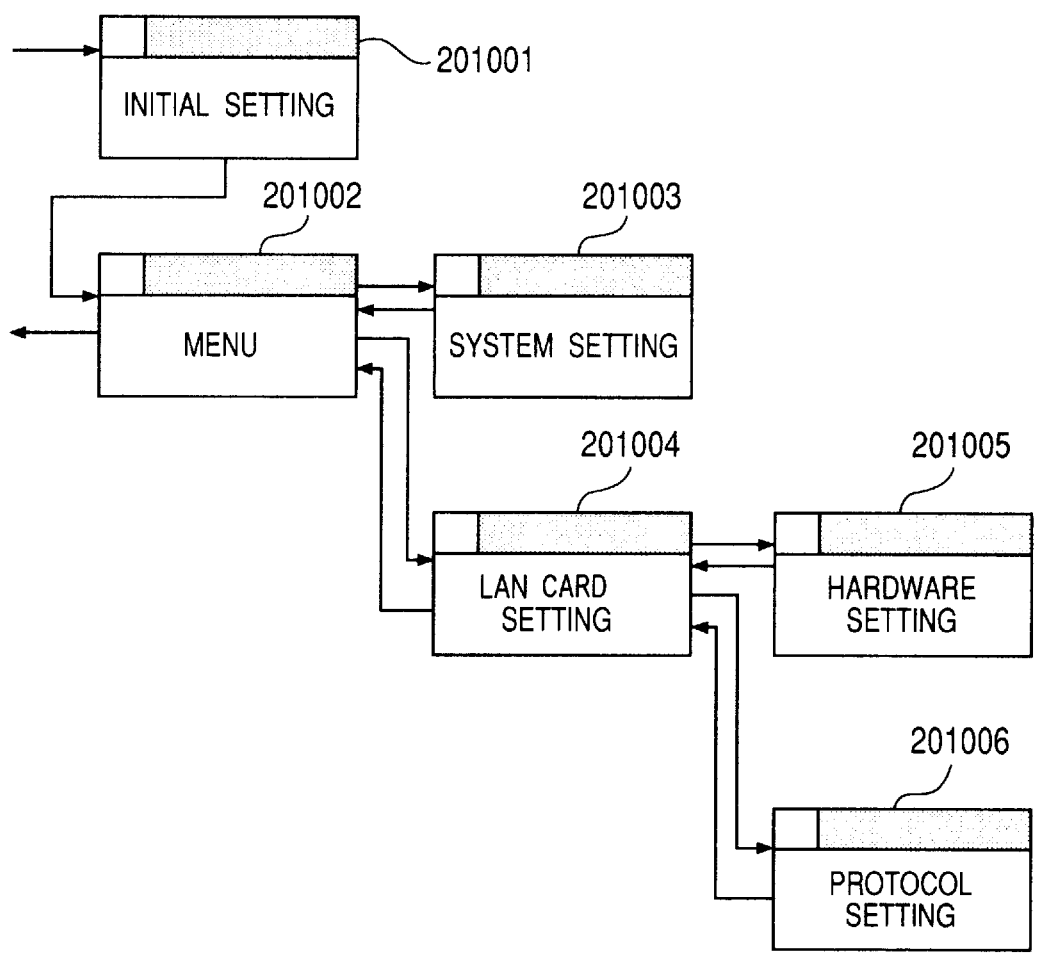
FIG. 59 is a block diagram showing relationships between the screens of the client installer (GUI section)

FIG. 59 shows the overall relationships between the screens of the client installer (GUI section). The installer is constituted with six screens. First, when the installer is activated, an initial setting screen (201001) is displayed to beforehand set therein the necessary information indispensable for the installation of the client machine such as a type thereof and a number of LAN cards. When the setting operation is finished in this screen, a menu screen (201002) is presented. In this screen, there are achieved a system setting for the client machine and selections of setting items such as LAN card setting. Moreover, a system setting screen (201003) and an LAN card setting screen (201004) can be opened. In addition, it is also possible to read as a parameter file various setting information items beforehand specified for a client machine. In the system setting screen, various items of the system environment are set for the client machine. In the LAN card setting screen, various parameters are set for LAN cards. In this screen, a screen to set hardware of LAN cards (201005) and a screen to set protocol for LAN cards (201006) can be opened. In the screen 201005, various hardware parameters such as an I/O port number and an interruption number are designated for LAN cards. In the screen 201006, parameters related to a protocol such as a frame type are set.

Whether or not the screens other than the initial setting and menu screens are to be opened can be arbitrarily determined by the user. At an activation of the client installer, the initial setting screen is displayed, and termination of the installer can only be effected from the menu window.

In this embodiment, the respective windows are implemented by use of windows of MS-Windows by way of example; consequently, these screens will be called windows herebelow. Naturally, these screens may be realized according to a method other than that of MS-Windows.

Figure 60:
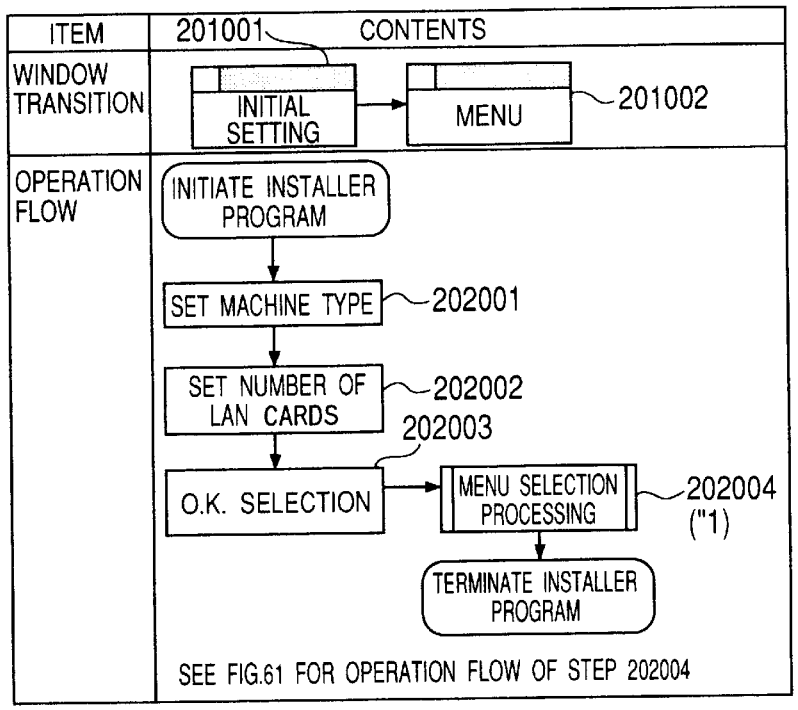
FIG. 60 is a flowchart showing an initial setting processing.

FIG. 60 shows a flowchart of the initial setting operation. When the installer program is invoked, the initial setting window (201001) is opened. In this window, a type of client machine is set (step 202001), a number of LAN cards is specified (step 202002), and then the O.K. is selected (step 202003). Thereafter, a menu window (201002) is automatically opened. In this window, a menu selection is conducted (step 202004) and then the installer program is terminated. The operation flow in the menu window is shown in FIG. 61.

Figure 61:
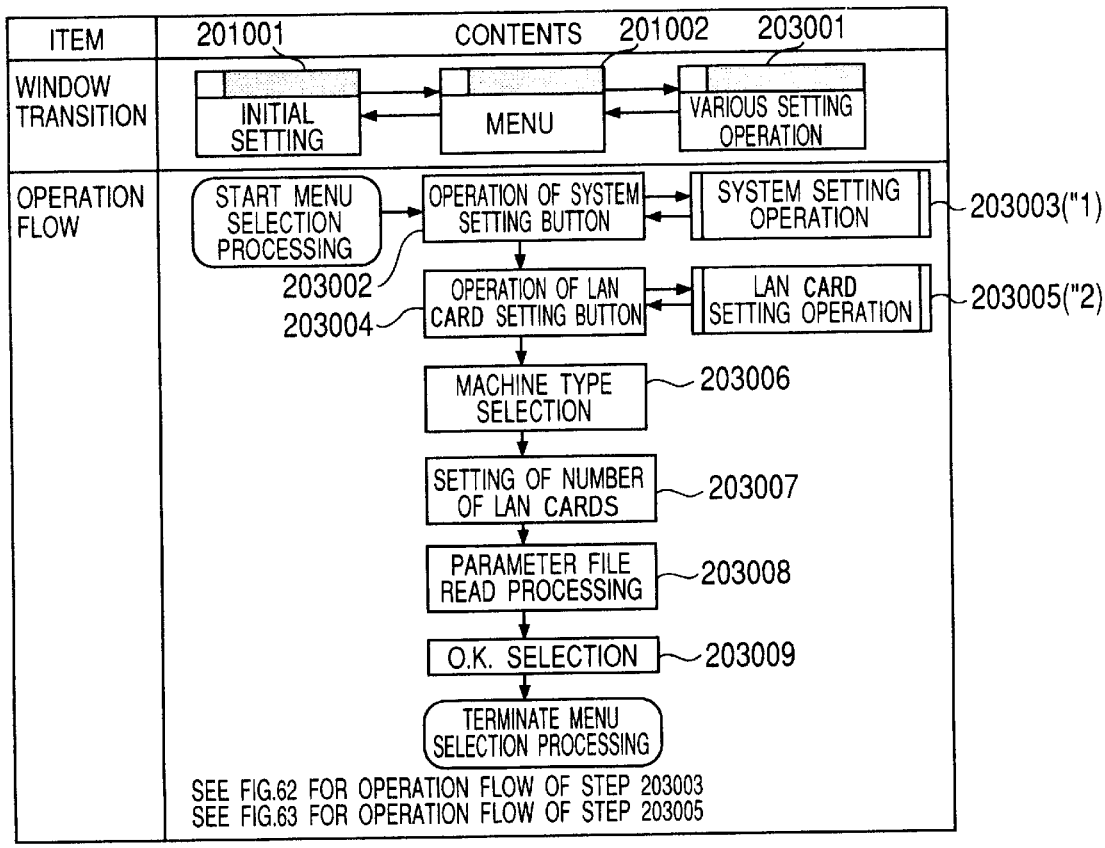
FIG. 61 is a flowchart showing a menu selection processing.

In the operation flow of FIG. 61, when the O.K. is selected in the initial setting window (201001), the menu window (201002) is opened. In this window, when an operation of system setting button 203002 is selected, a system setting operation 203003 can be achieved in the system setting window. Moreover, when an operation of LAN card setting button 203004 is selected, an LAN card setting operation 203005 can be conducted in the LAN card setting window. In addition, the type of client machine and the number of LAN cards specified in the initial setting window can be set again in the menu screen (steps 203006 and 203007). Furthermore, the setting parameters specified by the client installer in the previous installation of a client machine can be read from the parameter file by specifying the client name (step 203008). When the O.K. is selected (step 203009), the menu selection is finished. Operation flows respectively of the system setting operation 203003 and the LAN card setting operation 203005 are shown in FIGS. 62 and 63, respectively.

The operation to read the setting parameters beforehand set for a client is provide for the following reason. In a case where the parameters to be set for a client in a machine installation are the same or substantially the same as those previously registered to the system, the existing parameters need only be read from the parameter file so as to avoid the similar operation to be conducted by the user. Next, description will be given of the reasons why the machine type and the number of LAN cards beforehand set in the initial setting window can be set again in the menu window. In the client installer, the parameters to be set are presented to the user via window screens such that particularly necessary parameters are explicitly denoted by the user and those not specified by the user are set to the associated default values. However, the type of client machine and the number of LAN cards are indispensable in the explicit specification by the user in the client installation. Namely, the user is required to set these parameters in the initial setting window when the installer is invoked. Once a transition occurs from the initial setting window to the menu window, control cannot be returned to the initial setting window. Consequently, in a case where the machine type and the number of LAN cards set in the initial setting window are required to be altered later, the parameter change is allowed to be effected in the menu window.

Figure 62:
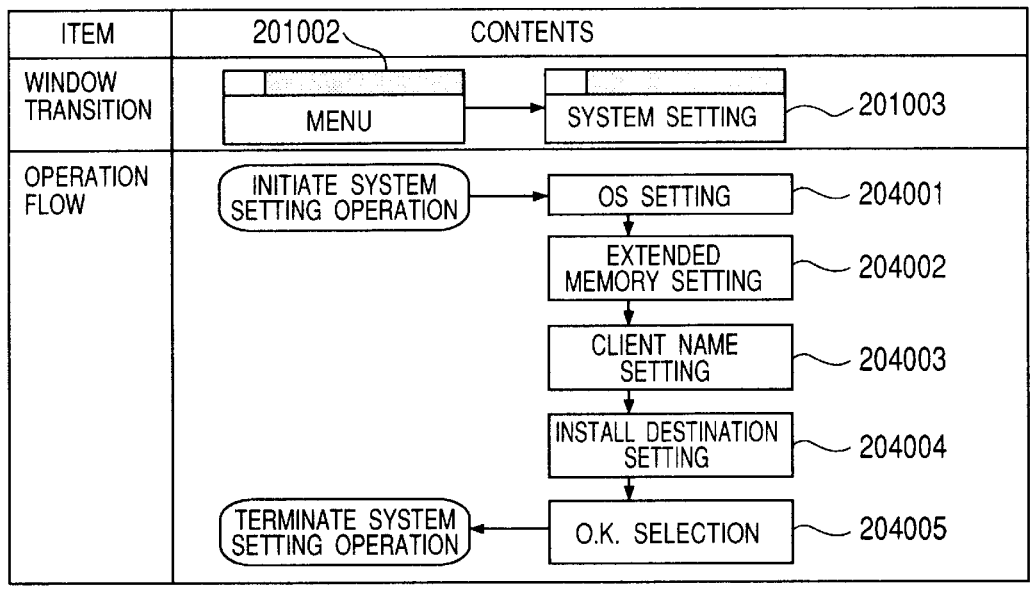
FIG. 62 is a flowchart showing a system setting processing.

FIG. 62 is a flowchart of the system setting processing. When a system setting button is activated in the menu window 201002, the system setting window 201003 is opened. In this window, there are specified an operating system to be installed in the client machine prior to the initiation of the client installer (step 204001), a method of using an extended memory (step 204002), a client name (step 204003), and a destination of installation, namely, a hard disk or a floppy disk (step 204004). When the setting operation is completed, the O.K. is selected (step 204005) to terminate the system setting operation and then control is passed to the original menu window.

Figure 63:
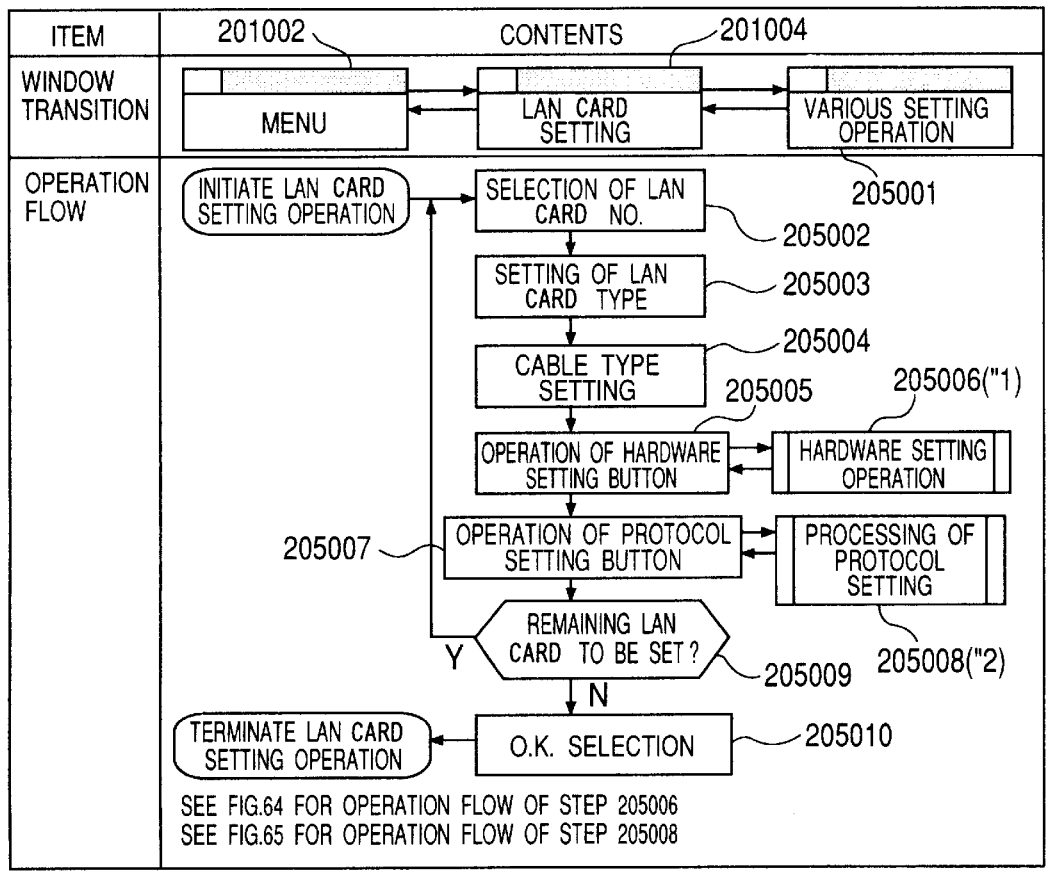
FIG. 63 is a flowchart showing the LAN card setting processing.
Figure 64:
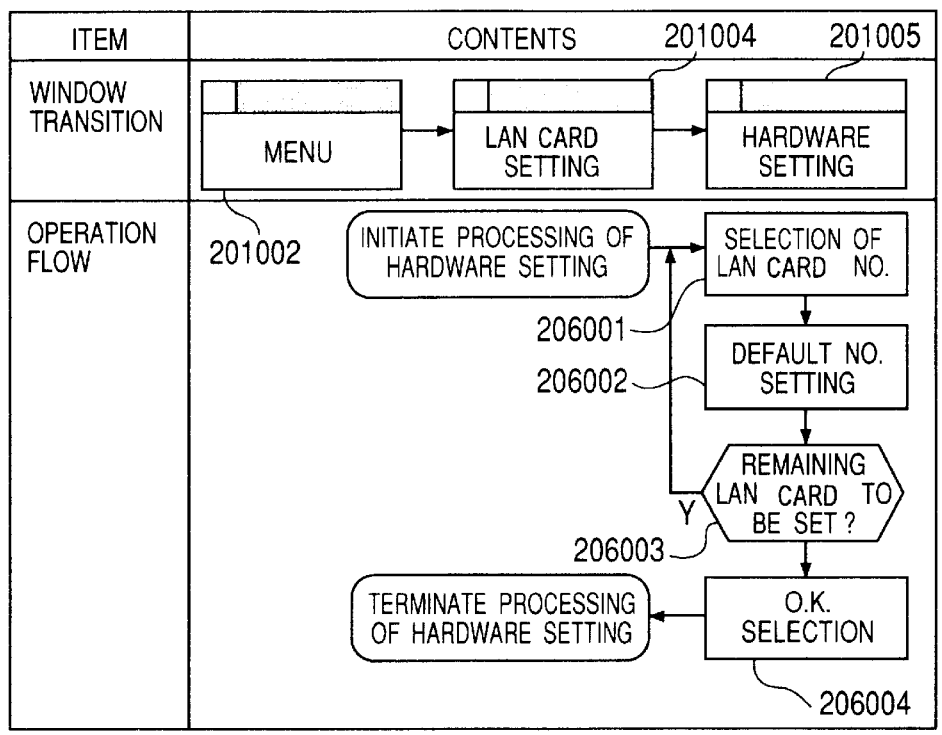
FIG. 64 is a flowchart showing the processing to set hardware for LAN cards.
Figure 65:
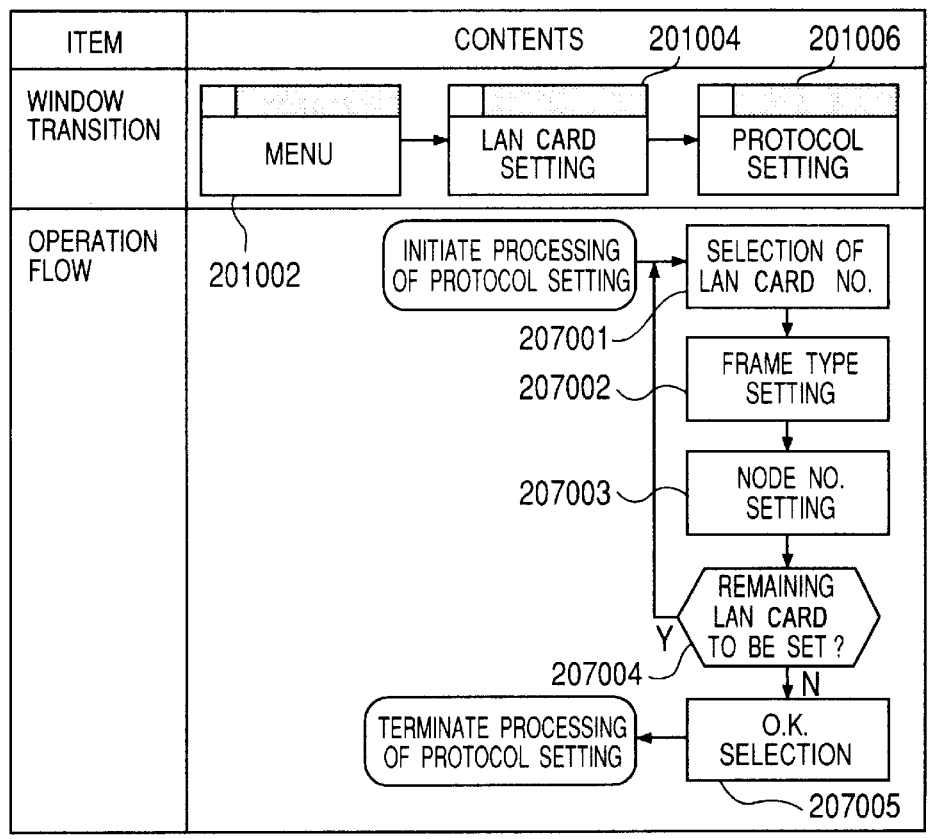
FIG. 65 is a flowchart showing the processing to set protocol for LAN cards.

FIG. 63 is a flowchart of the LAN card setting processing. When a system setting button is activated in the menu window 201002, the LAN card setting window 201004 is opened. In this window, a number of LAN card to be set is selected (step 205002, the number is uniquely determined according to a slot number to which the LAN card is connected), a type of LAN card is set (step 205003), and a cable type (coaxial, twist pair, etc.) is set. When the hardware setting button is operated (step 205005) to open the hardware setting window to achieve a hardware setting operation (step 205006). When the protocol setting button is activated (step 205007), there is opened the protocol setting window to conduct a protocol setting operation (step 205008). The operation flows respectively of the hardware and protocol setting operations are shown in FIGS. 64 and 65, respectively. In a case where the numbers of LAN cards are not completely set in the step 202002 or 203007, namely, there are remained LAN cards for which the numbers are to be set (step 205009), the processing is required to be repeatedly conducted beginning from the selection of LAN card number (step 205002).

FIG. 64 is a flowchart of the processing of LAN card hardware setting operation. In the LAN card setting window 201004, when a hardware setting button is depressed, the hardware setting window 201005 is opened. In this window, an LAN card number is selected (step 206001) and a default number is set for a combination of various values for hardware parameters (step 206002). The setting operation is achieved for all LAN cards specified (step 206003). When the O.K. is selected (step 206004), the hardware setting operation is terminated.

FIG. 65 shows a flowchart of the processing to set a protocol for LAN cards. When a protocol setting button is activated in the LAN card setting window 201004, the protocol setting window 201006 is opened. In this window, a number assigned to the LAN card is selected for the setting operation (step 207001) and then a frame type is set (step 207002), and then a node number is set (step 207003). The setting operation is achieved for all LAN cards specified (step 207004). When the O.K. is selected (step 207005), the protocol setting operation is terminated.

Next, the screen layouts of windows will be described.

FIG. 66 shows the layout of the initial setting window 201001. In this window, an item presented in a rectangular region 220001 is the default value of the type of client machine. To change the machine type, the user depresses a button 220002 to open a pull-down menu below the frame 220001, thereby selecting a type of client machine to be installed. This interface can be disposed, for example, by use of a combo box of MS-Windows. To set the number of LAN cards, a numeric value may be directly inputted to a frame 220003 or the value presented in the frame 220003 may be incremented or decremented by one by depressing a button 220004 or 220005, respectively. Moreover, when the button 22004 or 22005 is kept depressed, the value in the frame 220003 can be successively increased or decreased in an automatic manner. The interface can be achieved with the edit control and push buttons of MS-Windows. When a O.K. button 220006 is activated, the initial setting window is closed so as to open the menu window 201002. In the window, the operation to move focus onto the frame 220001, 220003, or 220006 or the operation to depress the push button is accomplished as follows in an ordinary case. The mouse cursor is moved onto an objective control or button and then a button on the right side of the mouse or on the left side thereof is clicked, thereby achieving the operation above. However, the similar interface may possibly realized through a keyboard operation. Since "Machine type (M)", "Number of LAN cards (B)", and "O.K. (X)" are presented in this screen, the user depresses the 'M' and 'B' keys of the keyboard to move the focus onto the controls 220001 and 220003 and then activates the 'X' key. Resultantly, there is developed an interface similar to that of the depression of the button 220006 above. Since the method of implementing the mouse interface by the keyboard is similarly applied to the subsequent windows, description of the keyboard operation in the subsequent window screens will be avoided. In this regard, a control having the focus indicates a control in any window screen which accepts an input in response to a click operation of the mouse button or a depression of the keyboard.

In FIG. 66, when the O.K. button is depressed, there is opened a window of disk change confirmation as shown in FIG. 28. Details of the confirmation window will be described in conjunction with the file server installer and the loader/saver. The menu window of FIG. 67 is opened from this window.

Figure 67:
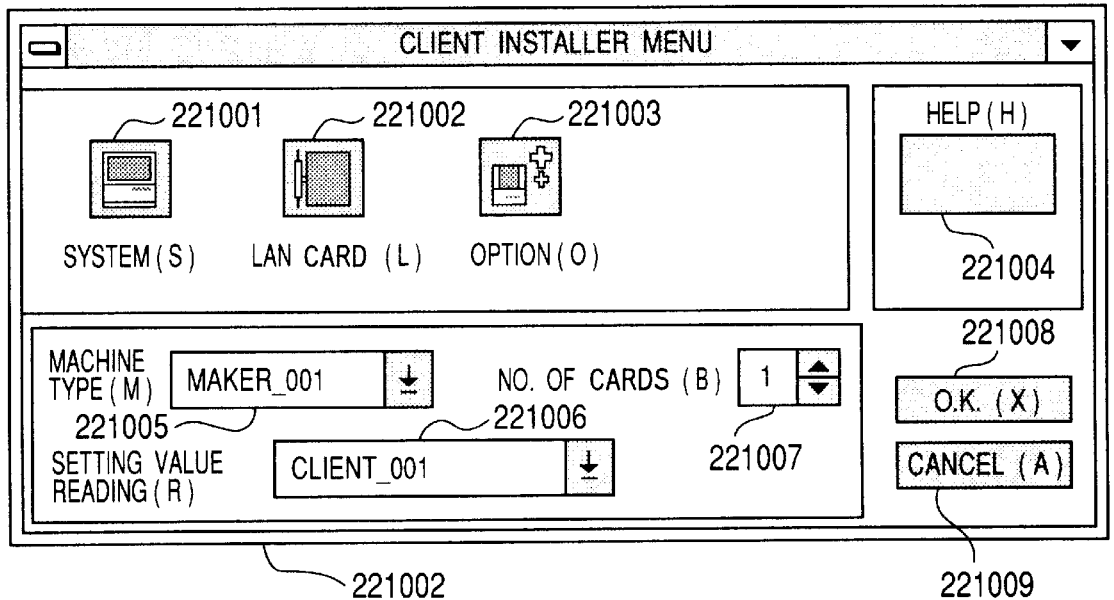
FIG. 67 is a diagram showing a menu window.

FIG. 67 shows the layout of the menu window 201002. When a system setting button 221001 is depressed, a system setting window 201003 is opened. When an LAN card setting button 221002 is activated, an LAN card setting window 201004 is opened. Although not described in detail in conjunction with this embodiment, the following operations may possibly be implemented. When an option setting button 221003 is depressed, there is opened an option setting window so that detailed environment items are set for the client machine. When a help button 221004 is activated, there are presented the meanings and operation procedures of the controls and buttons of the client installer. In the control frames or controls for a machine type 221005 and a number of cards 221007, there are set, like in the initial setting window 201001, a type of client machine and a number of LAN cards, respectively. The operation interface is implemented in the similar manner as for the window 201002. A setting value reading control 221006 is disposed to read a file to attain desired setting parameters beforehand installed by the client installer for a client machine. The setting parameters are respectively saved in a parameter file having a file name represented by the client name. In this frame, the user specifies an item of the pull-down menu to read the parameters therefrom. The control can be materialized by a combo box like that of the "machine type". In the processing to read the parameter file, there is opened a window to confirm the file loading operation. For details about these windows, reference is to be made to descriptions of the loader/saver. A O.K. button 221008 and a cancel button 221009 are used to terminate the operations of the windows and the installer. The difference between the buttons is as follows. When the O.K. button 221008 is depressed, the parameters set in the associated windows of the installer are saved in a parameter file having a file name designated by the client name. In contrast thereto, when the cancel button 221009 is activated, the parameters are entirely discarded and the parameter file is not created. At the depression of the O.K. button 221008, there is opened a window to confirm the saving operation of the parameter file. For details about the windows, reference is made to the description of the loader/saver.

When the cancel button 221009 is depressed, the setting interruption window (FIG. 29) is opened. In response to depression of the O.K. button 131002 in the window, the parameters are discarded and the client installer is finished. If the cancel button 131003 is activated, the original menu window is displayed.

Figure 68:
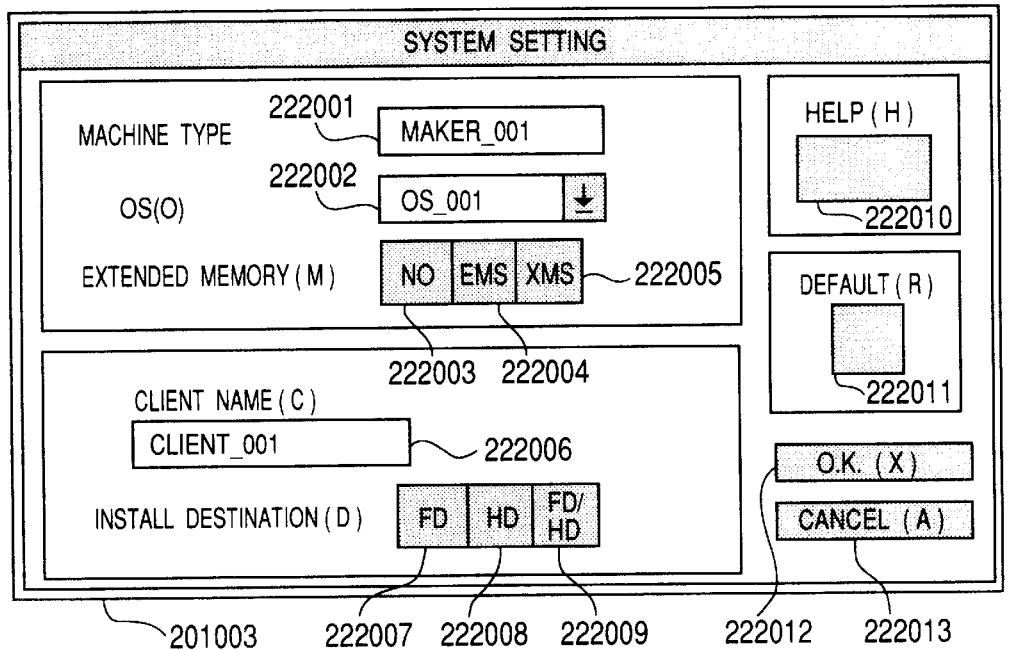
FIG. 68 is a diagram showing a system setting window.

FIG. 68 shows the screen layout of the system setting window 201003. In a machine type frame 222001, there is presented a machine type set in the initial setting window of FIG. 66 or in the menu window of FIG. 67. The user cannot change the machine type in this window. The interface is implemented, for example, by the static control of MS-windows. An OS frame 222002 is used to select an operating system to be beforehand installed in the client machine and is realized, for example, by a combo box. Three buttons 222003 to 222005 to select a method of using an extended memory are disposed to specify that the extended memory is missing, the extended memory is used as an EMS memory, and the extended memory is utilized as an XMS memory, respectively. When either one thereof is depressed to the ON state, two remaining buttons are automatically set to the OFF state. For example, push buttons are employed for these buttons. A client name frame 222006 is adopted to set a file name assigned to a parameter file in which the parameters being set are stored. The user input characters therein from the keyboard. This frame is implemented, for example, by the edit control of MS-Windows. Three buttons to specify an install destination are associated with specifications that the install destination of the client is a floppy disk (FD), a hard disk (HD), and a combination thereof (FD and HD), respectively. Like the buttons for the extended memory specification, either only of the three button can be set to the ON state. A help button 222010 is almost the same as that disposed in FIG. 67. A default button 222011 is used to set default values for all setting parameters presented in the window. Since the user cannot change the machine type in this window, when the default button is activated, there are set the default values only for four parameters including the operating system, the extended memory, the client name, and the installation destination. At depression of a O.K. button 222012, while retaining the parameters being currently displayed on the window screen, the system passes control to the menu window (FIG. 67). When the cancel button is depressed, the setting interruption window (FIG. 29) is opened. Fundamentally, this window is displayed when the cancel button is depressed in any other windows. Assume that the interruption window is called from a first window and the first window is called from a second window. When the O.K. button is depressed in the interruption window, the parameters of the first window and the windows in hierarchic layers below that of the first window are discarded, thereby opening the second window. When the cancel button is depressed in the interruption window, the first window is opened with the parameters kept retained.

Figure 69:
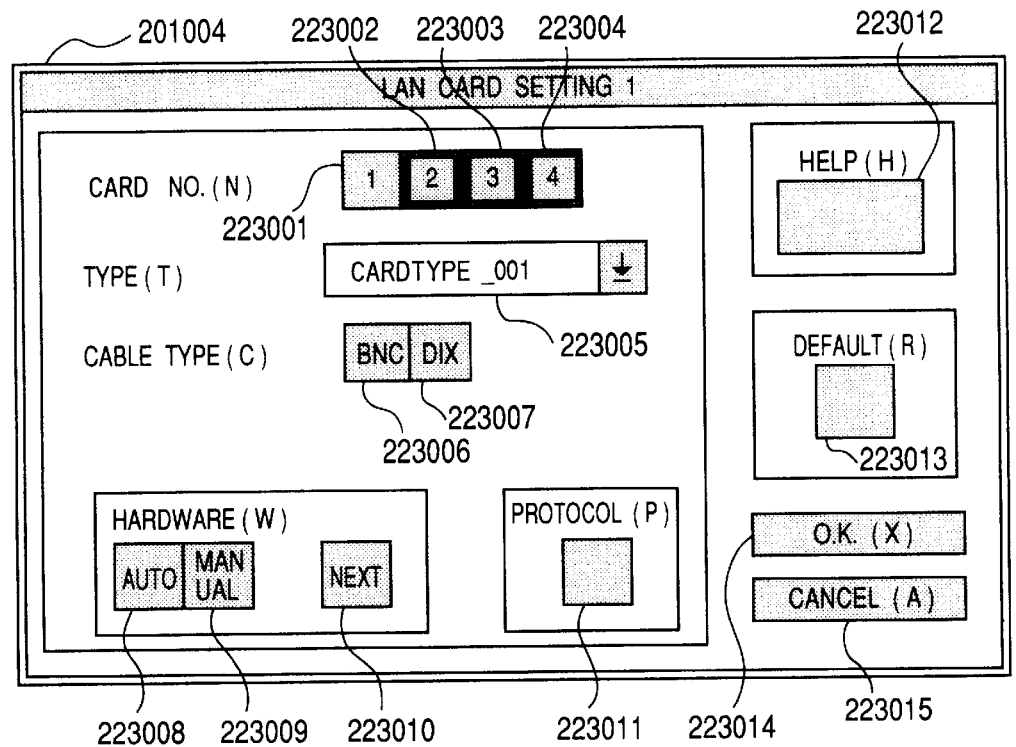
FIG. 69 is a diagram showing an LAN card setting window.

FIG. 69 shows the screen configuration of the LAN card setting window 201004. In a group of card numbers 223001 to 223004, buttons presented as valid units respectively indicate LAN card numbers for which parameters cannot be set. Those presented as invalid units respectively denote LAN card numbers for which the user may set parameters. Of the valid buttons, a button having the focus designates an LAN card number for which a parameter is currently being set. The focus can be set to only one of the four buttons. In the type frame 223005, a type of LAN card is selected. This frame is implemented, for example, by a combo box. Cable type buttons 223006 and 223007 are used to specify a type of LAN cable for BNC (10BASE-2) and DIX (10BASE-5), respectively. If necessary, the number of buttons may be increased for a selecting operation of a cable type 10BASE-T. In a case where the parameter of cable type is to be selected, only one of the selection buttons can be set to the ON state. In other cases, all buttons are presented as invalid units. Next, the operation of hardware setting buttons 223008 to 223010 will be described. When an AUTO button is effective, the user may depress the AUTO button to automatically set the hardware parameters of LAN cards according to the environment of the client machine. On the other hand, when a MANUAL button is effective, the user may depress the MANUAL button and then a NEXT button to open a window for setting LAN card hardware (FIG. 70), thereby explicitly setting therein various hardware parameters for LAN cards. In this connection, it is possible to set only either one of the AUTO and MANUAL buttons to the ON state. Moreover, the NEXT button is subordinate to the MANUAL button; consequently, the NEXT button can be depressed only when the MANUAL button is in the ON state. Namely, when the AUTO button is on and the MANUAL button is off, the NEXT button cannot be depressed. A protocol button 223011 is used to open the window for setting protocol for LAN cards (FIG. 71) so as to set therein various parameters of protocol. A help button 223012 is almost the same in function as the help button shown in FIG. 67. A default button 223013, a O.K. button 223014, and a cancel button 223015 develop almost the same functions as the corresponding buttons of FIG. 68.

Figure 70:
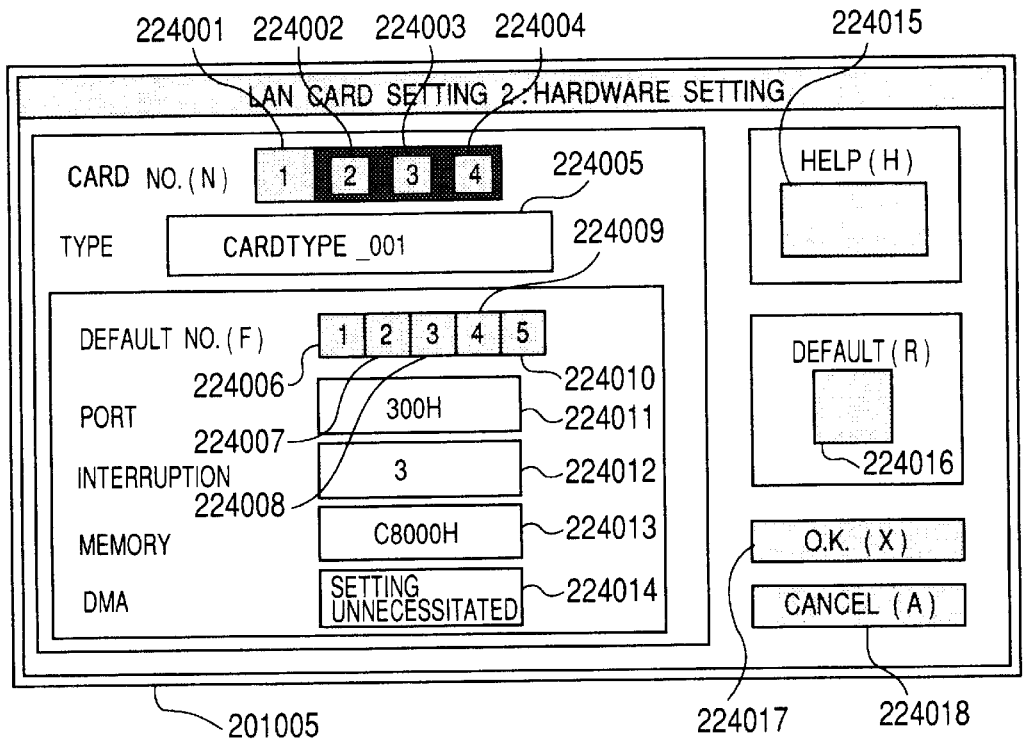
FIG. 70 is a diagram showing a window to set hardware for LAN cards.

FIG. 70 shows the screen layout of the window for setting LAN card hardware (201005). In this window, card numbers 224001 to 224004 have functions similar to those of the numbers 223001 to 223004 of FIG. 69. A type frame 224005 denotes a type of LAN card, namely, the type selected in the type frame 223005 of FIG. 69 is only displayed and cannot be changed by the user. The frame can be implemented, for example, by the static control of MS-Windows. Default numbers 224006 to 224010 are used to specify a combination of various parameters of LAN card hardware. When either one of five buttons is depressed, an I/O port number 224011, an interruption number 224012, a memory address 224013, and a DMA channel number 224014 are changed. The user depresses either one of the default number buttons to detect a default number for the hardware parameters of LAN cards, thereby setting the desired number. When there is missing a default number for the parameter values, the user sets a default value displaying the values most similar to those to be specified. In the description, the parameters are related to each other in the window such that the parameters are specified as a combination of the associated setting values. However, in a case where the respective parameters are completely independent of each other, there may be used, for example, a method in which each parameter value is selected in a combo boxes related thereto. A help button 224015 is almost the same in function as the help button shown in FIG. 67. A default button 224016, a O.K. button 224017, and a cancel button 224018 develop almost the same functions as the corresponding buttons of FIG. 68.

Figure 71:
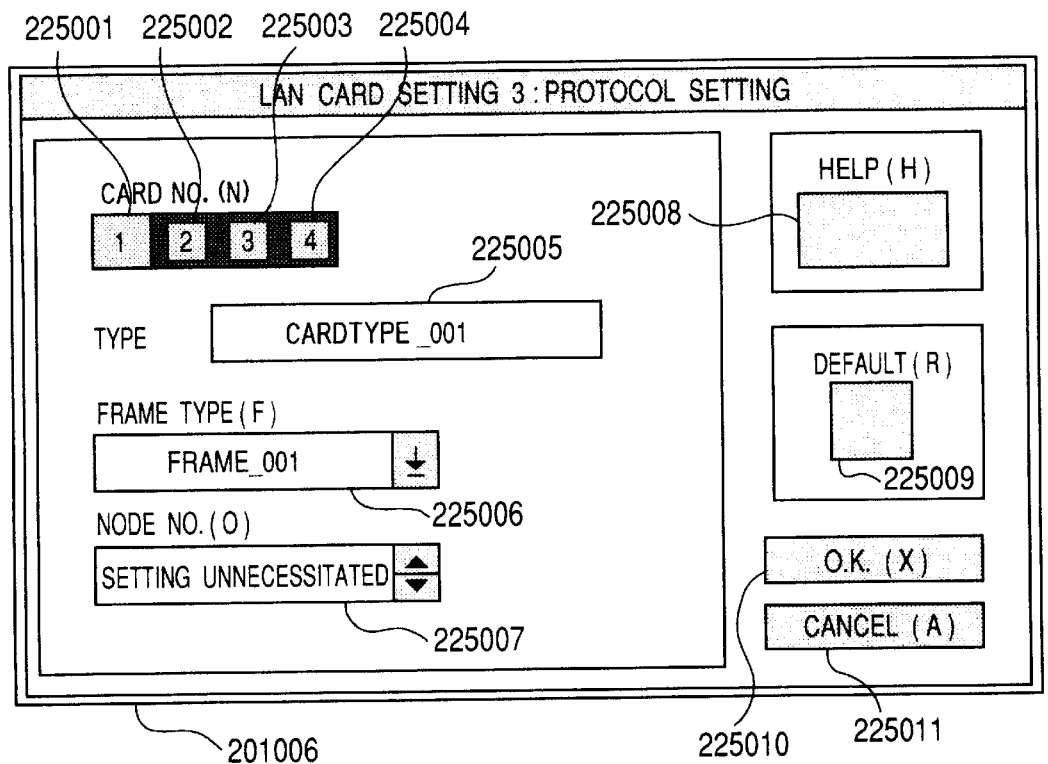
FIG. 71 is a diagram showing a window to set protocol for LAN cards.

FIG. 71 shows the screen structure of the window for setting protocol for LAN cards 201006. Card number buttons 225001 to 225004 are substantially identical to those of FIG. 69, whereas an LAN card type frame 225005 is almost the same as that of FIG. 70. A frame type box 225006 is used to select a frame type for communications and is implemented, for example, by a combo box. A node number frame 225007 is operated in a similar fashion as for the frame for setting the number of LAN cards of FIG. 66. In a case where the type of client machine does not require any node number, an indication of "Setting unnecessitated" is presented in this rectangle. A help button 225008 is almost the same in function as the help button shown in FIG. 67. A default button 225009, a O.K. button 225010, and a cancel button 225011 achieve almost the same functions as the corresponding buttons of FIG. 68.

The program of client install GUI conducts processing similar to that of the program of file server installer GUI and hence description thereof will be avoided.

Figure 72:
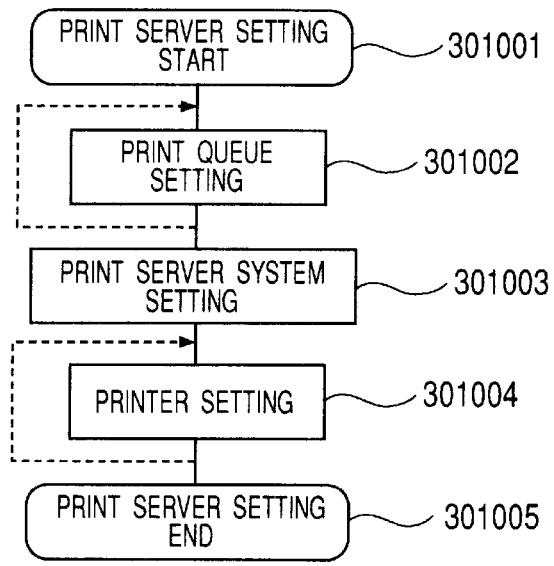
FIG. 72 is a diagram showing a print server setting process.

Referring now to FIG. 72, the following items will be described in detail.
1. Processing of parameter setting in installation of NetWare print server
2. Characteristics of processing of parameter setting of Item 1

In the installation of the NetWare print server, parameters are set as follows. After the processing is started in a step 301001, the user sets such parameters related to a print queue as a print queue name. Next, in a step 301003, parameters of a print server system such as a print server name are set. Finally, in a step 301004, parameters related to a printer such as a printer name are specified, thereby terminating the processing in a step 301005.

It is characteristic to the processing that the setting operation is sequentially conducted from the step 301001 to the step 301005. Moreover, any setting items cannot be skipped in the steps 301002 to 301004, for example, by using default values. In addition, a plurality of items may be set in the steps 301002 and 301004. In such a case, it is required to repeatedly set all parameters in the steps 301102 and 301004 through the associated processing routes indicated by broken lines in FIG. 72 as many times as there are the necessary items.

Figure 73:
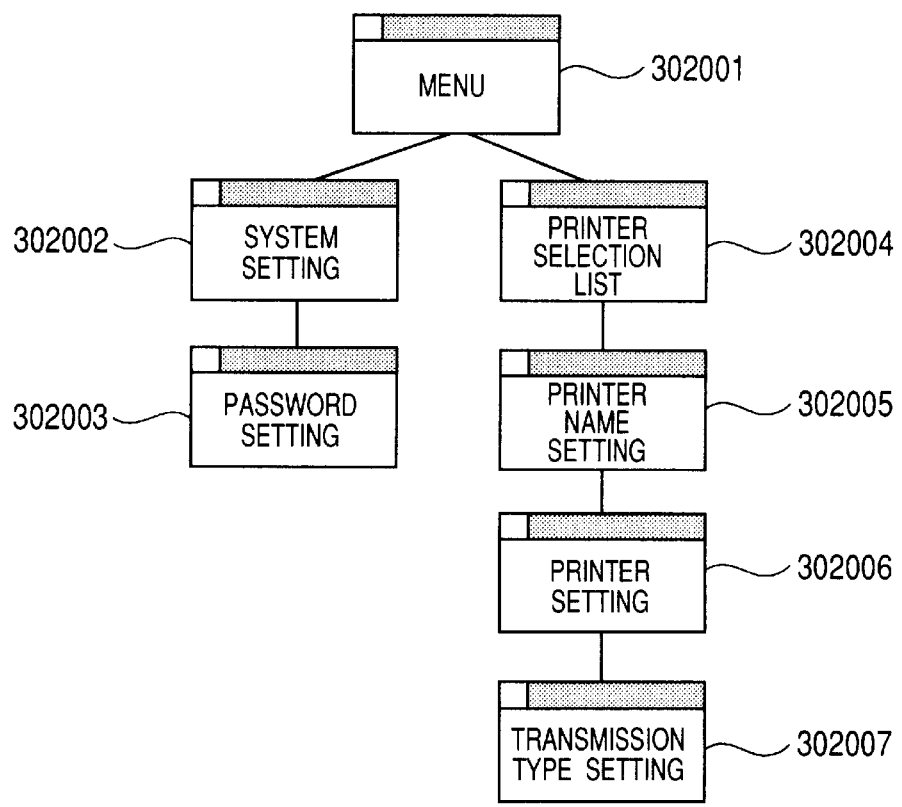
FIG. 73 is a diagram showing the construction of print server installer window.

Referring now to FIG. 73, the following items will be described in detail.
1. Window structure of printer server installer GUI
2. Relationships between windows and parameter setting operations of FIG. 72

In the GUI section of printer server installer, the setting operations of printer server installation shown in FIG. 72 are conducted in an interactive fashion by the GUI facilitating the setting operations through seven window screens 302001 to 302007 shown in FIG. 73.

A numeral 302001 indicates a menu window. The print server system setting and the printer setting sequentially achieved in the steps 301003 and 301004 of FIG. 72 are arranged to be independent of each other at an identical level. Control is transferred to each of the setting operations from the menu window 302001. In this connection, for the print queue setting step 301002 of FIG. 72, there is established a one-to-one correspondence between print queues and printers so that the print queues are automatically set with default values as many as there are printers to be installed.

Numerals 302002 and 302003 denote a system setting window and a password setting window, respectively. In these windows, there is accomplished the setting operation of the print server system, which is conducted in the step 301003 of FIG. 72.

Numerals 302004 to 302007 stand for a printer selection list window, a printer name setting window, a printer setting window, and a transmission type setting window. These windows are adopted to execute the printer setting operation conducted in the step 301004 of FIG. 72.

Figure 74:
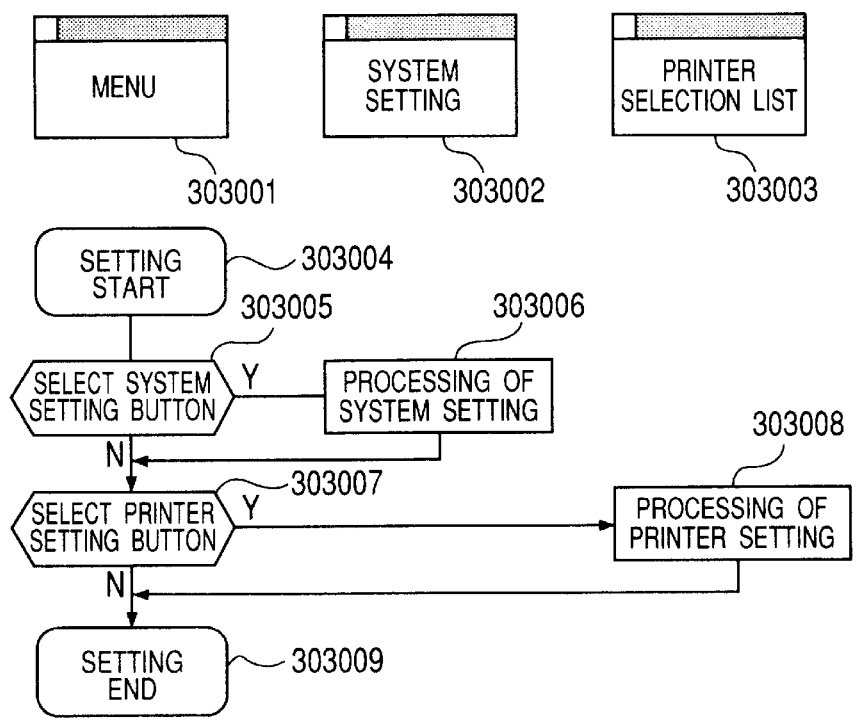
FIG. 74 is a diagram showing the processing to set the print server installer.

The following item will next be described by reference to FIG. 74.
1. Contents of processing of menu window setting A menu window 303001 presents an initial setting menu to initiate processing of print server system setting 303006 and processing of printer setting 303008. When the print server installer is initiated by the install manager, the operation of menu window 303001 is started to conduct the setting operation in a step 303004. When a system setting button is depressed in a step 303005, control is passed to the print server setting 303006 so as to open the system setting window 303002. In a step 303007, when a printer setting button is selected, control is transferred to the printer setting 303008 to open a window of printer selection list 303003. The setting processing is terminated in a step 303009.

Figure 75:
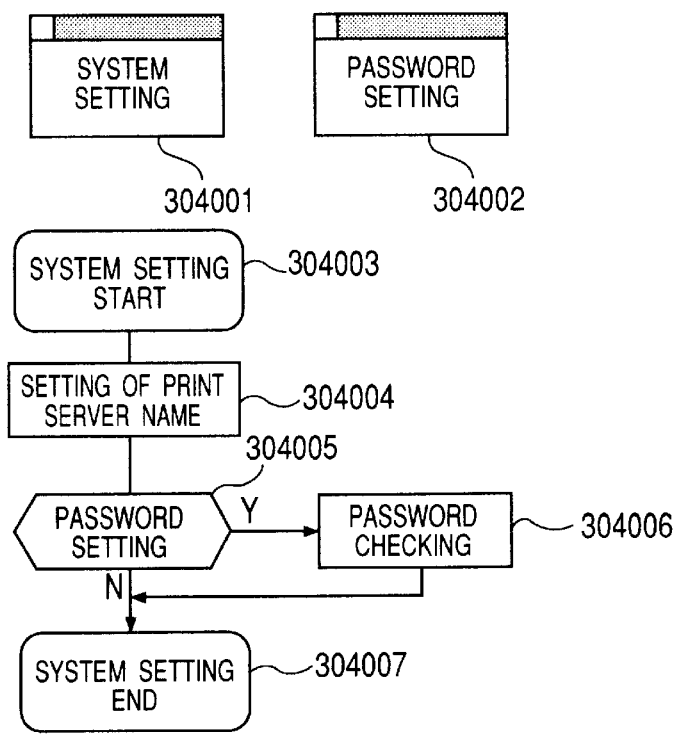
FIG. 75 is a diagram showing a system setting processing.

Referring now to FIG. 75, the following item will be described in detail.
1. Contents of processing to set print serve system The processing of setting print server system 303005 of FIG. 74 is executed as follows. When the system setting button is selected in the menu window, a system setting window 304001 is opened to start the setting operation in a step 304003. First, a printer server name is set in a step 304004 and then a print server password is specified in a step 304005 so as to open a password setting window 304002 to confirm the password in a step 304006, thereby finishing the setting operation in a step 304007.

Next, the following item will be described in detail by reference to FIG. 76.
1. Contents of printer setting operation The processing of printer setting operation 303008 of FIG. 74 is executed as follows. When the system setting button is selected in the menu window, a printer selection window 305001 is opened to start the setting operation in a step 305004. First, whether or not the printer list displayed in the window 305001 is in the selected state is judged in a step 305005.

When there does not exist any printer selected, only the new creation button is in the state for selection. In this state, when the new creation button is selected in a step 305006, control is transferred to a new creation setting 305007 to open a printer name setting window 305002.

On the other hand, when there exists a printer selected, the change/reference button, the name change button, the copy button, and the delete button are set to the state for selection. In this situation, four printer setting steps are executed as follows. When the change/reference button is selected in a step 305008, control is passed to a change/reference setting step 305009 to open a printer setting window 305003. When the name change button is activated in a step 305010, control is transferred to a name change operation 305011 to open the printer name setting window 305002. When the copy button is depressed in a step 304012, control is passed to a copy setting operation 305013 to open the printer name setting window 305002. When the delete button is activated in a step 305014, the setting of the selected printer is cancelled in a step 305015.

When the setting operation is finished, a check is made to decide whether or not the setting operation is again continued in a step 305016. If this is the case, control is returned to the step 305005 to repeatedly accomplish the same operation. In this connection, up to 16 printers can be set for a print server. If the setting operation is not desired to be continued, the printer setting operation is completed in a step 305017.

Next, by reference to FIG. 77, the following item will be described in detail.
1. Contents of processing of new creation setting The processing of new creation setting operation 305007 of FIG. 76 is executed as follows. When the new creation button is selected in the printer selection list window 305001, a printer name setting window 306001 is opened to start the setting operation in a step 306004. First, a new printer name is set in a step 306005.

In response thereto, a printer setting window 306002 is opened to set such items indispensable for the printer setting as a printer type name in a step 306006, a print form size 306007, a destination of printer connection 306008, a port type 306009, and a port number 306010. In addition, to specify detailed items in the printer setting operation, a transmission type button is selected in a step 306011 to open a transmission type setting window 306003. If the button is not activated, the setting operation is finished in a step 306019.

In the window 306003, there are set the following parameters, which are optionally specified in the printer setting operation, namely, an interruption level in a step 306012, a buffer size in a step 306013, a baudrate in a step 306014, a data bit in a step 306015, a stop bit in a step 306016, a parity in a step 306017, and the presence or absence of X control in a step 306018. Thereafter, like in the case where the selection of transmission type is not selected in the step 306011, the operation of new creation setting is terminated in the step 306019.

Figure 78:
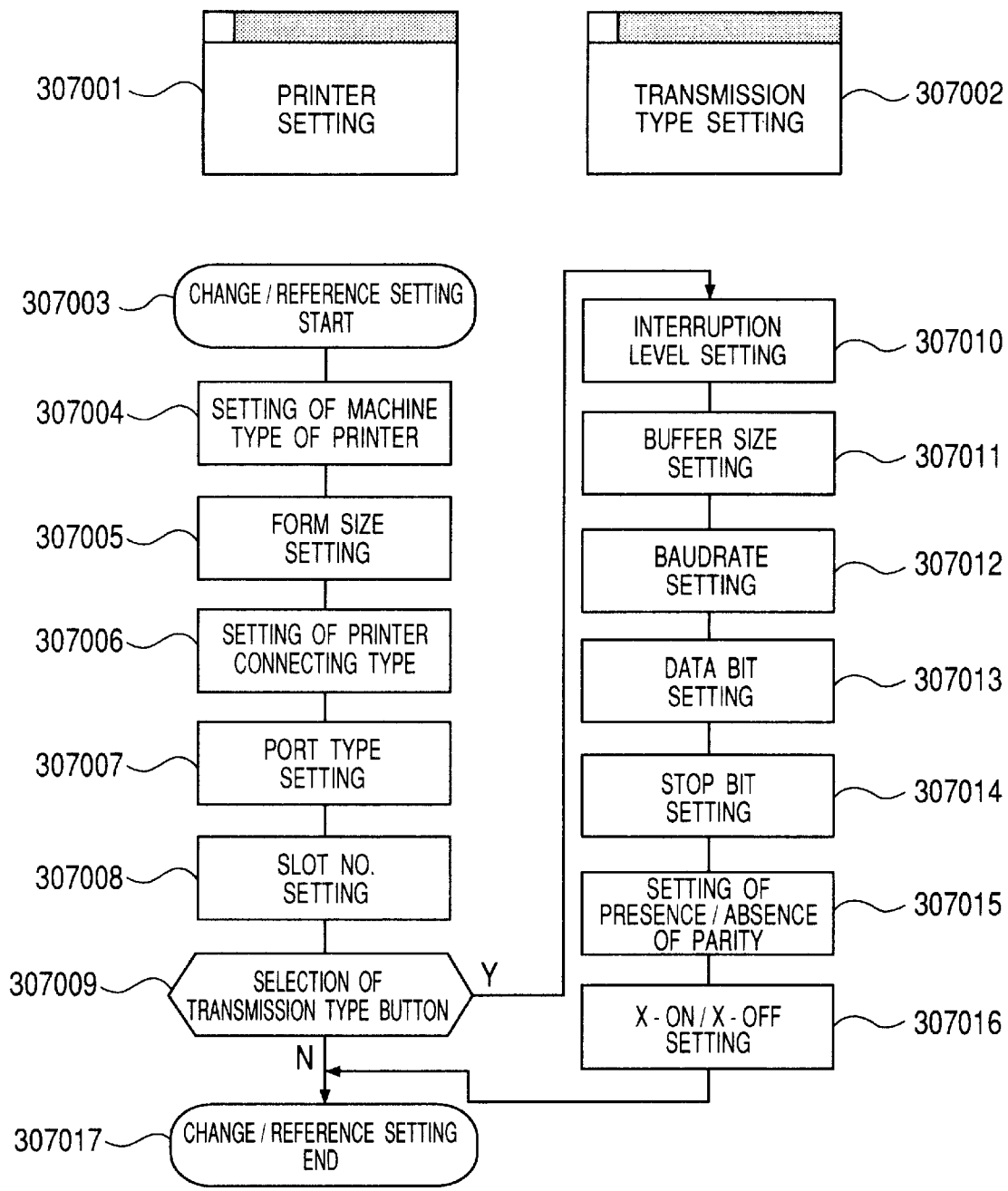
FIG. 78 is a diagram showing a change/reference setting processing.

Referring now to FIG. 78, the following item will be described in detail.

1. Contents of processing of change/reference setting operation

Figure 76:
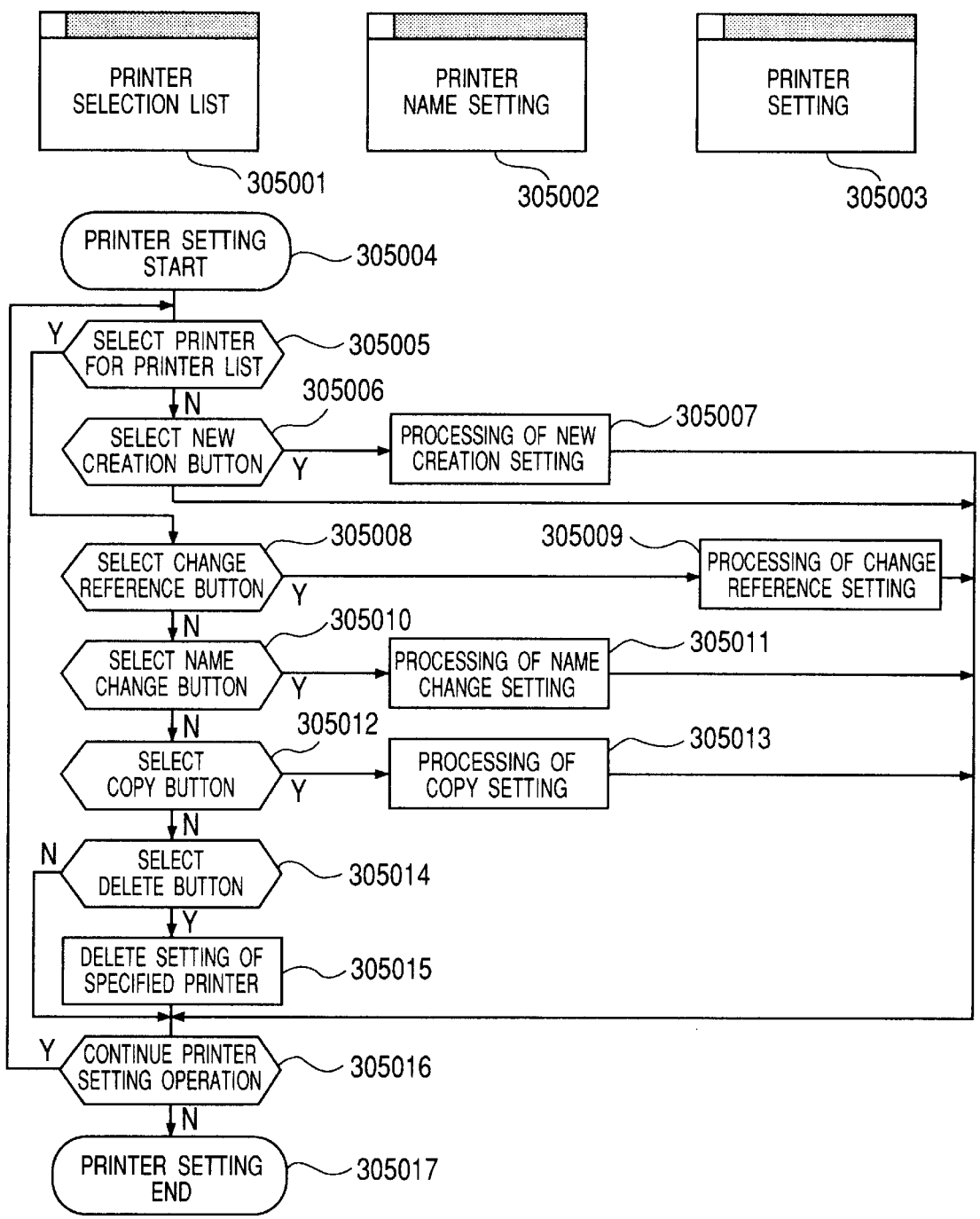
FIG. 76 is a diagram showing a printer setting processing.
Figure 77:
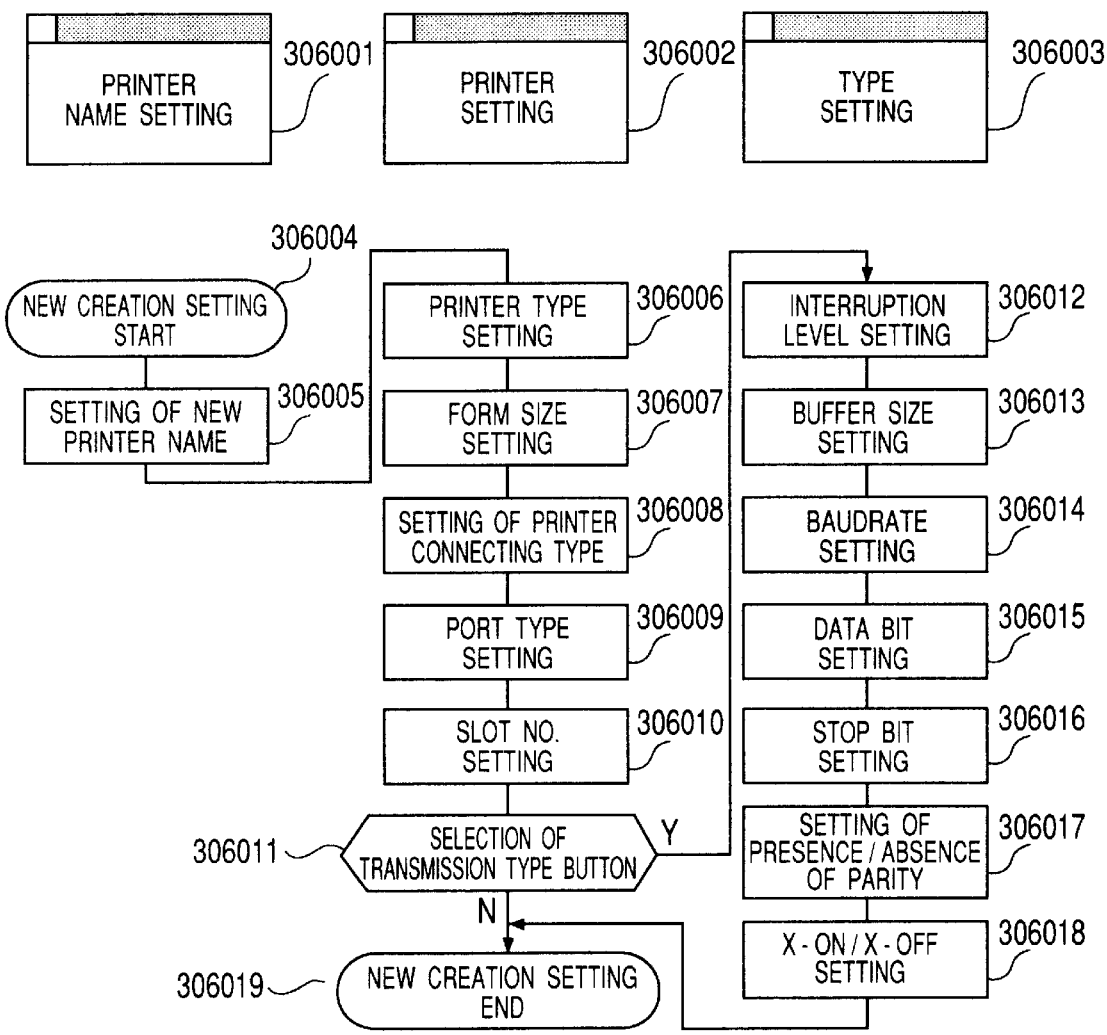
FIG. 77 is a diagram showing a new creation setting processing.

The processing of change/reference setting operation 305009 of FIG. 76 is executed as follows. When the change/reference button is selected in the printer selection list window 305001, a printer setting window 307001 of FIG. 78 is opened to start the setting operation in a step 307003.

In the window, there are set such items indispensable for the printer setting as a printer type name in a step 307004, a print form size 307005, a destination of printer connection 307006, and a port type 307008. In addition, to specify detailed items in the printer setting operation, a transmission type button is selected in a step 307009 to open a transmission type setting window 307002. If the button is not activated, the setting operation is finished in a step 307017.

In the window 307002, there are set the following parameters, which are selectively set in the printer setting operation, namely, an interruption level in a step 307010, a buffer size in a step 307011, a baudrate in a step 307012, a data bit 307013, a stop bit 307014, a parity in a step 307015, and the presence or absence of X control in a step 307016. Thereafter, like in the case where the selection of transmission type is not effected in the step 307009, the operation of new creation setting is terminated in the step 307017.

Figure 79:
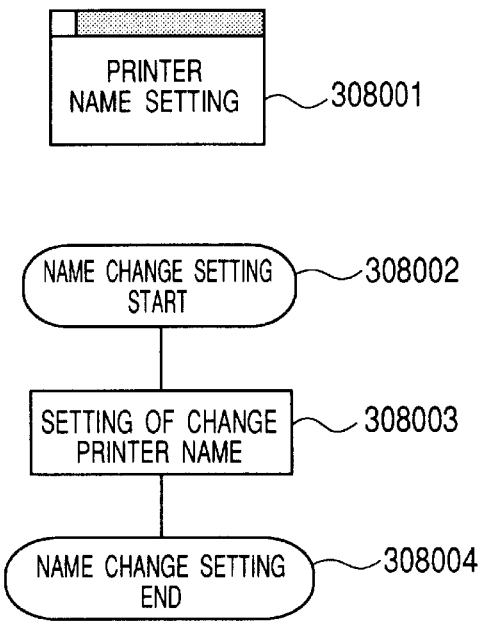
FIG. 79 is a diagram showing a name change setting processing.

Next, by reference to FIG. 79, the following item will be described in detail.

1. Contents of processing of name change setting

The processing of name change setting operation 305011 of FIG. 76 is executed as follows. When the name change button is selected in the printer selection list window, a printer name setting window 306001 is opened to start the setting operation in a step 308002. A change printer name is set in a step 308003 and then the setting operation is terminated in a step 308004. The change printer name cannot be identical to any one of the existing printer names presented in the printer selection list window. If such an identical name is specified, a warning message is displayed in the window.

Figure 80:
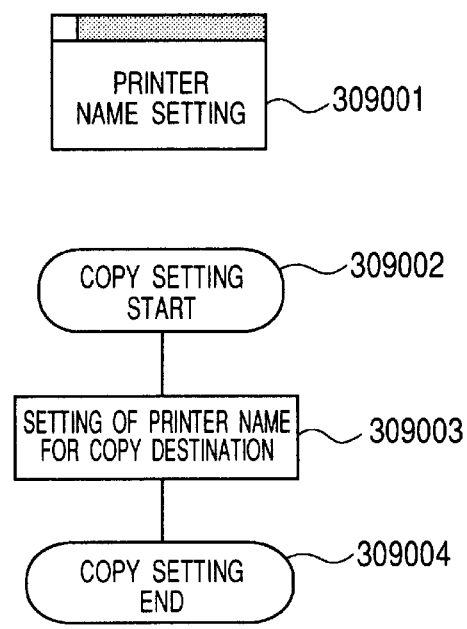
FIG. 80 is a diagram showing a copy setting processing.

Referring next to FIG. 80, the following item will be described in detail.

1. Contents of processing of copy setting operation

The processing of copy setting operation 305013 of FIG. 76 is executed as follows. When the copy button is selected in the printer selection list window, a printer name setting window 309001 of FIG. 80 is opened to start the setting operation in a step 309002. A copy printer name is set as an object of change in a step 309003 and then the setting operation is terminated in a step 309004. The copy printer name cannot be identical to any one of the existing printer names presented in the printer selection list window. If such an identical name is specified, a warning message is displayed in the window.

Next, by reference to FIG. 81, the following item will be described in detail.

1. Screen configuration and functions of menu window

A reference numeral 310001 denotes a menu window, which is opened when the print server installer is initiated by the install manager.

A frame 310002 presents a system menu in which there are displayed profile items such as a version number of print server installer and indication of copyright.

Figure 82:
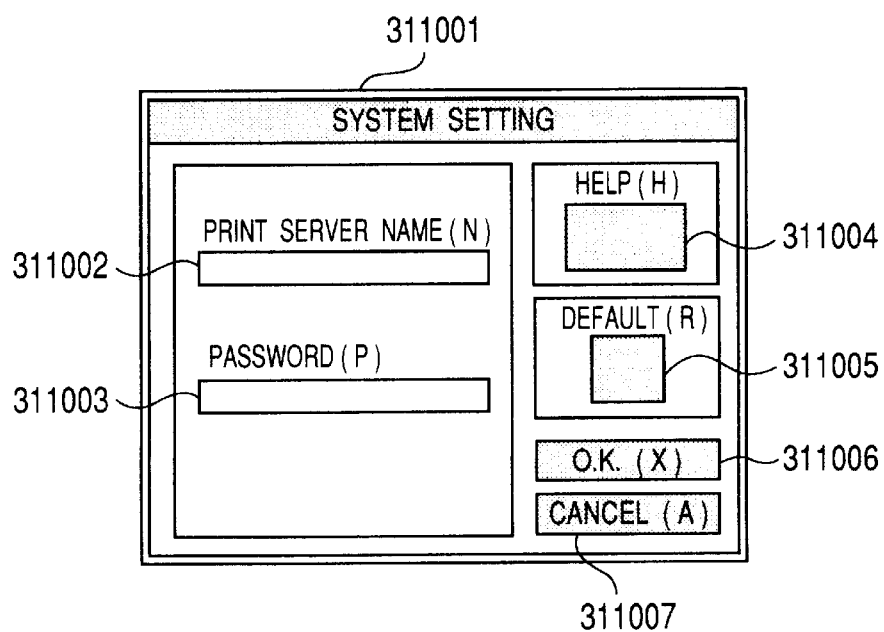
FIG. 82 is diagram showing a system setting window.

A numeral 310003 is a button to provide a function of print server setting operation. When the button is selected, a system setting window 311001 of FIG. 82 is opened. Using bit maps, graphic representation is supported for this button to improve operability thereof.

Figure 84:
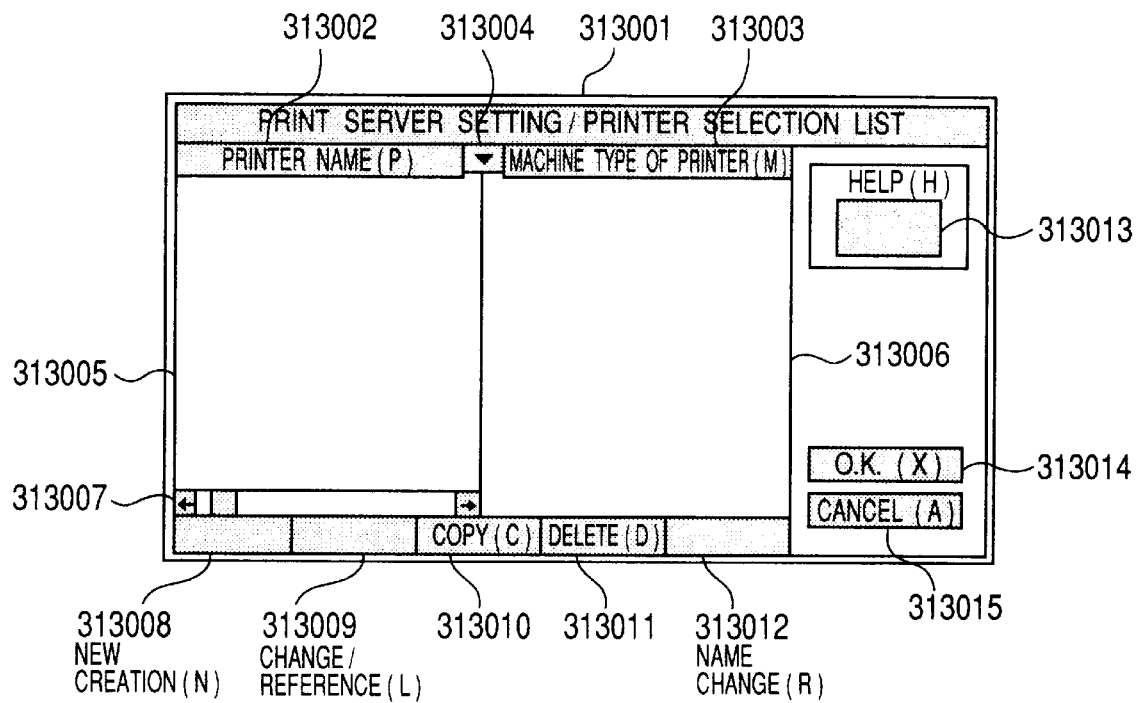
FIG. 84 is diagram showing a printer selection list window.

A numeral 310004 designates a button to provide a function of print server setting operation. When the button is selected, a printer selection list 313001 of FIG. 84 is opened. Using bit maps, graphic representation is supported for this button to improve operability thereof.

A numeral 310005 denotes a button to provide additional functions not supported in the present time such as processing to set a plurality of print queues, processing to set print server user, and processing to set print server operator. Using bit maps, graphic representation is supported for this button to improve operability thereof.

A numeral 310006 stands for a button to open a window in which operations, setting procedures, terms, etc. of windows of the print server installer are described. Using bit maps, graphic representation is supported for this button to improve operability thereof.

A numeral 310007 indicates a combo box to read the contents of parameter file for storing therein the setting values designated for a print server in advance and reference setting values incorporated in products in the system. To change setting values, the user selects a portion denoted by an arrow to display a list in a pop-up format so as to select a print server name therefrom. In response to the selection, a parameter load window is opened and control is passed to processing to read parameters. If the setting value read operation is not required, an indication "Basic values" is presented in the rectangle. If the values to be set are similar to the values thus obtained by the function, the user need only conduct a partial change thereof, thereby easily setting the parameter values.

Figure 98:
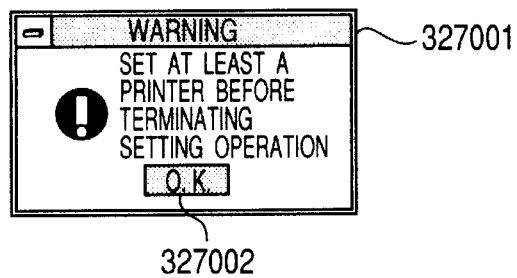
FIG. 98 is diagram showing a setting termination warning window.

A numeral 310008 designates a button to provide a function to save the setting values in the parameter file and to terminate the print server installer. When button is depressed, a setting end window is displayed to pass control, like in the case of termination of file server, to processing of parameter registration. If there has not been set any printer yet at the button selection, a setting end warning window 327001 of FIG. 98 is displayed.

Figure 88:
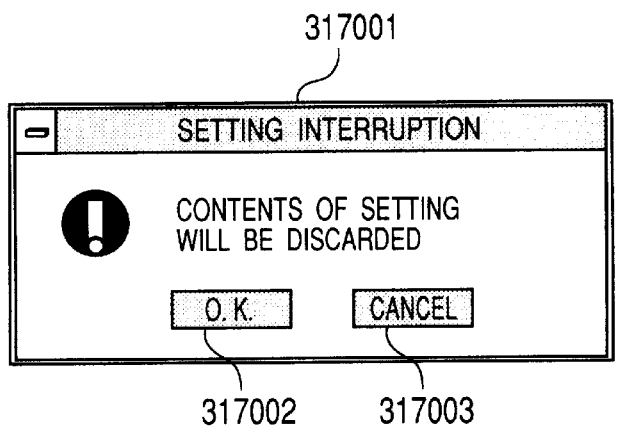
FIG. 88 is diagram showing a setting interruption window.

A numeral 310009 denotes a button to provide a function to discard the setting values and to end the print server installer. When the button is depressed, a setting interruption window 317001 of FIG. 88 is presented for confirmation of the user, thereby discarding the parameters and finishing the processing.

Referring next to FIG. 82, the following item will be described in detail.

1. Screen configuration and functions of system setting window

Figure 81:
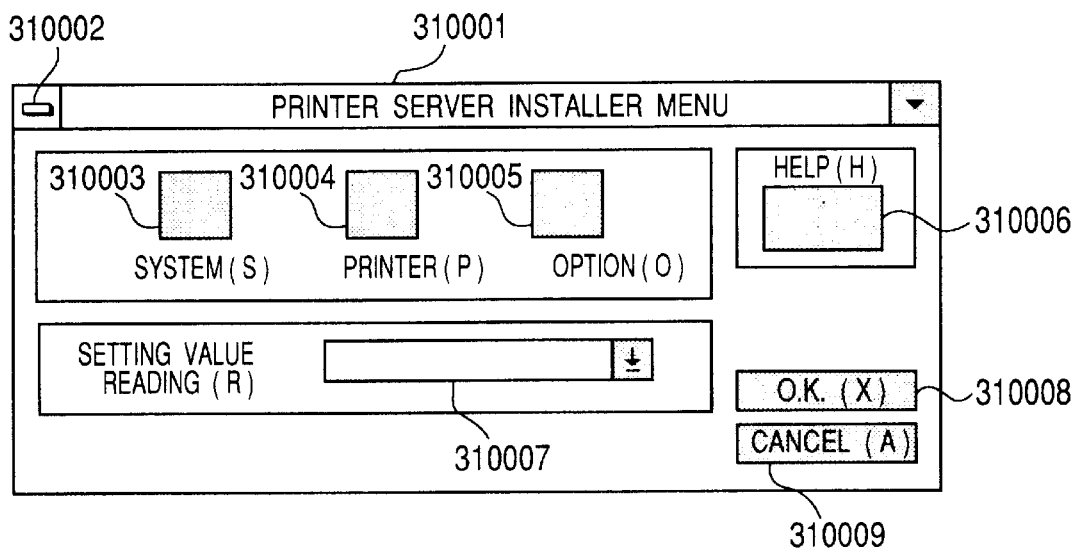
FIG. 81 is a diagram showing a menu window.

A reference numeral 311001 denotes a system setting window, which is opened when the system button 310003 is selected in the menu window 310001 shown in FIG. 81.

A numeral 311002 designates an edit control to set a print server name. The name is set with up to 47 alphanumeric characters for specification. When the setting value read step is not effected in the frame 310007 of FIG. 81, a default print server name "NWPSV01" is set in advance when the system setting window 311001 is initiated.

A numeral 311003 denotes an edit control to set a print server password. The name is set with up to 47 alphanumeric characters for specification. In response thereto, asterisks are displayed as many as there are the specified characters. After the input operation is completed, when an attempt is made to pass control to the other operation, there is presented a password setting window 312001 of FIG. 83 for confirmation of the password.

A numeral 311004 stands for a button to open a window in which operations, setting procedures, terms, etc. of windows of the print server installer are described. Using bit maps, graphic representation is supported for this button to improve operability thereof.

A numeral 311005 indicates a button to provide a function in which default values are set and are displayed for the print server name 311002 and the print server password 311003. Using bit maps, graphic representation is supported for this button to improve operability thereof.

A numeral 311006 indicates a button to provide a function in which the window 311001 is closed with the setting values kept remained and the processing of print server system setting operation is terminated. When the button is activated, control is returned to the menu window 310001 of FIG. 81.

A numeral 311007 indicates a button to provide a function in which the setting values are discarded, the window 311001 is closed, and the processing of print server system setting operation is terminated. When the button is selected, a setting interruption window 317001 of FIG. 88 is displayed for confirmation of the user.

By reference to FIG. 83, the following item will now be described in detail.

1. Screen configuration and functions of password setting window

A reference numeral 312001 denotes a password setting window, which is opened before control is passed to another operation when the password 311003 is set in the system setting window 311001 of FIG. 82.

A numeral 312002 denotes an edit control to set a password. The name is designated with up to 47 alphanumeric characters for specification. In response thereto, asterisks are displayed as many as there are the specified characters.

Figure 91:
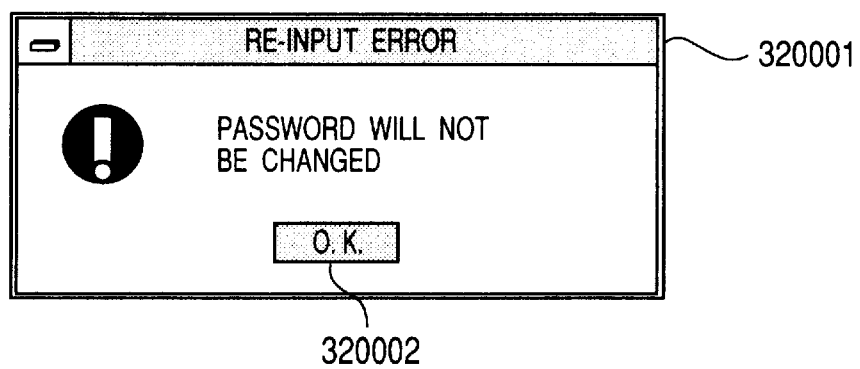
FIG. 91 is diagram showing a re-input error window.

A numeral 312003 indicates a button to provide a function in which the password confirmation is terminated and the window 312001 is closed. When this button is activated and the password confirmed in the frame 312002 is identical to that inputted in the frame 311003 of FIG. 82, the value of password is saved and then control is returned to the window 311001 of FIG. 82. On the other hand, if the passwords are different from each other, a re-input error window 320001 of FIG. 91 is displayed and then control is returned to the window 311001 of FIG. 82 without saving the password value.

Figure 89:
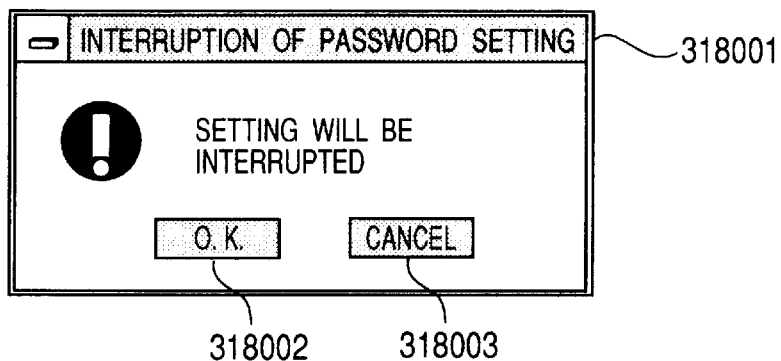
FIG. 89 is diagram showing a password setting interruption window.

A numeral 312004 indicates a button to provide a function in which the setting values are discarded and the window 312001 is closed. When the button is selected, a setting interruption window 318001 of FIG. 89 is displayed for confirmation of the user. Next, the re-input error window 320001 of FIG. 91 is displayed and then control is returned to the window 311001 of FIG. 82. In this operation, the display of the password inputted in the rectangle 311003 is restored to the state presented prior to the input operation.

By reference to FIG. 84, the following item will now be described in detail.

1. Screen configuration and functions of printer selection list window

A reference numeral 313001 denotes a printer selection list window, which is opened when a print button 310004 is activated in the menu window 310001 of FIG. 81.

A numeral 313002 designates a sort selection button. When the button is selected, the items of printer name list in a frame 313005 are arranged in a sorting order of ASCII characters as denoted by an arrow 313004. Moreover, since there exists a one-to-one correspondence between a printer type list 313006 and the printer names 313005, the items of the type list 313006 are also arranged according to the sequence of printer names.

A numeral 313003 indicates a button to select items to be sorted. When the button is depressed, the items of printer type list in the frame 313006 are arranged in a sorting order of ASCII characters as denoted by the arrow 313004. When there exit rearranged items having an identical type, these items are sorted according to the printer names thereof. Moreover, since there exists a one-to-one correspondence between the printer name list 313005 and the printer types in the frame 313006, the items of the name list 313005 are also arranged according to the sequence of printer types.

The button 313004 is used to select the sorting order. Each time the button is depressed, the arrow or triangle drawn in the button changes the direction thereof like a toggle switch, namely, the upward or downward direction is alternately presented. The upward direction indicates sorting in a descending order (reverse to the indication 313004), whereas the downward direction designates sorting in an ascending order (as shown by the indication 313004). For each selection thereof, the printer name list 313005 and the printer type list 313006 are re-arranged. Either the printer name button 313002 or the printer type button 313003 which is last activated before the operation of the sorting direction button 313004 designates the objective items, namely, the printer names or printer types to be sorted.

The list box 313005 is used to present therein a list of printer names of printers already set. The list may contain the names for up to 16 printers. The printer name of a printer is represented by up to 47 characters. Characters of the name exceeding the limit can be presented by horizontally scrolling the list by use of a horizontal scroll bar 313007. In the operation, when there exists a short printer name which may be set to a position outside the screen by the scrolling, the last character thereof is kept remained in the list, thereby notifying the name to the user. Moreover, the user may select printer names such that the selected names are displayed in the reverse display mode together with the associated printer types in the list 313006. When the setting value reading is not achieved in the frame 310007 of FIG. 81, a default printer name "PRINTER01" is displayed when the window 313001 is opened.

The list box 313006 is disposed to present a list of machine types of printers beforehand set. The list may contain the types for up to 16 printers. The printer name of a printer is represented by up to 18 characters. Moreover, the user may select printer types such that the selected items are displayed in the reverse display mode together with the associated printer names in the list 313005. When the setting value reading is not achieved in the frame 310007 of FIG. 81, a default printer type displayed when the window 313001 is opened.

The horizontal scroll bar 313007 is disposed in association with the printer name list 313005. When a printer name exceeds the display limit in the list 313005, the bar 313007 is operated to horizontally scrolling the list so as to confirm the remaining portion of the name. As above, where there exists a short printer name which may be concealed due to the scrolling, the last character of the name is kept remained in the list, thereby notifying the name to the user.

Figure 85:
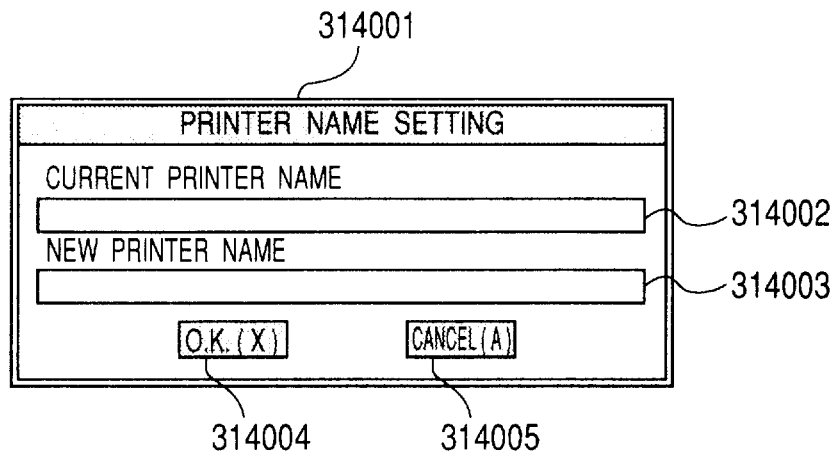
FIG. 85 is diagram showing a printer name setting window.

A numeral 313008 denotes a button to provide a function of the processing of new creation setting in the printer setting operation. The button is set to an invalid display state in a halftone when the list 313006 is selected or when all of 16 printers are already set. That is, when the number of printers set is less than 16 and the printer selection is not being conducted in the list 313006, the button 313008 is effected and hence can be selected. When the button is activated, a printer name setting window 314001 of FIG. 85 is opened.

Figure 86:
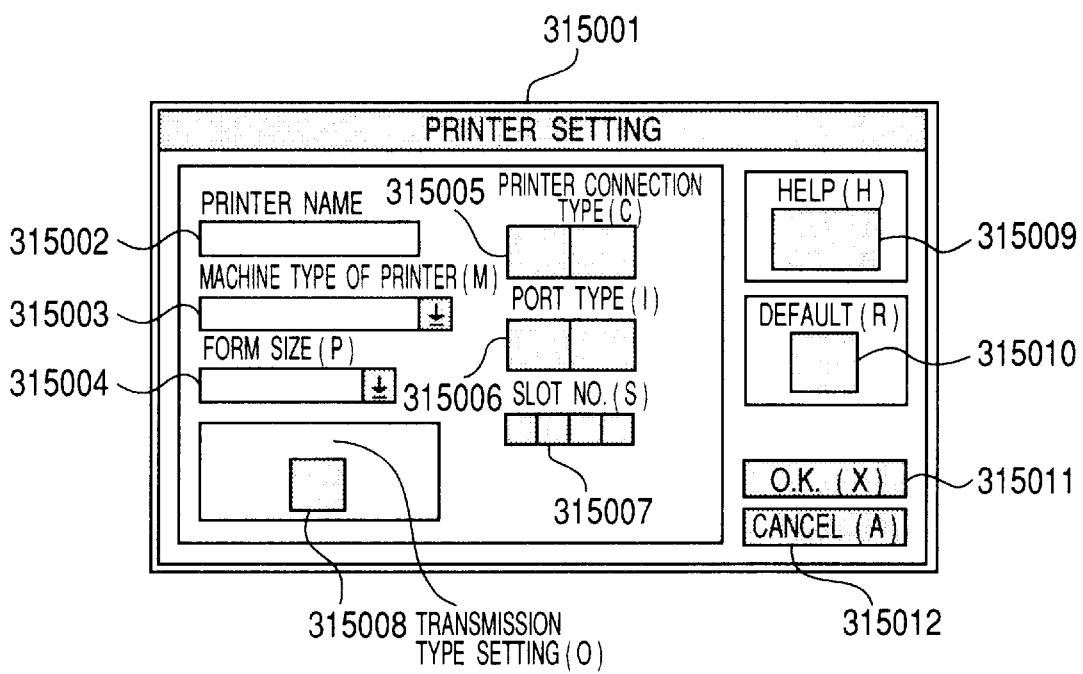
FIG. 86 is diagram showing a printer setting window.

A numeral 313009 stands for a button providing a function of processing of change/reference setting in the printer setting operation. The button is valid and hence can be selected when the lists 313005 and 313006 are selected. On the other hand, when these lists are not selected, the button is displayed in an invalid state in a halftone and hence cannot be selected. When the button is activated, a printer setting window 315001 of FIG. 86 is opened. When a plurality of printers are selected in the lists 313005 and 313006, the change/reference setting operation is repeatedly conducted for the selected printers in a sequential manner beginning from an item having the smallest sequential number in the list. Namely, when the change/reference setting operation is conducted for a printer, control is passed to the same operation for the subsequent printer until the operation is completely achieved for all printers specified.

Figure 95:
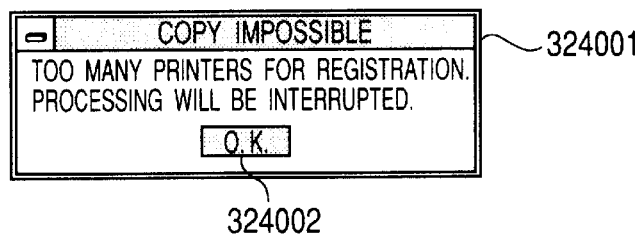
FIG. 95 is diagram showing a copy disabled window.

A numeral 313010 denotes a button providing a function of copy setting operation in the printer setting operation. The button is valid and hence can be selected when the lists 313005 and 313006 are selected. On the other hand, when these lists are not selected, the button is displayed in an invalid state in a halftone and hence cannot be selected. When the button is activated, the printer name setting window 314001 of FIG. 85 is opened. Moreover, when a plurality of printers are selected in the lists 313005 and 313006, the copy setting operation is repeatedly conducted for the selected printers in a sequential manner beginning from an item having the least sequential number in the list. Namely, when the change/reference setting operation is conducted for a printer, control is passed to the same operation for the subsequent printer until the operation is completely achieved for all printers selected. In addition, since up to 16 printers can be set for a print server, if an attempt is made to conduct the copy setting operation for more than 16 printers, a copy impossible window 324001 of FIG. 95 is displayed to notify a message of an illegal setting to the user, thereby interrupting the setting operation. If the number of printers exceeds 16 in the copy setting, the window of illegal setting message is displayed in the copy setting for the 17th printer and then the processing is interrupted.

Figure 96:
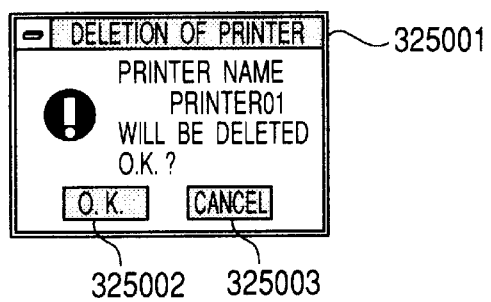
FIG. 96 is diagram showing a printer deletion window.

A numeral 313011 designates a button providing a function of deletion in the printer setting operation. The button is valid and hence can be selected when the lists 313005 and 313006 are selected. On the other hand, when these lists are not selected, the button is displayed in an invalid state in a halftone and hence cannot be selected. When the button is activated, a printer deletion window 325001 of FIG. 96 is opened to delete printers selected in the list 313005 and 313006. Moreover, when a plurality of printers are selected in the lists 313005 and 313006, the delete operation is repeatedly conducted for the selected printers in a successive manner beginning from an item having the least sequential number in the list. Namely, when the change/reference setting operation is conducted for a printer, control is passed to the same operation for the subsequent printer until the operation is completely achieved for all printers selected.

A numeral 313012 designates a button providing a function of name change setting in the printer setting operation. The button is valid and hence can be selected when the lists 313005 and 313006 are selected. On the other hand, when these lists are not selected, the button is displayed in an invalid state in a halftone and hence cannot be selected. When the button is activated, the printer name setting window 314001 of FIG. 85 is opened. Moreover, when a plurality of printers are selected in the lists 313005 and 313006, the pertinent operation is repeatedly conducted for the selected printers in a sequential manner beginning from an item having the smallest sequential number in the list. Namely, when the name change setting operation is conducted for a printer, control is passed to the same operation for the subsequent printer until the operation is completely achieved for all printers selected.

A numeral 313013 denotes a button to initiate a window in which operations, setting procedures, terms, etc. of the respective windows of the print server installer are described. Using bit maps, a graphic presentation is provided for the button, thereby improving operability thereof.

A numeral 313014 stands for a button providing a function in which the window 313001 is closed with the setting values kept remained, thereby terminating the printer setting operation. When the button is selected, control is returned to the menu window 310001 of FIG. 81.

A numeral 313015 stands for a button providing a function in which the setting values are discarded, the window 313001 is closed, thereby terminating the printer setting operation. When the button is selected, the setting interruption window 317001 of FIG. 88 is displayed for confirmation of the user.

By reference to FIG. 85, the following item will now be described in detail.

1. Screen configuration and functions of printer name setting window

A reference numeral 314001 denotes a printer name setting window, which is opened when the new creation button 313008, the copy button 313010, or the name change button 313012 is selected in the window 313001 of FIG. 84 to set a new creation printer name, a copy destination printer name, or a new (change result) printer name, respectively.

A numeral 314002 designates a static control for displaying a default printer name, a source printer name, and a current printer name. Each name is presented with up to 47 alphanumeric characters as follows. In the new creation setting, "PRINTERxx" is used, wherein xx ranges from 01 to 16. For the value of xx, there is selected the least value from the values not used, namely, not displayed in the printer list 313005 of FIG. 84. In the copy and name change operations, there is displayed a printer name selected in the list 313005 or 313006 of FIG. 84. Moreover, the caption display ("Current printer name" in the diagram) above the static control 314002 varies depending on the setting operations. Namely, in the new creation, copy, and name change operations, there are presented "Default new creation printer name", "Copy source printer name", and "Current printer name", respectively.

A numeral 314003 stands for an edit control to set a new creation printer name, a copy destination printer name, and a new (change result) printer name. The name is represented with up to 47 alphanumeric characters. A default printer name is displayed as "PRINTERxx" in which xx ranging from 01 to 16. For the value of xx, there is selected the least value from the values not used, namely, not displayed in the printer list 313005 of FIG. 84. Moreover, the caption display ("New printer name" in the diagram) above the edit control 314003 varies depending on the setting operations. Namely, in the new creation, copy, and name change operations, there are presented "New creation printer name", "Copy destination printer name", and "New printer name", respectively.

A numeral 314004 indicates a button to provide a function in which the printer name setting is terminated and the window 314001 is closed. When the button is selected in the new creation setting, the values of printer names are saved and control is passed to the printer setting window 315001 of FIG. 86. When the button is selected in the copy or name change setting operation, the processing is achieved as follows. Determining whether or not a plurality of printers are selected in the lists 313005 or 313006 of FIG. 84. Even if this is the case, when the setting operation is to be achieved for the final printer selected, the printer names are saved and control is passed to the printer selection list window 313003 of FIG. 84. In other cases, namely, in other than the case where a plurality of printers are selected and the setting operation is conducted for other than the final printer specified, the printer names are saves and the printer name setting window 314001 is again displayed. Moreover, if a printer name set is already existing, a warning message window is displayed in the subsequent processing to notify the condition to the user. In the new creation, copy, and name change operations, there are displayed a new creation interruption window 321001 of FIG. 92, a copy interruption window 322001 of FIG. 93, and a name change interruption window 323001 of FIG. 94, respectively. In each of these windows, the associated processing is interrupted. When "O.K." is selected, the pertinent processing is aborted and the printer names set are discarded.

Figure 90:
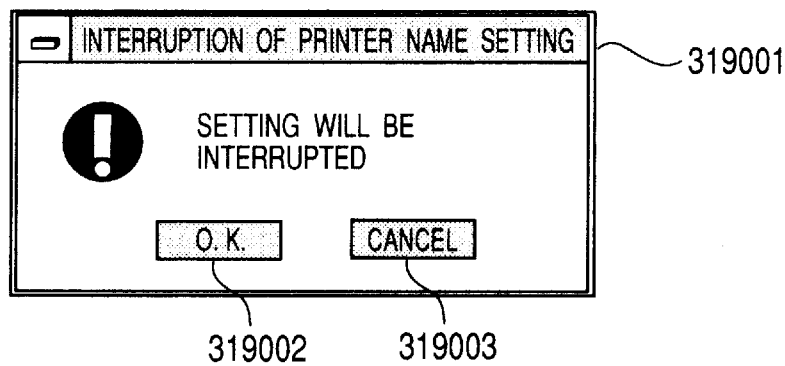
FIG. 90 is diagram showing a printer name setting interruption window.

A numeral 314005 denotes a button to provide a function in which the setting values are discarded and the window 314001 is closed. When the button is selected in the new creation setting, a setting interruption window 319001 of FIG. 90 is displayed for confirmation of the user and then control is passed to the printer selection list window 313001 of FIG. 84. When the button is selected in the copy or name change setting operation, the processing is achieved as follows. It is determined whether or not a plurality of printers are selected in the lists 313005 or 313006 of FIG. 84. Even if this is the case, when the setting operation is to be achieved for the final printer selected, the printer names are discarded and the setting interruption window 319001 of FIG. 90 is displayed for confirmation of the user so as to return control to the window 313001 of FIG. 84. In other cases, namely, in other than the case where a plurality of printers are selected and the setting operation is conducted for other than the final printer specified, the printer names are discarded and the setting interruption window 319001 of FIG. 90 is displayed for confirmation of the user, thereby presenting again the printer name setting window 314001. For the selected printers, the associated setting operations are repeatedly conducted.

Referring next to FIG. 86, the following item will be described in detail.

1. Screen configuration and functions of printer setting window

A reference numeral 315001 denotes a printer setting window, which is opened in the following cases. The first case is as follows. After the new creation button 313008 is selected in the window 313001 of FIG. 84, when a printer name other than the existing printer names is set in the edit control 314003 of the window 314001 of FIG. 85 and the. "O.K." button 314004 is activated the window 315001 is displayed to set printer parameters other than the printer name. The second case occurs as follows. When the change/reference button is selected in the window 313001 of FIG. 84, the window 315001 is displayed to set printer parameters other than the printer name. In this window, the printer parameters indispensable for the printer setting operation are specified. The other parameters are set in a transmission type setting window in the subsequent layer of the system.

A numeral 315002 indicates a static control to display a printer name being currently set.

A numeral 315003 designates a combo box to set a printer type being currently set. The setting change is indicated by selecting an arrow portion on the right of the combo box. A printer type is selected from a list presented in a pop-up format. A total of six kinds of lists are available. The number thereof may be increased in the future. A default printer type is presented in the box 315003.

A numeral 315004 stands for a combo box to set a print form size of the printer being currently set. The setting change is achieved by selecting an item from a list presented in a pop-up format in response to selection of an arrow portion on the right of the combo box. Two kinds of form sizes "A4" and "B5" (JIS) are available. The number thereof may possibly be increased in the future. A default form size "A4" is presented in the box 315003.

A numeral 315005 denotes a selection button to set a connection destination of the printer being currently set in the network. Of two elements, when either one thereof is selected to the depressed or ON state, the remaining one is associatively set to the state not depressed, namely, the OFF state. The user can set one of two destinations for connection, which are a "local" connection for a direct connection to a print server machine and a "remote" connection for a connection via a client machine. The "local" connection is set as the default value. Moreover, using bit maps, a graphic presentation is provided for the button 315005, thereby improving operability thereof.

A numeral 315006 designates a selection button to set a cable form, namely, a port type for connection of the pertinent cable. When either one of the two elements thereof is selected to the depressed (ON) state, the remaining one is associatively set to the state not depressed, namely, the OFF state. The user can set one of two port types including the parallel and serial ports. The parallel port is set (to ON) as the default value. The port type depends on printer types and hence is uniquely determined as a parallel or serial port according to the selection of the machine type of printer in some cases. In such a case, the port type need not be selected and these button elements are set to the invalid state. In this case, only the parallel port is available for the default printer type and hence these buttons are set to be invalid. Moreover, since the port type parameter depends on printer types, when a default button 315010 is depressed after the printer type is altered in a box 315002, there is necessarily designated the default value in association with the printer type. In addition, using bit maps, a graphic presentation is provided for the button 315006, thereby improving operability thereof.

Figure 97:
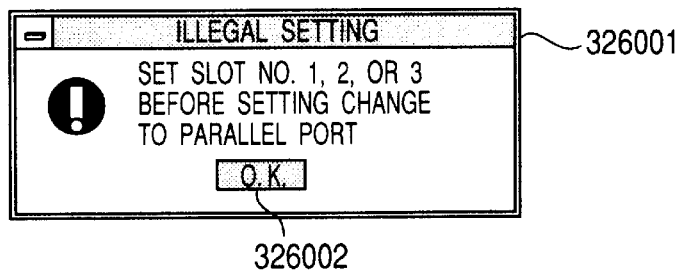
FIG. 97 is diagram showing an illegal setting window.

A numeral 315007 stands for a selection button to set a slot number of connection port for the pertinent cable. When either one of the four elements thereof is selected to the depressed (ON) state, the remaining ones are associatively set to the state not depressed, namely, the OFF state. The user can set slot numbers "1", "2" and "3" for the parallel port and "1", "2", "3" and "4" for the serial port. For both ports, the slot number 1 is set to ON as the default value. When the port type is set to "parallel", the slot number "4" button element is set to the invalid state for the reason that the slot number parameter depends on the port types. In this regard, when the port type is varies from "serial" to "parallel" in the case where the slot number is set to four, the illegal setting window 326001 of FIG. 97 is displayed to notify a warning message to the user. Moreover, since this parameter depends on printer types, when the default button 315010 is depressed after the printer type is altered in the frame 315002, there is accordingly set the default value in association with the printer type. Furthermore, using bit maps, a graphic presentation is provided for the button 315007, thereby improving operability thereof.

Figure 87:
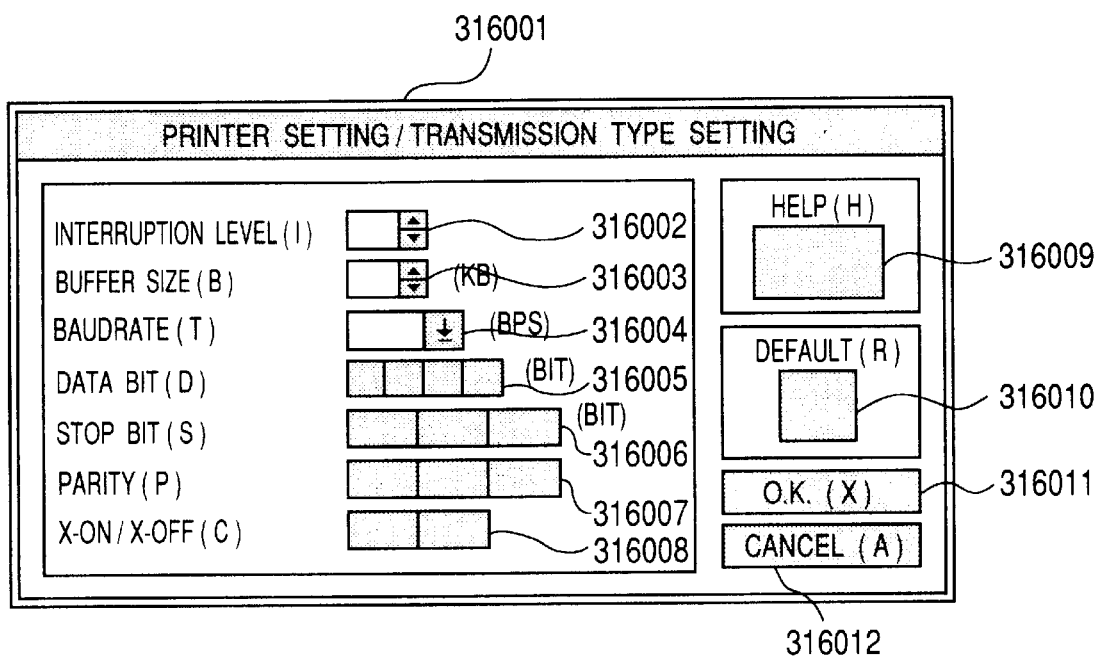
FIG. 87 is diagram showing a transmission type setting window.

A numeral 315008 denotes a transmission type setting button in association with a subsequent layer to set further detailed parameters of the printer for the setting operation. When this button is selected, the transmission type setting window 316001 of FIG. 87 is opened. In addition, using bit maps, a graphic presentation is provided for the button 315008, thereby improving operability thereof.

A numeral 315009 indicates a button to initiate a window in which operations, setting procedures, terms, etc. of the respective windows of printer server installer are described. Furthermore, there are used bit maps for this button 315009 to provide a graphic presentation, thereby improving operability thereof.

A numeral 315010 designates a button to provide a function in which the default values of setting values respectively of the printer size 315004, the printer connecting destination 315005, the port type 315006, the slot number 315008, and the parameters of the window 316001 of FIG. 87 are set according to the printer type 315003. Moreover, using a bit map design, a graphic presentation is provided for the button 315008, thereby improving operability thereof.

A numeral 315011 is a button to provide a function to finish the new creation and change/reference setting operations so as to close the window 314001. When the button is depressed in the new creation setting, the printer parameters are saved and control is passed to the printer selection list window 313001 of FIG. 84. In the change/reference setting operation, when the button is selected, the operation is achieved as follows. Whether or not a plurality of printers are selected in the printer name list 313005 or the printer type list 313006 of FIG. 84 is first determined. Even when this is the case, if the setting operation is to be conducted for the final printer specified, the printer parameter values are saved and control is passed to the window 313001 of FIG. 84. In other cases, namely, when a plurality of printers are selected and the setting operation is to be achieved for other than the final printer specified, the printer parameter values are saved and control is passed to the window 315001 again. For the next printer selected, the change/reference setting operation is to be accomplished in the window 315001.

A numeral 315012 is a button to provide a function in which the setting values are discarded and the window 315001 is closed. When the button is activated in the new creation setting, the setting interruption window 317001 of FIG. 88 is displayed for confirmation of the user and control is transferred to the window 313001 of FIG. 84. In the change/reference setting operation, when the button is selected, the operation is achieved as follows. Whether or not a plurality of printers are selected in the printer name list 313005 or the printer type list 313006 of FIG. 84 is first determined. Even when this is the case, if the setting operation is to be conducted for the final printer specified, the printer parameters are discarded and the setting interruption window 319001 of FIG. 90 is displayed for confirmation of the user and control is transferred to the window 313001 of FIG. 84. In other cases, namely, when a plurality of printers are selected and the setting operation is to be achieved for other than the final printer specified, the printer name is discarded and the setting interruption window 317001 of FIG. 88 is displayed for confirmation of the user, thereby presenting the window 313001 of FIG. 84. For the next printer selected, the change/reference setting operation is to be accomplished in the window 315001.

Next by reference to FIG. 86, the following item will be described in detail.

1. Screen configuration and functions of transmission type setting window

A reference numeral 316001 denotes a transmission type setting window, which is opened when the transmission type button 315008 is selected in the window 315001 of FIG. 86. In this window, the printer parameters other than those indispensable for the printer setting operation are specified. The other indispensable parameters are set in a transmission type setting window in the preceding layer of the system.

A numeral 316002 indicates an edit control to set a logical interruption level for the printer being currently set. The value may be set through either one of two operations. Using the upward and downward buttons as indicated by triangular marks on the right of the control, when the upward or down button is depressed the value is increased or decreased, respectively. Alternatively, the value may be directly inputted from the keyboard to the edit control. The default value varies depending on the printer type 315003 of FIG. 86. In addition, the value of interruption level is fixed for some printer types. In this situation, the edit control is displayed as an invalid unit. Specifically, when the printer type is designated by the default value, the value of interruption level is set to "7".

A numeral 316003 designates an edit control to set a buffer size of the pertinent printer. The value may be set through either one of two operations. Using the upward and downward buttons as indicated by triangular marks on the right of the control, when the upward or down button is depressed the value is increased or decreased, respectively. Alternatively, the value may be directly inputted from the keyboard to the edit control. The default value varies depending on the printer type 315003 of FIG. 86. In this connection, when the printer type is designated by the default value, the value of interruption level is set to "3".

A numeral 316004 stands for a combo box to set a communication speed when the serial port is selected in the box 314006 of FIG. 86 for the pertinent printer. The setting change is achieved by selecting an item from a list presented in a pop-up format in response to selection of an arrow portion on the right of the combo box. Six communication speeds "9600", "4800", "2400", "1200", "600", and "300" are available. When the serial port is selected in the window 315006 of FIG. 86, the default communication speed "9600" is displayed. When the parallel port is selected in the window 315006 of FIG. 86, an indication "Setting unnecessitated" is presented in the combo box.

A numeral 316005 denotes a selection button to set a data bit when the serial port is selected in the window 315006 of FIG. 86. Of four elements, when either one thereof is selected to the depressed or ON state, the remaining ones are associatively set to the state not depressed, namely, the OFF state. The user can set values of four data bits "8", "7", "6", and "5". When the serial port is selected in the window 315006 of FIG. 86, the default data bit value is displayed as "8". When the parallel port is selected in the window 315006 of FIG. 86, the button is displayed in a halftone as an invalid unit. Moreover, using a bit map design, a graphic presentation is provided for the button 316005, thereby improving operability thereof.

A numeral 316006 designates a selection button to set a stop bit when the serial port is selected in the window 315006 of FIG. 86. When either one of the three elements thereof is selected to the depressed (ON) state, the remaining ones are associatively set to the state not depressed, namely, the OFF state. The user can set values of three data bits "1", "1.5", and "2". When the serial port is selected in the window 315006 of FIG. 86, the default stop bit value is displayed as "1". When the parallel port is selected in the window 315006 of FIG. 86, the button is displayed in a halftone as an invalid unit. Moreover, using a bit map design, a graphic presentation is provided for the button 316006, thereby improving operability thereof.

A numeral 316007 stands for a selection button to set the parity when the serial port is selected in the window 315006 of FIG. 86. When either one of the three elements thereof is selected to the depressed (ON) state, the remaining ones are associatively set to the state not depressed, namely, the OFF state. The user can set three values for the parity "NONE", "EVEN", and "ODD". When the serial port is selected in the window 315006 of FIG. 86, the default parity value is displayed as "NONE". When the parallel port is selected in the window 315006 of FIG. 86, the button is displayed in a halftone as an invalid unit. Moreover, using a bit map design, a graphic presentation is provided for the button 316007, thereby improving operability thereof.

A numeral 316008 denotes a selection button to set the X control when the serial port is selected in the window 315006 of FIG. 86. When either one of the two elements thereof is selected to the depressed (ON) state, the remaining one is associatively set to the state not depressed, namely, the OFF state. The user can set two values for the X control "YES" and "NO". When the serial port is selected in the window 315006 of FIG. 86, the default X-ON/X-OFF value depends of the printer type 315003 of FIG. 86. When the parallel port is selected in the window 315006 of FIG. 86, the button is displayed in a halftone as an invalid unit. In addition, using a bit map design, a graphic presentation is provided for the button 316008, thereby improving operability thereof.

A numeral 316009 indicates a button to initiate a window in which operations, setting procedures, terms, etc. of the respective windows of printer server installer are described. Furthermore, there are used bit maps for this button 316009 to provide a graphic presentation, thereby improving operability thereof.

A numeral 316010 designates a button to provide a function in which the default values respectively of the interruption level 316002, the buffer size 316003, communication speed 316004, the data bit 316005, the stop bit 316006, the parity 316007, the X-ON/X-OFF 316008 are set according to the printer type 315003 and the port type 315006 of FIG. 86. Moreover, using a bit map design, a graphic presentation is provided for the button 316010 so as to improve operability thereof.

A numeral 316011 is a button to provide a function to finish the new creation and change/reference setting operations so as to close the window 314001. When the button is depressed in the new creation setting, the printer parameters are saved and control is passed to the printer setting window 315001 of FIG. 86.

A numeral 316012 indicates a button to provide a function in which the setting values are discarded and the window 315001 is closed. When the button is activated in the new creation setting, the setting interruption window 317001 of FIG. 88 is displayed for confirmation of the user and control is transferred to the window 315001 of FIG. 86.

Referring next to FIG. 88, the following item will now be described in detail.

1. Screen configuration and functions of setting interruption window

A reference numeral 317001 indicates a setting interruption window, which is opened in the following cases.

(a) The setting interruption button 310009 is selected in the menu window 310001 of FIG. 81.

(b) The setting interruption button 311007 is selected in the menu window 311001 of FIG. 82.

(c) The setting interruption button 313015 is selected in the menu window 313015 of FIG. 84.

(d) The setting interruption button 315012 is selected in the menu window 315001 of FIG. 86.

(e) The setting interruption button 316012 is selected in the menu window 316001 of FIG. 87.

As above, this window is a message window presented for confirmation of the user when the setting interrupt button is depressed in the associated window.

A numeral 317002 indicates a button to be selected when the confirmation is accepted. In response thereto, the system operates as follows.

(f) In the case (a), all print servers designated so far are discarded and control is passed to the install manager.

(g) In the case (b), all system setting items specified for the pertinent print server are discarded and control is passed to the menu window 310001 of FIG. 81.

(h) In the case (c), all printer setting items specified for the pertinent print server are discarded and control is passed to the menu window 310001 of FIG. 81.

(i) In the case (d), the setting items specified for the pertinent printer are discarded and control is passed to the printer selection list window 313001 of FIG. 84.

(j) In the case (c), the transmission type setting item specified for the pertinent print server are discarded and control is passed to the menu window 315001 of FIG. 86.

A numeral 317003 denotes a button to prevent the setting contents from being discarded. In response thereto, the system operates as follows.

(k) In the case (a), all print servers set so far are kept retained and the control is passed to the menu window 310001 of FIG. 81.

(l) In the case (b), all system setting items specified for the pertinent print server are kept retained and control is passed to the system setting window 311001 of FIG. 82.

(m) In the case (c), all printer setting items specified for the pertinent print server are kept retained and control is passed to the printer selection list window 313001 of FIG. 84.

(n) In the case (d), the setting items specified for the pertinent printer are kept retained and control is passed to the printer selection list window 313001 of FIG. 86.

(o) In the case (e), the transmission type setting item specified for the pertinent print server is kept retained and control is passed to the transmission type setting window 316001 of FIG. 87.

By reference to FIG. 89, the following item will now be described in detail.

1. Screen configuration and functions of password setting interruption window

Figure 83:
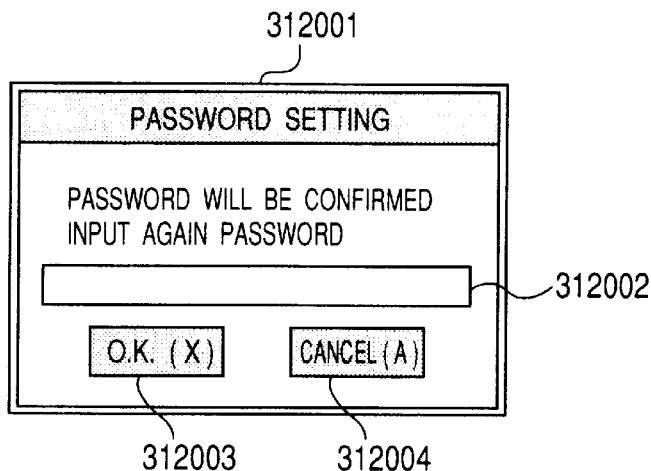
FIG. 83 is diagram showing a password setting window.

A reference numeral 318001 denotes a password setting interruption window, which is opened for confirmation when the cancel button 312004 is selected in the password setting window 312001 of FIG. 83.

A numeral 318002 indicates a button to be selected when the confirmation is accepted. In response thereto, the password set for the pertinent print server is discarded and control is passed to the system setting window 311001 of FIG. 82.

A numeral 318003 denotes a button to prevent the specified password from being discarded. In response thereto, the password set for the print servers is kept retained and control is passed to the password setting window 312001 of FIG. 83.

Referring next to FIG. 90, the following item will be described in detail.

1. Screen configuration and functions of printer name setting interruption window A reference numeral 319001 denotes a printer name setting interruption window, which is opened for confirmation when the cancel button 314005 is selected in the printer name setting window 314001 of FIG. 85.

A numeral 319002 indicates a button to be selected when the confirmation is accepted. In response thereto, the printer name set for the pertinent printer is discarded and control is passed as follows. In the new creation setting, control is transferred to the printer selection list window 313001 of FIG. 84. In the copy setting or the name change operation, control is passed as follows. Whether or not a plurality of printers are selected in the printer name list 313005 or the printer type list 313006 of FIG. 84 is determined. Even if this is the case, if the setting operation is to be achieved for the final printer selected, control is transferred to the window 313001 of FIG. 84. In other cases, namely, when a plurality of printers are selected and the setting operation is to be conducted for other than the final printer, control is passed to the printer name setting window 314001 of FIG. 85.

A numeral 319003 denotes a button to prevent the specified password from being discarded. In response thereto, the password set for the pertinent printer is kept retained and control is returned to the printer name selection window 314001 of FIG. 85.

By reference to FIG. 91, the following item will now be described in detail.

1. Screen configuration and functions of re-input error window

A reference numeral 320001 is a re-input error window, which is opened as a warning message window to notify a password input error to the user in the following cases. First, in the password setting window 312001 of FIG. 83, when a value inputted in the frame 312002 is different from the password specified in the frame 311003 of FIG. 82, the end button is accordingly depressed. Second, in the window 312001 of FIG. 83, the cancel button 312002 is selected; thereafter in the window 319001 of FIG. 90 next displayed, the cancel button 319003 is activated.

A numeral 320002 indicates a button to be selected when the contents of warning message are recognized or acknowledged. In response thereto, the password set for the pertinent print server is discarded and control is passed to the system setting window 311001 of FIG. 82.

Figure 92:
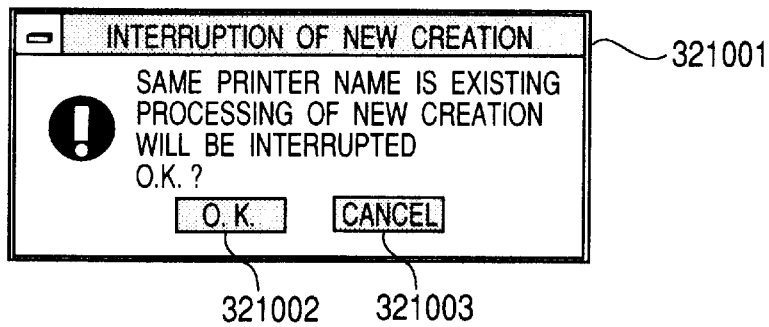
FIG. 92 is diagram showing a new creation interruption window.

Referring now to FIG. 92, the following item will be described in detail.

1. Screen configuration and functions of new creation interruption window

A reference numeral 321001 is a new creation interruption window, which is opened as a warning message window as follows. During a new creation setting in the window 314001 of FIG. 85, an existing printer name is set in the frame 314003 and then the end button 314004 is selected.

A numeral 321002 indicates a button to be selected, when the contents of warning message are recognized or acknowledged, to interrupt the new creation step. In response thereto, the printer name set for the pertinent print server is discarded and control is passed to the printer selection list window 313001 of FIG. 84.

A numeral 321003 denotes a button to recognize the warning message so as to set again the printer name. In response thereto, the printer name set for the pertinent printer is kept retained and control is returned to the printer name setting window 314001 of FIG. 85.

Figure 93:
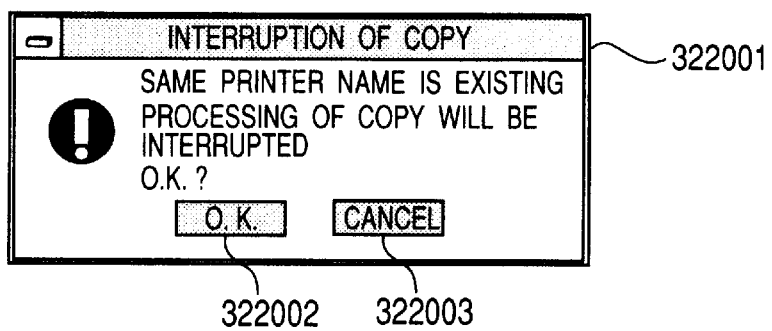
FIG. 93 is diagram showing a copy interruption window.

Referring next to FIG. 93, the following item will be described in detail.

1. Screen configuration and functions of copy interruption window

A reference numeral 322001 is a copy interruption window, which is opened as a warning message window as follows. During a copy setting in the window 314001 of FIG. 85, an existing printer name is set in the frame 314003 and then the end button 314004 is selected.

A numeral 322002 indicates a button to be selected when the warning message is recognized to interrupt the copy setting operation. In response thereto, the printer name set for the pertinent printer is discarded and control is passed as follows. Whether or not a plurality of printers are selected in the printer name list 313005 or the printer type list 313006 of FIG. 84 is determined. Even if this is the case, if the setting operation is to be achieved for the final printer selected, control is transferred to the window 313001 of FIG. 84. In other cases, namely, when a plurality of printers are selected and the setting operation is to be conducted for other than the final printer, control is passed to the printer name selection window 314001 of FIG. 85.

A numeral 322003 denotes a button to recognize the warning message so as to set again the printer name. In response thereto, the printer name set for the pertinent printer is kept retained and control is returned to the printer name setting window 314001 of FIG. 85.

Figure 94:
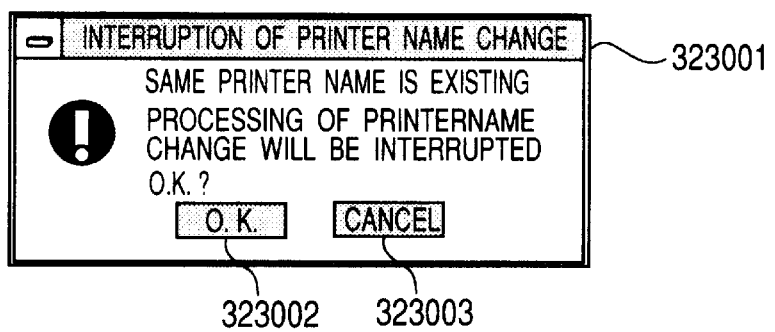
FIG. 94 is diagram showing a printer name setting interruption window.

Next, by reference to FIG. 94, the following item will be described in detail.

1. Screen configuration and functions of name change interruption window

A reference numeral 323001 is a name change interruption window, which is opened as a warning message window as follows. During a name setting operation in the window 314001 of FIG. 85, an existing printer name is set in the frame 314003 and then the end button 314004 is selected.

A numeral 323002 indicates a button to be selected when the warning message is recognized to interrupt the name change setting. In response thereto, the printer name set for the pertinent printer is discarded and control is passed as follows. Whether or not a plurality of printers are selected in the printer name list 313005 or the printer type list 313006 of FIG. 84 is determined. Even if this is the case, if the setting operation is to be achieved for the final printer selected, control is transferred to the window 313001 of FIG. 84. In other cases, namely, when a plurality of printers are selected and the setting operation is to be conducted for other than the final printer, control is passed to the printer name selection window 314001 of FIG. 85 to execute the name change setting for the next printer.

A numeral 323003 denotes a button to recognize the warning message so as to set again the printer name. In response thereto, the printer name set for the pertinent printer is kept retained and control is returned to the printer name setting window 314001 of FIG. 85.

Referring next to FIG. 95, the following item will be described in detail.

1. Screen configuration and functions of copy impossible window

A reference numeral 324001 is a copy impossible window, which is opened as a warning message window to notify that the copy is impossible in the following case. During the copy setting, an attempt is made to accomplish a copy setting step for a printer exceeding 16 printers.

A numeral 324002 indicates a button to be selected when the warning message is recognized to interrupt the copy setting operation. In response thereto, the printer copy processing attempted is interrupted and control is returned to the printer selection list window 313001 of FIG. 84.

Referring next to FIG. 96, the following item will be described in detail.

1. Screen configuration and functions of printer deletion window

A reference numeral 325001 indicates a printer deletion window, which is a message window to be opened for confirmation when the delete button 313011 is selected in the printer selection list window 313001 of FIG. 84.

A numeral 325002 indicates a button to be selected when the message is accepted so as to delete the printer contained in the message. In response thereto, the printer name contained in the message is discarded and control is passed as follows. Whether or not a plurality of printers are selected in the printer name list 313005 or the printer type list 313006 of FIG. 84 is determined. Even if this is the case, if the setting operation is to be achieved for the final printer selected, control is transferred to the window 313001 of FIG. 84. In other cases, namely, when a plurality of printers are selected and the setting operation is to be conducted for other than the final printer, control is passed to the printer deletion window 325001 to execute the deleting operation for the next printer.

A numeral 325003 denotes a button to prevent the printer denoted by the message from being deleted. In response thereto, the setting values of the printer are kept retained and control is returned as follows. Whether or not a plurality of printers are selected in the printer name list 313005 or the printer type list 313006 of FIG. 84 is determined. Even if this is the case, if the setting operation is to be achieved for the final printer selected, control is transferred to the window 313001 of FIG. 84. In other cases, namely, when a plurality of printers are selected and the setting operation is to be conducted for other than the final printer, control is passed to the printer deletion window 325001 to execute the deleting operation for the next printer.

By reference to FIG. 97, the following item will now be described in detail.

1. Screen configuration and functions of illegal setting window

A reference numeral 326001 indicates an illegal setting window, which is opened as a warning message window to notify a password input error to the user in the following case. With the the slot number 315007 set to four in the window 315001 of FIG. 86, the port type 313006 is varies from "serial" to "parallel".

A numeral 326002 indicates a button to be selected when the warning message is recognized or acknowledged to return control to the window 315001 of FIG. 86. When control is thus returned thereto, the selection states respectively of the port type 315006 and the slot number 315007 in the window 315001 are those presented before the illegal setting window 326001 is displayed, namely, the port number and the slot number are restored to "serial", and "4", respectively.

Referring next to FIG. 98, the following item will be described in detail.

1. Screen configuration and functions of setting end warning window

A reference numeral 327001 denotes a setting end warning window, which is a warning message window to be opened as follows. When the setting button 31009 is selected in the menu window 310001 of FIG. 81, there is missing a printer set in advance.

A numeral 327002 indicates a button to return control to menu window 310001 of FIG. 31.

Since the processing of the GUI program of print server is similar to that of the GUI program of file server, description thereof will be avoided.

Bit maps for buttons

When creating windows of the system manager GUI section, there have been adopted images of bit maps for buttons in the windows. Description will now be given of the changes in states of button bit maps and functional classification as well as creating methods thereof. As an example, bit maps will be described by reference to the hard disk setting window of FIG. 22. There are disposed such user buttons on which bit maps of characters and/or pictures are attached as the disk number (N) button elements 122001 to 122008, the hardware button (O) 122011, the area partition (P) button elements 122013 to 122017, the OS (S) button elements 122016 and 122017, the capacity button (C) 122018, the help button (H), and the default button (D). On the other hand, the setting end button (X) 122022 and the setting interruption button (A) are called push buttons. In relation to provision of the button bit maps, the difference between the user button with bit maps and the push button will be described. For the push button, only characters are displayed and there exists limitation with respect to colors and character types. Furthermore, the button cannot be kept depressed for presentation. Consequently, when one of such push buttons is selected, it is difficult to determine which one thereof is in the selected state. As above, the push buttons are not suitable for such a selecting operation. In contrast thereto, for the user button with bit maps, arbitrary sizes and colors may be used to display characters and pictures. Special button images and pictures can be displayed, for example, in the buttons 122011 to 122021. Moreover, as can be appreciated from configurations of the buttons 122001 to 122008 and 122012 to 122015, 122016, and 122017, it is possible to select one of such buttons for the setting operation. In addition, characters and pictures can be presented in colors by use of bit maps, which improves operability for the user. Next, description will be given of the method of creating bit maps employed for the user buttons.

Figures 99, 100:
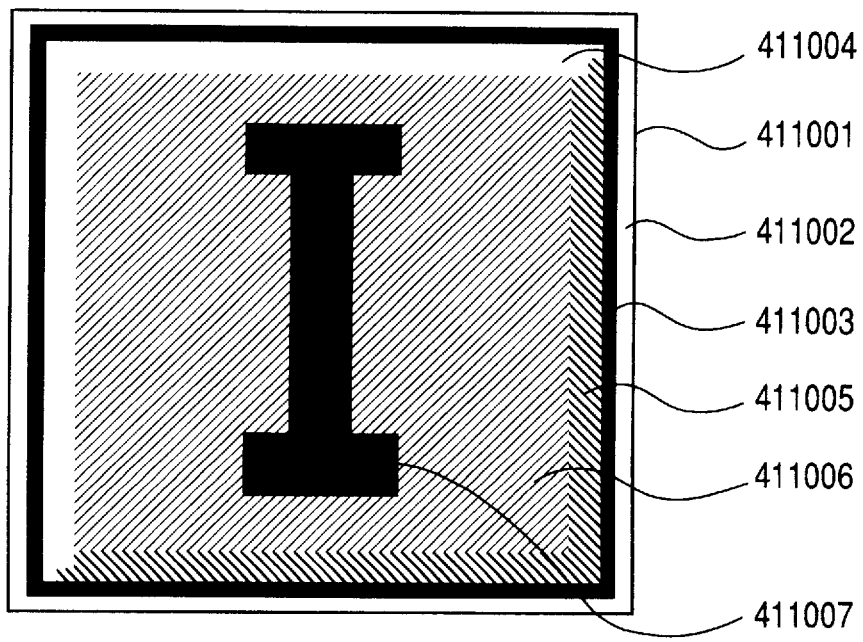
FIG. 99 is a list showing the state transition names of bit maps.
FIG. 100 is a diagram showing a button in a state 1.

Referring now to FIG. 99, the following item will be described in detail.

As shown in FIG. 99, for each button, there are necessitated five bit maps. The classification of five states is accomplished according to a state of button and a selection wait state associated therewith. The state of button includes "depressed", "not depressed", and "invalid". "Depressed" indicates a state in which the button seems to be set to the depressed state indicating that the button is currently being selected. "Not depressed" denotes a state in which the button seems to be set to the projected state indicating that the button is currently available for selection. "Invalid" designates that the surface of button is in the even or flat state indicating that the button cannot develop the function thereof. "Selection waiting or wait state" indicating that the button cannot be operated for selection is associated with items "Present or Yes" and "Absent or No", which denotes the availability thereof in the key operation for the setting procedure. "Yes" stands for a state where the button is currently awaiting selection and can be set by a decision key. This state will be called "state with input focus" herebelow. For a key operation of "No", "Selection wait state" is moved onto a button to be selected and then the return key is activated for decision. The state will be called "state without input focus" herebelow. When the mouse is adopted for the operation, the selection can be accomplished regardless of presence or absence of input focus. Any button in the invalid state is always in the state without input focus. In the state 1, the pertinent button is not depressed and is without input focus. The name of this state is defined as "of". In the state 2, the pertinent button is not depressed and is with input focus. The name of this state is defined as "off". In the state 3, the pertinent button is depressed and is without input focus. The name of this state is designated as "on". In the state 4, the pertinent button is depressed and is with input focus. The name of this state is denoted as "onf". In the state 5, the pertinent button is invalid and the name of this state is defined as "dis". Each button is set to one of these five states in any situation. Actual graphic images of the buttons will be described by reference to FIGS. 100 to 105. Moreover, FIGS. 100, 101, 102, 103, and 104 are respectively identical to images 416001, 416002, 416003, 416004, and 416005 of FIG. 105.

Subsequently, the following item will be described in detail by reference to the button state 1 of FIG. 100.
Definition of name "of" (button not depressed and without input focus)

FIG. 100 shows the overall image of a button which is without input focus and which is not depressed. A numeral 411001 denotes a line defining the size of bit map. When the button is without input focus, a one-dot line 411002 on the outer-most position is displayed in white. On an inner side thereof, a black frame 411003 having a width of one dot is presented. This frame is regarded as the actual button size. For the button not depressed, a white shade portion is displayed as indicated by a numeral 411004 on a two-dot line on the upper and left sides inside the input focus. For the button not depressed, a dark grey shade portion is displayed as indicated by a numeral 411005 on a two-dot line on the lower and right sides inside the input focus. A background color 411006 is light or thin grey for all buttons. This provides integrity and visibility of the buttons. A numeral 411007 stands for a character or picture drawn in the button.

Next, the following item will be described in detail by referring to the button state 2 of FIG. 101.
Definition of name "off" (button not depressed and with input focus)

Figure 101:
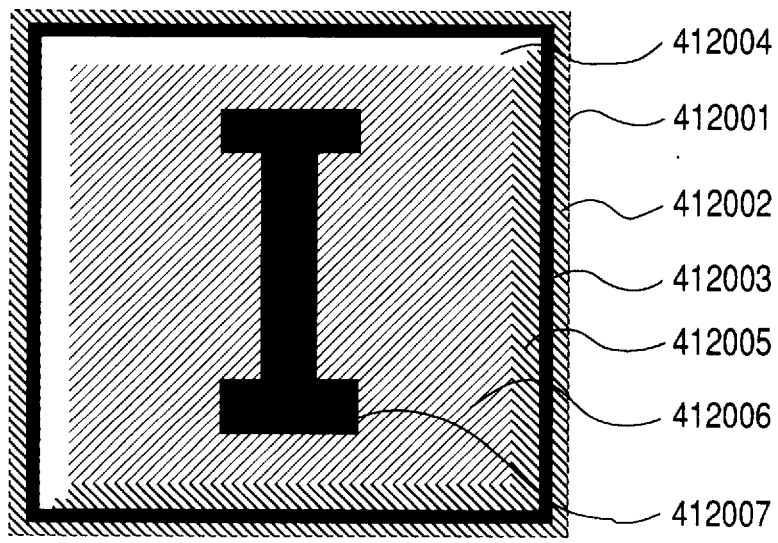
FIG. 101 is a diagram showing a button in a state 2.

FIG. 101 shows the overall image of a button which is with input focus and which is not depressed. A numeral 412001 denotes a line defining the size of bit map. When the button is with input focus, a one-dot line 412002 on the outer-most position is displayed in thick grey. On an inner side thereof, a black frame 412003 having a width of one dot is presented. This frame is regarded as the actual button size. For the button not depressed, a white shade portion is displayed as indicated by a numeral 412004 on a two-dot line on the upper and left sides inside the input focus. For the button not depressed, a thick grey shade portion is displayed as indicated by a numeral 412005 on a two-dot line on the lower and right sides inside the input focus. Thanks to the portions 412004 and 412005, the button looks as if it were not to be in the depressed state. A background color 412006 is a thin grey for all buttons. This provides integrity and visibility of the buttons. A numeral 412007 stands for a character or picture drawn in the button.

Subsequently, the following item will be described in detail by reference to the button state 3 of FIG. 102.
Definition of name "on" (button depressed and without input focus)

Figure 102:
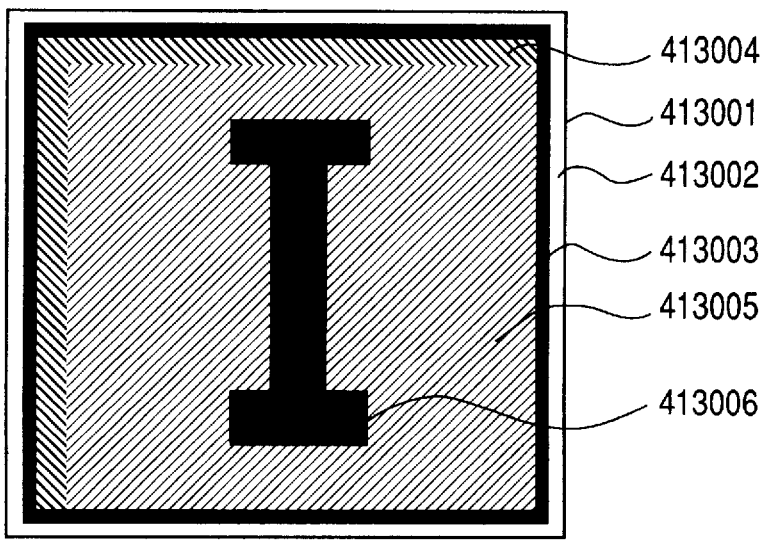
FIG. 102 is a diagram showing a button in a state 3.

FIG. 102 shows the overall image of a button which is without input focus and which is depressed. A numeral 413001 denotes a line defining the size of bit map. When the button is without input focus, a one-dot line 413002 on the outer-most position is displayed in white. On an inner side thereof, a black frame 413003 having a width of one dot is presented. This frame is regarded as the actual button size. For the button depressed, a thick grey shade portion is displayed as indicated by a numeral 413004 on a two-dot line on the upper and left sides inside the input focus. Thanks to the portion 413004, the button looks as if it were depressed. A background color 413005 is a light grey for all buttons. This provides integrity and visibility of the buttons. A numeral 413006 stands for a character or picture drawn in the button. The character or picture 413006 in the depressed button is displayed by moving the associated character or picture 411007 or 412007 of the button not depressed to the right and lower directions respectively by one bit. As a result, the button seems to have been moved.

Next, the following item will be described in detail by referring to the button state 4 of FIG. 103.
Definition of name "onf" (button depressed and with input focus)

Figure 103:
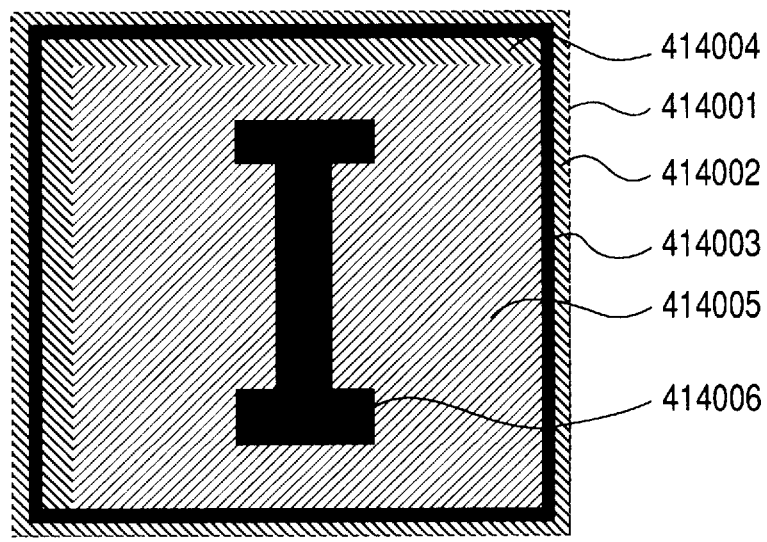
FIG. 103 is a diagram showing a button in a state 4.

FIG. 103 shows the overall image of a button which is with input focus and which is depressed. A numeral 414001 denotes a line defining the size of bit map. When the button is with input focus, a one-dot line 414002 on the outer-most position is displayed in a thin grey. On an inner side thereof, a black frame 414003 having a width of one dot is presented. This frame is regarded as the actual button size. For the button depressed, a thick shade portion is displayed as indicated by a numeral 414004 on a two-dot line on the upper and left sides inside the input focus. Thanks to the portion 414004, the button looks as if it were in the depressed state. A background color 414005 is a thin grey for all buttons. This provides integrity and visibility of the buttons. A numeral 414006 stands for a character or picture drawn in the button. The character or picture 414006 in the depressed button is displayed by moving the associated character or picture 411007 or 412007 of the button not depressed to the right and lower directions respectively by one bit. As a result, the button seems to have been moved.

Subsequently, the following item will be described in detail by reference to the button state 5 of FIG. 104.
Definition of name "dis" (invalid button)

Figure 104:
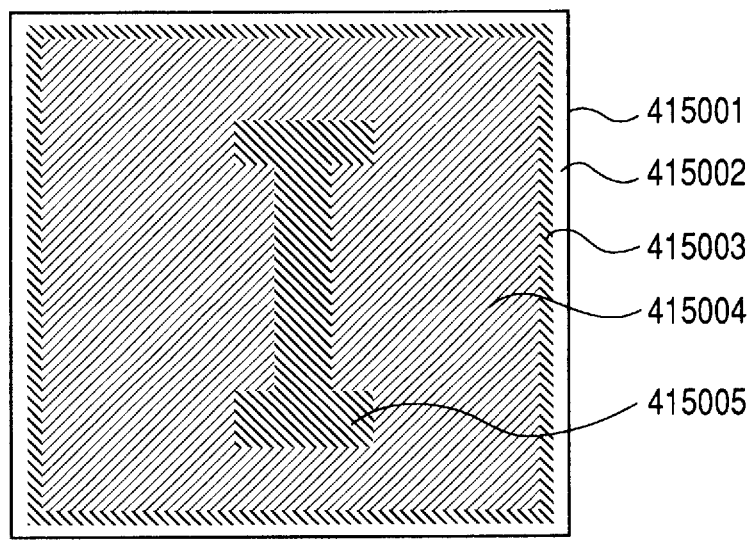
FIG. 104 is a diagram showing a button in a state 5.

FIG. 104 shows the entire image of an invalid button disabled. A numeral 415001 denotes a line defining the size of bit map. A one-dot line 415002 on the outer-most position is displayed in white. On an inner side thereof, a thick grey frame 414003 having a width of one dot is presented. This frame is regarded as the actual button size. Thanks to the portion 414004, the button surface looks as it were in the surface of screen, thereby indicating that the button is in the disabled state. A background color 415004 is a thin grey for all buttons. This provides integrity and visibility of the buttons. A numeral 415005 stands for a character or picture drawn in the button. The character or picture 415005 in the depressed button is displayed by moving the associated character or picture 411007 or 412007 of the button not depressed to the right and lower directions respectively by one bit. The invalid button is presented as a monotone image for the user to easily understand the invalid state thereof.

Next, the following item will be described in detail by referring to FIG. 105.

List of changes in button state

According to the definitions above, the state of button can be determined depending on the contents of five bit maps. FIG. 99 shows correspondences between the states and the names thereof. That is, the numerals 416001 to 416005 are respectively associated with "of" (button without input focus and not depressed), "off" (button with input focus and not depressed), "on" (button without input focus and depressed), "onf" (button with input focus and depressed), and "dis" (button disabled). Any button is in either one of these states. Shade portions are generated on assumption that light is incident to the button from the upper-left position. Moreover, in the creation of shade portions, it is assumed in general that the operator has a pen on the right hand on a disk and the light source is placed at a position on the upper-left corner of the disk. This is because the shading effect developed in this state is most similar to that of the natural shade. For the buttons 416001 and 416002 not depressed, a white shade is created on the upper and left portions inside the input focus and a thick grey shade on the lower and right portions inside the input focus. As a result, the buttons seem to be in the state not depressed. For the buttons 416003 and 416004 depressed, a thick grey shade is created on the upper and left portions inside the input focus. As a result, the buttons seem to be in the state depressed. For the invalid button 416005, there is not disposed any shade, which makes the button to be flat and which hence helps user to easily appreciate that the button is in the disabled state.

Subsequently, description will be given in detail of operation of buttons by reference to FIG. 106.

Figure 106:
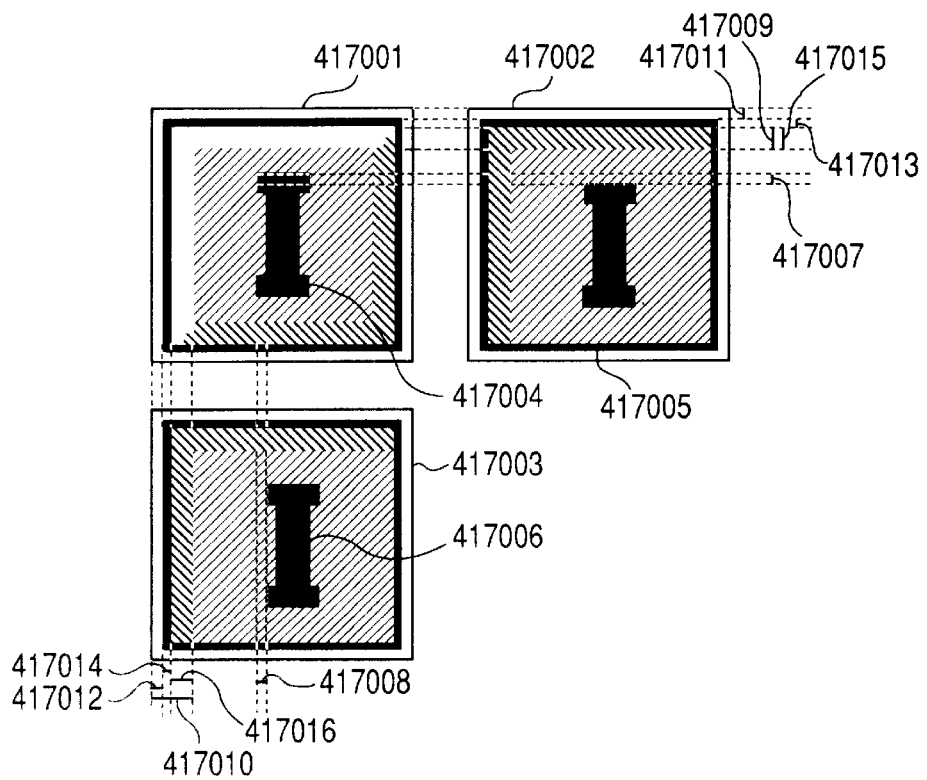
FIG. 106 is a diagram 1 for explaining a state change.

FIG. 106 shows a state of display in which the character or picture is moved to the right and lower directions in response to a depression of the pertinent button. Reference numeral 417001 denotes a button which is without input focus and which is not in the depressed state. Numerals 417002 and 417003 designate buttons which are without input focus and which are in the depressed state. The buttons 417002 and 417003 are identical to each other and are shown only for explaining the shifts respectively in the vertical and horizontal directions. In the following description, it is assumed that the button is with input focus. A numeral 417004 indicates a character or picture drawn on a button not depressed, whereas numerals 417005 and 417006 denote characters or pictures attached on buttons depressed. In this example, a letter I is displayed for convenience of explanation. As indicated by a numeral 417007, the character 417007 is shifted downward when compared with the character 417004. The distance therebetween is assumed as a. Similarly, as indicated by a numeral 417008, the character 417006 is shifted toward the right when compared with the character 417004. The distance therebetween is also a. Actually the distance a is equivalent to one bit and hence the character or picture is shifted downward or to the right by one bit. Next, the distance between the line 417009 and the line 417010 is 4a, namely, the distance between the line 417011 and the line 417012 is a, the width of each of button frames denoted as 417013 and the line 417014 is a, and the width of shade portions respectively of the lines 417015 and 417016 is 2a. Since a is equivalent to one bit in the actual program, the input focus takes one bit, the width of button frame is one bit, and the portion of shade takes two bits. As for the values above, the ratios therebetween are fixed in any situation. Assuming a to be a variable, each of the lines 417007 and 417008 takes a value a, each of the lines 417009 and 417010 is of a value 4a, each of the line 417011 and 417012 takes a value a, each of the lines 417013 and 417014 is of a value a, and each of the lines 417015 and 417016 takes a value 2a.

Figure 107:
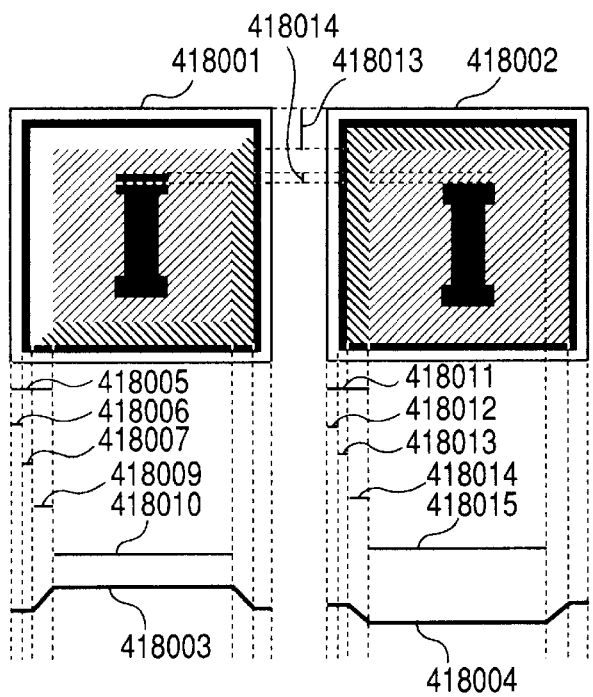
FIG. 107 is a diagram 2 for explaining a state change.

Next, a cross-sectional view of each button will be described by reference to FIG. 107. A numeral 418001 denotes a button without input focus and not depressed, whereas a numeral 418002 denotes a button without input focus and depressed. A numeral 418003 indicates a cross-sectional view of the button 418001. Input focus 418006 and the portion of frame of the button 418007 are in a plane, which is below the plane of a button 418010 where a character or picture is drawn. In consequence, the portion of shade 418009 is inclined. A numeral 418004 designates a cross-sectional view of the button 418002. Input focus 418012 and the portion of frame of a button 418013 are in a plane, which is above the plane of a button 4180015 where a character or picture is drawn. In consequence, the portion of shade 418014 is inclined. As described in conjunction with FIG. 106, assuming the width of the portion 418014 to be a, there are developed the following ratios with respect to widths of the respective portions. Namely, each of the portions 418013, 418005, and 418011 has a width of 4a, each of the portions 418006, 418007, 418012, and 418013 has a width of a, and each of the portions 418009 and 418014 has a width of 2a.

Figure 108:
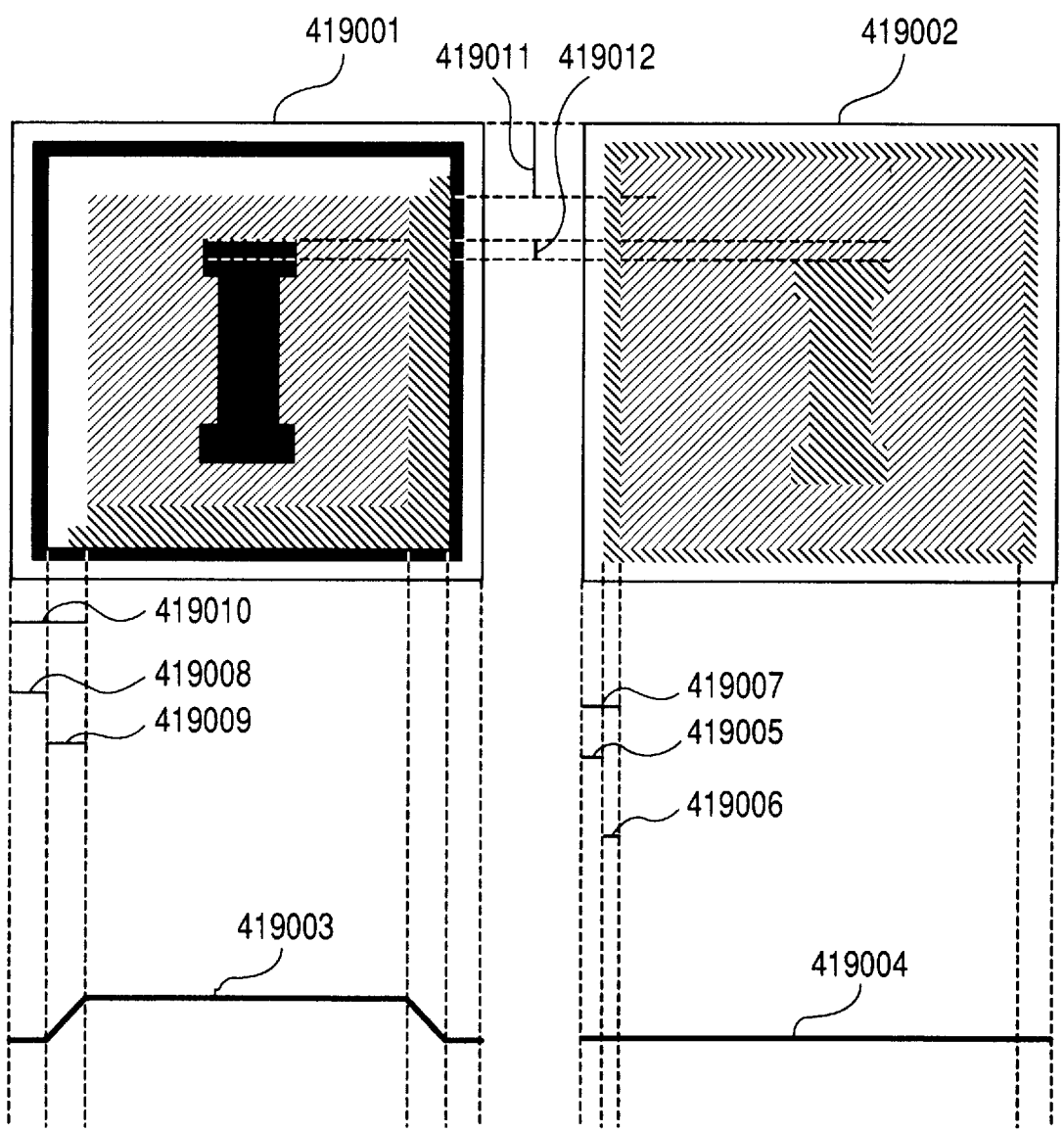
FIG. 108 is a diagram 3 for explaining a state change.

Referring next to FIG. 108, description will be given of state changes of the buttons. A numeral 419001 denotes a button not depressed. The state thereof is as described by reference to FIG. 107. A numeral 419002 indicates an invalid button. A numeral 419004 designates a cross section thereof. The surface of the button is of the same height as input focus. The position of the character or picture of the disabled button is the same as the depressed button. Consequently, assuming the width of a portion 419012 to be a, there are developed the following ratios with respect to widths of the respective portions. Namely, each of the portions 419010 and 419011 has a width of 4a, each of the portions 419007 to 419009 has a width of 2a, and each of the portions 419005 and 419006 has a width of a.

Figure 109:
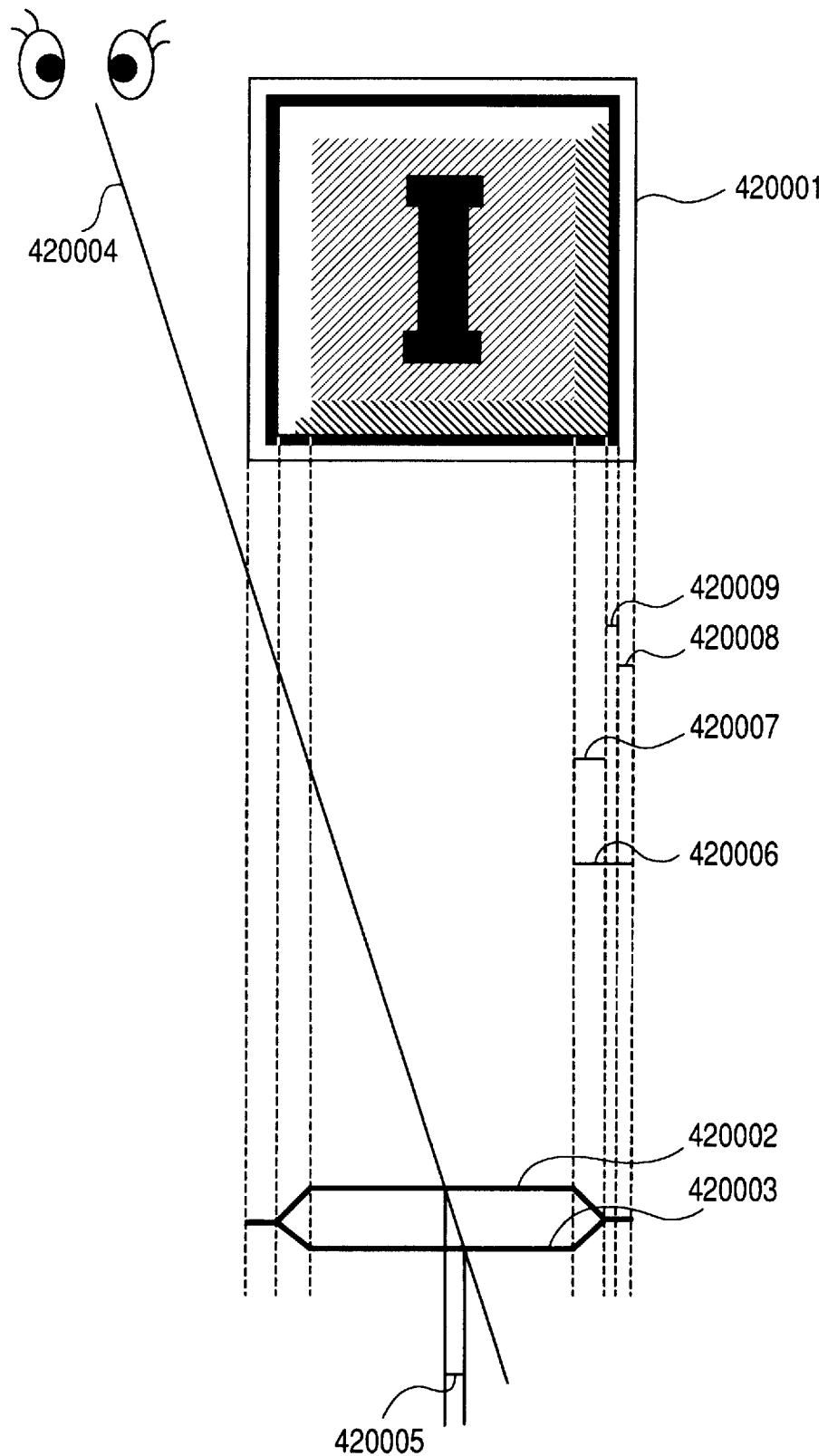
FIG. 109 is a diagram 4 for explaining a state change.

Referring now to FIG. 109, description will be given of the reason why the depressed button is shifted to the right and lower sides by a distance a relative to the button not depressed. As described by reference to FIG. 107, the numeral 419002 indicates a cross section of the button not depressed, whereas the numeral 419003 indicates a cross section of the button depressed. Assuming a numeral 420004 to denote a viewpoint, to obtain a situation in which button seems to be in the depressed state, there is required a shift 420005. This is necessitated for the visual sense. Moreover, since the light is illuminated from an upper-left point, the shift 420005 of the image to the right and lower sides causes the image to become most similar to a natural image. If the button is viewed from a point just thereabove, the shift does not appear at all. In this case, however, it is quite difficult to determine a state that the button is depressed. Next, as a result of discussion on the distance or width of shift 420005, it has been determined that the distance is suitably set to be half the width of the shade 420007 of the button. In consequence, assuming the width of shift 420005 to be a, the width of each of the input focus 420008 and the button frame is a and the width of the shade 420007 is 2a. Since a is actually equivalent to one bit in the program, the character or picture of the depressed button is implemented by shifting that of the button not depressed in the right and lower sides by one bit.

FIGS. 110 and 111 are tables containing characteristic items associated with the buttons classified according to functions. As for classification of use positions FWP, a letter F stands for a file server, W designates a workstation, and P indicates a print server. In the column of remarks, there are shown utilization screens and use objects. As can be seen from these tables, the size and type of buttons vary depending on the functions thereof.

Important notes for creating bit mats for buttons

In preparing buttons, it is necessary to retain integrity thereof. Consequently, the following items are to be applied to all buttons.

(1) The button itself presents a function thereof.
(2) When a title is attached below the button, it is unnecessary to write any character in the button.
(3) The character type, picture, and color are to be used with integrity. Any button generated without such integrity will give a negative impression to the user.
(4) Four outer-most bits used to display a button are integrally used and are free from the white, grey, or black shade.
(5) The size of button is to be decided with integrity according to the types and use objects shown in FIGS. 110 and 111.

Important notes for characters and pictures of button

The bit maps are classified into three groups as follows (FIGS. 110 and 111).
1. Bit map having only a character (without mark)
2. Bit map having only a picture (○)
3. Bit map having a character and a picture (◎)

Description will now be given of important notes in creation of bit maps of the respective button.

1. Bit map having only a character (without mark)
(1) The Helvetic font basically helps the user read the character.
(2) The character of the button not depressed is presented in black.
(3) The character of the button depressed is presented in a light green for easy discrimination of the button in the selected state.
(4) The character of the disabled button is presented in a dark or thick grey.
(5) The color of the background area is displayed in a light or thin grey for any button.
(6) The character of the button depressed is presented by displacing the character of the button not depressed to the right and lower sides by one bit.

2. Bit map having only a picture (○)

The picture of the button depressed is displayed by shifting the picture of the button not depressed to the right and lower sides by one bit. The color is kept unchanged. As a result, the button seems to be in the depressed state.
(2) For the disabled button, the picture of the button in the depressed state is presented in a monotone color. This facilitates the user to determine that he button is unavailable.
(3) To present the bit map to be more similar to a real item associated therewith, there is required a shade portion. For a picture, the shade portion develops an essential function.
(4) Since there are fundamentally used 16 colors for the picture, the shade portion can be possibly created as follows. Among the colors, thicker or darker colors and thinner or lighter colors are used as shade and background portions, respectively.
(5) Grey colors are classified into four gradation levels for white, light grey, dark grey, and black.
(6) A picture created with a high contrast gives a metallic impression to the viewer. For this purpose, the white portion is to be increased in the picture.
(7) To produce a golden color, it is only necessary to appropriately use such colors as white, yellow, dark yellow, and black.
(8) An intermediate color can be generated with an appropriate use of tile patterns. According to the usage thereof, the thickness or darkness of the color can be adjusted.

(9) Colors such as red and green effectively attract users' attention and hence are to be employed in the central part, not in the periphery of the picture.
(10) In the peripheral portion of the field of view, colors including blue, black, white, and yellow are to be adopted. Even in the circumferential part, retinae are sensitive to these colors.
(11) Blue is to be utilized in a large region, not in the portions of a text type, a thin line, and a small item. As for the numbers of the organs of retina related to sensation of colors, those for blue takes the smallest number. This is particularly remarkable in the central part of the retina. Namely, blue is suitable for the background.
(12) Careful contemplation is necessary when meanings of colors are explicitly used. For example, it is to be noted that such meanings vary between the respective cultural environments.

3. Bit map having a character and a picture (◎)
(1) When any title is not disposed below the button, the button itself presents a function thereof.

To create a button to be easily understood by the user, there are required bit maps of a character and a picture, respectively.
(2) The bit maps are to be produced according to the notes 1 and 2 above. Balance between the character and the picture is to be integrally designed for each type of button.

Figure 112:
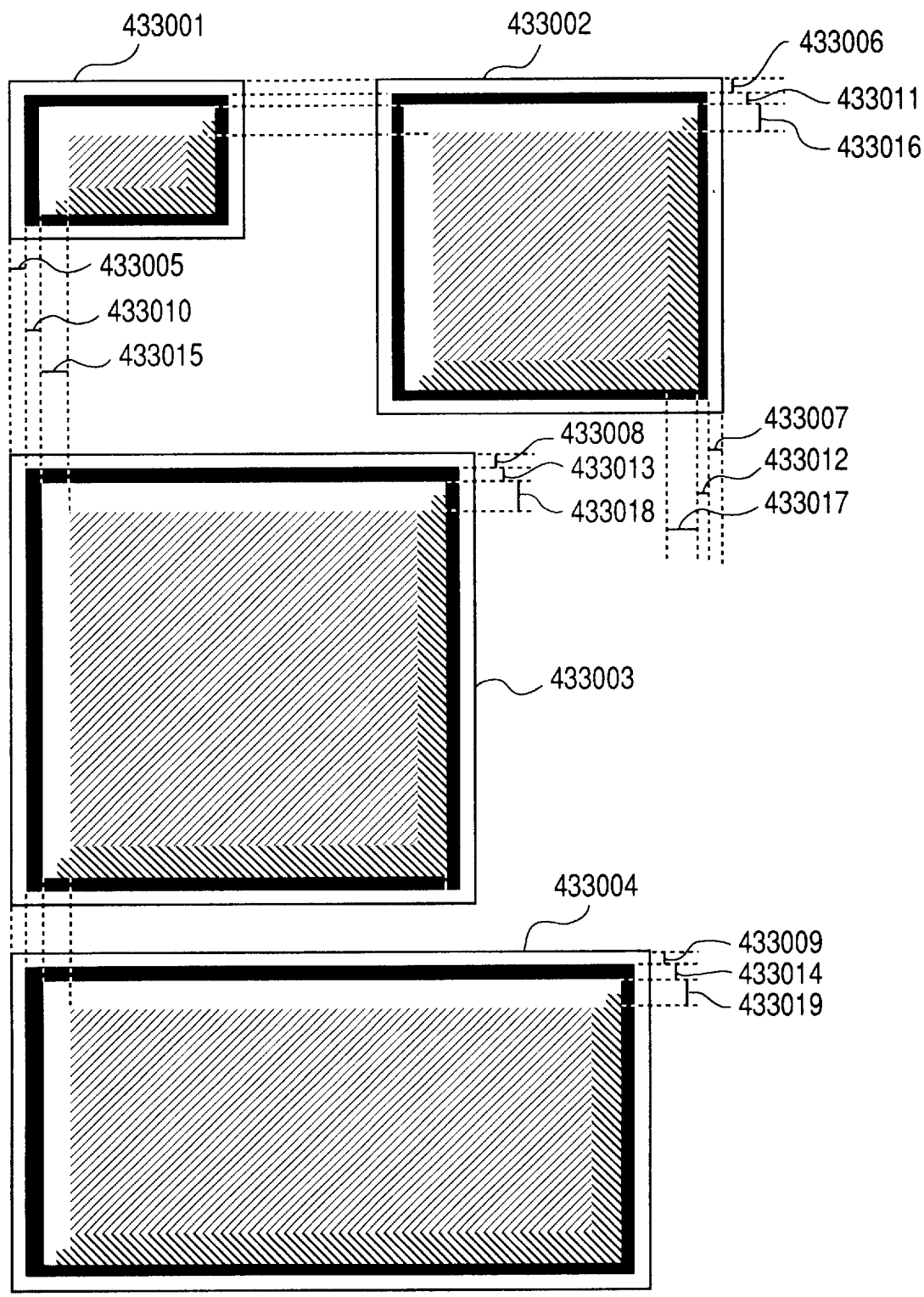
FIG. 112 is a diagram showing comparison in size between buttons.

Referring next to FIG. 112, description will be given of a method of creating buttons having different sizes.

The buttons 433001 to 433004 are mutually different in size from each other. The size expressed by the numbers of dots respectively in the horizontal and vertical directions is 16 by 12, 24 by 24, 32 by 32, and 44 by 24 for the buttons 433001 to 433004, respectively. However, the periphery of button is determined regardless of the size thereof, namely, the peripheral portion is uniquely fixed for the respective sizes. Naturally, this also applies to the sizes 40 by 40, 48 by 40, 48 by 48, and 80 by 40 as denoted above. Assume that each of input focus portions 433005 to 433009 has a width a. There are attained the following ratios between widths of the related portions. Each of button frames 433010 to 433014 has a width a and each of shade portions 433015 to 433019 has a width 2a. Thanks to the provision, the height of each button is fixed regardless of the button sizes. When creating a button having an extremely large or small size, the user may alter the width of shade portion in some cases.

Referring to FIG. 113, a method of presenting a curved line will be described.

Description will be given of presentation of a numeral "8" by way of example. The operation is similar for both of the picture and the curved line. For presentation of "8" according to bit maps, since it has been defined that the button not depressed is displayed in black, there is resultantly obtained an image 43001. However, for a particularly small button, it is difficult to present a portion of the curved line by a combination of black rectangles. To overcome this difficulty, there is adopted an intermediate color between the color of character and the background color. In this case, the character is black and the background is a light grey and hence there is used a dark grey to be indicated by a numeral 434004. The black rectangle is to be designated by a numeral 434003. As indicated by a numeral 434002, the dark grey is used for a portion having a large curvature in the curved line. As a result, there is created a curved line much more similar to a natural image of a curved line.

Figure 114:
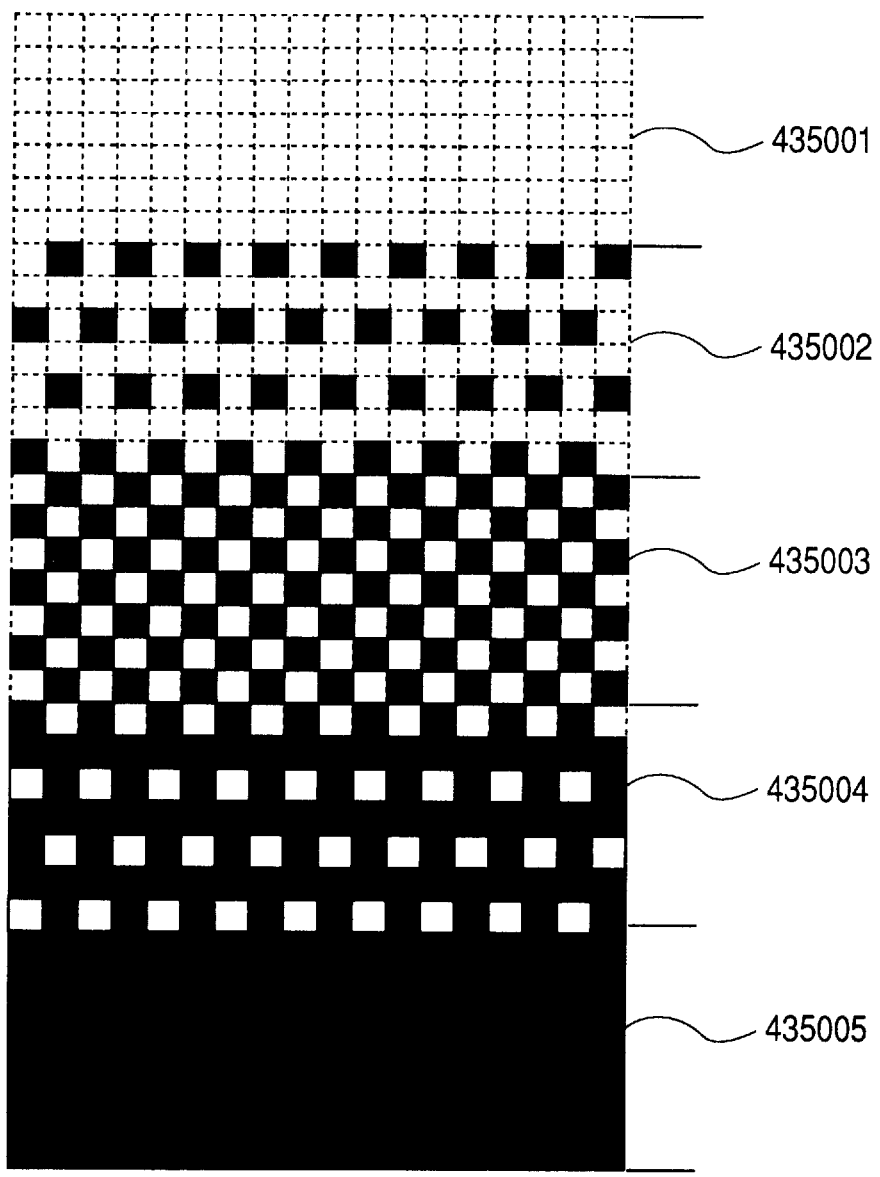
FIG. 114 is a diagram showing a method of presenting an intermediate color.

By reference to FIG. 114, description will be given of an operation to present an intermediate color.

An intermediate color is employed for a change in color between two different colors to obtain quite a natural picture.

Description will be given of a case of FIG. 114 including a white portion 435001 and a black portion 435005 by way of example. In a case where a three-dimensional object is to be represented by bit maps, there may be required darker and brighter portions depending on surfaces thereof. However, since only 16 colors are available, it is difficult to display intermediate colors. Consequently, an intermediate color is obtained by presenting the portions 435002 to 435005, thereby producing a natural change from one color to another color.

Next, the following item will be described by reference to FIGS. 115 to 118.

Method of generating shade for character of clear color

Figure 115:
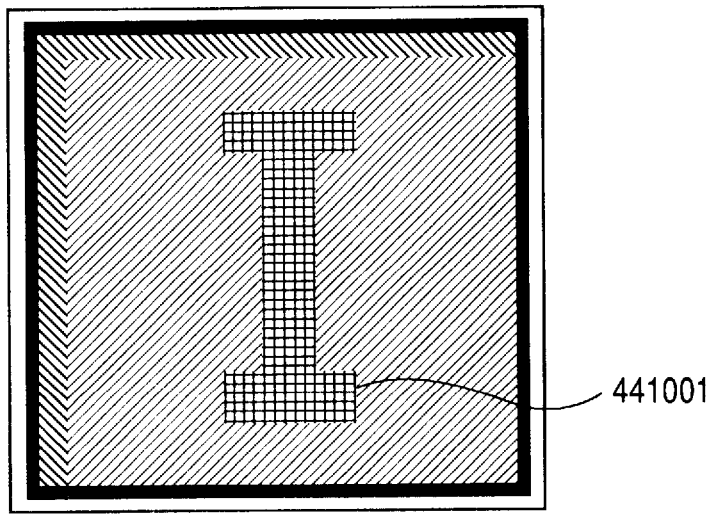
FIG. 115 is a diagram of a button without shade when an "on" character is in a clear color.
Figure 116:
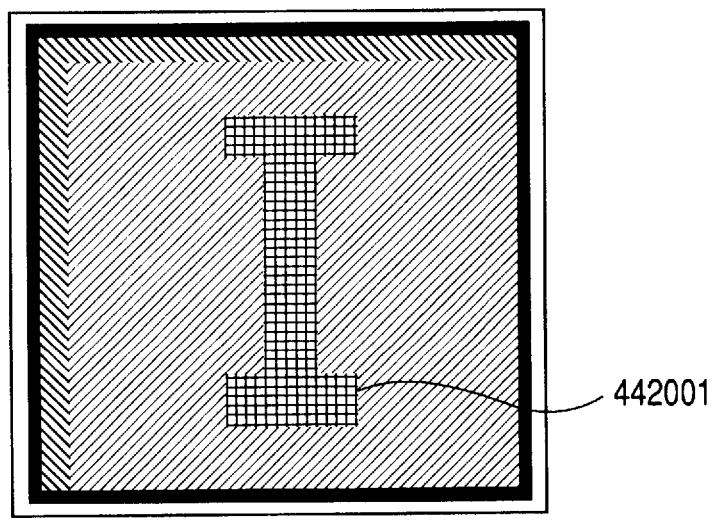
FIG. 116 is a diagram of a button without shade when an "onf" character is in a clear color.
Figure 117:
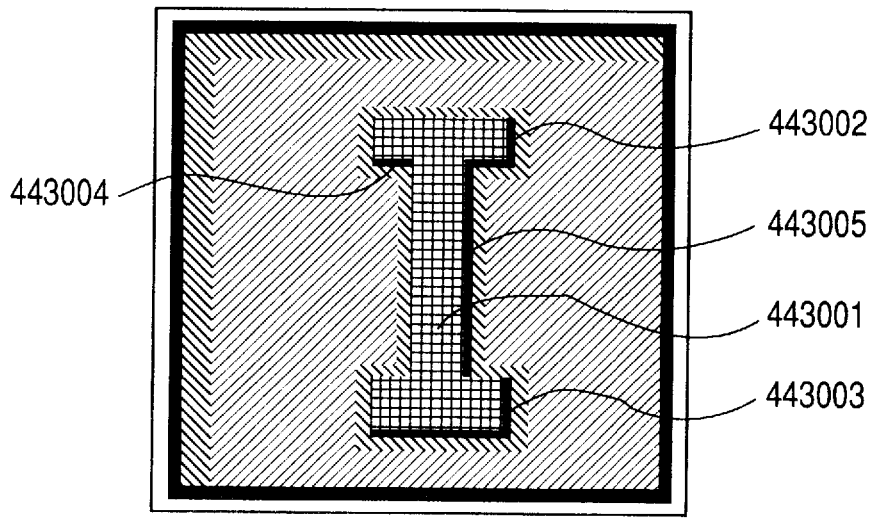
FIG. 117 is a diagram of a button with shade when an "on" character is in a clear color.
Figure 118:
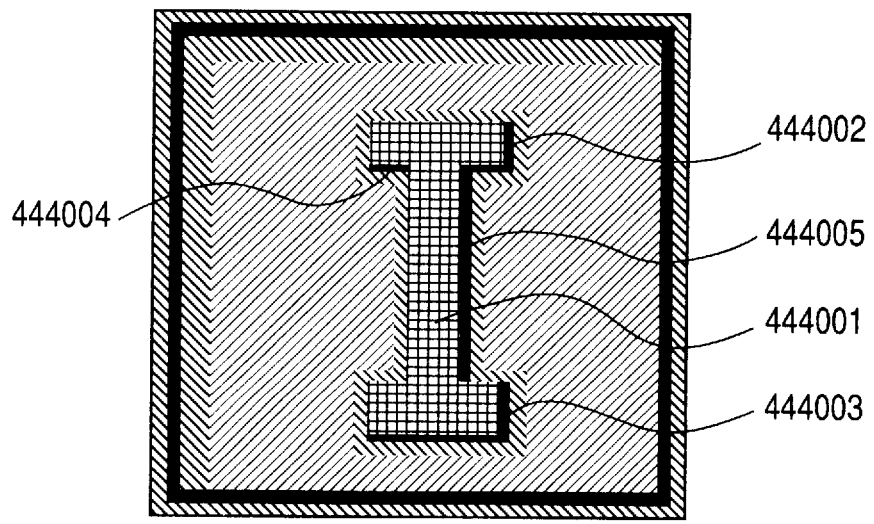
FIG. 118 is a diagram of a button with shade when an "onf" character is in a clear color.
Figure 119:
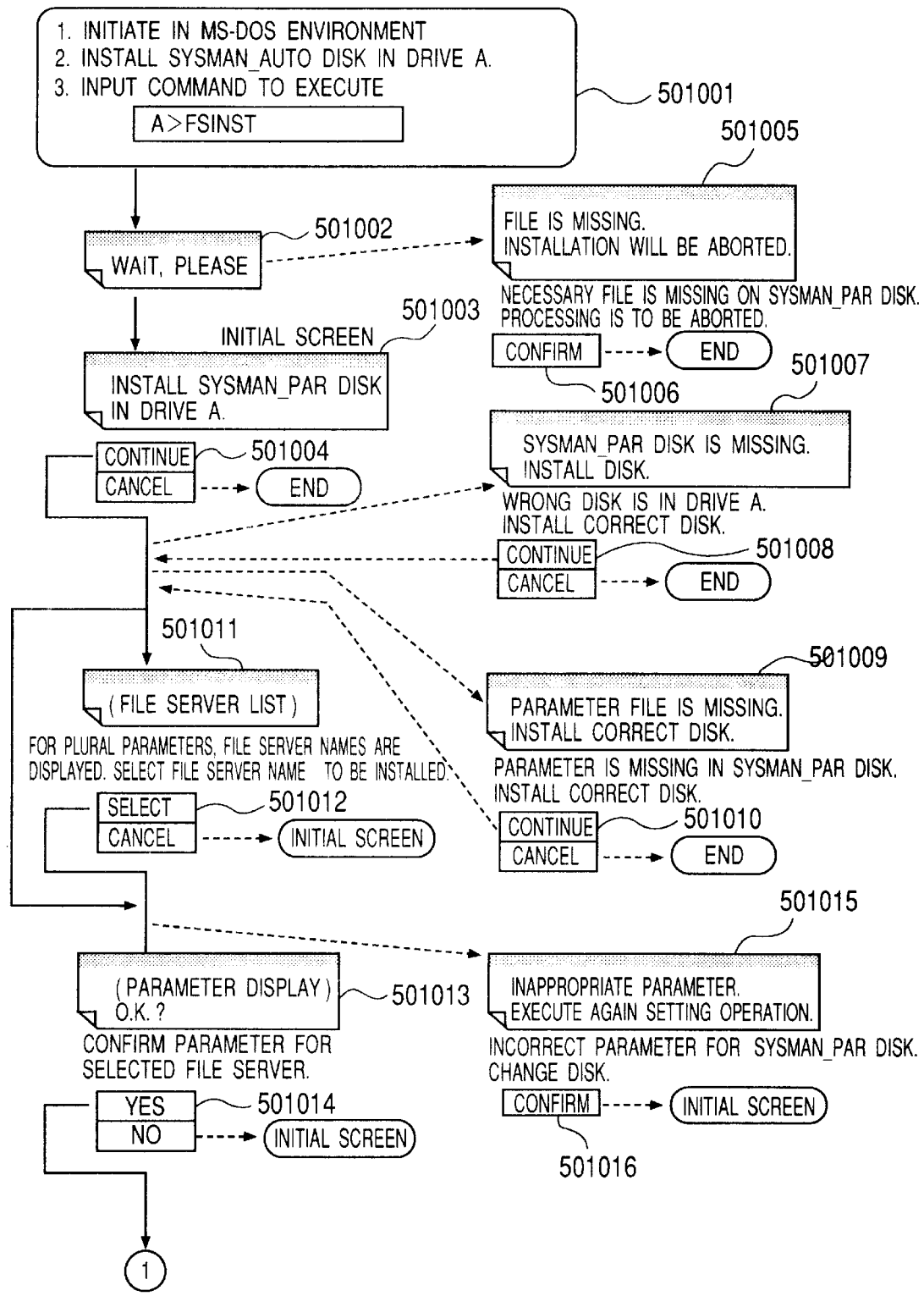
Figure 120:
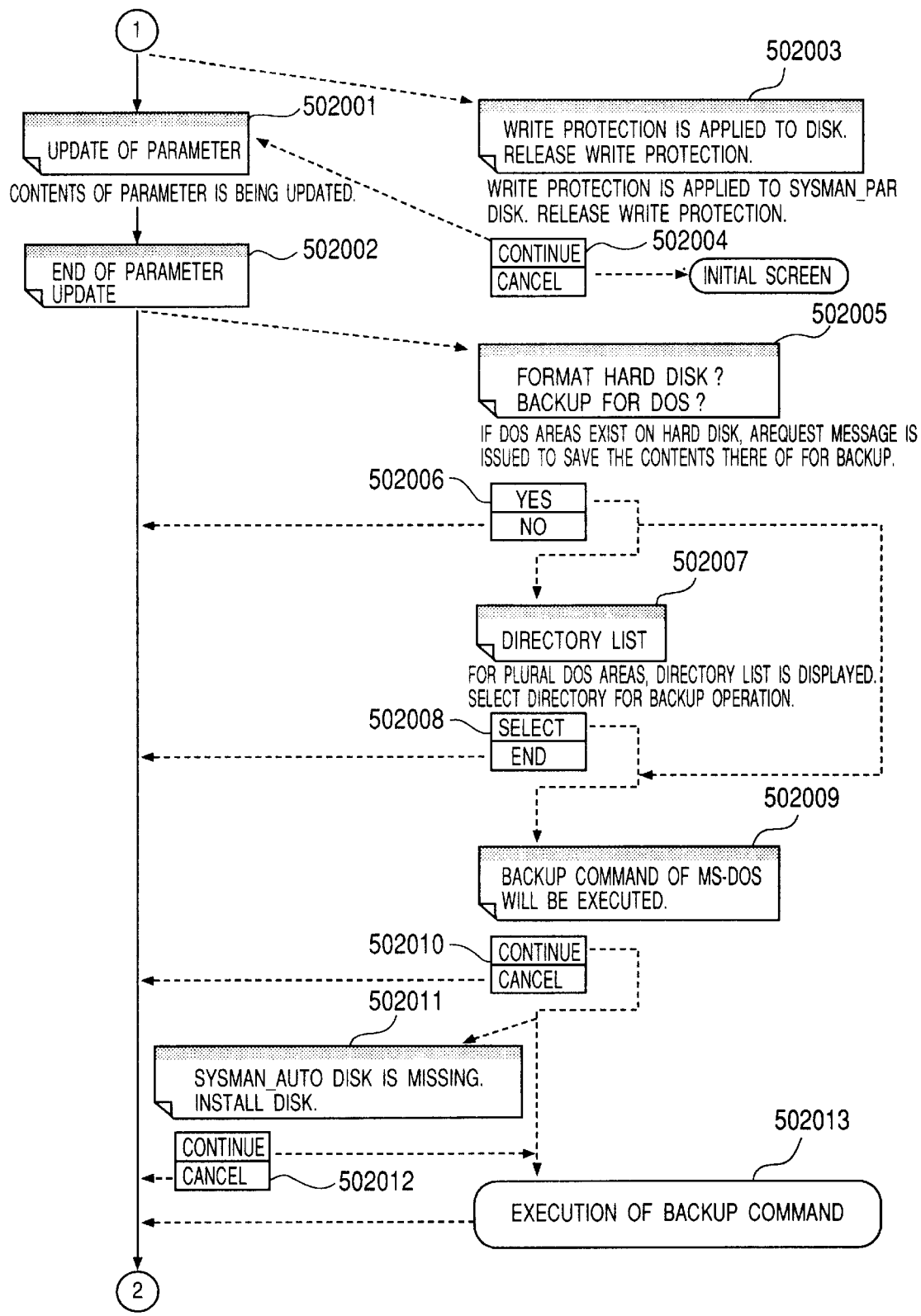

As described above, for a button on which a character is written, the color thereof is black when the button is not in the depressed state and is a clear green when the button is depressed. In the disabled state, the color of character is grey for any button. Resultantly, the buttons available for selection, those in the selected state, and those in the disabled state can be easily discriminated from each other. Clear green has been selected from 16 available colors of the buttons in the depressed state for the following reasons. Red and green efficiently attract attention of the user and are suitable for characters. Of these colors, red is associated with a negative image for the user. However, when a character or line is displayed in a clear color, there may appear obscurity and hence visibility of character is deteriorated as shown in FIGS. 115 and 116. FIG. 115 shows a button without shade and without focus when the character is displayed in a clear color, whereas FIG. 116 shows a button without shade and with focus when the character is displayed in a clear color. Consequently, when a character of a clear color is to be employed, there is required a black or dark grey shade. Namely, for the character of such a clear color, there is necessitated a particular job to improve visibility of the character. FIG. 117 shows an "on" button without focus and in the depressed state, whereas FIG. 118 is an "onf" button with focus and in te depressed state. When a button with a character written thereon is in the depressed state, the character is presented in a light green. Description will now be given of an example of a letter I, namely, the portions 443001 and 444001 of FIGS. 117 and 118, respectively. First, a one-bit wide line is drawn in black on the right and lower sides of the character as indicated by numerals 43002 to 43004 and 444002 to 444004. Next, on the peripheral of the characters in a clear green and that of black shades, there are formed one-bit wide shade portions in a dark grey as designated by numerals the 443004 and 444004. The shade portions facilitate the user to read the letters respectively of FIGS. 117 and 118 as compared with those of FIGS. 115 and 116.

Provision of the button above expectedly leads to the following advantages.

Thanks to the shades formed on the button, the button is displayed in a quasi-three-dimensional manner. This gives reality thereof to the user and hence the user can obtain a quasi-three-dimensional sensation from the button image.

Presentation the button above is altered according to the state related thereto, which helps the user attain a quasi-real feeling of button operations. Accordingly, the user can recognize the current selection state and items at once.

Next, the operation of the file server installer (AUTO section, which will be abbreviated as FS AUTO herebelow) will be described. The FS_AUTO automatically accomplishes installation of the NetWare according to the contents of the parameter files generated by the file server installer (GUI section).

In relation to the processing above, the following item will be described in details by referring to FIGS. 119 to 124.

1. Processing of automatic execution of FS_AUTO

In an initiating operation of the FS_AUTO, an objective machine is initiated in the MS-DOS environment in a step 501001. Next, a SYSMAN_AUTO disk is installed in the drive A and then a command FSINST is inputted from the keyboard.

In response to the initiation in the step 501001, a message 501002 is presented on the screen. In this situation, if there are missing any files necessary for the FS_AUTO initiation on the SYSMAN_AUTO disk, a message as denoted by a numeral 501005 notifying the pertinent files is displayed in the screen and then a message 501006 awaiting confirmation of termination by the operator is presented, thereby waiting for confirmation from the operator. Recognizing necessity of termination, when the operator inputs "Confirm" for O.K., the FS_AUTO is terminated.

When the message 501002 is displayed and the FS_AUTO is normally initiated, a message 501003 is presented in an initial screen and a message 501004 is displayed to request the operator for the next instruction. For an instruction to continue the installation, the operator installs the SYSMAN_PAR disk in the drive A and then activates "Continue". For termination, the operator depresses "Cancel".

When "Continue" is inputted in the frame 501004, the FS_AUTO checks the disk in the drive A. If the installed disk is other than the SYSMAN_PAR disk, a message 501007 is presented to request the operator to change the disk. In response to an indication 501008, when the installation is to be continued, the operator installs the SYSMAN_PAR disk in the drive A and then inputs "Continue". When the installation is to be ended, the operator activates "Cancel".

If there are missing parameter files necessary on the SYSMAN_PAR disk, a message 501009 is displayed to request the operator to change the disk. In response to an indication 501010, when the installation is to be continued, the operator installs the SYSMAN_PAR disk in the drive A and then inputs "Continue". When the operation is to be ended, the operator activates "Cancel".

After the message 501004 is presented, when the SYSMAN_PAR disk is normally installed, a file server list 501011 is displayed. In this case, if there exists only one file server to be presented, a message 501013 is displayed in place of the list 501011.

After the message 501011, there is presented a message 501012 to request the operator to select a file server. In response thereto, the operator chooses a file server for the installation and then activates "Select". When the operation is to be ended, the operator activates "Cancel".

After the operator selects the file server, the FS_AUTO checks the contents of the parameter file. If the contents are inappropriate, a message 501015 is presented for confirmation of the operator. Recognizing the message, the operator inputs "Confirm" and then the FS_AUTO displays the message 501003, thereby passing control to the processing above.

When a file server is selected or when there exists only one file server in the parameter file, the message 501013 is presented for confirmation of the operator. To continue the installation, the operator inputs "Yes". To interrupt the installation, the operator inputs "No". In response thereto, the FS_AUTO displays the message 501003, thereby passing control to the processing above.

When "Yes" is inputted from the operator, the FS_AUTO presents a message 502001 and writes an event of use of parameter file on the SYSMAN_PAR disk. If the write protection is being applied to the disk, a message 502003 is displayed to report the condition to the operator. According to a message 502004, to continue the installation, the operator releases the write protection and then inputs "Continue". To restore the initial screen 501003, the user activates "Cancel".

After the event of use of parameter file is written on the disk, the FS_AUTO displays a message 502002.

Thereafter, if the hard disk contains a DOS area, the FS_AUTO presents a message 502005 to request the user to save the contents of hard disk for backup thereof in a possible accident. In response thereto, if it is desired to produce a backup disk, the operator activates "Yes"; otherwise, the user inputs "No".

In a case where there exist a plurality of DOS areas for the backup operation when "Yes" is replied to the message 502006, a message 502007 is presented to request the operator for directory selection. According to a message 502008, the operator picks a directory and then inputs "Select". If control is to be passed to the installation without producing the backup disk, the operator activates "End".

In a case where there exists only one DOS area for the backup operation when "Yes" is replied to the message 502006, a message 502009 is presented in place of the message 502007.

When a directory is selected for backup in response to the message 502007 or when there exists only one DOS area, messages 502009 and 502010 are successively presented to request the operator for the next instruction. According to the message 501010, to continue the backup processing, the operator selects "Continue". To instruct termination, the user activates "Cancel".

Since the FS_AUTO uses MS-DOS commands to create the backup of the DOS area, if the SYSMAN_AUTO disk is missing in the drive A, there is presented a message 502011 to request the operator for an action. According thereto, if the backup operation is to be continued, the operator installs the disk on the drive A and then inputs "Continue". For an interruption of backup operation, the user activates "Cancel".

When the backup is selected in the message 502010 or 502012, an MS-DOS command is activated for backup as indicated by a message 502013 to produce the backup of the DOS area.

If the backup operation is desired to be finished or is not conducted, a message 503001 is presented to request the operator for a response. According to a selection message 503002, to continue the installation, the operator installs the SYSMAN_AUTO disk in the drive A and then selects "Continue". For termination of the operation, the operator activates "Cancel".

When "Cancel" is selected in the message 503002, the FS_AUTO presents a request message 503005 to the user. According to a selection message or item 503006, to end the installation, the operator selects "To DOS". To restore the initial screen 501003, the user enters "To start".

When the operator instructs continuation of the installation in the step 503002, the FS_AUTO writes the contents of the parameter file on the SYSMAN_AUTO disk for temporary storage thereof. If the write protection is being applied to the disk, a message 503007 is displayed to report the condition to the operator. According to a message 503008, to continue the installation, the operator releases the write protection and then inputs "Continue". To return control to the screen 503005, the user activates "Cancel".

Moreover, when the SYSMAN_AUTO disk is missing in the drive A, a message 503009 is presented to request the operator for an action. According to an indication 503010, to continue the installation, the operator installs the SYSMAN_AUTO disk in the drive A and then inputs "Continue". To return control to the screen 503005, the user activates "Cancel".

After the message 503002 is displayed, when the SYSMAN_AUTO disk is normally installed, messages 503003 and 503004 are displayed to respectively notify the operator that the processing is being executed and is already finished.

The FS_AUTO displays a message 503011 after the message 503004 and then initializes the hard disk according to the contents indicated by the parameter file.

Figure 124:
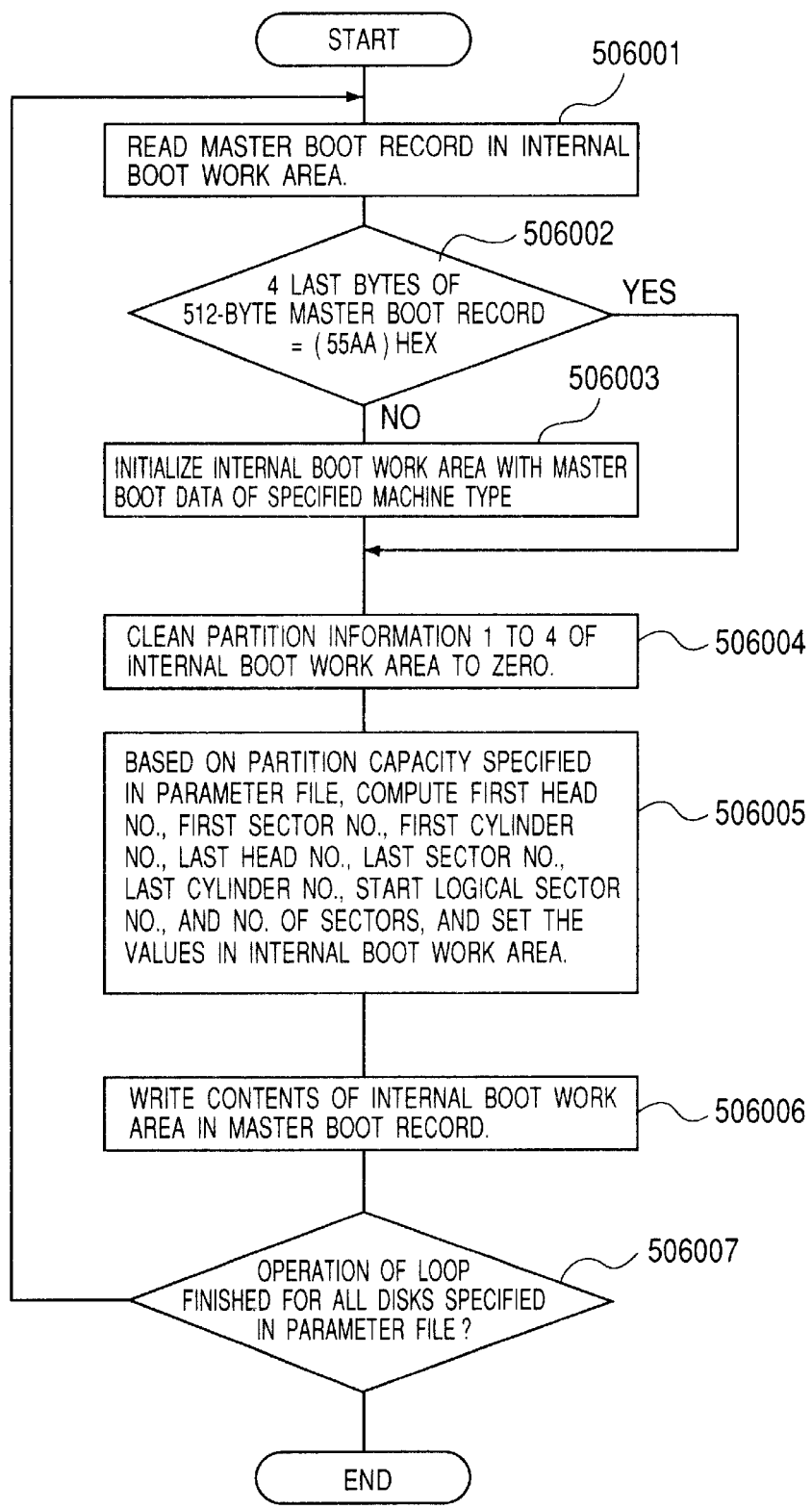

Referring now to FIG. 124, the initialization of hard disk will be described.

In a step 506001, a 512-byte master boot record is read in an inner boot work area. In a step 502002, if four last bytes are hexadecimal codes "55AA", it is assumed that the initialized data exists for the master boot record and hence control is transferred to a step 506004. Otherwise, since the master boot is assumed to have not been initialized, a step 506003 is executed to initialize the internal boot work area with master boot data for a machine type specified by the parameter file. Subsequently, partition information items 1 to 4 of the master boot record are cleared. Based on the number of partitions and each partition capacity denoted by the parameter file, the program computes a start head number, a start sector number, a start cylinder number, a last head number, a last sector number, a last cylinder number, a start logical sector number, and a number of sectors, thereby setting the obtained items in the internal boot work area. Next, in a step 506006, the data items generated in the internal boot work area are written in the master boot. The processing above is repeatedly accomplished as many times as there are hard disks, thereby completing the initialization thereof.

When the hard disk initialization is normally ended, a re-boot operation is effected as indicated by the step 503012.

When the re-boot operation is finished, the FS_AUTO presents the messages 503013 and 503014 and then initializes partitions of the hard disks.

When the partitions are completely initialized, the message 504001 is presented to request the operator for a response. According to the indication 504002, to continue the installation, the operator installs the DOS system disk in the drive A and then activates "Continue". For termination, the operator selects "Cancel".

When "Continue" is inputted in response to the indication 504002, the FS_AUTO checks the disk in the drive A. If the disk is other than the DOS system disk, the message 504005 is presented to request the operator for a response. According to the indication 504006, to continue the installation, the operator installs the DOS system disk in the drive A and then activates "Continue". To terminate the operation, the operator selects "Cancel".

After the message 504002 is presented, when the DOS system disk is normally installed, the messages 504003 or 504004 are displayed to notify the operator that the processing is being executed or is already terminated, respectively.

When the DOS areas are completely generated, the message 504007 is presented to request the operator for a response. According to the indication 504008, to continue the installation, the operator installs one (SYSTEM-1 disk) of the NetWare system disks in the drive A and then activates "Continue". To terminate the operation, the operator selects "Cancel".

When the operator instructs continuation of the installation in the step 504008, the FS_AUTO checks the disk in the drive A. If the disk is other than the SYSTEM-1 disk, a message 504011 is presented to request the operator to change the disk. According to an indication 504012, to continue the installation, the operator installs the SYSTEM-1 disk in the drive A and then inputs "Continue". For termination, the user activates "Cancel".

After the message 504008 is displayed, when the SYSTEM-1 disk is normally installed, messages 504009 and 504010 are displayed to respectively notify the operator that the processing is being executed and is already finished.

When the SYSTEM-1 is completely copied, a message 504013 is present to request the operator for an action. According to an indication 504014, to continue the installation, the operator installs one (SYSTEM-2) of the NetWare system disks in the drive A and then activates "Continue". To terminate the operation, the operator inputs "Cancel".

When the operator instructs continuation of the installation in the step 504014, the FS_AUTO checks the disk in the drive A. If the disk is other than the SYSTEM-2 disk, a message 504017 is presented to request the operator to change the disk. According to an indication 504018, to continue the installation, the operator installs the SYSTEM-2 disk in the drive A and then inputs "Continue". For termination, the user activates "Cancel".

After the message 504014 is displayed, when the SYSTEM-2 disk is normally installed, messages 504015 and 504016 are displayed to respectively notify the operator that the processing is being executed and is already finished.

When the SYSTEM-2 is completely copied, a message 505001 is presented to request the operator for an action. According to an indication 505002, to continue the installation, the operator installs one (LAN_DRV_908) disk) of the LAN driver disks in the drive A and then activate "Continue". To terminate the operation, the operator inputs "Cancel".

When the operator instructs continuation in the step 505002, the FS_AUTO checks the disk in the drive A. If the disk is other than the LAN_DRV_908 disk, a message 505005 is presented to request the operator to change the disk. According to an indication 505006, to continue the installation, the operator installs the LAN_DRV_908 disk in the drive A and then inputs "Continue". For termination, the user activates "Cancel".

After the message 505002 is displayed, when the LAN_DRV_908 disk is normally installed, messages 505003 and 505004 are displayed to respectively notify the operator that the processing is being executed and is already finished.

When the LAN_DRV_908 is completely copied, a message 505007 is present to request the operator for an action. According to an indication 505008, to continue the installation, the operator installs SYSMAN AUTO disk in the drive A and then activates "Continue". To terminate the operation, the operator inputs "Cancel".

When the operator instructs continuation in the step 505008, the FS_AUTO checks the disk in the drive A. If the disk is other than the SYSMAN_AUTO disk, a message 505013 is presented to request the operator to change the disk. According to an indication 505014, to continue the installation, the operator installs the SYSMAN_AUTO disk in the drive A and then inputs "Continue". For termination, the user activates "Cancel".

After the message 505008 is displayed, when the SYSMAN_AUTO disk is normally installed, there are presented messages 505009 and 501010 to respectively notify the operator that the processing is being executed and is terminated.

When the operator instructs continuation of installation in the step 505008, in order to update the reference files (such as AUTOEXEC.NCF and FILEDATA.DAT files), the system writes pertinent data in the SYSMAN_AUTO disk. If the write protection is being applied to the disk, a message 505011 is presented to notify the condition to the user. According to a message 505012, for continuation of the installation, the operator releases the write protection and then activates "Continue". To terminate the operation, the operator inputs "Cancel".

If the SYSMAN_AUTO disk is missing in the drive A, a message 505013 is presented to request the operator for an action. According to an indication 505014, to continue the installation, the operator installs the SYSMAN_AUTO disk in the drive A and then activates "Continue". To terminate the operation, the operator inputs "Cancel".

After the SYSMAN_AUTO is thus completely updated, a message 505015 is presented for an operator's instruction. According to a message 505016, to display explanation of the NetWare server initiation (SERVER) command, the operator inputs "YES". In other cases, the user inputs "NO". In response to "YES" in the step 505016, a message 505017 is displayed and then a message 505018 is presented to request the user for an instruction. After the explanation is completed, to pass control to an execution of the SERVER command, the operator inputs "END".

When "NO" is activated after the explanation of SERVER command or in the step 505016, the SERVER command is initiated as indicated by a reference numeral 505019, thereby terminating the FS_AUTO operation.

Through the operations above, the automatic execution processing of FS_AUTO is accomplished.

Next, description will be given of operation of the client installer. The client installer (AUTO section to be abbreviated as WS_AUTO herebelow) conducts an automatic execution of NetWare installation in accordance with the contents of parameter file produced by the client installer (GUI section).

Figure 125:
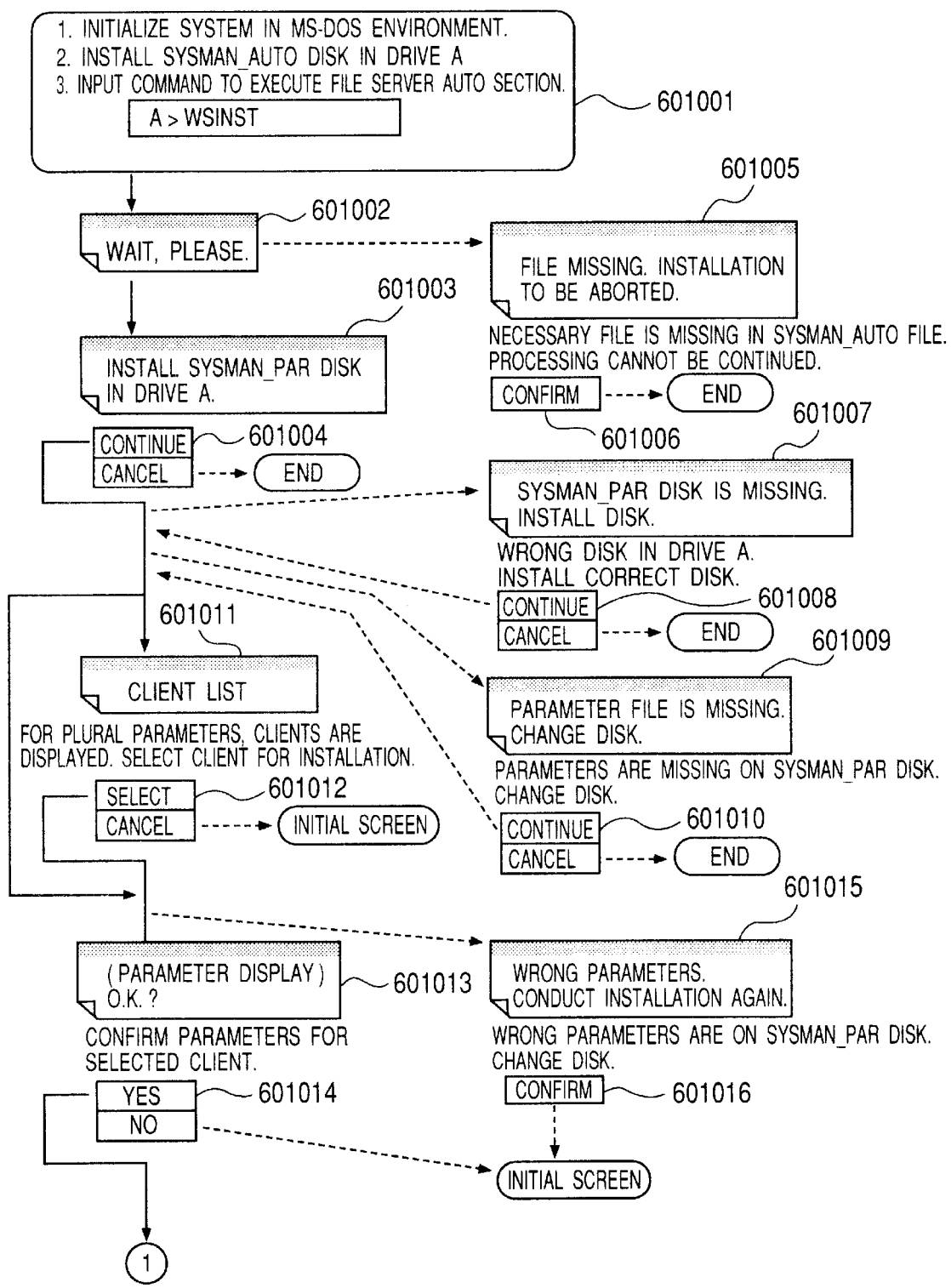
Figure 126:
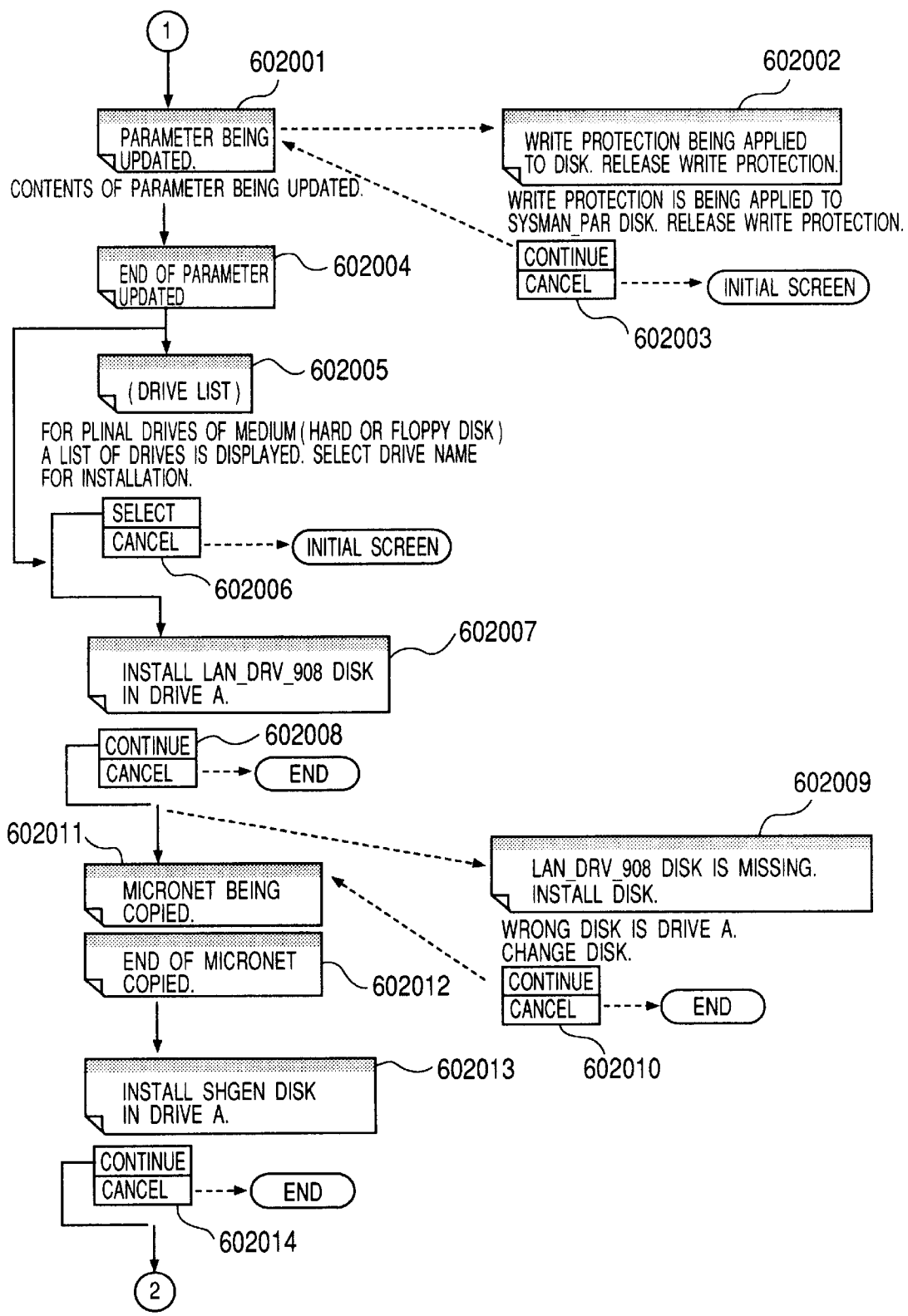
Figure 127:
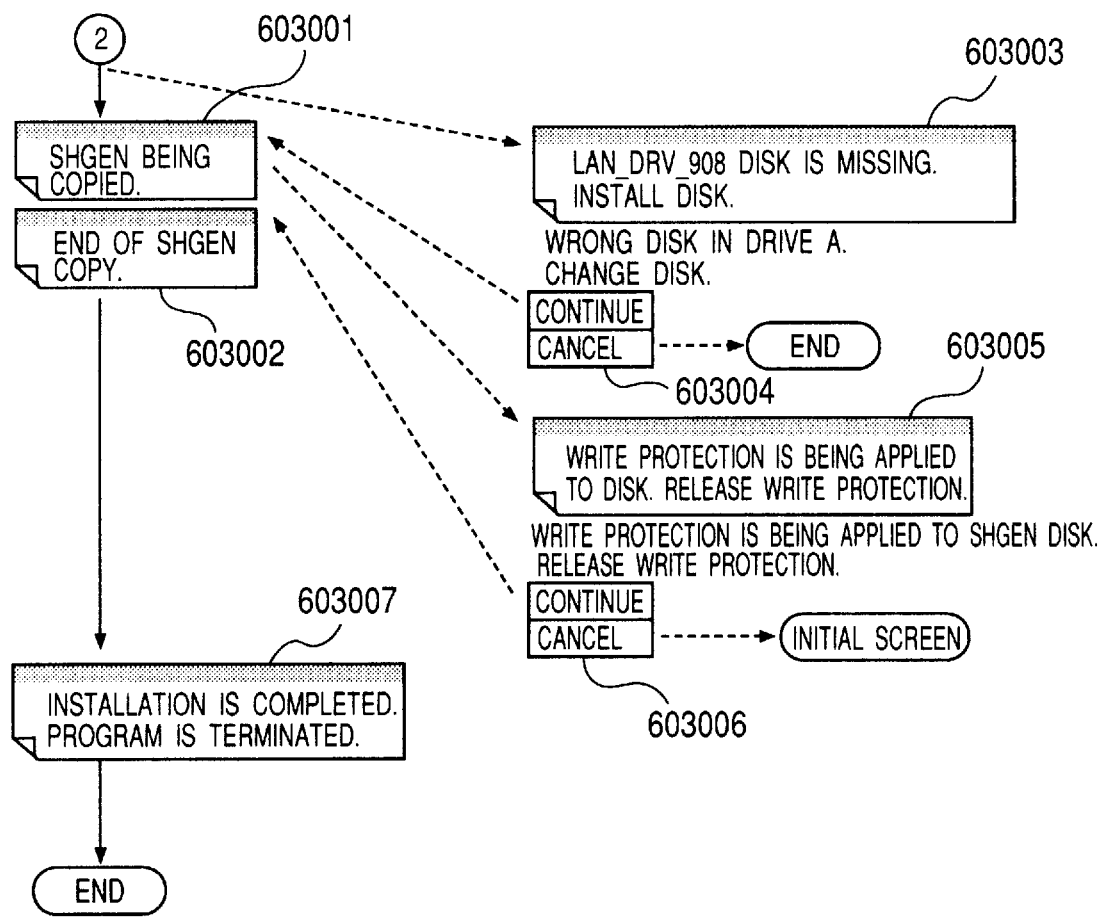
Figure 128:
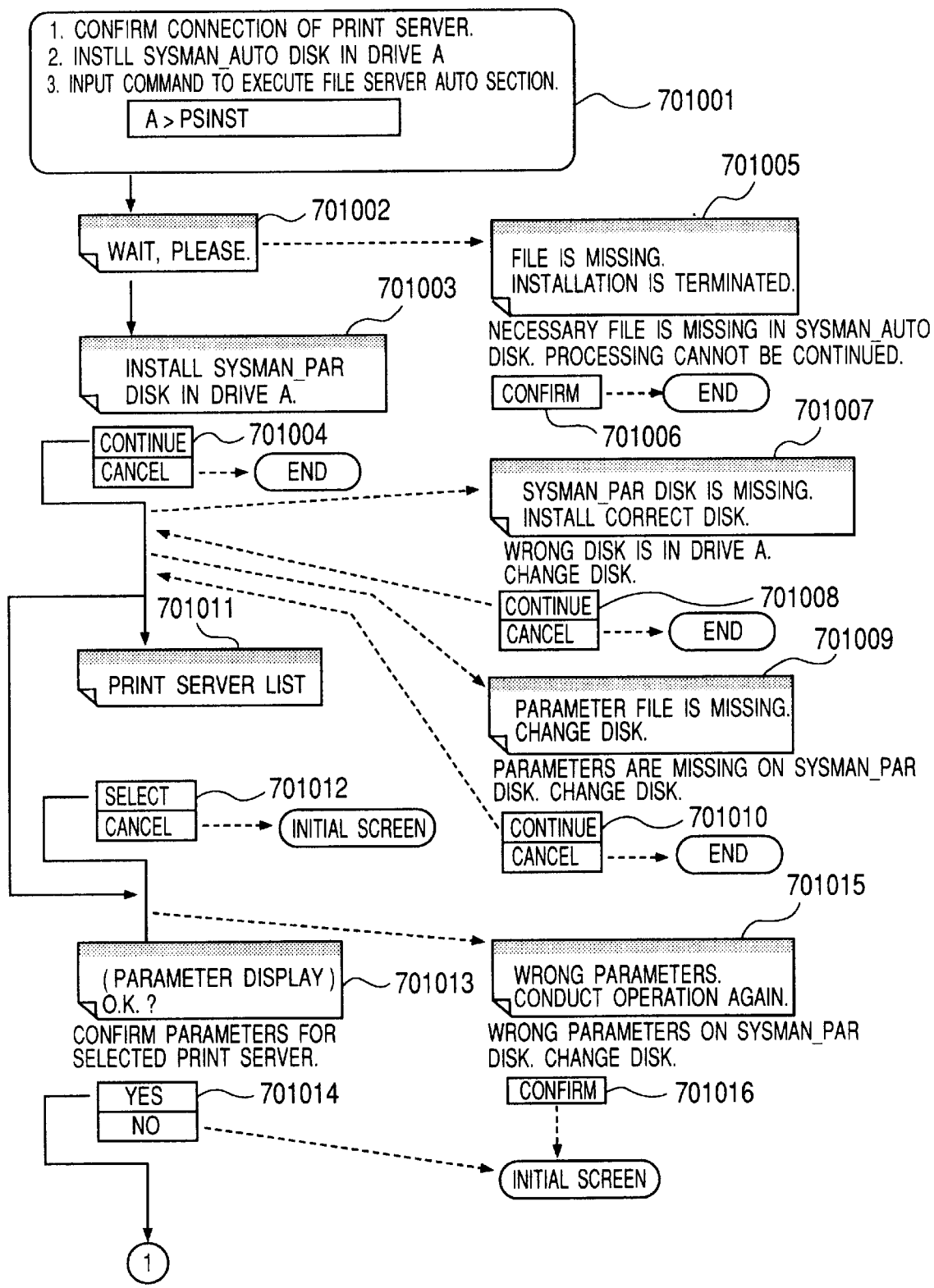
Figure 129:
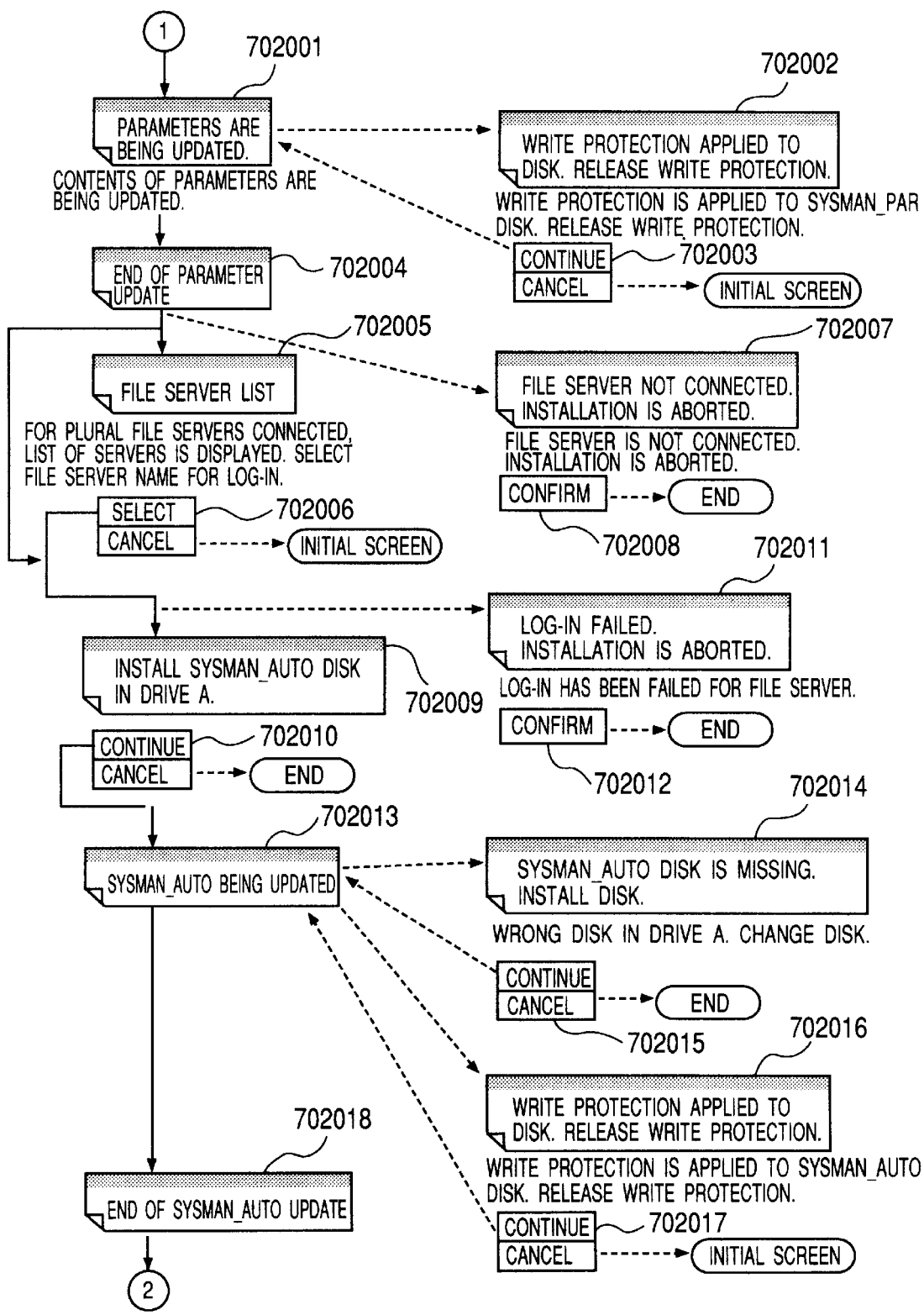
Figure 130:
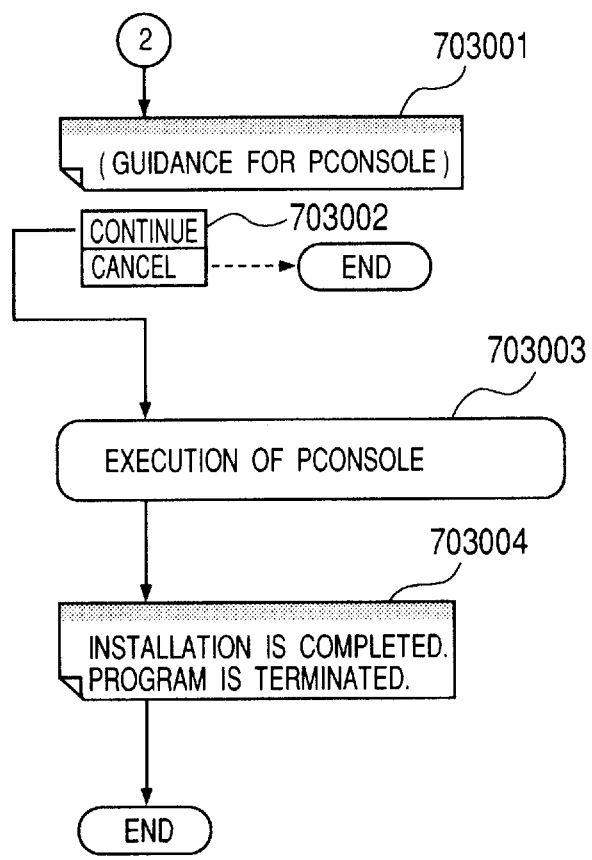

The processing of the WS_AUTO will now be described in detail for the following item by reference to FIGS. 125 to 127.

1. Processing of automatic WS_AUTO execution For initiation of WS_AUTO, an objective machine is first initiated in the MS-DOS environment as indicated by a numeral 601001. Subsequently, the SYSMAN_AUTO disk is installed in the drive A and then a command "WSINST" is inputted from the keyboard.

In response to the initial operation 601001, a message 601002 is presented in the screen. In this situation, if there is missing any file necessary for the initiation of WS_AUTO in the SYSMAN_AUTO disk, a message 601005 is displayed for a missing file on the screen and then a message 601006 is presented to wait for confirmation of termination from the user, thereby awaiting a user's action. When the operator confirms termination and inputs the pertinent instruction, the WS_AUTO is terminated.

When the message 601002 is presented and the WS_AUTO is normally started, an initial image 601003 is displayed in the screen. With an indication 601004, the system requests the user for an instruction. To continue the installation, the operator installs SYSMAN_PAR disk in the drive A and then activates "Continue". To terminate the operation, the operator inputs "Cancel".

When the operator instructs continuation in the step 601004, the WS_AUTO checks the disk in the drive A. If the disk is other than the SYSMAN_PAR disk, a message 601007 is presented to request the operator to change the disk. According to an indication 601008, to continue the installation, the operator installs the SYSMAN_PAR disk in the drive A and then inputs "Continue". For termination, the user activates "Cancel".

If the parameter file is missing in the SYSMAN_PAR disk, a message 601009 is displayed for a change of disk. According to an indication 601010, to continue the installation, the operator installs the SYSMAN_PAR disk in the drive A and then inputs "Continue". For termination, the user activates "Cancel".

After the message 601004 is displayed, when the SYSMAN_PAR disk is normally installed, the system presents a client list 601011. In this case, if there exists only one client, a message 601013 is displayed in place of the list 601011.

After the message 601011, a message 601012 is presented for the user to select a client. The operator selects a client for the installation and then inputs "Select". For termination, the user activates "Cancel".

When the operator selects a client, the WS_AUTO checks the contents of the parameter file. If there exists any wrong item in the contents thereof, a message 601015 is presented for confirmation of the operator. After recognizing the message, the operator activates "Confirm". The WS_AUTO then displays the initial screen 601003 to conduct again the above processing.

When a client is selected or when there is only one client in the parameter file, a message 601013 is displayed for confirmation of parameters by the operator. Recognizing the message, to continue the installation, the operator activates "YES". To terminate the installation, the user selects "NO". As a result, the WS_AUTO displays the initial screen 601003 to conduct again the above processing.

When the operator inputs "YES", the WS_AUTO achieves a write access to the SYSMAN_PAR disk to record a use of parameter file thereon. If the write protection is being applied to the disk, a message 602002 is presented to notify the condition to the user. According to a message 602003, for continuation of the installation, the operator releases the write protection and then activates "Continue". To restore the initial screen 601003, the operator inputs "Cancel".

After the recording of use of parameter file is finished, the WS_AUTO displays a message 602004 to present a drive list for installation 602005. In this situation, if there exists only one drive, the system displays a message 602007 in place of the list 602005.

After the message 602005, a message 602006 is displayed for the operator to select a drive for the installation. The operator picks a drive and then inputs "Select". For termination, the operator activates "Cancel".

When a drive is selected or when there is only one drive, a message 602007 is displayed and then a message 602008 is presented for the operator to install the LAN_DRV_908 disk. To terminate the installation, the user installs the disk in the drive A and then selects "Continue". For termination, the operator activates "Cancel".

When the operator selects "Continue", the WS_AUTO checks the disk in the drive A. If the disk is other than the LAN_DRV_908 disk, a message 602009 is presented to change the disk. To continue the installation, the operator installs the LAN_DRV_908 disk in the drive A and then activates "Confirm". To terminate the installation, the operator inputs "Cancel".

In response to the message 602008, when the LAN_DRV_908 disk is normally installed, messages 602011 and 602012 are displayed to notify the operator that the processing is being executed and is terminated, respectively.

After the message 602012, a message 602013 is presented for the to install one (SHGEN) of the NetWare system disks by use of a button indication 602014. For continuation of the installation, the operator installs the SHGEN disk in the drive A and then inputs "Continue". To stop the installation, the operator selects "Cancel".

When the user inputs "Continue" via the indication 602014, the WS_AUTO checks the disk in the drive A. If the disk is other than SHGEN, a message 603003 is presented to request the user for a disk change. According to an indication 603004, to continue the installation, the operator install the SHGEN disk in the drive A and then inputs "Continue". For termination thereof, the operator activates "Cancel".

After the indication 602014, when the SHGEN disk is normally installed, messages 603001 and 603002 are displayed to notify the operator that the processing is being executed and is terminated, respectively.

After the message 603002, when the installation is completely finished, a message 603007 is presented to terminate the installation.

As a result of the above operations, the processing of automatic WS_AUTO execution has been achieved.

Subsequently, description will be given of operation of the print server installer. The print server installer (AUTO section to be abbreviated as PS_AUTO herebelow) conducts an automatic execution of NetWare installation in accordance with the contents of parameter file produced by the print server installer (GUI section).

The processing of the PS_AUTO will now be described in detail for the following items by reference to FIGS. 128 to 132.

1. Processing of automatic PS_AUTO execution

For initiation of PS_AUTO, an objective machine is first initiated in the MS-DOS environment as indicated by a numeral 701001. Subsequently, the SYSMAN_AUTO disk is installed in the drive A and then a command "PSINST" is inputted from the keyboard.

In response to the initial operation 701001, a message 701002 is presented in the screen. In this situation, if there is missing any file necessary for the initiation of PS_AUTO in the SYSMAN_AUTO disk, a message 701005 is displayed for the missing file on the screen and then a message 701006 is presented to wait for confirmation of termination from the user, thereby awaiting a user's action. When the operator confirms termination and inputs the pertinent instruction, the PS_AUTO is terminated.

When the message 701002 is presented and the PS_AUTO is normally started, an initial image 701003 is displayed in the screen. With an indication 701004, the system requests the user for an instruction. To continue the installation, the operator installs SYSMAN_PAR disk in the drive A and then activates "Continue". To terminate the operation, the operator inputs "Cancel".

When the operator instructs continuation in the step 701004, the PS_AUTO checks the disk in the drive A. If the disk is other than the SYSMAN_PAR disk, a message 701007 is presented to request the operator to change the disk. According to an indication 701008, to continue the installation, the operator installs the SYSMAN_PAR disk in the drive A and then inputs "Continue". For termination, the user activates "Cancel".

If the parameter file is missing in the SYSMAN_PAR disk, a message 701009 is displayed for a change of disk. According to an indication 701010, to continue the installation, the operator installs the SYSMAN_PAR disk in the drive A and then inputs "Continue". For termination, the user activates "Cancel".

After the message 701004 is displayed, when the SYSMAN_PAR disk is normally installed, the system presents a print server list 701011. In this case, if there exists only one print server, a message 701013 is displayed in place of the list 701011.

After the message 701011, a message 701012 is presented for the user to select a print server. The operator selects a print server for the installation and then inputs "Select". For termination, the user activates "Cancel".

When the operator selects a print server, the PS_AUTO checks the contents of the parameter file. If there exists any wrong item in the contents thereof, a message 701015 is presented for confirmation of the operator. After recognizing the message, the operator activates "Confirm". The PS_AUTO then displays the initial screen 701003 to conduct again the above processing.

When a print server is selected or when there is only one print server in the parameter file, a message 701013 is displayed for confirmation of parameters by the operator. Recognizing the message, to continue the installation, the operator activates "YES". To terminate the installation, the user selects "NO". As a result, the PS_AUTO displays the initial screen 701003 to return again to the above processing.

When the operator inputs "YES", the PS_AUTO achieves a write access to the SYSMAN_PAR disk to record a use of parameter file thereon. If the write protection is being applied to the disk, a message 702002 is presented to notify the condition to the user. According to a button message 702003, for continuation of the installation, the operator releases the write protection and then activates "Continue". To restore the initial screen 701003, the operator inputs "Cancel".

When the recording of use of parameter file is completed, the PS_AUTO presents a message 702004 to present a file server list for installation 702005. In this situation, if the file server is not connected, the system displays a message 702007 for confirmation of user. When the user recognizes the end of processing and inputs "Confirm", the PS_AUTO finishes its operation.

After the message 702004 is displayed, when the file server is normally connected and there exists only one server to be presented, a message 702009 is displayed in place of the list 702005.

After the message 702005, a message 702006 is displayed for the operator to select a file server for the installation. The operator picks a file server and then inputs "Select". For termination, the operator activates "Cancel".

The PS_AUTO makes an attempt to establish connection to the file server. If this fails, however, a message 702011 is presented for confirmation of the user. When the operator assumes the end of operation and activates "Confirm", the PS_AUTO finishes its operation.

When the connection to the file server is normally established, a message 702009 is displayed. According to a message 702010 requesting the SYSMAN_AUTO disk, to continue the installation, the operator installs the SYSMAN_AUTO disk in the drive A and then selects "Continue". For termination, the operator activates "Cancel".

When the operator selects "Continue" from the indication mark 702010, the PS_AUTO checks the disk in the drive A. If the disk is other than the SYSMAN_AUTO disk, a message 702014 is presented to change the disk. According to an indication 702015, to continue the installation, the operator installs the SYSMAN_AUTO disk in the drive A and then activates "Continue". To terminate the installation, the operator inputs "Cancel".

When the operator inputs "Continue", the PS AUTO achieves a write access to the SYSMAN_AUTO disk to temporarily store the contents of the parameter file therein. In this situation, if the write protection is being applied to the disk, a message 702016 is presented to notify the condition to the operator. According to an indication message 702017, to continue the installation, the operator releases the write protection and selects "Continue". To restore the initial screen, the user inputs "Cancel".

After the message 702009 is displayed, when the SYSMAN_AUTO disk is normally installed, messages 702013 and 702018 are presented to notify the operator that the processing is being executed and is already terminated, respectively.

After the message 702018, a message 703001 is displayed for explanation of processing of a utility routine Pconsole for setting the NetWare print server. Thereafter, a button message 703002 is presented for an operator's instruction. According to the message 703002, for continuation of the installation, the operator selects "Continue". For termination thereof, the operator inputs "Cancel".

After the indication 703002 is displayed. Pconsole is executed as indicated by a numeral 703003. In this operation, the operator need only achieve registration of a print server name for the Pconsole processing.

After the registration of the print server name of Pconsole is normally finished, the PS_AUTO actually starts the installation of the print server.

Figure 131:
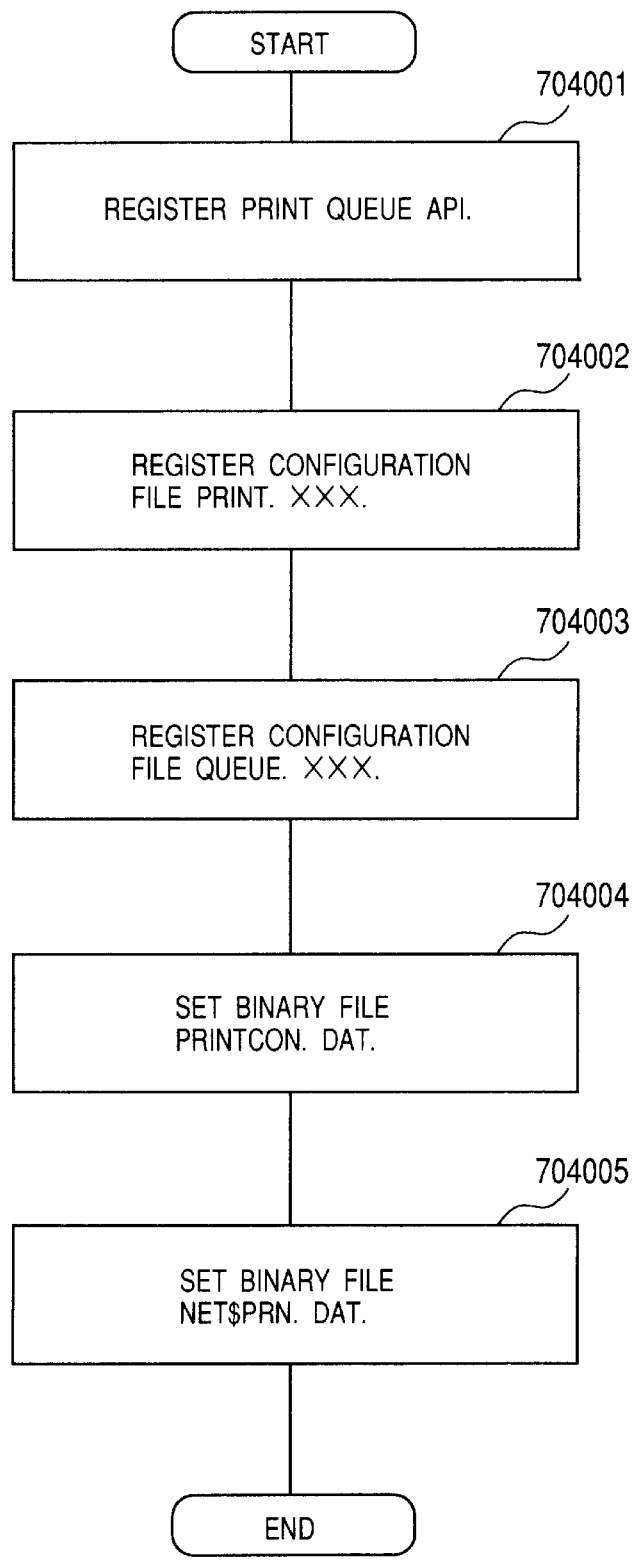

FIG. 131 shows the contents of processing of the print server installation. Of the utility routines supported by NetWare, processing steps of Pconsole, Printdef, and Printcon are realized by programs for automatic execution.

Figure 132:
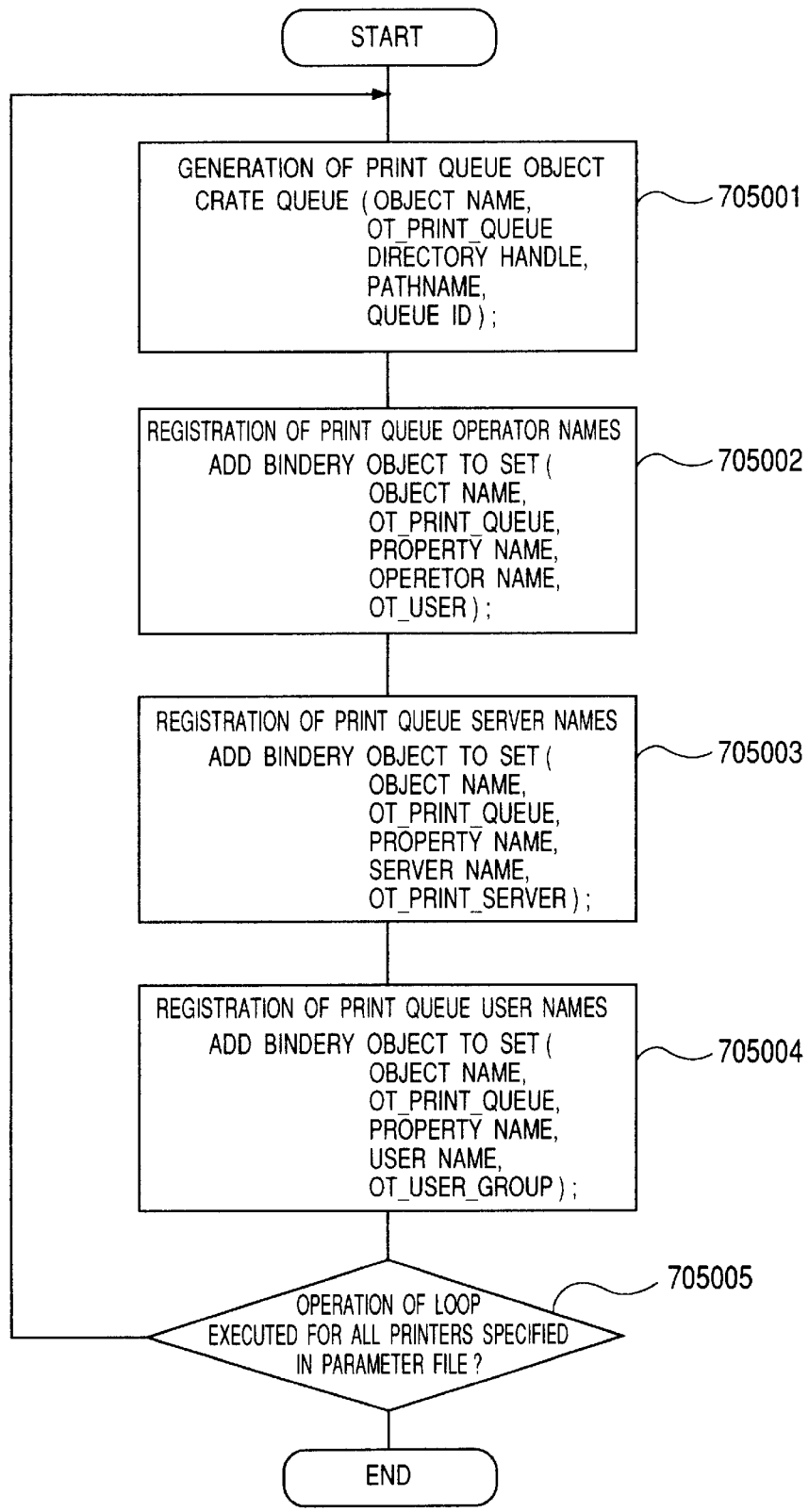

FIG. 132 shows details of the registration of print queues according to an API function 704001.

PRINT.xxx (xxx stands for an internal printer number and ranges from 000 to 015 for up to 16 printers) in a step 704002 denotes a configuration file generated in the printer setting operation of Pconsole. In this case, the PRINT.xxx file is automatically created by PS AUTO.

QUEUE.xxx (xxx is the same as for PRINT.xxx) in a step 704003 designates a configuration file generated in the queue setting operation to define queues in Pconsole. In this case, the QUEUE.xxx file is automatically created by PS_AUTO.

PRINTCON.DAT in a step 704004 stands for a binary file generated in the Printcon. In this case, the PRINTCON.DAT file is automatically created by PS AUTO.

NET$PRN.DAT in a step 704004 stands for a binary file generated in the Printdef. In this case, the NET$PRN.DAT file is created in advance such that a saved NET$PRN.DAT file will be copied for the processing.

When all installation steps are normally ended, a message 703004 is presented to terminate the installation.

Through the operations above, the processing of automatic PS_AUTO execution has been accomplished.

Referring now to FIGS. 133 to 135, the structure of parameter files will be described. The respective parameters are classified according to the machine types, connection types, and operation modes based on information of network configuration so as to be sorted in portable parameter files. Each parameter file is a text-type file developing a satisfactory visual effect and includes a parameter record 801004 and a comment record 801005. The record 801004 has an identification number 801001 for identifying a kind of parameter, a header field 801002 containing arbitrary data, and an actual data field 801003 in which a parameter condition is described. The record 801005 has not any identification number and includes arbitrary data. For both records, the length thereof is variable in a range enabling the record to be displayed without a line change in a display of an ordinary personal computer. The number of records and the sequence of records can be arbitrarily selected.

FIG. 133 is an example of a parameter file actually used by the file server installer to install the NetWare. Numerals 801010 to 801013 denote parameters disposed to control the parameter file itself. The numeral 801010 indicates a counter to store therein the number of uses of the parameter file such that the value thereof is updated each time an installation is achieved according to the setting values of the parameter file. The numeral 801011 stands for a machine type name to be installed as a file server. The numeral 801012 denotes a version number of NetWare and the numeral 801013 indicates a version number of the GUI section of file server installer having created the parameter file. Numeral 801020 to 801022 are parameters to set system control information of file server, namely, a file server name, a network number in IPX, and a network number, respectively. Numerals 801030 to 801039 are parameter setting information of a hard disk driver (to be abbreviated as HDD herebelow). The numeral 801030 designates a number of HDDs to be used and the numerals 801031 to 801039 denote conditions of the respective HDDs to set various conditions for the associated HDD groups. The numerals 801031 to 801034 indicate a driver program name for the first HDD, an interruption vector number, a port address, and a total disk capacity, respectively. The numeral 801035 stands for a number of partitions to be disposed in the HDD. Numerals 801036 and 801037 denote conditions for the respective partitions. Various conditions can be set for the associated partition groups. The numerals 801036 to 801039 designate a type of operating system (OS) controlling the first partition, a disk capacity to be allocated to the partition, a type of OS controlling the second partition and a disk capacity to be allocated to the partition, respectively. Numerals 801050 to 801059 stand for parameters to set communication environments. The numeral 801050 indicates a number of LAN communication cards to be mounted in the file server. The numerals 801051 to 801059 denote conditions for the respective communication cards. Various conditions can be set for the associated LAN communication card groups. The numerals 801051 to 801059 designate a driver program name, an interruption vector number, a port address, a slot number, a frame memory address, a cable type, a packet frame type, a retry count, and a node number, respectively. The respective parameters are classified as follows to be stored in the parameter file accordingly, namely, information items such as the items 801010 to 801030 designating types of machines, information items such as items 801031 to 801050 indicating operation modes necessary for operations in the network, and information items such as items 801051 to 801059 denoting connection types necessary for-connection in the network. The classification also applies to the items which will be described later by reference to FIGS. 134 and 135. The AUTO section of file server installer establishes the system, HDDs, and communication environments according to the parameter files above so as to accomplish the file server installation.

FIG. 134 shows an example of the parameter file actually adopted by the client installer to install the NetWare. Numerals 802010 to 802013 denote parameters disposed to control the parameter file itself. The numeral 802010 indicates a counter to store therein the number of uses of the parameter file. The numeral 801011 stands for a machine type name to be installed as a client. The numeral 802012 denotes a version number of NetWare and the numeral 802013 indicates a version number of the GUI section of file server installer having created the parameter file. Numeral 802020 to 802023 are parameters to set system control information of file server, namely, a client name, a type of drive for the installation, presence or absence of an extended memory, and a type of OS to control the machine to be installed, respectively. Numerals 802030 to 802033 are parameters to set environments of communication cards. The numeral 802030 designates a number of communication cards. Various conditions can be set for the associated partition groups. The numerals 802031 to 802033 denote a driver program name, a cable type, and a LAN communication card setting number, respectively. The AUTO section of client installer establishes the system and communication environments according to the parameter files so as to accomplish the client installation.

FIG. 135 is an example of a parameter file actually used by the print server installer to install NetWare. Numerals 803010 to 803012 denote parameters disposed to control the parameter file itself. The numeral 803010 indicates a counter to store therein the number of uses of the parameter file. The numeral 803011 stands for a version number of NetWare and the numeral 803012 indicates a version number of the GUI section of print server installer having created the parameter file. Numeral 803020 to 803026 are parameters to set system control information of file server, namely, a file server name for connection of the print server, a print server name, a first portion of password, a central portion thereof, a last portion thereof, an operator name, and a user name, respectively. Numerals 803030 to 803047 are parameter setting information of printer setting conditions. The numeral 803030 designates a number of printers to be controlled by the print server and the numerals 803031 to 803047 denote conditions of the respective printers. Various conditions can be set for the respective groups of printers. The numerals 803031 to 803047 indicate a machine type name, an indication name of maker, a printer name, a connection type, a port type, a port number, a type number, presence or absence of interruption vector, an interruption vector number, a buffer size, a service condition, a form type number, a name of print job environment, presence or absence of character code conversion, a form name, a number of lines of form, and a number of characters, respectively. Numerals 803050 and 803053 denote conditions for the respective print queues. Various conditions can be set for the associated print queue groups. The numerals 803050 to 803053 designate a print queue name, priority, an operator name, and a user name, respectively. The AUTO section of print server installer establishes the system, printers, and print queues according to the parameter files above so as to accomplish the print server installation.

Figure 136:
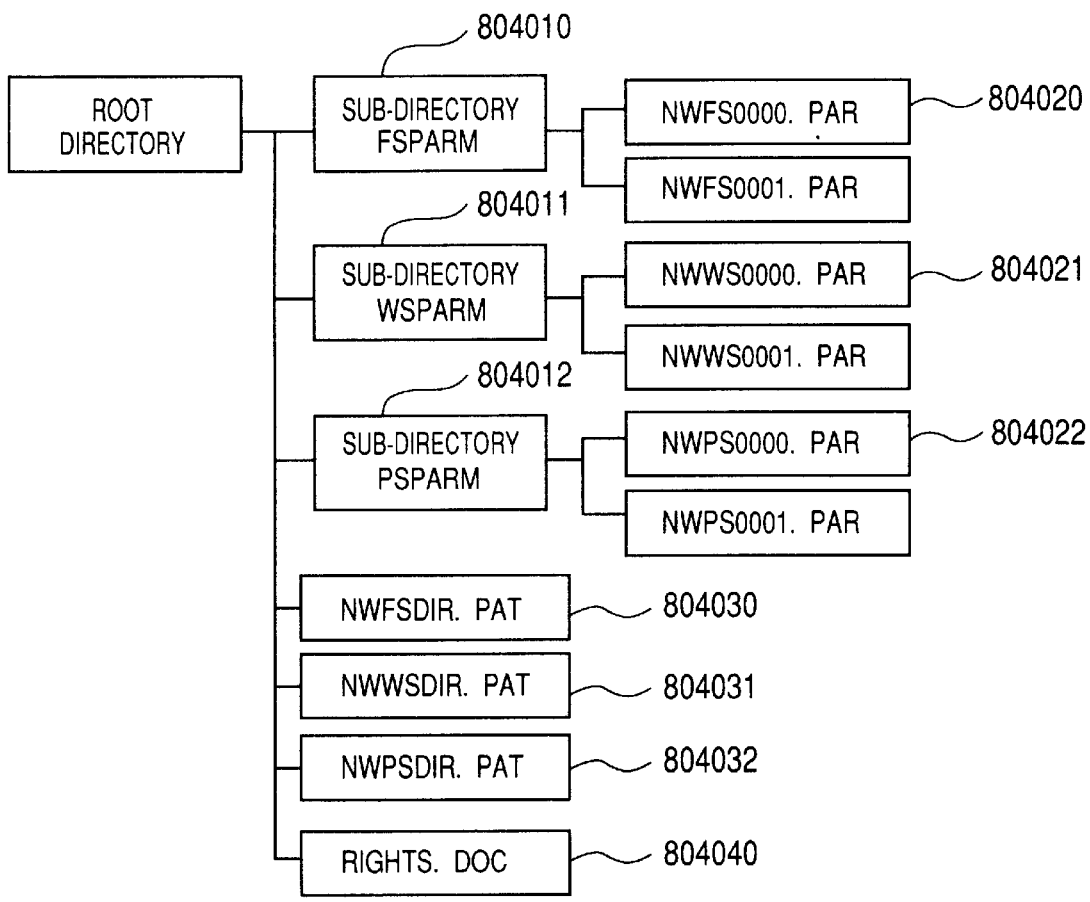
Figure 137:
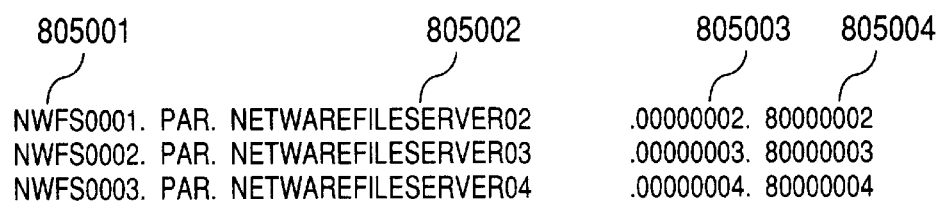

Referring now to FIGS. 136 and 137, the method of controlling the parameter files will be described.

FIG. 136 shows the configuration of a directory of an exclusive FD (to be referred to as a parameter disk herebelow) to store therein parameter files. The parameter disk is assigned with a unique volume name 804001, which is consisted of a fixed field for identifying the parameter disk and a variable field for storing therein items such as a control number. In a root directory of the parameter disk, there is disposed a unique sub-directory for each kind of installer. Reference numerals 804010 to 804012 denote subdirectories respectively of the file server, client, and print server installers. Under these sub-directories, parameter files are stored in accordance with the associated classification. Numerals 804020 to 804022 stand for parameter files respectively for the file server, client, and print server installers. An index information file of each sub-directory and a document file storing therein notes for operation of parameter disks and the copyright thereof are stored in the root directory. Numerals 804030 to 804032 designate index information files respectively for the file server, client, and print server installers. A numeral 804040 indicates the document file. All of the directories and files excepting the document file are associated with a conceal file attribute, namely, read-only files. The parameter files are accordingly prevented from being accessed directly from the users.

FIG. 137 is an example of the index information file for the file server installer. The file is structured as a text-format file and is constituted of as many file information records as there are parameter files in the related sub-directory. The contents thereof are updated when the GUI section generates and/or updates the contents of parameter files. Each record contains a name assigned to the parameter file and several setting items particularly familiar to the user. Reference numerals 805001 to 805004 stand for a parameter file name, a file server name equal to that of the parameter file, an IPX network number, and a network number. Thanks to adoption of the index information file, the user can utilize necessary parameters without considering existence of parameter files. For example, in a case where a plurality of parameter files are handled in the AUTO section of file server installer, there is presented a list of file server names for the user to select a desired one therefrom.

Figure 138:
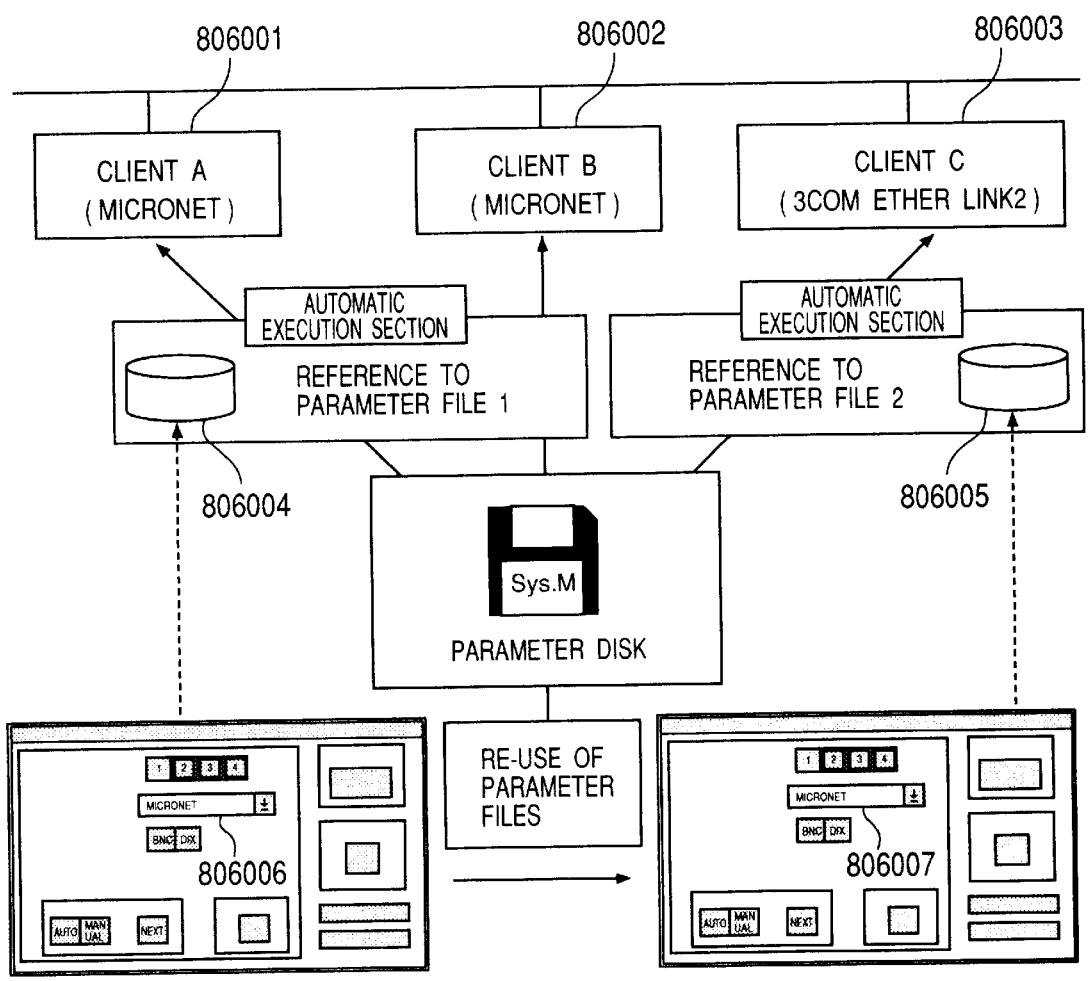

Description will now be given of use of parameter files by reference to FIG. 138. In a communication environment including three client machines A 806001, B 806002, and C 806003 connected to the system, assume that the machines A and B operate under an identical condition and only the machine C is assigned with a communication card type different from that of the machines A and B. Once there is generated a parameter file 806004 related to the installation of the client machine A, it is possible to employ the file for the installation of the machine B. For the machine C, the file applied to the machines A and B can be used again such that only the communication card type is altered from an item 806006 to an item 806007 by the GUI section, thereby easily preparing a parameter file 806005.

Figure 139:
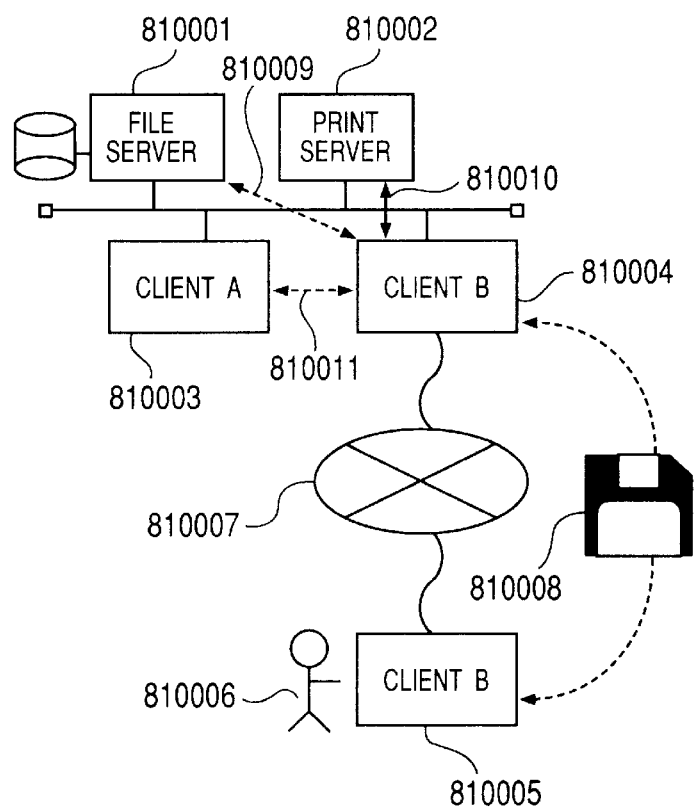

Referring now to FIG. 139, the following items will be described in detail.
1. Means for communicating parameters between GUI and automatic sections
2. Method of acquiring information of machines in operation by generating parameter file of existing machine
3. Method of maintaining user environments during system operation based on parameter files FIG. 139 shows an example of a local area network (LAN) constituted of a file server 810001, a print server 810002, and two clients 810003 and 810004. It is possible to connect a client B 810005 via a public or leased communication line 810007 to the LAN so as to operate the client as a client B' 810004 directly connected to the LAN. For transfer of parameters, there may be adopted a parameter disk 810008 to pass parameters in an offline fashion. Alternatively, an online transfer mode may be employed to pass parameters, for example, via the leased line. The communication path 81007 for the online connection is not limited to the leased line, namely, general communication means such as a radio communication channel and an exclusive communication line may possibly be utilized.

An operator 810006 to conduct jobs such as installations and maintenance can operate the client B in the same manner as for the client B' directly connected to the LAN to communicate parameters with the file server (810009), with the print server (810010), and with the client A (810011). Owing to the communicating method, the operator 810006 can achieve the jobs such as the parameter communication and maintenance from a distant or remote place, namely, the operator need not visit the actual location of the LAN system.

As indicated by arrows 810009 to 810011, the parameters are passed in two directions. Namely, by transmitting parameters, various environments can be prepared; whereas, by receiving parameters, information items of the respective systems can be collected. Even for a machine installed without using parameter files, there is supported a tool to create a parameter file from the current setting values. Consequently, the overall network system and the machines as the constituent components thereof can be integrally controlled according to the parameter files, which is applicable to the management of maintenance and operation of the system.

Moreover, in addition to the parameter files related to the environments of the respective machines constituting the network system, there are also produced parameter files associated with environments of the users of the network system such as the directory construction and user registration information. Namely, these user environments can also be controlled and maintained in an integrated fashion. These parameters can be set and/or collected in a realtime manner. In consequence, during the LAN operation, the user environments can be improved and the management of operation and maintenance of the overall network system can be accomplished.

Description will now be given of the user interface in a case where the AUTO or Auto section is operated in the Hitachi's personal station FLORA3010 (registered trade mark of Hitachi Ltd.) To operate the AUTO section in various types of machines, there has been adopted a standard control method free from differences between the machines. Screen images are presented according to only the outputs of text data, and an escape sequence is employed, for example, to change colors and to move cursor; moreover, a BIOS call of the AX standards is utilized to detect inputs from the keyboard and the mouse.

FIG. 140 shows the initial screen presented after the AUTO section of file server installer is initiated. In any screens presented during the operation of AUTO section, a base pattern and a pseudo window 901010 are displayed. The base pattern is configured with a header field 901001, a base field 901002, and a copyright display field 901003. Displayed in the header field are a name and a version number of a program of AUTO section. The base field is an area of background and is painted with a base color which varies between program types. In this embodiment, colors of red, blue, and yellow are employed for the file server, workstation, and print server installers, respectively. Thanks to adoption of the base colors in addition to the header display, the user can immediately identify the type of a program being executed. In the copyright field, the copyright of AUTO section is declared in any situation. In the pseudo window (to be simply called a window herebelow), a message for a user or a pseudo switch (to be simply called a switch herebelow) requesting a user selection for an operation are displayed in a rectangle painted with a color different from the associated base color. The AUTO section presents windows having various sizes and various data according to internal operations at the display point of time to report the state of progress of installation work, thereby requesting the user for an action.

FIGS. 141 to 178 show windows adopted by the file server installer.

Figure 141:
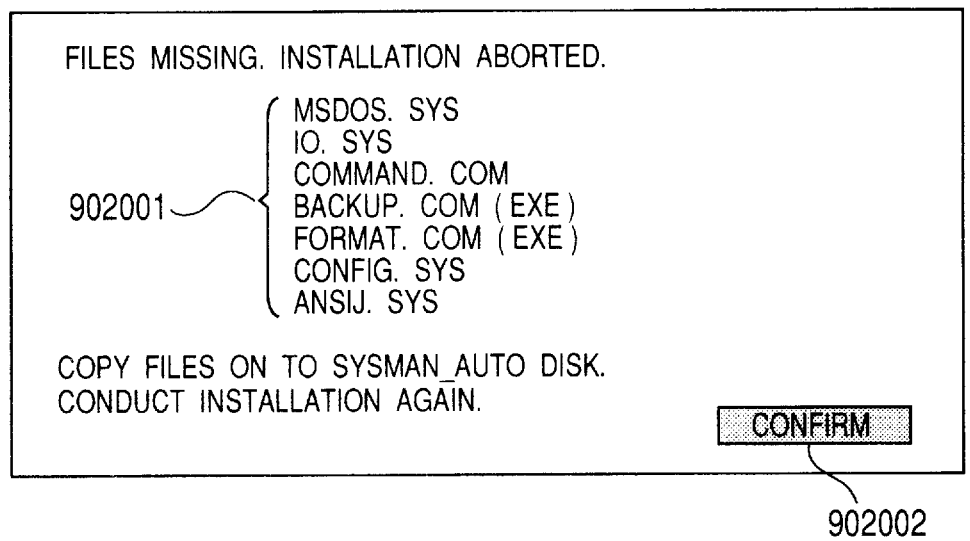

FIG. 141 shows an error message displayed when the files necessary for the program execution are not completely stored in the program system disk (to be called SYSMAN AUTO disk herebelow) after the AUTO section is initiated. A reference numeral 902001 indicates the names of missing files and a numeral 902002 denotes a switch for confirmation. When the user clicks the switch pattern by a mouse or depresses the return key, the message is confirmed so as to interrupt the installation as indicated by the contents of the message.

Figure 142:
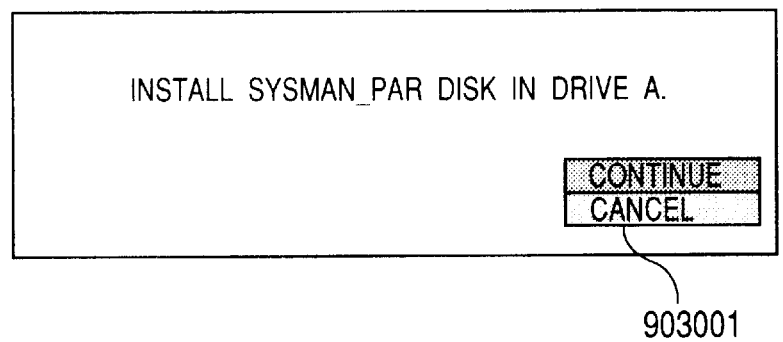

FIG. 142 shows a window to request the user to set a parameter disk (to be called SYSMAN_PAR disk herebelow) in the drive A. A numeral 903001 designates a switch to request continuation or interruption of the processing. The upper-half element of the switch is presented in a reverse display color denoting that the switch element is in an execution mode. The execution-mode switch can be arbitrarily changed by depressing the upper or lower cursor key or by clicking the remaining switch element by the mouse. When the return key is depressed, the system selects the switch in the execution mode at the point of time. Alternatively, when the execution-mode switch is again clicked by the mouse, the switch is selected. When the operator sets the disk according to the message and then selects "Continue", the processing is continued. When "Cancel" is activated, the processing is interrupted.

Figure 143:
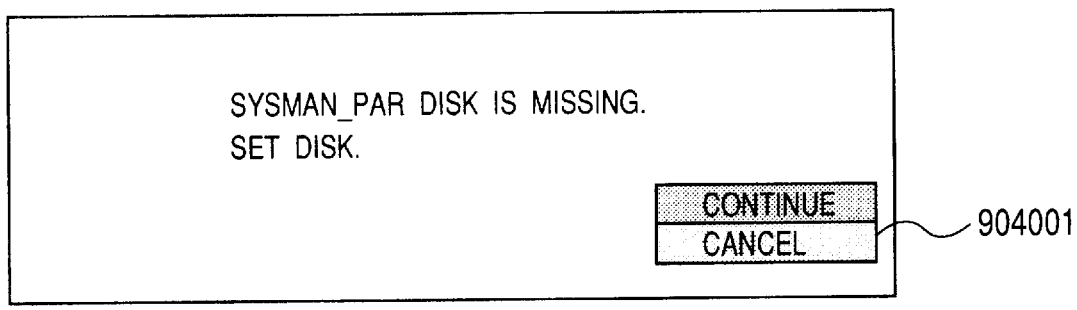

FIG. 143 shows an error message presented in a case where the SYSMAN_PAR disk is missing when "Continue" is selected in response to the message of FIG. 142. A numeral 904001 stands for a switch requesting selection for the continuation or interruption of processing.

Figure 144:
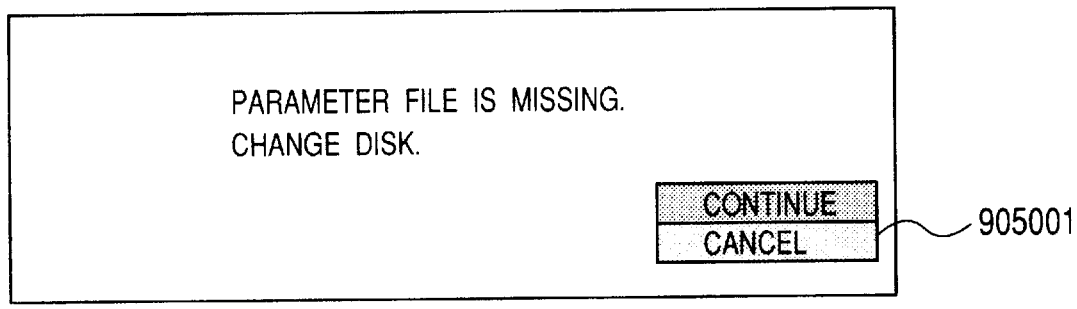

FIG. 144 shows an error message presented when a parameter file is missing on the SYSMAN_PAR disk. A numeral 905001 indicates a switch for the continuation or interruption of processing.

Figure 145:
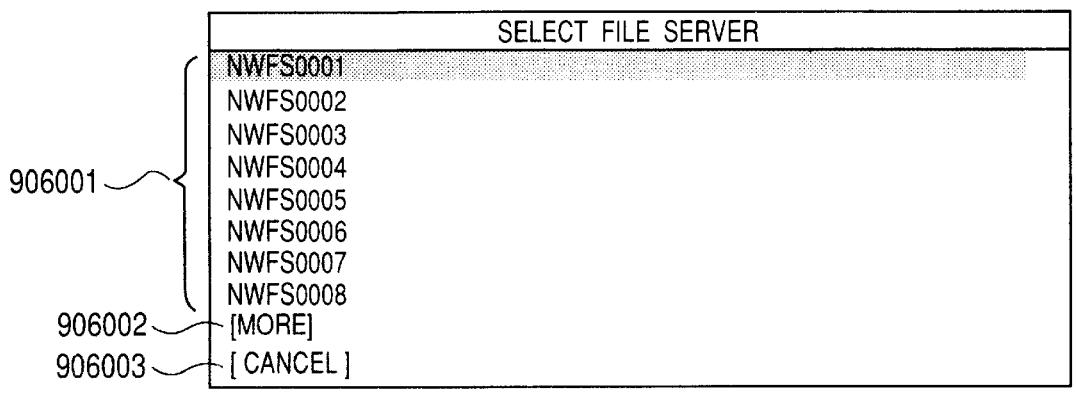

FIG. 145 shows a window presented when a plurality of parameter files exist on the SYSMAN_PAR disk, thereby requesting the user to select one of the files. A numeral 906001 denotes a file server name switch corresponding to a parameter file, a numeral 906002 stands for a "MORE" switch which is presented only when there exists data items to be displayed, and a numeral 906003 is an interruption switch. The file server name switch in the upper-most position is presented in a reversed display color indicating that the switch is in the execution mode. The execution-mode switch is changed sequentially when the execution-mode switch, the upper cursor key, or the lower cursor key is depressed in an order of "file server name", "MORE", and "Cancel". Alternatively, when clicked by the mouse, the clicked switch is set to the execution mode. When the return key is depressed, the system selects the execution-mode switch at the point of time. Moreover, when the execution-mode switch is again clicked by the mouse, the switch is selected. When the user selects one of the file server names, the processing is continued. When "Cancel" is activated, the processing is interrupted. When "MORE" is selected, there are displayed the remaining file server names.

Figure 146:
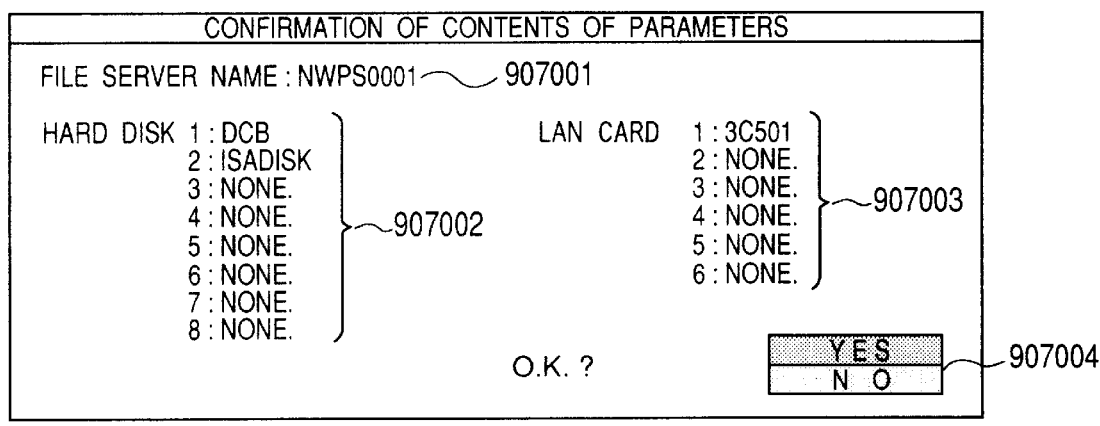

FIG. 146 shows a window presenting the contents of the parameter file selected in the window 145 to request confirmation of the user. Reference numerals 907001 and 907002 respectively designate a file server name and an HDD type. In a system to which up to eight HDDs can be connected, when parameters of only two HDDs are specified, "None" is presented for the six remaining units. A numeral 907003 designates a communication card type. In a system to which up to six cards can be connected, when parameters of only two cards are specified, "None" is presented for the four remaining sheets. A numeral 907004 indicates a switch requesting decision of acceptance of the contents of parameters.

Figure 147:
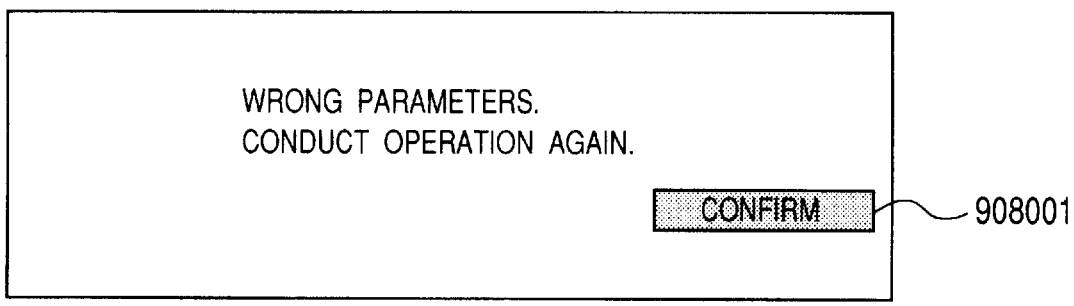

FIG. 147 shows an error message notifying that a wrong setting value is found in the parameter file confirmed in the window 146. A numeral 908001 denotes a switch for confirming the message.

Figure 148:
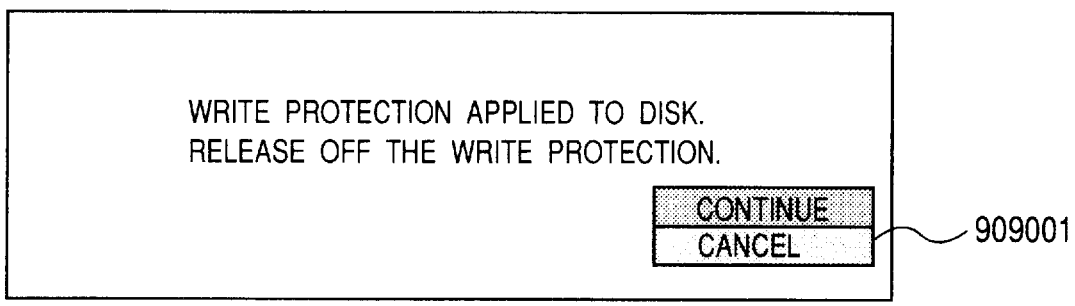

FIG. 148 shows an error message presented, in a case of a rewrite operation of the parameter file on the SYSMAN_PAR disk to update the counter value of the file, when the write protection is being applied to the disk. A numeral 909001 designates a switch for selection of the continuation or interruption of processing.

FIG. 149 shows a message displayed to notify the system state while the parameter file is being rewritten in the SYSMAN_PAR disk. FIG. 150 shows a message reporting the completion of the rewrite operation.

FIG. 151 shows a window requesting selection for backup of the DOS directory. A numeral 912001 indicates a switch requesting the user to decide whether or not the backup is to be prepared.

Figure 152:
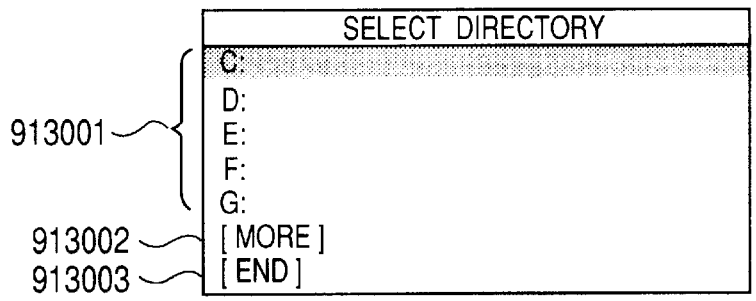

FIG. 152 shows a window requesting the user to select a directory when a plurality of DOS directories exit in the HDD, if the user has selected backup the DOS directory in FIG. 151. Numerals 913001 to 913003 respectively denote a directory name switch, a "MORE" switch to be displayed only when there exist remaining display data items, and an interruption switch.

Figure 153:
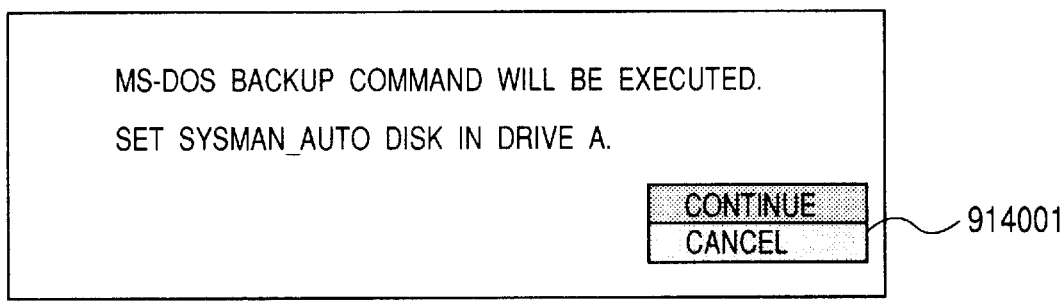

FIG. 153 shows a window requesting the user to set the SYSMAN_AUTO disk containing a BACKUP command program in the drive before executing the backup operation. A numeral 914001 denotes a switch for selecting the continuation or interruption of processing.

Figure 154:
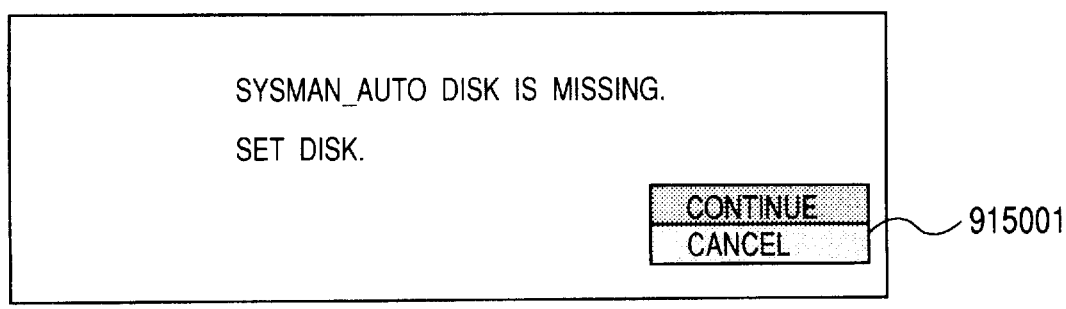

FIG. 154 shows an error message displayed in response to selection of "Continue" in FIG. 153 when the SYSMAN_AUTO is not appropriately set. A numeral 915001 designates a switch requesting the user to select the continuation or interruption of processing.

Figure 155:
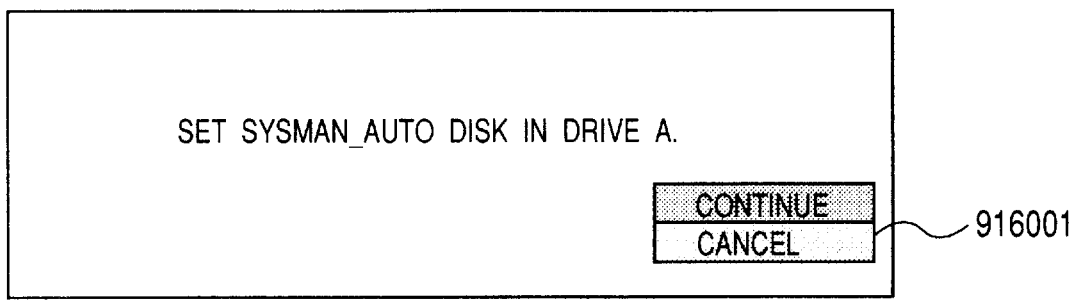

FIG. 155 shows a window requesting the user to set the SYSMAN_AUTO disk in the drive to copy the parameter file before executing the re-boot operation. A numeral 916001 denotes a switch for selection of the continuation or interruption of processing.

Figure 156:
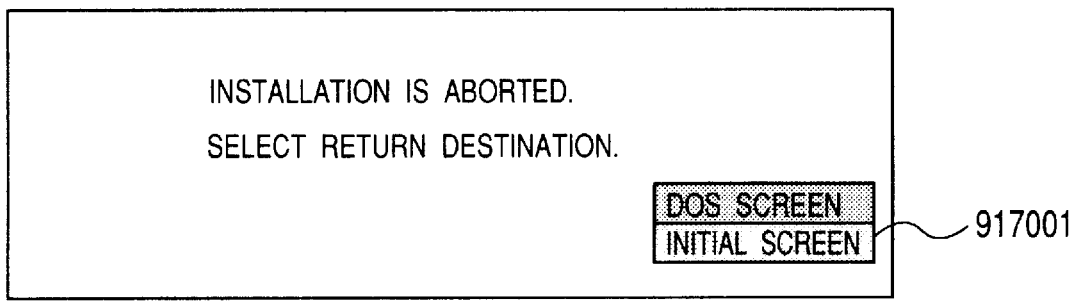

FIG. 156 shows a window presented when "Cancel" is selected in FIG. 155 to notify the interruption of installation. A numeral 917001 designates a switch requesting the user to select transition to the next screen.

FIG. 157 shows a window presenting a report of the state while the write operation is being executed on the SYSMAN_AUTO. FIG. 158 shows a completion report of the operation.

FIG. 159 shows a window presented during the re-boot execution. FIGS. 160 and 161 respectively show a window representing the system state while the partitions are being created after the re-boot operation and a window reporting the completion of the initialization of partitions.

FIG. 162 is a window requesting the user to set a DOS system disk in the drive before the DOS partitions are initialized. A numeral 923001 denotes a switch for selection of the continuation or interruption of processing.

Figure 163:
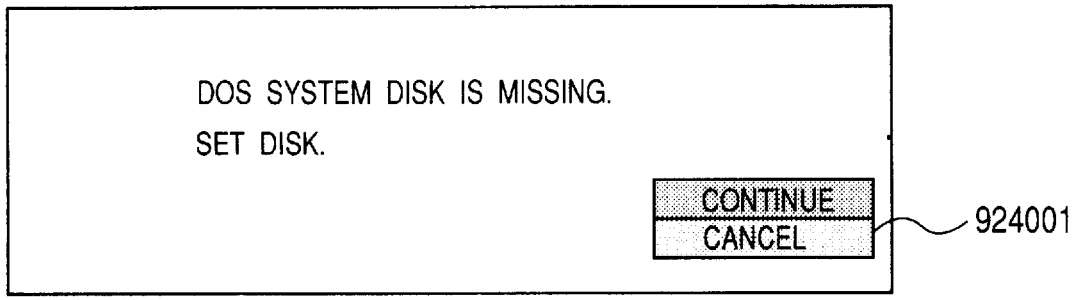

FIG. 163 shows an error message displayed in response to selection of "Continue" in FIG. 162 when the DOS system disk is not appropriately set. A numeral 924001 designates a switch requesting the user to select the continuation or interruption of processing.

Figure 164:
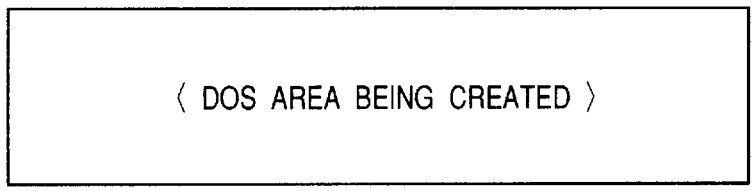
Figure 165:
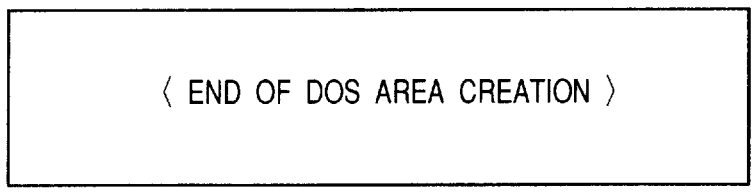

FIG. 164 shows a window notifying the system state while the OS partitions are being created. FIG. 165 shows a message of the completion report of the partition initialization.

Figure 166:
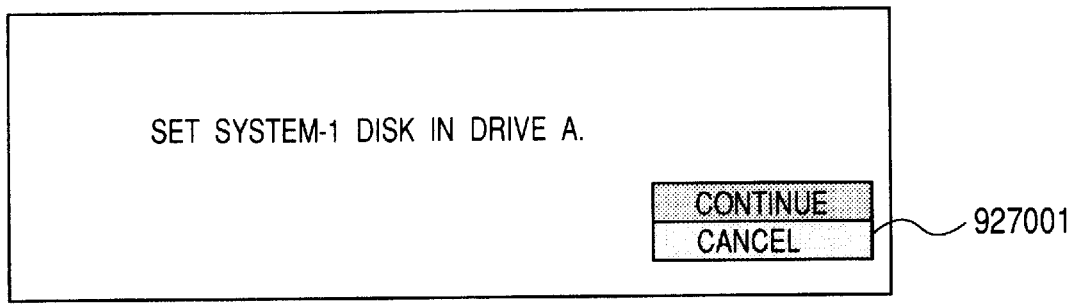

FIG. 166 is a window requesting the user to set the SYSTEM-1 disk on the drive. A numeral 927001 designates a switch requesting the user to select the continuation or interruption of processing.

Figure 167:
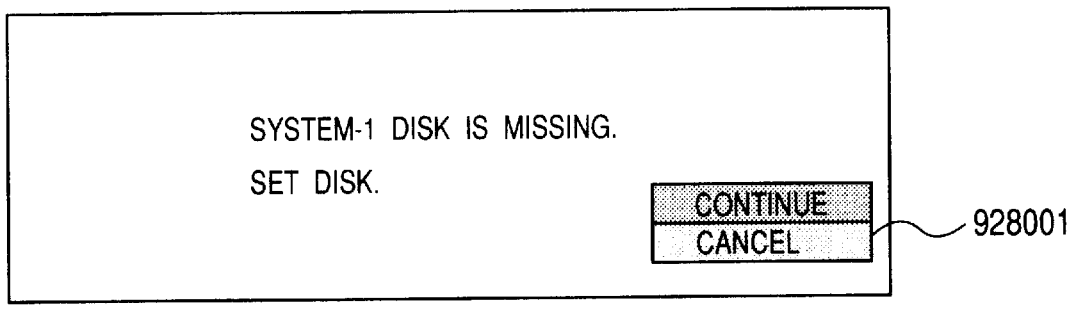

FIG. 167 shows an error message displayed in response to selection of "Continue" in FIG. 166 when the SYSTEM-1 disk is not appropriately set. A numeral 928001 designates a switch requesting the user to select the continuation or interruption of processing.

FIG. 168 shows a window notifying the system state while the contents of the SYSTEM-1 disk are being copied onto a partition. FIG. 169 shows a message of the completion report of the copy operation.

FIG. 170 is a window requesting the user to install the SYSTEM-2 disk on the drive. A numeral 931001 designates a switch requesting the user to select the continuation or interruption of processing.

Figure 171:
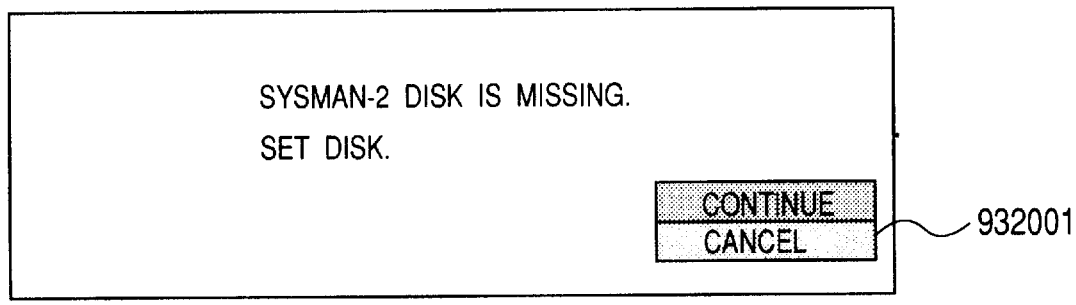

FIG. 171 shows an error message displayed in response to selection of "Continue" in FIG. 170 when the SYSTEM-2 disk is not appropriately set. A numeral 932001 designates a switch requesting the user to select the continuation or interruption of processing.

Figure 172:
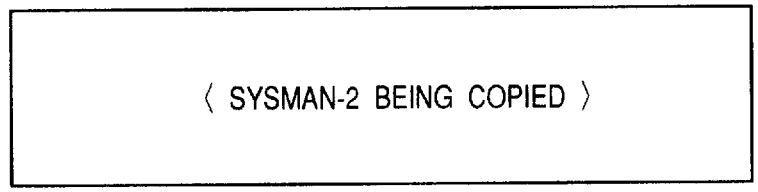
Figure 173:
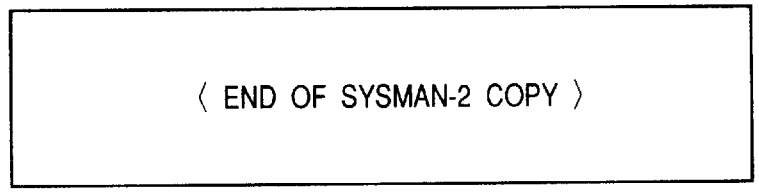

FIG. 172 shows a window notifying the system state while the contents of the SYSTEM-2 disk are being copied on to a partition. FIG. 173 shows a message of the completion report of the copy operation.

Figure 174:
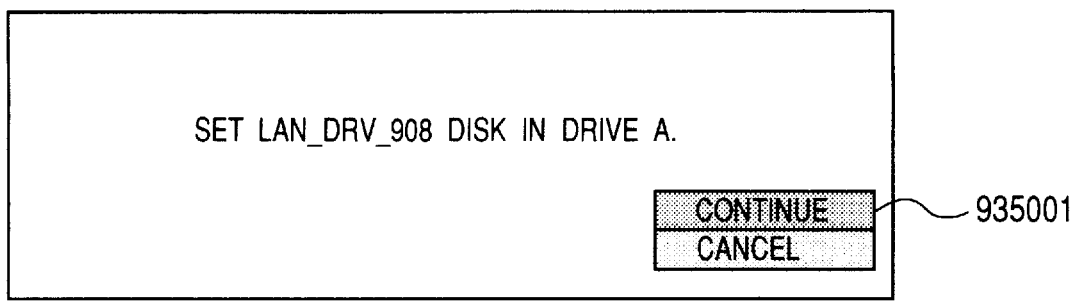

FIG. 174 is a window presented in response to the specification of MICRONET as for communication card so as to request the user to set the LAN_DRV_908 disk containing a MICRONET driver file on the drive. A numeral 935001 designates a switch requesting the user to select the continuation or interruption of processing.

Figure 175:
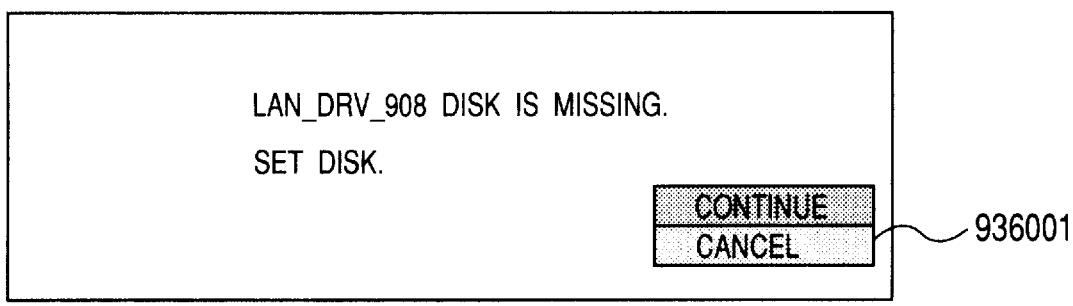

FIG. 175 shows an error message displayed in response to selection of "Continue" in FIG. 174 when the LAN_DRV_908 disk is not appropriately set. A numeral 936001 designates a switch requesting the user to select the continuation or interruption of processing.

FIG. 176 shows a window notifying the system state while the contents of the MICRONET driver file are copied onto a partition. FIG. 177 shows a message of the completion report of the copy operation.

FIG. 178 shows a window for explaining the processing of a SERVER program to be executed after the AUTO section program. A numeral 939001 is a switch for a message conformation.

FIGS. 179 to 186 are windows used by the client installer.

FIG. 179 shows a window displayed when a plurality of parameter files exist on the SYSMAN PAR disk to request the user to select one of the files. A numeral 940001 denotes a client name switch associated with the parameter file, a numeral 94002 is a "MORE" switch which is presented only when there exists data items to be displayed, and a numeral 940003 is an interruption switch.

FIG. 180 shows a window presenting the contents of the parameter file selected in FIG. 179 to request confirmation of the user. Reference numerals 941001 and 941002 respectively designates a client name and a machine type name as an object of installation. A numeral 941003 designates a type of drive for the installation. A numeral 941004 denotes a type of communication cards. In a system to which up to four communication cards can be connected, when a parameter of only one communication card is specified, "None" is presented for the three remaining sheets. A numeral 941005 indicates a switch requesting decision of acceptance of the contents of parameters.

Figure 181:
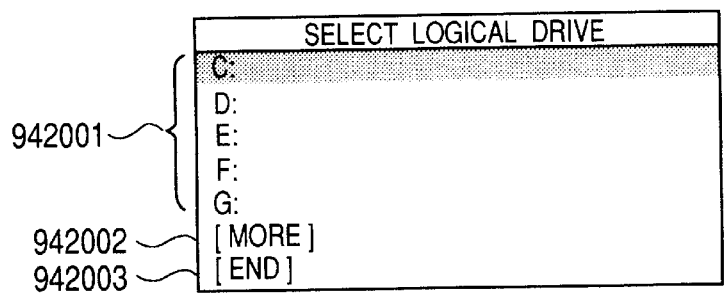

FIG. 181 shows a window displayed when there exist a plurality of drives which can be set as objects of installation so as to request the user to select one of the drives. A numeral 942001 denotes a drive name switch, a numeral 942002 stands for a "MORE" switch which is presented only when there exists data items to be displayed, and a numeral 942003 is a switch to terminate the selection.

Figure 182:
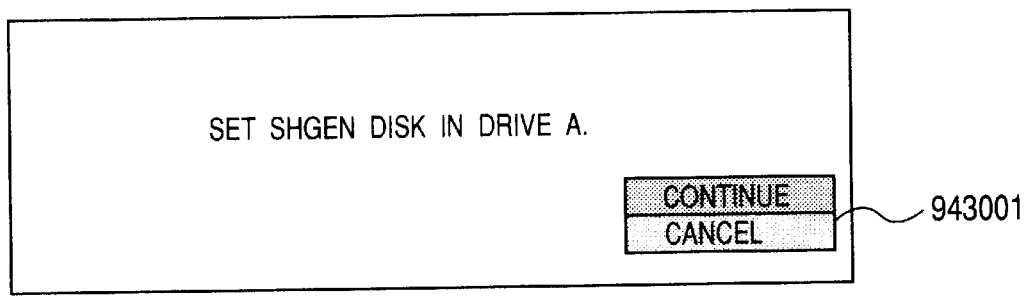

FIG. 182 shows a window requesting the user to set the SHGEN disk on the drive. A numeral 943001 designates a switch requesting the user to select the continuation or interruption of processing.

Figure 183:
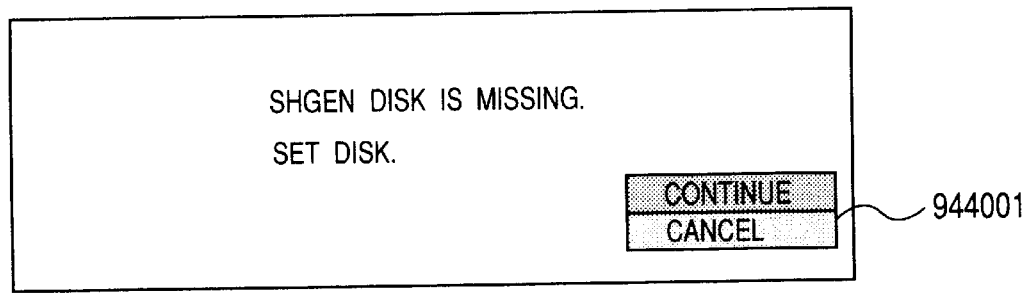

FIG. 183 shows an error message in response to the selection of "Continue" in FIG. 182 when the SHGEN disk is not appropriately installed. A numeral 944001 denotes a switch requesting the user to select the continuation or interruption of processing.

FIG. 184 shows a message display to notify the system state while the parameter contents of the SHGEN disk is being copied. FIG. 185 shows a message reporting the completion of the copy operation.

FIG. 186 is a message of the completion of the installation. A numeral 946001 indicates a switch to confirm the message.

FIGS. 187 to 191 are windows employed by the print server installer.

FIG. 187 shows a window displayed when there exist a plurality of parameter files in the SYSMAN_PAR disk so as to request the user to select one of the files. A numeral 950001 denotes a print server name switch corresponding to the parameter file, a numeral 950002 is a "MORE" switch which is presented only when there exists data items to be displayed, and a numeral 950003 is a switch to terminate the selection.

FIG. 188 shows a window presenting the contents of the parameter file selected in FIG. 187 to request confirmation of the user. Reference numerals 951001 and 951002 respectively designate a print server name and a type name of printer to be connected. In a system to which up to 16 printers can be connected, when a parameter of only one printer is specified, "None" is presented for the 15 remaining printers. A numeral 951003 designates a switch requesting the user to select acceptance of the contents of parameters.

Figure 189:
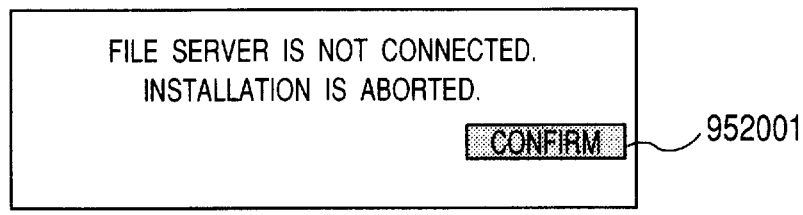

FIG. 189 shows an error message presented when the file server is missing in the environment in which the printer server is installed. A numeral 952001 denotes a switch requesting confirmation of the user.

Figure 190:
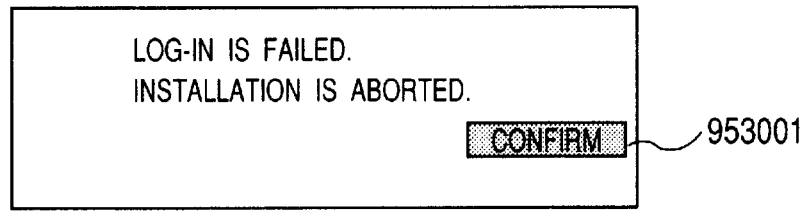

FIG. 190 shows an error message displayed when an attempt of a log-in to the file server selected by the user is failed. A numeral 953001 indicates a switch to confirm the message.

Figure 191:
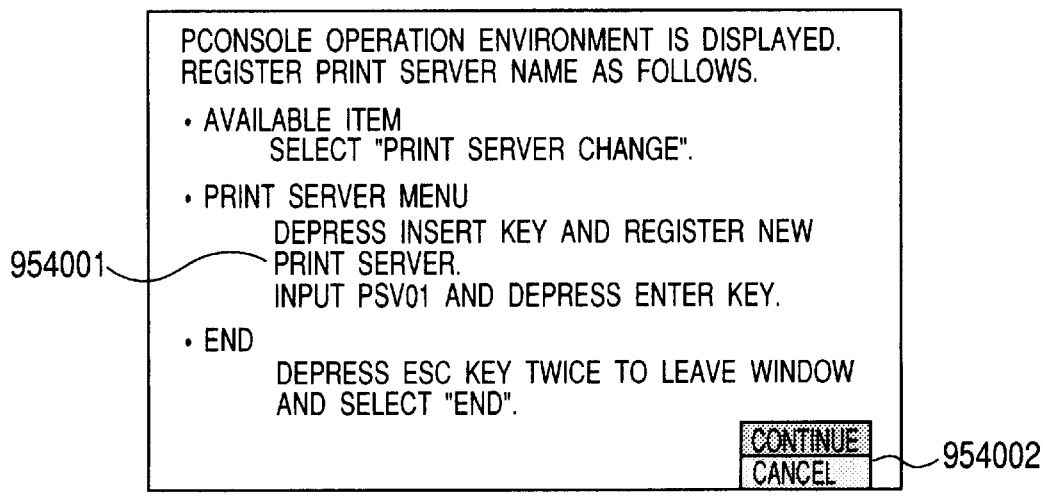

FIG. 191 is a window for explaining the processing of the Pconsole program to be executed after the AUTO section. A numeral 954001 indicates a print server name to be set in this processing. A numeral 954002 denotes a switch to confirm the message.

Subsequently, description will be given of an embodiment according to the present invention. FIG. 197 is a block diagram schematically showing the system configuration of an embodiment according to the present invention. The system includes a server 1 and clients 2a to 2c, which are connected to each other via an LAN 600. The client 2a primarily accomplishes the construction work according to the present invention and is called a working client, however, the client need not be provided with any special hardware. Each of the server 1 and the client 2 is an information processing apparatus called a personal computer or a workstation. FIG. 200 shows the constitution of the apparatus, which includes a central processing unit (CPU) 901, a memory 902 for temporarily storing therein program and data of the CPU 1 and for achieving read and write operations under control of the CPU 1, a keyboard controller 903 for controlling key inputs from a keyboard 910, an LAN controller 904 to achieve communications via the LAN 600 with another server 1 or another client 2, a hard disk (HD 3) 905, an HD controller 908 for controlling data read and write operations, a floppy disk (FD) controller 906 for controlling read and write operations on a FD installed in an FD drive 909, a display controller 907 for displaying data on a display 911, and a bus 950 for transmitting signals between the CPU 901, the memory 902, and the respective controller. In accordance with the present invention, files of programs and data are stored on the HD3 908 and/or the FD installed in the FDD 909 to achieve the following operations. Information is read from the files under supervision of the HD controller 905 and the FD controller 907 to be transferred to the memory 902. Moreover, information in the memory 902 is written in the files.

First, an outline of the operation will be described. FIG. 192 illustratively shows the system configuration associated with an NOS construction method according to the present invention. The system includes a server 1, a client 2, a working client 2a, a server HD 3, a parameter input program 101, a server construction FD 102, a program to generate client construction FD 103, a server construction tool 104, a program to install operation monitor tool 105, a program to install application 106, a construction tool FD 107, and a HD.network driver FD 108. Moreover, the constitution includes an NOS system FD 109, a server construction FD 110, a client construction FD 111, an operation monitor tool FD 112, an application FD 113, a client construction tool 114, an FD for graphical user interface (GUI) program 116, and a program to install GUI program 115. Next, description will be briefly given of the procedure of system construction method according to the embodiment.

When constructing a system, the operator instructs the operating system from the working client 2a to initiate the parameter input program 101 stored on the construction tool FD 107. Based on default values and inputs from the user, the program 101 prepares information necessary for the construction. The user can easily input such information items through the graphical user interface. Furthermore, thanks to adoption of the default values, the number of items to be set by the user has been minimized to the maximum extent, which is a feature of the present invention. With this provision, parameters to be inputted by the user in response to requests from the pertinent program in the prior art can be easily inputted in a batch manner at a time.

The program 102 creates the server construction FD 110 according to information acquired by the program 101. Similarly, the program 103 produces the client construction FD 111 based on information acquired by the program 101.

When the operator sets the FD 110 in the server 1 and then resets the server 1, the server construction tool 104 starts its operation to conduct an automatic server construction. The tool 104 is constituted with an automatic execution file and a plurality of programs to construct the system. In this situation, when necessary, the NOS program is copied from the NOS system FD 109 onto the server HD 3. Similarly, when the operator sets the FD 111 in the client 2 and then resets the client 2, the client construction tool 114 starts its operation to conduct an automatic client construction.

When the setting operations respectively of the server 1 and the client 2 are completed as a result of the processing above, the program 105 starts operation thereof to move a program from the operation monitor tool FD 112 via the LAN 600 onto the server HD 3. Moreover, the program 106 transfers the application program from the application FD 113 via the LAN 600 onto the HD 3.

Subsequently, the construction procedure and processing programs of the embodiment will be described in detail.

FIG. 218 shows programs and data files stored in the construction tool FD 107, the operation monitor tool FD 112, the HD.network driver FD 108, and the NOS system FD 109. FIGS. 193 to 195 are flowcharts showing actual procedures of construction processing. In each diagram, items respectively on the left and right sides thereof denote operations of users and programs, respectively. FIGS. 193 to 195 shows operation procedures of the working client 2a, the file server 1, and the other clients 2, respectively. FIG. 218 shows programs and data files which are utilized in the construction operations and which are loaded in the construction tool FD 107, the operation monitor tool FD 112, the HD network driver FD 108, and the NOS system FD 109.

First, the FD 107 is set in the client 2a in a step 201 and then the user initiates the construction automatic execution file. In a step 203, according to the automatic execution file, the construction tool is installed in the HD of the client 2a and then the parameter input program 101 is started in a step 204.

FIGS. 198 and 199 show examples of automatic construction execution file. In the step 202, a construction automatic execution file 700 of FIG. 198 is initiated. In a line 701, a directory for the construction tool is created on the ED 908. In a line 702, a directory pointer is moved to the directory. In a line 703, all files on the FD 107 are copied onto the directory on the HD 908. As a result of the copy operation, a construction automatic execution file 800 of FIG. 199 is also copied onto the HD 908. In a line 704, the file 800 is activated so as to terminate the operation of the file 700. The initiation of the program 101 in the step 204 is executed in a line 801 of FIG. 199. In a similar manner, lines 802 to 815 of the file 800 of FIG. 199 are sequentially executed to achieve each processing of FIG. 193.

In a step 205, the program 101 displays such an information item required for the user to construct the system as a display screen of FIG. 196 on the display 911, thereby acquiring hardware configurations respectively of the server 1 and the client 2 in an interactive manner. In a step 206, parameter file is initialized to store therein the obtained parameters. Referring now to FIGS. 203 to 205, the operations of the steps 204 to 206 will be described in detail. FIG. 205 shows a flowchart of the parameter input program 101. In a step 1401, the system reads the default value file 1200 of FIG. 203. The file 1200 contains default values and selection values of hardware configurations respectively of the server 1 and the client 2. In a step 1402, a server 1 input screen 501 of FIG. 196 is presented on the display 911. At this point of time, the cursor is on the selection line of server machine type. In a step 1403, according to the user input, the machine type name is selected. The default and selection values vary depending on machine types. Consequently, using the default and selection values attained in the step 1401, there are displayed in a step 1404 the default and selection values of the respective hardware parameters as shown in the input screen 501 of FIG. 196. In a step 1405, the parameters are confirmed or additional values are set by the user. In a step 1406, according to specification from the user, it is determined to set another server or to terminate the server setting operation. If it is determined to set another server, control is returned to the step 1402; otherwise, control is passed to a step 1407 to set a client. The steps 1407 to 1411 conduct, when the server is replaced by the client, the same operation as the steps 1402 to 1406. After parameters are completely inputted for the servers and clients, in step 1450, a parameter file 1300 is generated to record therein the input values. FIG. 204 shows an example of the parameter file 1300. In this example, the parameter file 1300 is created after all of the parameters are inputted; however, a parameter file 1300 may be generated or modified for each input operation. Moreover, in this example, only one pattern of default values are adopted in the parameter input program; however, there may be used a plurality of default patterns for selection by the user so as to decrease the number of parameters to be inputted by the user for various system configurations. FIG. 222 is an example of the parameter input program related to a plurality of default patterns, whereas FIG. 223 shows an example of a default value file 3200 associated with the plural patterns. The system reads the default value file 3200 in a step 3101 and displays in the screen the construction patterns registered to the file 3200 in a step 3102. FIG. 224 shows an example of the display screen. In a step 3103, the user selects one of the construction patterns to be adopted as a default value. Subsequent steps up to a step 3150 conducts the same operation as those of the first example of parameter input program shown in FIG. 205. In a step 3151, parameters inputted by the user according to the default values are registered to the file 3200 as a new pattern or as a replacement of the existing registered pattern. Resultantly, for the default value, a plurality of patterns can be easily registered.

Next, when the user sets the HD.network driver FD 108 in a step 207, a necessary driver program is temporarily saved on the ED of the client 2a in a step 208.

Subsequently, the program 102 operates in a step 210. The operation of the program 102 will now be described by reference to FIG. 206. First, in a step 1501, to request the user to set the server construction FD 110 in the FDD 909 of the client 2a, an instruction is presented on the display 911 of the client 2a. After the setting of the FD 110 is confirmed, the system reads the parameter file 1300 in a step 1502. In a step 1503, based on the contents of the file 1300, an HD driver and a network driver file which are necessary for the processing are copied onto the FD 110. In a step 1504, an automatic execution file for reset operation 1000 of which an example is shown in FIG. 201 is created on the FD 110. Next, in a step 1505, an automatic execution file for NOS initiation 1100 of which an example is shown in FIG. 202 is generated on the FD 110. In a step 1506, a reference file for NOS initiation 2500 of which an example is shown in FIG. 216 is produced on the FD 110, thereby terminating the program to create server construction FD 102. FIG. 219 shows the files generated on the FD 110 as a result of the processing above.

Thereafter, in a step 211, the contents and procedures of the job to be achieved from the server 1 by the user are presented on the screen of the display of the client 2a. FIG. 207 shows a flowchart of the guidance display program 1600. The system reads in a step 1601 the guidance data file containing text or graphic data and displays the data in a step 1602. FIG. 208 shows an example of the guidance display screen.

On the other hand, according to the guidance, the user removes the FD 110 from the client 2a in a step 212 of FIG. 193 to set the FD 110 in the server 1 so as to execute the server construction processing of a step 300. The processing will now be described by reference to FIG. 194. The user sets the FD 110 in the server 1 in a step 301 and resets or powers the server 1 in a step 302. In response to the reset operation, the automatic execution file 100 of FIG. 201 is executed in a step 303. Namely, a line 1001 is executed to achieve the initialization of the server HD of a step 304. When lines 1002 and 1003 are executed, there are conducted a copy of the automatic execution file for NOS initiation of a step 305 and a copy of the reference file for NOS initiation of a step 306 to server HD 3 from the FD 110. Subsequently, a line 1004 is executed such that a message is displayed to request the user to set the NOS system FD 109. In a step 307, when it is detected that the FD 109 is set, a line 1005 is executed such that the file is copied onto the server HD 3 in a step 308. When a line 1006 is executed, the NOS is initiated in a step 309 in which the NOS refers to the reference file 2500 to execute the automatic execution file 1100. As a result of the initiation, the HD driver, the network driver, etc. are incorporated in the system. After the processing above, the user operation returns to the client 2a in a step 350. In a step 230 of FIG. 193, the user notifies the completion of processing of the server 1 to the guidance display program 1600 being executed in the client 2a. Resultantly, when this condition is detected in a step 1603 of FIG. 207, the program 1600 is terminated. Through the processing above, the files of FIG. 221 are generated on the server HD 3.

Next, in a step 231, a client shell is generated on the HD of the working client. FIG. 209 shows a flowchart of the client shell generating program. In a step 1801, the system reads the parameter file 1300 to obtain an LAN card name and a protocol of the client 2a. Next, in a step 1802, referencing an LAN driver association file 1900 as shown in FIG. 210, there is attained an LAN driver file name corresponding to the LAN card name. In a step 1803, the system reads the LAN driver file. In a step 1804, the client shell program is generated.

Moreover, in a step 232 of FIG. 193, the client shell program is executed to enable communication with the server 1 via a network. Next, in a step 233, a log-in operation of a privileged user is achieved to the server 1. In steps 234 and 235, a log-in execution file and printer setting file are generated on the server HD 3 of the server 1. Thereafter, in a step 237, executing the GUI program installation program 115, the GUI program is moved from the GUI program FD 116 onto the server ED 3. Next, in a step 239, using the operation tool installation program 105, the operation tool stored on the operation tool FD 112 is moved onto the server HD 3 so as to be used in the GUI program. Subsequently, the operation tool is initiated to conduct the user registration in a step 241 according to programs of the tool.

Thereafter, in a step 244, the file construction program 2000 is executed. The file constructing operation will be described by reference to the flowchart of the file construction program 2000 shown in FIG. 211. First, in a step 2001, the system reads a default directory construction file 2100 of which an example is shown in FIG. 212. The file 2100 contains, for each directory, a directory name, a hierarchic structure, an attribute for the directory, and default values of attributes of files in the directory. In the example of FIG. 212, there are shown flags as attribute examples, namely, "Sy: System", "Ro: Read only", "Rw: Read and write enabled", "Fi: Find enabled", and "Sh: Available for shared use". According to information of the file 2100, a directory diagram is displayed in a step 2002. FIG. 217 shows an example of the display screen image of the directory diagram. In a step 2003, when necessary, the user adds or changes items in the display screen. The directory configuration thus determined is recorded in the directory file in a step 2004. Moreover, according to the directory structure, files and directories are created in a step 2005 and then attributes are set in a step 2006.

After the file construction is finished, the AP installation program 106 is executed in a step 246 of FIG. 193. Next, the operation of the program 106 will be described by reference to the flowcharts of FIGS. 213 and 214. When the program 106 is initiated, the system call interruption vector is first changed in a step 2201 so that control is passed, when a system call is issued from an application program, to a program to process an interruption for application installation program 2300. Next, in a step 2202, a command interpreter of the operating system is invoked as a sub-process. In a step 245, the user executes a desired installation program or installs the application by a command of the operating system. In this situation, when a system call is issued from the AP installation program or from the OS command, control is passed to the interruption processing routine 2300 thanks to the change of system interruption vector in the step 2201. In a step 2301, a check is made to decide whether or not the system call instructs a file creation for the file server. If this is the case, the system reads the directory construction file in a step 2302. In a step 2303, according to the attributes specified by the file, there is created the objective file for the file server. Owing to this provision, there is obtained an advantageous feature, namely, the file attribute setting operation which necessitates in the prior art a manual operation after the AP installation can be automatically accomplished. On the other hand, if the call is other than the case above, control jumps to the original system call interruption vector, namely, the vector not modified, thereby accomplishing the processing in the original form.

Until the AP installation by the user is terminated, the step 245 of FIG. 213 is repeatedly executed. However, when the AP installation is finished, the sub-process is terminated in a step 2251, the system call interruption vector is restored in a step 2252, and then the AP installation program 106 is terminated.

Next, in a step 248 of FIG. 193, the program to create client construction FD 103 is initiated. FIG. 215 shows a flowchart of the program 103. First, in a step 2401, the system reads the parameter file 1300. In a step 2402, a message is presented on the display to instruct the user to install an FD to construct client n 111. In a step 2403, using the LAN driver association file 1900 of FIG. 210, there is attained an LAN driver file name corresponding to the LAN card name of client n stored in the file 1300. In a step 2404, the LAN driver file is copied onto the FD 111. In steps 2405 to 2407, a client shell, a server connection test program, and a client construction batch file are respectively copied onto the FD 111. The operation above is repeatedly accomplished for all clients, thereby terminating the program 103.

The client construction FD 111 thus prepared contains the files shown in FIG. 220. Uses of these files in the respective clients 2 will next be described.

In each client 2, operations are carried out as follows. As shown in FIG. 195, the user sets the FD 111 and then executes the automatic execution file for client construction in a step 401. In response thereto, a client shell (In Step 402), an LAN driver file (In Step 403), and a server connection test program (In Step 450) are respectively copied onto the HD. Moreover, the client shell is executed in a step 404 and a communication test with the server 1 is conducted in a step 405, thereby terminating the construction of client 2.

As above, according to the embodiment, in addition to the installation of NOS in the server, the user registration, the file construction, the GUI program installation, the application installation, and the shell installation to the client can be achieved through a sequence of processing steps.

We claim:

1. A method of constructing a network operating system for operating a network to which a plurality of network machines are connected for communications therebetween, comprising the steps of:

integrally setting, by a working machine, parameters unique to each of said network machines necessary for initial installation of said network operating system from said working machine; and constructing said network operating system by initially installing said network operating system in each of said network machines for which initial installation is to be conducted according to said parameters set in said setting step.

2. A method according to claim 1, further comprising the steps of:

recording, on a medium by said working machines said parameters in a parameter file; and reading by said network machines said parameter file from said medium.

3. A method according to claim 2, wherein said medium is a portable recording medium.

4. A method according to claim 3, further comprising the steps of:

storing on said medium a file establishing a correspondence between a directory in which said parameter file is stored and names of said network machines; and conducting an installation of said network operating system on one of said network machines specified by a user by use of said parameter file corresponding to said one network machine.

5. A method according to claim 2, wherein said working machine is one of the plural network machines.

6. A method according to claim 5, wherein the working machine transmits the parameters recorded on said recording medium via the network to one of said network machines for which installation is to be conducted.

7. A method according to claim 2, wherein:

the parameter file includes an automatic execution file and a reference file for initiation; and each of the network machines executes the automatic execution file by use of the reference file for initiation.

8. A method according to claim 1, wherein the setting of parameters by the working machine is conducted by use of a graphical user interface.

9. A method according to claim 1, wherein the setting of parameters by the working machine is achieved according to predetermined hierarchic levels.

10. A method according to claim 1, wherein the setting of parameters by the working machine is conducted integrally in a batch manner for said network machines for which installation is to be conducted.

11. A method according to claim 1, wherein the setting of parameters by the working machine is conducted integrally in a batch manner for network machines connected to a plurality of networks including said network.

12. A method according to claim 1, wherein the setting of parameters by the working machine is achieved by use of preset default values.

13. A method according to claim 1, wherein the setting of parameters by the working machine is conducted by setting a parameter as a key such that parameters related thereto are automatically changed or updated.

14. A method according to claim 1, wherein the setting of parameters by the working machine is conducted by re-using parameters beforehand set for a network similar to said network or for similar functions of constituent elements thereof.

15. A method according to claim 14, wherein said re-using of parameters is achieved by at least one of changing a change portion thereof and deleting or adding an unmatched portion thereof, thereby setting the parameters.

16. A method according to claim 1, further comprising the step of:

utilizing said parameters set in said setting step for operation control and maintenance control.

17. A method according to claim 1, wherein the setting of parameters by the working machine is carried out in response to a sequential presentation of guidance information of a setting procedure with selection items displayed for each selection item as confirmation.

18. A method according to claim 1, wherein said installing step further comprises the step of:

simultaneously conducting an installation of application programs of said network machines connected to the network.

19. A method according to claim 1, wherein in said installing step, a user registration is simultaneously accomplished.

20. A method according to claim 1, wherein said step of integrally setting the parameters is performed in a batch manner.

21. A method according to claim 1, wherein said step of initially installing said network operating system in said each network machine occurs at initialization of said network.

22. A method according to claim 21, wherein said parameters unique to each of said network machines are set according to respective hardware configurations of said each network machine and the operating system.

23. A network integrated construction system for constructing a network operating system for operating a network, comprising:

at least one working machine including interface means for receiving a medium for transferring information and setting means for setting parameters on the medium unique to each of a plurality of network machines, physically connected to the network, necessary to logically connect the network machine to the network; and each of said plurality of network machines having interface means for receiving the medium, input means for inputting the parameters set on the medium, and constructing means for constructing the network operating system by initially installing the network operating system to said each network machine according to the parameters input from the input means.

24. A system according to claim 23, wherein the parameters are formed into parameter files.

25. A system according to claim 24, wherein:

each of the parameter files is a file on the portable recording medium, portable recording medium includes a file establishing a correspondence between a directory in which the parameter files are stored and names of the network machines, and the constructing means installs the network operating system by use of a parameter file associated with one of the names specified by a user.

26. A system according to claim 23, wherein the medium is a portable recording medium.

27. A system according to 23, wherein:

the at least one working machine which is one of the plural network machines is connected to the network as the medium; and the parameters are transmitted from the at least one working machine via the network to a network machine for which installation is to be conducted.

28. A system according to claim 23, wherein the setting means sets parameters by use of a graphical user interface.

29. A system according to claim 23, wherein the setting means sets parameters according to predetermined hierarchic levels.

30. A system according to claim 23, wherein the setting means achieves the parameter setting operations for a plurality networks including said network and for a plurality of network machines connected to said networks integrally in a batch manner.

31. A system according to claim 23, wherein the setting means achieves the parameter setting operation by use of predetermined default values.

32. A system according to claim 23, wherein the setting means is responsive to a setting of one of said parameters as a key to automatically change or to update parameters related thereto.

33. A system according to claim 23, further comprising:

manual setting means for manually setting the parameters, wherein the manual setting means is coupled with the setting means by an online help menu.

34. A network according to claim 23, wherein the network operating system is initially installed in said each network machine at initialization of said network.

35. A network according to claim 34, wherein the parameters unique to each of said network machines are set according to hardware configurations of respective ones of said each network machine and the operating system.

36. A network integrated construction system for constructing a network operating system for operating a network, comprising:

at least one working machine including setting means for integrally setting parameters unique to each of a plurality of network machines physically connected to the network, necessary to logically connect the network machine to the network; and each of said plurality of network machines having input means for inputting the parameters set by the working machine, and constructing means for constructing the network operating system by initially installing the network operating system to said each network machine according to the parameters input from the input means.

37. A network according to claim 36, wherein the network operating system is initially installed in said each network machine at initialization of said network.

38. A network according to claim 37, wherein the parameters unique to each of said network machines are set according to hardware configurations of respective ones of said each network machine and the operating system.

* * * * *